(12) United States Patent
Robinson et al.

(10) Patent No.: US 12,366,701 B2
(45) Date of Patent: Jul. 22, 2025

(54) OPTICAL STACK FOR IMAGING DIRECTIONAL BACKLIGHTS

(71) Applicant: RealD Spark, LLC, Beverly Hills, CA (US)

(72) Inventors: Michael G. Robinson, Boulder, CO (US); Graham J. Woodgate, Henley-on-Thames (GB); Jonathan Harrold, Leamington Spa (GB); Robert A. Ramsey, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 18/095,369

(22) Filed: Jan. 10, 2023

(65) Prior Publication Data

US 2023/0408750 A1 Dec. 21, 2023

Related U.S. Application Data

(63) Continuation of application No. 16/609,540, filed as application No. PCT/US2018/031206 on May 4, 2018, now abandoned.
(Continued)

(51) Int. Cl.
  *G02F 1/133* (2006.01)
  *F21V 8/00* (2006.01)
  (Continued)

(52) U.S. Cl.
  CPC ......... *G02B 6/0076* (2013.01); *G02B 6/0068* (2013.01); *G02F 1/133536* (2013.01); *G02F 1/133607* (2021.01)

(58) Field of Classification Search
  CPC .. G02B 6/0076; G02B 6/0068; G02B 6/0055; G02B 6/0048; G02B 6/133607;
  (Continued)

(56) References Cited

U.S. PATENT DOCUMENTS 3,914,022 A  10/1975 Kashnow
4,059,916 A  11/1977 Tachihara et al.
(Continued)

FOREIGN PATENT DOCUMENTS

CA  2222313 A1  6/1998
CN  1125943 C  10/2003
(Continued)

OTHER PUBLICATIONS

PCT/US2020/064633 International search report and written opinion of the international searching authority mailed Mar. 15, 2021.
(Continued)

*Primary Examiner* — Angela M. Medich
(74) *Attorney, Agent, or Firm* — Foley & Lardner LLP

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. Retarder stack arrangements are provided to reduce the display visibility to snoopers located in polar viewing regions of the display while achieving minimal reduction of head-on luminance. Further visibility of light reflections from automotive windscreens may be reduced.

19 Claims, 118 Drawing Sheets

FIG. 31

Related U.S. Application Data

(60) Provisional application No. 62/592,085, filed on Nov. 29, 2017, provisional application No. 62/582,052, filed on Nov. 6, 2017, provisional application No. 62/565,836, filed on Sep. 29, 2017, provisional application No. 62/559,187, filed on Sep. 15, 2017, provisional application No. 62/502,939, filed on May 8, 2017.

(51) Int. Cl.
*G02B 6/00* (2006.01)
*G02F 1/1335* (2006.01)

(58) Field of Classification Search
CPC .............. G02B 30/33; G02F 1/133607; G02F 1/133615; G02F 2203/62
See application file for complete search history.

(56) References Cited

U.S. PATENT DOCUMENTS

| | | |
|---|---|---|
| 4,586,790 A | 5/1986 | Umeda et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,579,139 A | 11/1996 | Abileah et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,726,729 A | 3/1998 | Takei |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A | 12/1998 | Coleman |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 9,939,675 B2 | 4/2018 | Peng et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,092,852 B2 | 8/2021 | Robinson et al. |
| 11,099,433 B2 | 8/2021 | Robinson et al. |
| 11,099,447 B2 | 8/2021 | Woodgate et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,340,482 B2 | 5/2022 | Robinson et al. |
| 11,366,358 B2 | 6/2022 | Wu et al. |
| 11,442,316 B2 | 9/2022 | Woodgate et al. |
| 11,573,437 B2 | 2/2023 | Woodgate et al. |
| 11,892,717 B2 | 2/2024 | Harrold et al. |
| 11,977,286 B2 | 5/2024 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0140342 A1 | 10/2002 | Sundahl |
| 2002/0163790 A1 | 11/2002 | Yamashita et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0246418 A1 | 12/2004 | Kumagai et al. |
| 2004/0264910 A1 | 12/2004 | Suzuki et al. |
| 2005/0002174 A1 | 1/2005 | Min et al. |
| 2005/0014913 A1 | 1/2005 | Kim et al. |

(56) References Cited

U.S. PATENT DOCUMENTS

| | | |
|---|---|---|
| 2005/0041311 A1 | 2/2005 | Mi et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0206814 A1 | 9/2005 | Histake |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259193 A1 | 11/2005 | Sumiyoshi et al. |
| 2005/0259205 A1 | 11/2005 | Sharp et al. |
| 2005/0270798 A1 | 12/2005 | Lee et al. |
| 2006/0050209 A1 | 3/2006 | Higa |
| 2006/0066785 A1 | 3/2006 | Moriya |
| 2006/0082702 A1 | 4/2006 | Jacobs et al. |
| 2006/0092512 A1 | 5/2006 | Shioya |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0040780 A1 | 2/2007 | Gass et al. |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0147088 A1 | 6/2007 | Chien et al. |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0117364 A1 | 5/2008 | Matsushima |
| 2008/0129899 A1* | 6/2008 | Sharp .................... G02F 1/1395 349/13 |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2008/0316366 A1 | 12/2008 | Takatani et al. |
| 2009/0009894 A1 | 1/2009 | Chuang |
| 2009/0021657 A1 | 1/2009 | Yang et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0309204 A1 | 12/2010 | Smith et al. |
| 2010/0328438 A1 | 12/2010 | Ohyama et al. |
| 2011/0018860 A1 | 1/2011 | Parry-Jones et al. |
| 2011/0032437 A1 | 2/2011 | Yoshimi et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0086893 A1 | 4/2012 | Ou et al. |
| 2012/0113158 A1 | 5/2012 | Goto et al. |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Mnther et al. |
| 2013/0050610 A1 | 2/2013 | Parry-Jones et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308185 A1 | 11/2013 | Robinson et al. |
| 2013/0308339 A1* | 11/2013 | Woodgate ............ G02B 6/0078 362/609 |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |

(56) References Cited

U.S. PATENT DOCUMENTS

| | | |
|---|---|---|
| 2014/0313464 A1 | 10/2014 | Li et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0029449 A1 | 1/2015 | Woo et al. |
| 2015/0035872 A1 | 2/2015 | Shima et al. |
| 2015/0055366 A1 | 2/2015 | Chang et al. |
| 2015/0088284 A1 | 3/2015 | Hendricks et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0293409 A1 | 10/2015 | Usukura et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1 | 6/2016 | Liu et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0023725 A1 | 1/2017 | Oki et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0056628 A1 | 2/2019 | Inokuchi |
| 2019/0086706 A1 | 3/2019 | Robinson et al. |
| 2019/0121173 A1 | 4/2019 | Robinson et al. |
| 2019/0146134 A1 | 5/2019 | Miura et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0331944 A1 | 10/2019 | Fang et al. |
| 2019/0339433 A1 | 11/2019 | Benoit et al. |
| 2019/0353944 A1 | 11/2019 | Acreman et al. |
| 2019/0361165 A1 | 11/2019 | Chang et al. |
| 2020/0019006 A1 | 1/2020 | Robinson et al. |
| 2020/0026114 A1 | 1/2020 | Harrold et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0132904 A1 | 4/2020 | Smith et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2020/0409156 A1 | 12/2020 | Sissom et al. |
| 2021/0018773 A1 | 1/2021 | Woodgate et al. |
| 2021/0033898 A1 | 2/2021 | Woodgate et al. |
| 2021/0072448 A1 | 3/2021 | Peng et al. |
| 2021/0116627 A1 | 4/2021 | Tsuji |
| 2021/0149233 A1 | 5/2021 | Robinson et al. |
| 2021/0149234 A1 | 5/2021 | Woodgate et al. |
| 2021/0271121 A1 | 9/2021 | Woodgate et al. |
| 2021/0333577 A1 | 10/2021 | Robinson et al. |
| 2021/0333580 A1 | 10/2021 | Matsushima |
| 2021/0341769 A1 | 11/2021 | Woodgate et al. |
| 2021/0373382 A1 | 12/2021 | Sakai et al. |
| 2022/0269128 A1 | 8/2022 | Matsushima |
| 2022/0404540 A1 | 12/2022 | Robinson et al. |
| 2022/0413338 A1 | 12/2022 | Matsushima et al. |
| 2023/0099000 A1 | 3/2023 | Harrold et al. |
| 2023/0254457 A1 | 8/2023 | Robinson et al. |
| 2023/0375863 A1 | 11/2023 | Woodgate et al. |

FOREIGN PATENT DOCUMENTS

| | | |
|---|---|---|
| CN | 1690800 A | 11/2005 |
| CN | 1776484 A | 5/2006 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |

(56) References Cited

FOREIGN PATENT DOCUMENTS

| | | |
|---|---|---|
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 106557711 A | 4/2017 |
| CN | 107102460 A | 8/2017 |
| CN | 209171779 U | 7/2019 |
| EP | 1326102 A1 | 7/2003 |
| EP | 1060344 B1 | 5/2004 |
| EP | 1956423 A1 | 8/2008 |
| EP | 2037318 A1 | 3/2009 |
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H09197405 A | 7/1997 |
| JP | H10268251 A | 10/1998 |
| JP | H11174489 A | 7/1999 |
| JP | 2005316470 A | 11/2005 |
| JP | 2005345799 A | 12/2005 |
| JP | 2006139160 A | 6/2006 |
| JP | 2006201326 A | 8/2006 |
| JP | 2006330164 A | 12/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011095719 A | 5/2011 |
| JP | 2011103241 A | 5/2011 |
| JP | 2013160818 A | 8/2013 |
| JP | 2014032953 A | 2/2014 |
| JP | 2014099363 A | 5/2014 |
| KR | 20090106062 A | 10/2009 |
| KR | 20090108231 A | 10/2009 |
| KR | 20120011228 A | 2/2012 |
| KR | 101227145 B1 | 2/2013 |
| KR | 20130046116 A | 5/2013 |
| KR | 1020150021937 A | 3/2015 |
| KR | 20160053264 A | 5/2016 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2005071474 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010101141 A1 | 9/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017065745 A1 | 4/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

PCT/US2021/029937 International search report and written opinion of the international searching authority mailed Aug. 6, 2021.
PCT/US2021/029944 International search report and written opinion of the international searching authority mailed Aug. 3, 2021.
PCT/US2021/029947 International search report and written opinion of the international searching authority mailed Aug. 10, 2021.
PCT/US2021/029954 International search report and written opinion of the international searching authority mailed Aug. 10, 2021.
PCT/US2021/029958 International search report and written opinion of the international searching authority mailed Aug. 10, 2021.
PCT/US2021/043435 International search report and written opinion of the international searching authority mailed Nov. 1, 2021.
PCT/US2021/043444 International search report and written opinion of the international searching authority mailed Nov. 1, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
TW107132221 First Office Action dated Apr. 28, 2022.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
EP21795524.4 Extended European Search Report of European Patent Office dated Apr. 26, 2024.
EP21796016.0 Extended European Search Report of European Patent Office dated Apr. 29, 2024.
EP21849510.9 Extended European Search Report of European Patent Office dated Jun. 19, 2024.
Heber, "Switchable View Control using a Vertically Aligned Polarizer and Polarization Control", 31-2, siOPTICA GmbH, SID 2024 Digest, Jena, Germany, ISSN 0097-996X/24/5501, pp. 398-401.
JP2022-526302 Non-Final Notice of Reasons for Rejection dated Apr. 30, 2024.
CN201980056022.0 Notification of the Second Office Action dated Jul. 26, 2024.
CN202080079843.9 Notification of the First Office Action dated Jul. 18, 2024.
EP21849888.9 Extended European Search Report of European Patent Office dated Jul. 1, 2024.
KR10-2020-7024291 Notice of Preliminary Rejection mailed Jun. 13, 2024.
PCT/US2024/020519 International search report and written opinion of the international searching authority mailed Jun. 17, 2024.
EP-20887756.3 Extended European Search Report of European Patent Office dated Jan. 2, 2024.
EP-20898295.9 Extended European Search Report of European Patent Office dated Jan. 22, 2024.
IN202017035853 Hearing Notice dated Jan. 3, 2024.
KR10-2020-7024293 Notice of Preliminary Rejection mailed Dec. 7, 2023.
TW108140291 First Office Action dated Nov. 9, 2023.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

(56) References Cited

OTHER PUBLICATIONS

Cheng, et al., "Fast-Response Liquid Crystal Variable Optical Retarder and Multilevel Attenuator," Optical Engineering 52 (10), 107105 (Oct. 16, 2013). (Year: 2013).
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN201880073578.6 Notification of the First Office Action dated Aug. 27, 2021.
CN-201980020303.0—Notification of the First Office Action dated Dec. 16, 2021.
CN201980030279.9 Notification of the First Office Action dated Mar. 29, 2022.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
EP-19825448.4 Extended European Search Report of European Patent Office dated Mar. 10, 2022.
EP-19881483.2 Extended European Search Report of European Patent Office dated Aug. 5, 2022.
EP-20754927.0 Extended European Search Report of European Patent Office dated Sep. 19, 2022.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
JP2019-561773 Non-Final Notice of Reasons for Rejection dated Mar. 22, 2022.
JP2020-509511 Non-Final Notice of Reasons for Rejection dated Jul. 19, 2022.
Kalantar, et al. "Backlight Unit With Double Surface Light Emission," J. Soc. Inf. Display, vol. 12, Issue 4, pp. 379-387 (Dec. 2004).
Nelkon et al., "Advanced Level Physics", Third edition with SI units, Heinemann Educational Books LTD, London, 1970.
PCT/US2016/058695 International search report and written opinion of the international searching authority mailed Feb. 28, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.
PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
PCT/US2019/059990 International search report and written opinion of the international searching authority mailed Feb. 28, 2020.
PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.
PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
CN202080089170.5 Notification of the First Office Action dated Apr. 7, 2024.
EP23218625.4 Extended European Search Report of European Patent Office dated Feb. 23, 2024.
JP2022-506340 Non-Final Notice of Reasons for Rejection dated Mar. 19, 2024.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
CN-201880042320.X Notification of the Third Office Action from the Chinese Patent Office dated Dec. 30, 2022.
CN-201980082757.0 Notification of the 1st Office Action of the Chinese Patent Office mailed Dec. 5, 2022.
EP19771688.9 Notification of the First Office Action dated Mar. 6, 2023.
EP-20835231.0 Extended European Search Report of European Patent Office dated May 15, 2023.
EP-20851155.0 Extended European Search Report of European Patent Office dated Aug. 2, 2023.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.
JP2020-550747 Non-Final Notice of Reasons for Rejection dated Mar. 29, 2023.
KR10-2020-7010753 Notice of Preliminary Rejection mailed Feb. 17, 2023.
PCT/US2022/045030 International search report and written opinion of the international searching authority mailed Jan. 3, 2023.
PCT/US2023/012240 International search report and written opinion of the international searching authority mailed Apr. 27, 2023.
PCT/US2023/012243 International search report and written opinion of the international searching authority mailed May 10, 2023.
PCT/US2023/017639 International search report and written opinion of the international searching authority mailed Jul. 6, 2023.
CN201980056000.4 Notification of the First Office Action dated Nov. 1, 2023.
CN201980056022.0 Notification of the First Office Action dated Oct. 23, 2023.
CN202080020818.3 Notification of the First Office Action dated Oct. 23, 2023.

(56) References Cited

OTHER PUBLICATIONS

CN202080059812.7 Notification of the First Office Action dated Oct. 19, 2023.
EP-20872625.7 Extended European Search Report of European Patent Office dated Sep. 20, 2023.
EP-20887527.8 Extended European Search Report of European Patent Office dated Nov. 20, 2023.
JP2021-518864 Non-Final Notice of Reasons for Rejection dated Oct. 24, 2023.
EP20835231.0 Notification of the First Office Action dated Nov. 27, 2024.
KR10-2022-7019753 Notice of Preliminary Rejection mailed Oct. 30, 2024.
PCT/US2024/025836 International search report and written opinion of the international searching authority mailed Jul. 23, 2024.

* cited by examiner

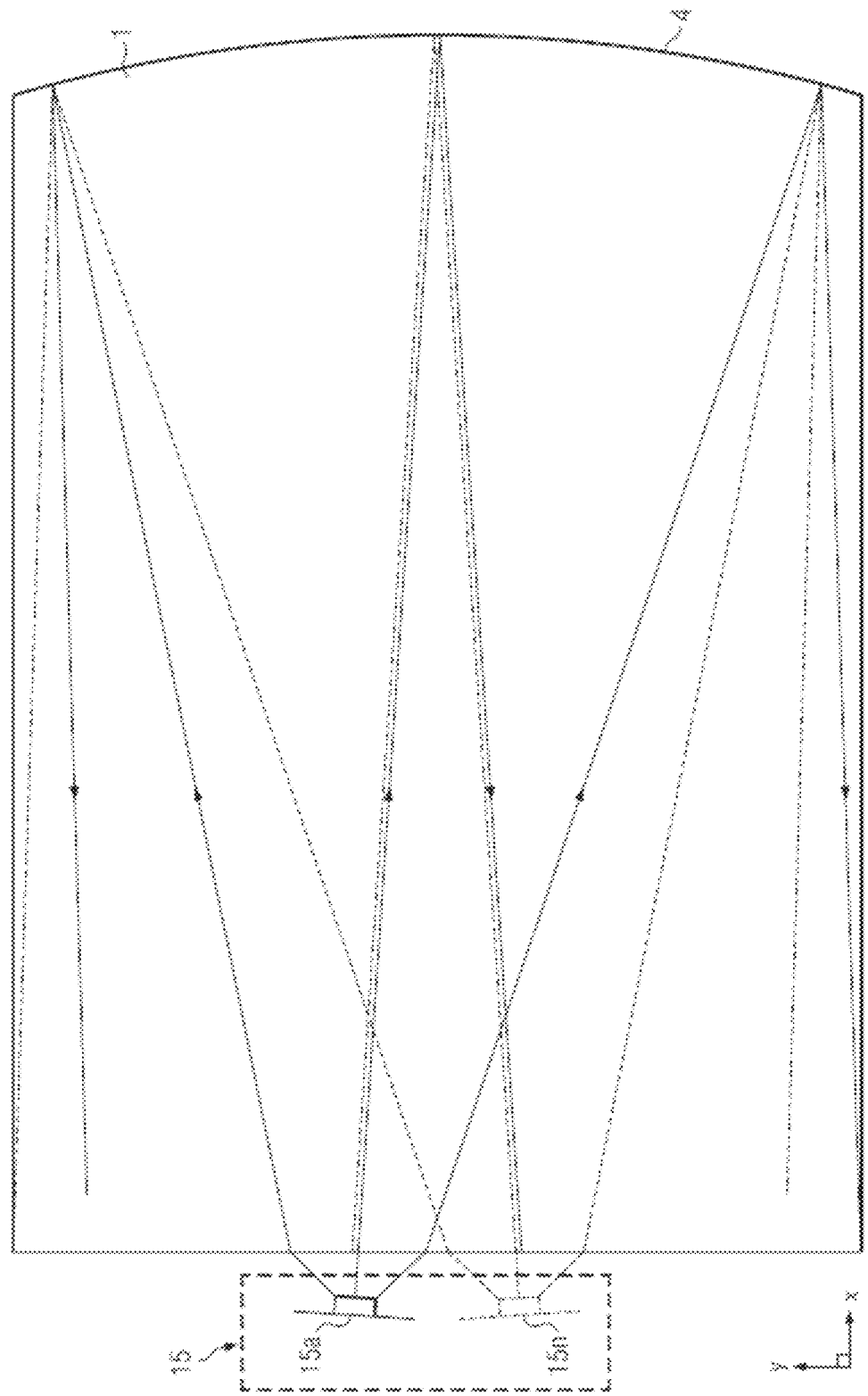

Key

50%-100% luminance    10%-50% luminance    <10% luminance

Key

50%-100% luminance    10%-50% luminance    <10% luminance

Key

50%-100% luminance   10%-50% luminance   <10% luminance

Key

50%-100% luminance     10%-50% luminance     <10% luminance

OPTICAL STACK FOR IMAGING DIRECTIONAL BACKLIGHTS

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can compromise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

A display to provide a weak privacy effect using a switchable ECB liquid crystal cell is described in Gass et al., "Privacy LCD Technology for Cellular Phones", Sharp Technical Journal, No. 27, 2007.

According to a first aspect of the present disclosure there is provided a display device comprising: a backlight arrange to output light comprising plural light sources; and a directional waveguide comprising: an input end extending in a lateral direction along a side of the waveguide, the light sources being disposed along the input end and arranged to input input light into the waveguide; and opposed first and second guide surfaces extending across the waveguide from the input end for guiding light input at the input end along the waveguide, the waveguide being arranged to deflect input light guided through the waveguide to exit through the first guide surface; a transmissive spatial light modulator arranged to receive output light from the backlight; an input polariser arranged on the input side of the spatial light modulator between the backlight and the spatial light modulator; an output polariser arranged on the output side of the spatial light modulator; at least one additional polariser arranged on the input side of the input polariser between the input polariser and the backlight or on the output side of the output polariser; and at least one retarder arranged between the at least one additional polariser and the input polariser in the case that the additional polariser is arranged on the input side of the input polariser or between the additional polariser and the output polariser in the case that the additional polariser is arranged on the output side of the input polariser.

Advantageously a privacy display with reduced visibility of the image to a snooper in comparison to that provided by the directional backlight alone is achieved.

The at least one retarder may comprise at least one correcting passive retarder and at least one switchable liquid crystal retarder. Advantageously the viewing angle over which a snooper can perceive the displayed image is reduced. Further, the luminance to the primary user is substantially maintained between wide angle and privacy modes.

The waveguide may be arranged to image the light sources in the lateral direction so that the output light from the light sources is directed into respective optical windows in output directions that are distributed in dependence on the input positions of the light sources.

Advantageously in the present embodiments, in cooperation with a privacy backlight apparatus, desirably off-axis luminance is reduced to achieve improved privacy characteristics in certain viewing directions. Further the visibility of the displayed image on the spatial light modulator to a snooper in locations that are off-axis in lateral angle and elevation may be reduced in comparison to a display in which the at least one retarder is not present. Further the luminance to a user in locations of zero lateral angle or zero elevation may be substantially unmodified, so that high efficiency is achieved. Further low thickness components may be provided to achieve a thin stack-up.

The additional polariser may be arranged on the input side of the input polariser and said at least one retarder may be arranged between the additional polariser and the input polariser. The additional polariser may be a reflective polariser.

Advantageously, device thickness and device efficiency in the head-on direction may be unmodified in comparison to displays wherein the at least one retarder is not present and reflective polariser is present.

The additional polariser may have an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser.

Advantageously, device efficiency in the head-on direction may be substantially the same in comparison to displays wherein the at least one retarder is not present.

The additional polariser may be arranged on the input side of the input polariser and said at least one retarder may be arranged between the additional polariser and the input polariser. The additional polariser may be arranged on the output side of the output polariser and said at least one retarder may be arranged between the additional polariser and the output polariser. Advantageously the existing display polariser can provide one of the pair of parallel polarisers, reducing device cost and thickness while achieving increased efficiency in comparison to two additional polarisers.

Said at least one retarder may be at least one of a pair of crossed A-plates or a C-plate may be a pair of crossed A-plates. In the present embodiments, the crossed A-plates may have slow axes that are substantially orthogonal.

Advantageously the crossed A-plates may each comprise single stretched materials that are cheaper than C-plates. Further achromatic compensation can be provided more readily.

The at least one retarder may comprise a pair of retarders which have slow axes in the plane of the retarders that are crossed. The pair of retarders may have slow axes that each extend at 450 with respect to an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser. The pair of retarders may each comprise a single A-plate. Advantageously cost and complexity may be reduced.

The pair of retarders may each comprise plural A-plates having respective slow axes aligned at different angles from each other. The at least one retarder may comprise a retarder having a slow axis perpendicular to the plane of the retarder. The retarder having a slow axis perpendicular to the plane of the retarder comprises a C-plate. Advantageously thickness and complexity may be reduced.

The at least one retarder may further comprise a C-plate and a pair of retarders which have slow axes in the plane of the retarders that are crossed. The pair of retarders may have slow axes that each extend at 0° and 90°, respectively, with respect to an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser.

Advantageously chromaticity change with viewing angle may be reduced.

The at least one retarder may comprise a retarder having a slow axis orientation with a component perpendicular to the plane of the retarder, and at least one component in the plane of the retarder. The retarder may comprise an O-plate.

Advantageously luminance field-of-view control may be provided over an increased or reduced area of the luminance field-of-view profile, achieving increased control of locations for reduced privacy luminance in comparison to C-plates or crossed A-plates.

The at least one retarder may comprise a retarder having a slow axis orientation with a component perpendicular to the plane of the retarder, a component that is orthogonal in the plane of the retarder to the electric vector transmission direction of the input polariser and substantially no component that is parallel in the plane of the retarder to the electric vector transmission direction of the input polariser. Advantageously privacy luminance may be reduced for reduced elevation angles in comparison to C-plates or crossed A-plates. Privacy luminance may be reduced in two quadrants, improving performance in wide angle mode for viewing angles with low probability of snooper locations.

The at least one retarder may comprise a retarder having a slow axis orientation with a component perpendicular to the plane of the retarder, a component that is parallel in the plane of the retarder to the electric vector transmission direction of the input polariser and substantially no component that is orthogonal in the plane of the retarder to the electric vector transmission direction of the input polariser. Advantageously privacy luminance may be reduced for vertical viewing angles.

The retarder may comprise a switchable liquid crystal retarder that is switchable between an O-plate retarder and an A-plate retarder by means of an applied voltage across the switchable liquid crystal retarder. Reduced privacy mode luminance may be provided in a privacy mode, and no reduction in off-axis luminance provided by the retarder in a wide angle mode. Advantageously privacy appearance may be improved and wide angle mode performance may be substantially not affected by the retarder.

The switchable liquid crystal retarder may comprise at least one homeotropic alignment layer and may further comprise at least one correcting passive retarder arranged between the at least one additional polariser and the input polariser in the case that the additional polariser is arranged on the input side of the input polariser or between the additional polariser and the output polariser in the case that the additional polariser is arranged on the output side of the input polariser. The correcting passive retarder may comprise a negative C-plate or crossed positive A-plates.

The liquid crystal retarder may have an optical thickness between 500 nm and 1000 nm, preferably between 700 nm and 900 nm and most preferably between 775 nm and 825 nm. The at least one correcting passive retarder has an optical thickness between 400 nm and 800 nm, preferably between 550 nm and 750 nm and more preferably between 625 nm and 675 nm.

Advantageously the polar region from which reduced luminance is provided to a snooper may be increased in size, and privacy performance enhanced. Further color variations may be minimised.

The switchable liquid crystal retarder may comprise at least first and second regions that are independently addressable with first and second applied voltages. Advantageously different regions of the display may be provided with different privacy levels. Increased viewing freedom comfort may be provided for non-critical data provided in the image while reduced privacy luminance for critical data.

The at least one retarder may comprise a first O-plate retarder and a second O-plate retarder that is switchable. Advantageously first and second privacy luminance reduction regions may be provided that cooperate to (i) reduce total privacy luminance for a given lateral angle and elevation and/or (ii) increase the polar distribution for which low privacy levels are achieved. Further power consumption in a privacy mode may be reduced.

A surface relief structure may be provided at an interface of the first and second O-plate retarders. Advantageously increased wide angle profile width may be provided in a wide angle mode of operation and reduced profile width in the privacy mode of operation.

According to a second aspect of the present disclosure there may be provided a display device according to the first aspect, wherein the backlight comprises: an array of light sources; a waveguide arranged to receive input light from the light sources at different input positions and comprising first and second, opposed guide surfaces for guiding the input light along the waveguide, sides that extend between the first and second guide surfaces and a reflective end for reflecting the input light back along the waveguide, wherein the second guide surface is arranged to deflect the reflected input light through the first guide surface as output light, and the waveguide is arranged to image the light sources in a lateral direction between the sides of the waveguide so that the output light from the light sources is directed into respective optical windows in output directions that are distributed in dependence on input positions of the light sources. The first guide surface may be arranged to guide light by total internal reflection, and the second guide surface may comprise light extraction features and intermediate regions between the light extraction features, the light extraction features being oriented to deflect the reflected input light through the first guide surface as output light and the intermediate regions being arranged to direct light through the waveguide without extracting it. The light extraction features may be curved and have positive optical power in the lateral direction between sides of the waveguide that extend between the first and second guide surfaces. The reflective end may have positive optical power in the lateral direction extending between sides of the waveguide that extend between the first and second guide surfaces. The waveguide may comprise an input end opposite to the reflective end and the light sources may be arranged to input light into the waveguide through the input end. The light sources may be arranged to input light into the waveguide through the sides of the waveguide.

The additional polariser may be a reflective polariser arranged on the input side of the input polariser and may be arranged to transmit a first polarisation component of the output light and to reflect a second polarisation component of the output light having a polarisation state orthogonal to the polarisation state of first polarisation component, as rejected light; and a rear reflector may be disposed behind the second guide surface arranged to reflect the rejected light for supply back to the spatial light modulator, the rear reflector comprising a linear array of pairs of reflective corner facets extending in a predetermined direction perpendicular to the normal to spatial light modulator so that the rear reflector converts the polarisation of the rejected light that has a double reflection from a pair of corner facets into the polarisation of the first polarisation component. The pairs of reflective corner facets may be curved and have optical power in the lateral direction.

According to a third aspect of the present disclosure there may be provided a display device according to the first or second aspects; further comprising a control system arranged to control the light sources. The backlight may be switchable between modes in which the output light is output into viewing windows of differing width. Advantageously a switchable privacy display may be provided with reduced visibility of the private image to a snooper.

The control system may be further arranged to control the applied voltage across the switchable liquid crystal retarder. Advantageously the privacy reduction of the switchable liquid crystal O-plate may be controlled or removed. The polar location of the reduced privacy region may be controlled.

The control system may be arranged to provide switching between in a first mode of operation the light sources being controlled to provide an illumination profile from the waveguide with a first angular width; and a first applied voltage across the switchable liquid crystal retarder; in a second mode of operation the light sources being controlled to provide an illumination profile from the waveguide with a second angular width that is larger than the first angular width; and a second applied voltage across the switchable liquid crystal retarder that is different to the first applied voltage. The second applied voltage may be less than the first applied voltage.

Advantageously in wide angle mode of operation angular profile may be the same as the directional backlight. Further for a given privacy level the width of the angular profile may be increased in comparison to the width for a display with no switchable liquid crystal O-plate. Further for a given angular profile from the backlight, privacy levels can be tuned.

The switchable liquid crystal retarder between the additional polariser and the input polariser in the case that an additional polariser is arranged on the input side of the input polariser or between the additional polariser and the output polariser in the case that an additional polariser is arranged on the output side of the input polariser may have a maximum attenuation polar coordinate that has an elevation that is greater than zero with respect to the direction of the normal direction to the spatial light modulator. The maximum attenuation polar coordinate may have an elevation between 10 degrees and 50 degrees, preferably between 15 degrees and 35 degrees and most preferably between 20 degrees and 30 degrees. The maximum attenuation polar coordinate may have a lateral angle from 30 degrees to 60 degrees, preferably 40 degrees to 50 degrees and most preferably at 45 degrees.

Advantageously the visibility of image to typical snooper location may be increased and the cost of the voltage control system reduced.

The control system may be capable of controlling the spatial light modulator and capable of selectively operating of light sources to direct light into corresponding optical windows, wherein stray light in the directional backlight is directed in output directions outside the optical windows corresponding to selectively operated light sources, the control system is arranged to control the spatial light modulator and the array of light sources in synchronization with each other so that: (a) the spatial light modulator displays a primary image while at least one primary light source is selectively operated to direct light into at least one primary optical window for viewing by a primary observer, and (b) in a temporally multiplexed manner with the display of the primary image, the spatial light modulator displays a secondary image while at least one light source other than the at least one primary light source is selectively operated to direct light into secondary optical windows outside the at least one primary optical window, the secondary image as perceived by a secondary observer outside the primary optical window obscuring the primary image that modulates the stray light directed outside the primary optical window. The control system may be arranged to control the applied voltage across the switchable liquid crystal retarder in a temporally multiplexed manner.

Advantageously contrast and luminance may be reduced for snooper locations. Privacy performance may be further enhanced.

The display device may further comprise a means to determine the location of a snooper with respect to the display wherein the control system is arranged to adjust the first applied voltage in response to the snooper location. Advantageously the luminance of the image to the snooper can be reduced for a given snooper location.

The display device may be arranged in a vehicle. The display device may be arranged beneath a transparent window in the vehicle. The display device is arranged in front of a seat in the vehicle. Advantageously an automotive display may be provided with reduced visibility of reflections from windscreen and other transparent surfaces within the vehicle. Further the transmission of light that is seen head-on may be substantially the same as an unmodified display increasing display efficiency.

At least one of the at least one retarders arranged between the at least one additional polariser and the input polariser in the case that the additional polariser is arranged on the input side of the input polariser or between the additional polariser and the output polariser in the case that the additional polariser is arranged on the output side of the input polariser may be controlled by means of addressing electrodes. The addressing electrodes may be patterned to provide at least two pattern regions. The pattern regions may be camouflage patterns. At least one of the pattern regions may be individually addressable and may be arranged to operate in a privacy mode of operation. Advantageously the images observed by a snooper in privacy mode of operation may have camouflage, the level of which may be controlled.

The display device may further comprise at least one further additional polariser and at least one further correcting passive retarder and at least one further switchable liquid crystal retarder layer arranged between the at least one further additional polariser and the input polariser in the case that the further additional polariser is arranged on the input side of the input polariser or between the further additional polariser and the output polariser in the case that the further additional polariser is arranged on the output side of the input polariser. The alignment direction of the upper alignment layer of the first switchable liquid crystal layer may be parallel or anti-parallel to the alignment direction of the upper alignment layer of the further switchable liquid crystal layer and the alignment direction of the lower alignment layer of the first switchable liquid crystal layer may be parallel or anti-parallel to the alignment direction of the lower alignment layer of the further switchable liquid crystal layer. The alignment direction of the at least first correcting passive retarder may be parallel or anti-parallel to the alignment direction of the at least one further correcting passive retarder. Advantageously reduced luminance is provided to a snooper, increasing privacy performance over an increased polar viewing region.

The alignment direction of the upper alignment layer of the first switchable liquid crystal layer may be orthogonal to the alignment direction of the upper alignment layer of the further switchable liquid crystal layer and the alignment direction of the lower alignment layer of the first switchable liquid crystal layer may be parallel or anti-parallel to the alignment direction of the lower alignment layer of the further switchable liquid crystal layer. The alignment direction of the at least first correcting passive retarder may be orthogonal to the alignment direction of the at least one further correcting passive retarder. Advantageously a privacy user may have reduced visibility for images seen from over the head of a primary viewer.

According to a fourth aspect of the present disclosure there is provided a display device comprising: a backlight arranged to output light a transmissive spatial light modulator arranged to receive output light from the backlight; an input polariser arranged on the input side of the spatial light modulator between the backlight and the spatial light modulator; an output polariser arranged on the output side of the spatial light modulator; an additional polariser arranged on the input side of the input polariser between the input polariser and the backlight or on the output side of the output polariser; and at least one correcting passive retarder and a switchable liquid crystal retarder arranged between the at least one additional polariser and the input polariser in the case that the additional polariser is arranged on the input side of the input polariser or between the additional polariser and the output polariser in the case that the additional polariser is arranged on the output side of the input polariser wherein the at least one switchable liquid crystal retarder comprises electrodes and is switchable by means of an applied voltage to the electrodes of the switchable liquid crystal retarder.

In comparison to the first aspect, non-directional backlights may be provided that achieve increased width of viewing cones in a wide angle mode of operation.

The display device may comprise at least one further additional polariser and at least one further correcting passive retarder and at least one further switchable liquid crystal retarder arranged between the at least one further additional polariser and the input polariser in the case that the further additional polariser is arranged on the input side of the input polariser or between the further additional polariser and the output polariser in the case that the further additional polariser is arranged on the output side of the input polariser, wherein the at least one further switchable liquid crystal retarder comprises electrodes and is switchable by means of an applied voltage to the electrodes of the switchable liquid crystal retarder.

The alignment of the upper alignment layer of the first switchable liquid crystal layer may be parallel or anti-parallel to the alignment of the upper alignment layer of the further switchable liquid crystal layer and the alignment of the lower alignment layer of the first switchable liquid crystal layer may be parallel or anti-parallel to the alignment of the lower alignment layer of the further switchable liquid crystal layer. The alignment of the at least first correcting passive retarder may be parallel or anti-parallel to the alignment of the at least one further correcting passive retarder.

The alignment of the upper alignment layer of the first switchable liquid crystal layer may be orthogonal to the alignment of the upper alignment layer of the further switchable liquid crystal layer and the alignment of the lower alignment layer of the first switchable liquid crystal layer is parallel or anti-parallel to the alignment of the lower alignment layer of the further switchable liquid crystal layer. The alignment of the at least first correcting passive retarder may be orthogonal to the alignment of the at least one further correcting passive retarder. The correcting passive retarder may comprise a negative C-plate or crossed positive A-plates. The switchable liquid crystal retarder may comprise at least one surface alignment layer disposed adjacent to the liquid crystal to provide homeotropic alignment in the adjacent liquid crystal. The liquid crystal retarder may have an optical thickness between 500 nm and 1000 nm, preferably between 700 nm and 900 nm and most preferably between 775 nm and 825 nm. The at least one correcting passive retarder may have an optical thickness between 400 nm and 800 nm, preferably between 550 nm and 750 nm and more preferably between 625 nm and 675 nm.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of a directional display device;

FIG. 46B is a schematic diagram illustrating in side view a directional display comprising a directional waveguide and a homogeneously aligned switchable liquid crystal O-plate arranged between a spatial light modulator and an output polariser and a C-plate arranged between the spatial light modulator and an additional polariser;

FIG. 47A is a schematic luminance field-of-view graph illustrating variation in transmitted luminance of the multiple homogeneously aligned switchable liquid crystal O-plates of FIGS. 45A-B for an applied voltage;

FIG. 47B is a schematic luminance field-of-view graph illustrating variation in transmitted luminance of the optical stack of FIGS. 45A-B in a privacy mode of operation;

FIG. 47C is a schematic luminance field-of-view graph illustrating variation in transmitted luminance of the optical stack of FIGS. 45A-B in a wide angle mode of operation;

FIG. 48A is a schematic diagram illustrating in perspective side view orientation of a homeotropically aligned switchable liquid crystal O-plate arranged between a directional backlight and a spatial light modulator and a negative C-plate arranged between the spatial light modulator and an additional polariser in a wide angle mode of operation;

FIG. 48B is a schematic luminance field-of-view graph illustrating variation in transmitted luminance of the optical stack of FIG. 48A in a wide angle mode of operation;

FIG. 48C is a schematic diagram illustrating in perspective side view orientation of a homeotropically aligned switchable liquid crystal O-plate arranged between a directional backlight and a spatial light modulator and a negative C-plate arranged between the spatial light modulator and an additional polariser in a privacy mode of operation;

FIG. 48D is a schematic luminance field-of-view graph illustrating variation in transmitted luminance of the optical stack of FIG. 48C in a privacy mode of operation;

FIG. 48E is a schematic luminance field-of-view graph illustrating variation in transmitted luminance of a directional backlight in a polar region;

FIG. 48F is a schematic luminance field-of-view graph illustrating variation in transmitted luminance of a directional backlight in a polar region of FIG. 48F further modulated by the optical stack of FIG. 40A;

FIG. 48G is a schematic luminance field-of-view graph illustrating variation in transmitted luminance of a directional backlight in a polar region of FIG. 48F further modulated by the optical stack of FIG. 48C;

FIG. 48H is a schematic diagram illustrating in perspective side view orientation of multiple parallel homeotropically aligned switchable liquid crystal O-plates and correcting passive retarders arranged between a backlight and a spatial light modulator;

Figure 48A:
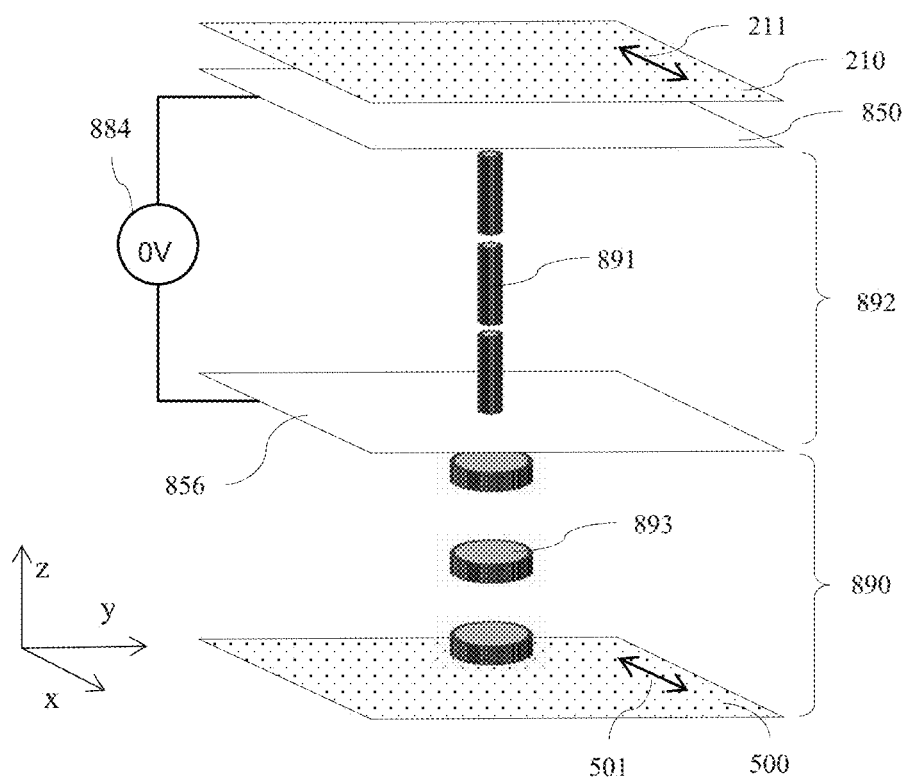
Figure 48B:
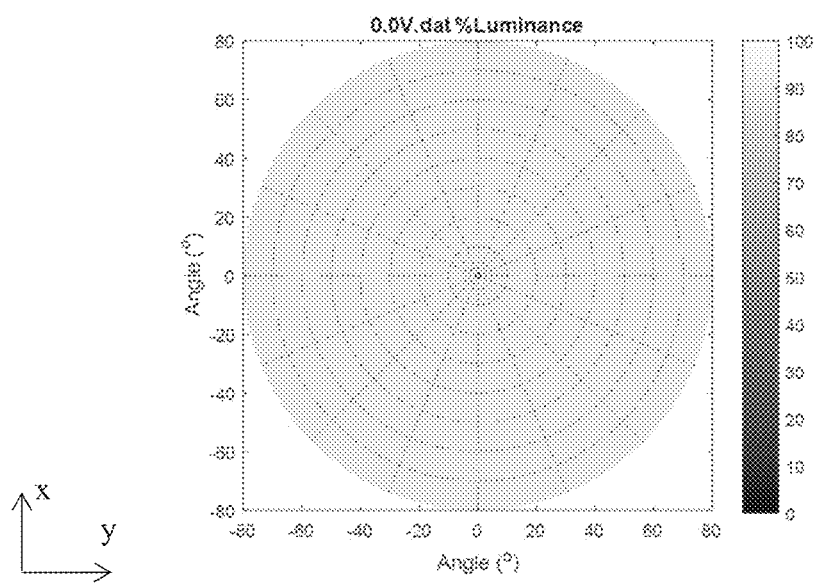
Figure 48C:
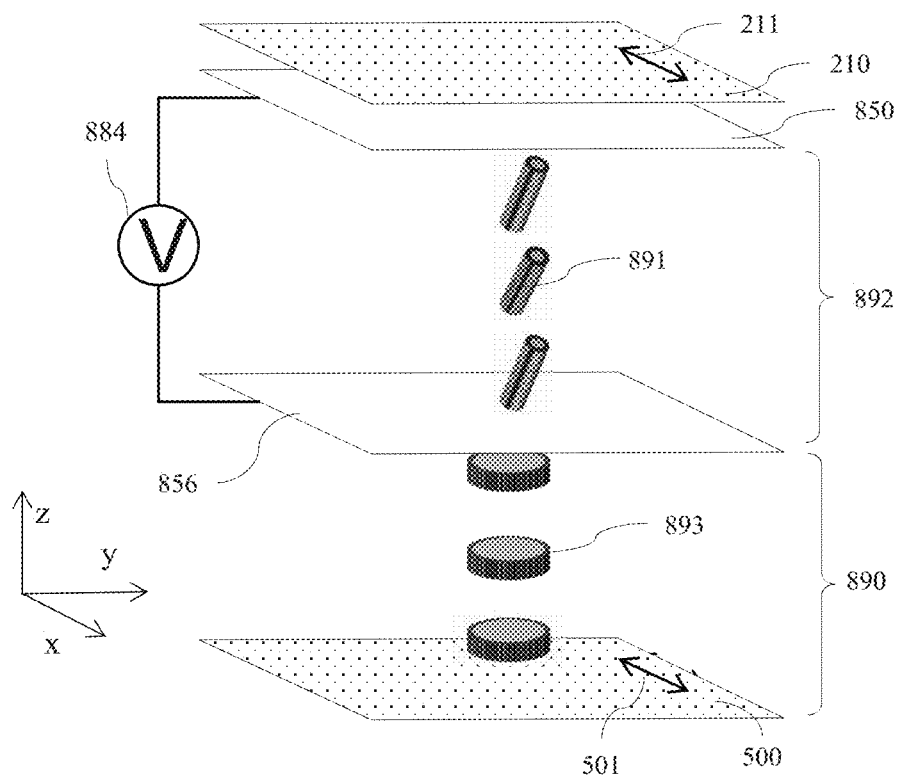
Figure 48D:
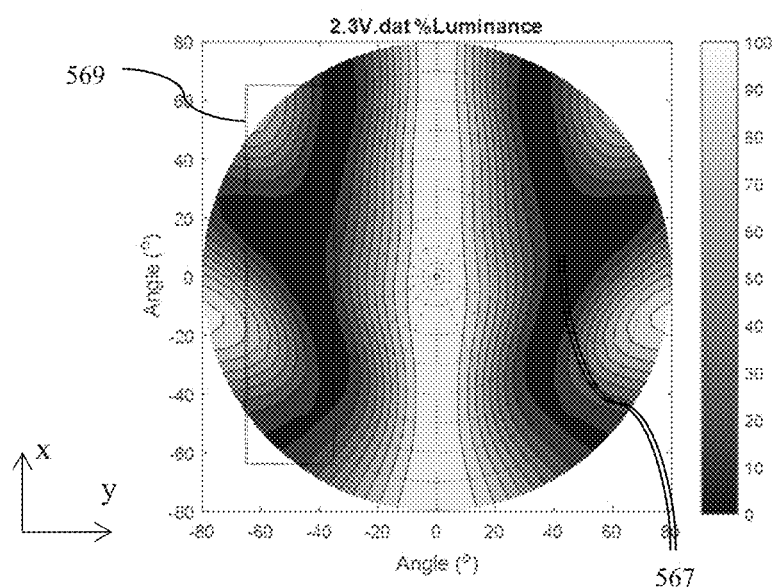
Figures 48E, 48F, 48G:
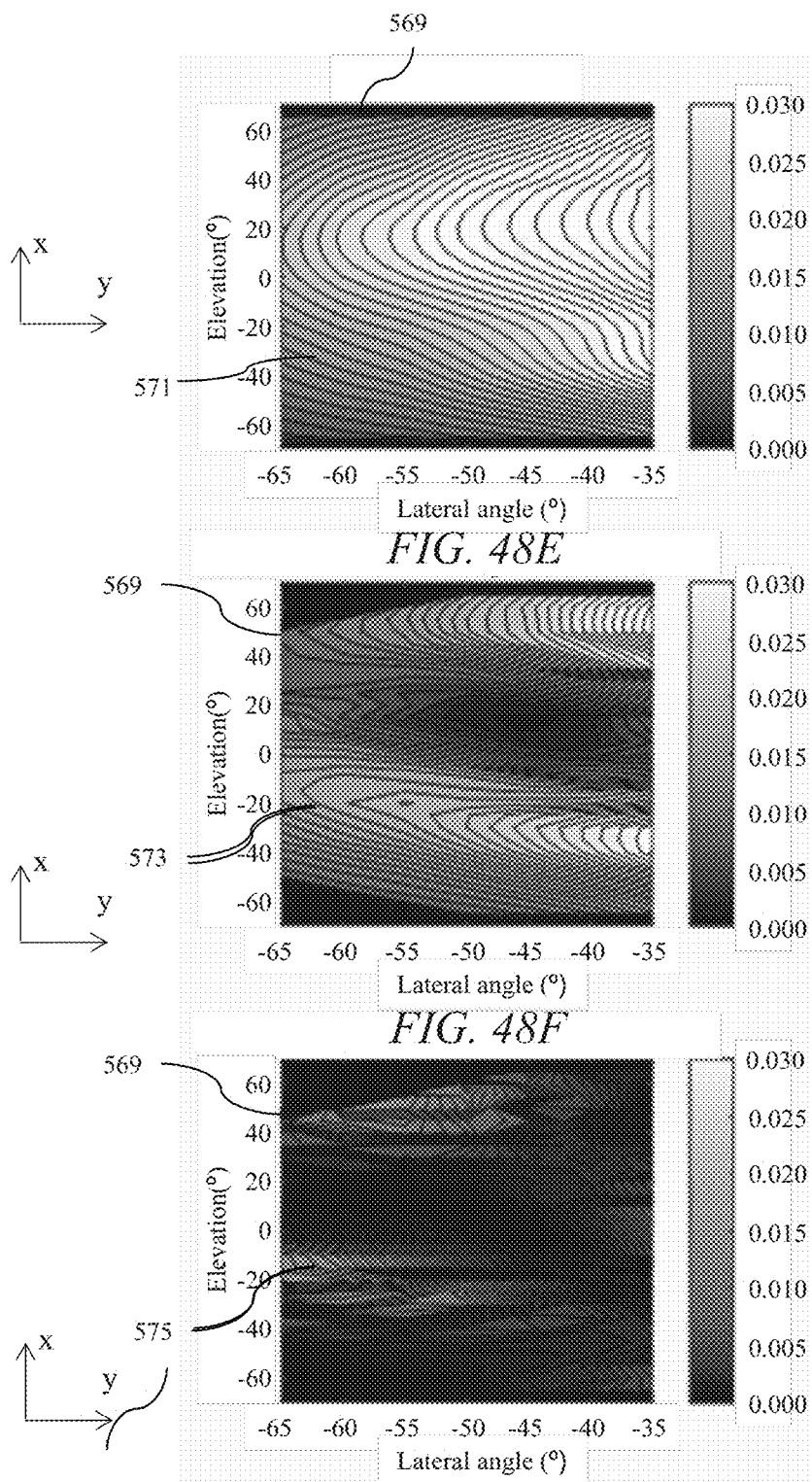
Figure 48H:
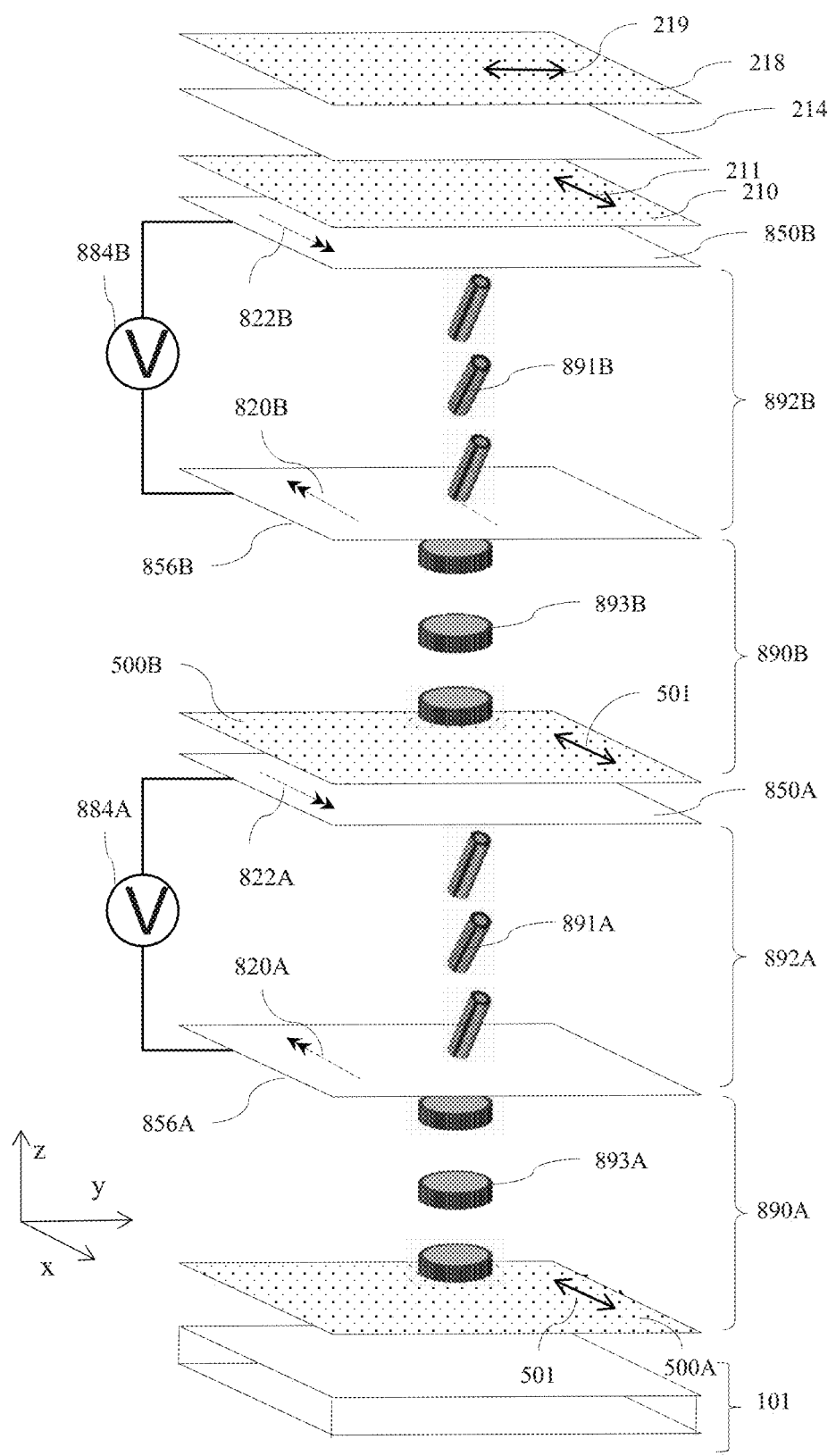
Figure 48I:
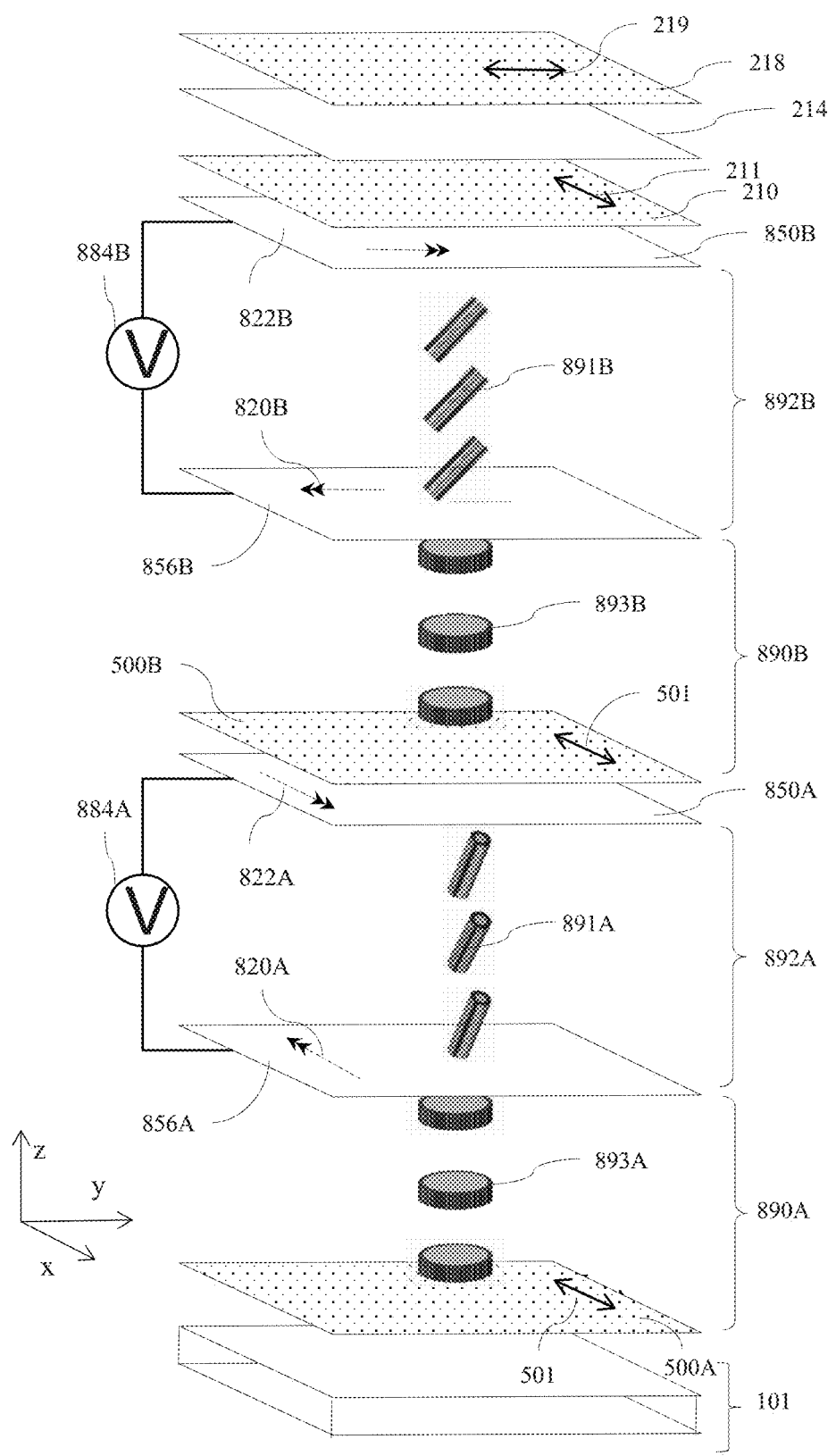
Figure 48J:
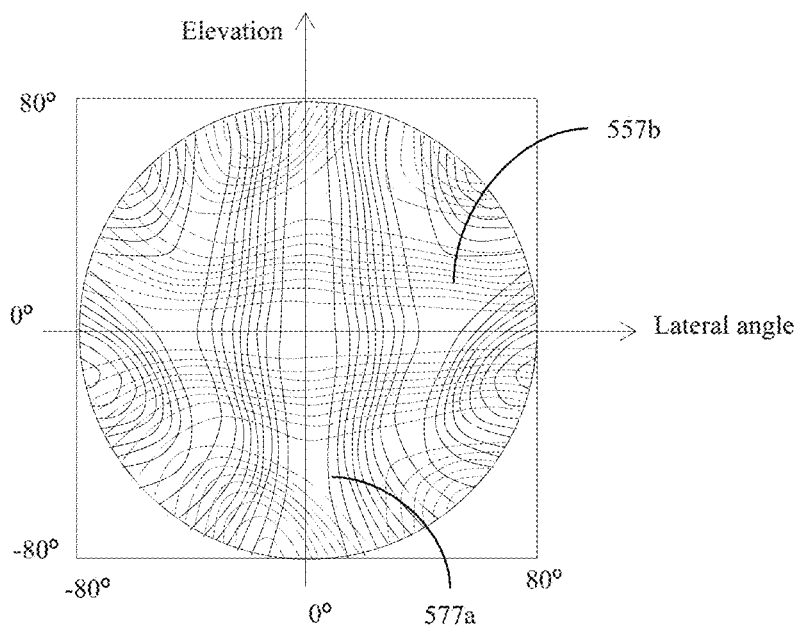
Figure 49A:
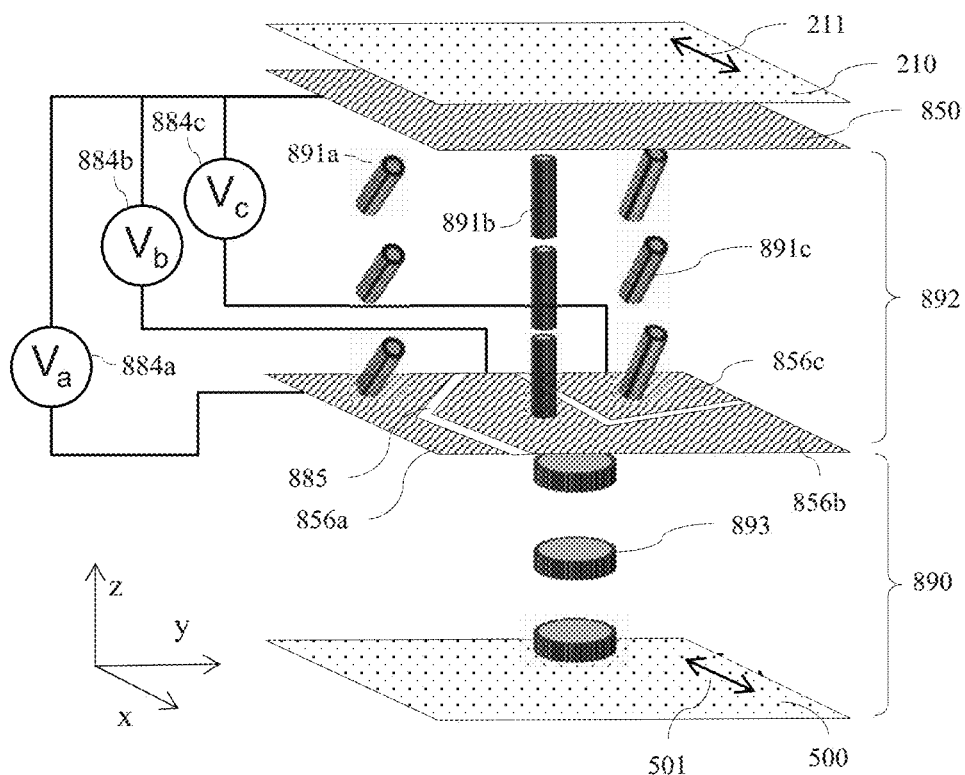
Figure 49B:
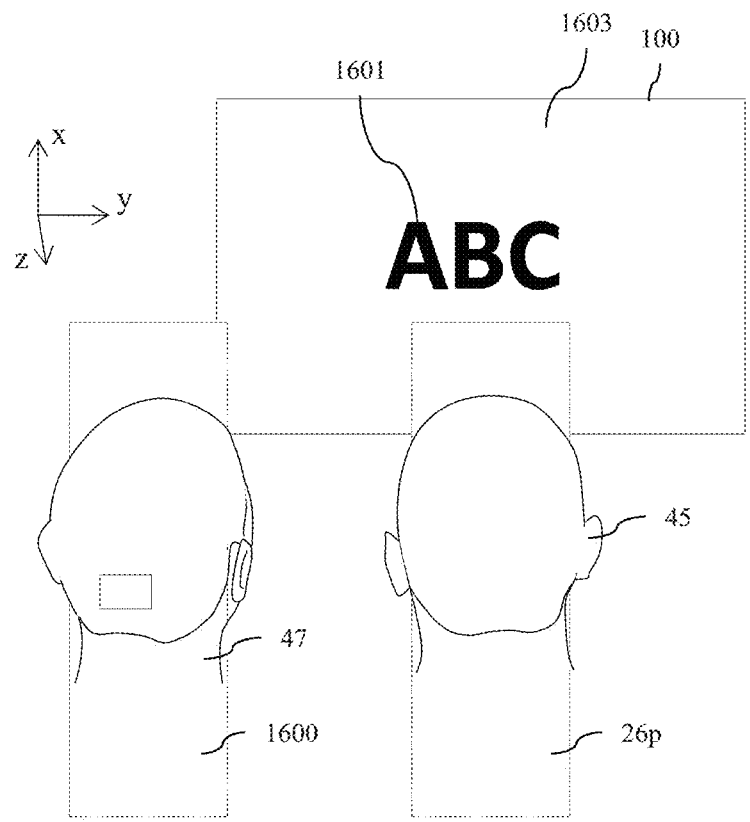
Figure 49C:
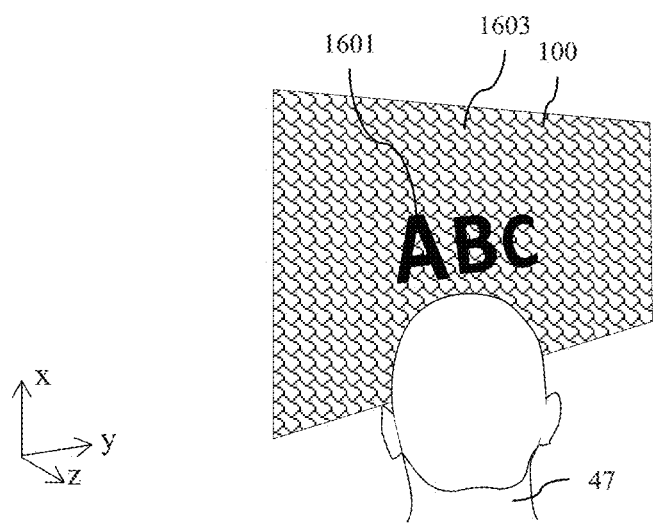
Figure 50A:
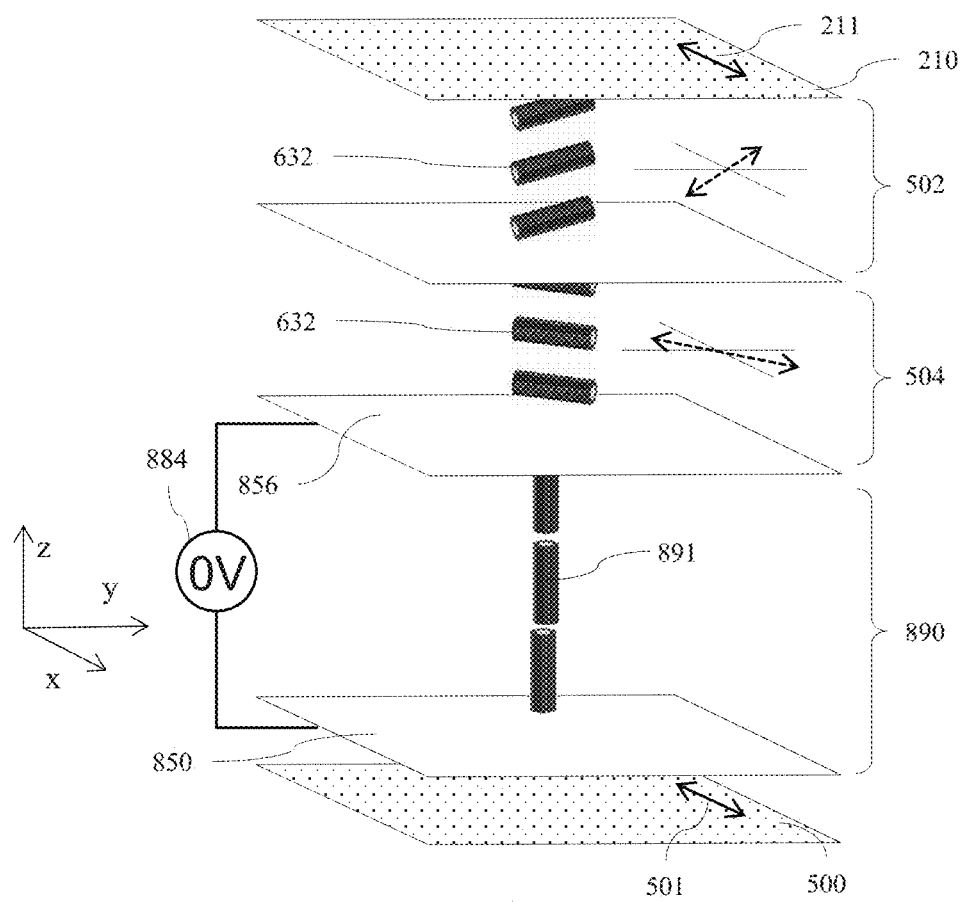
Figure 50B:
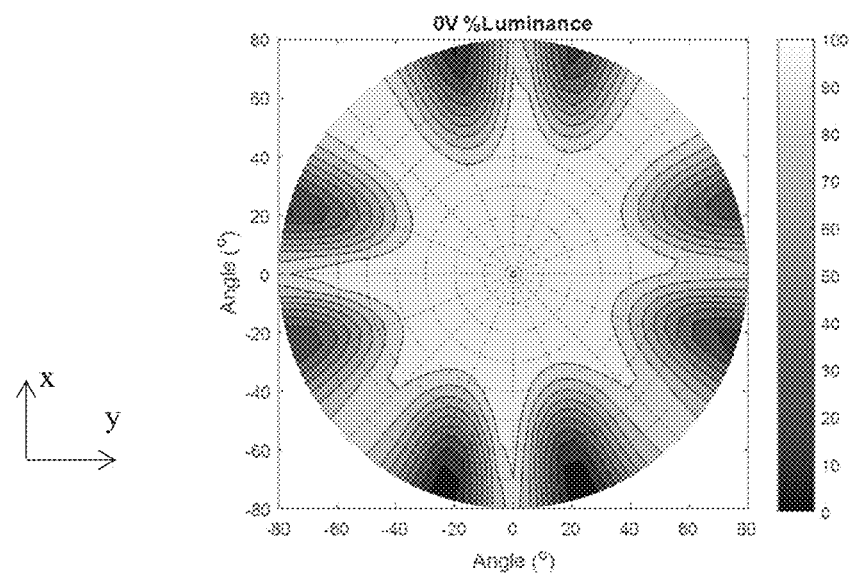
Figure 50C:
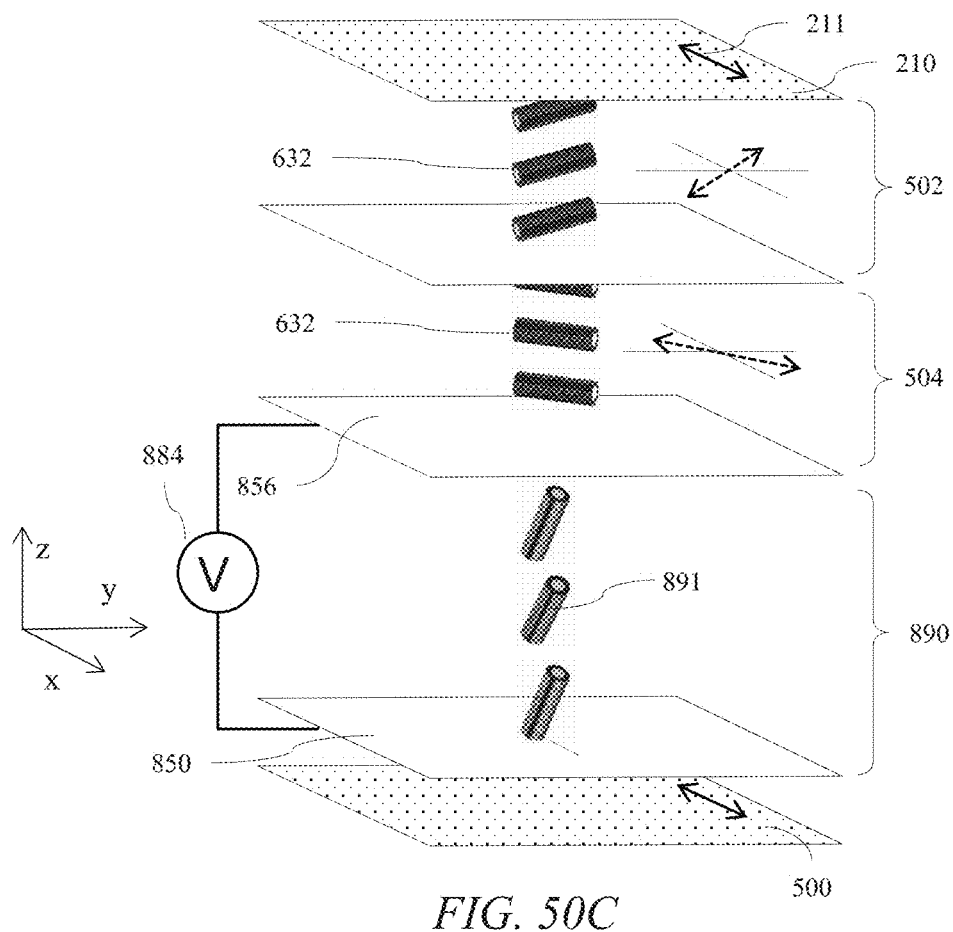
Figure 50D:
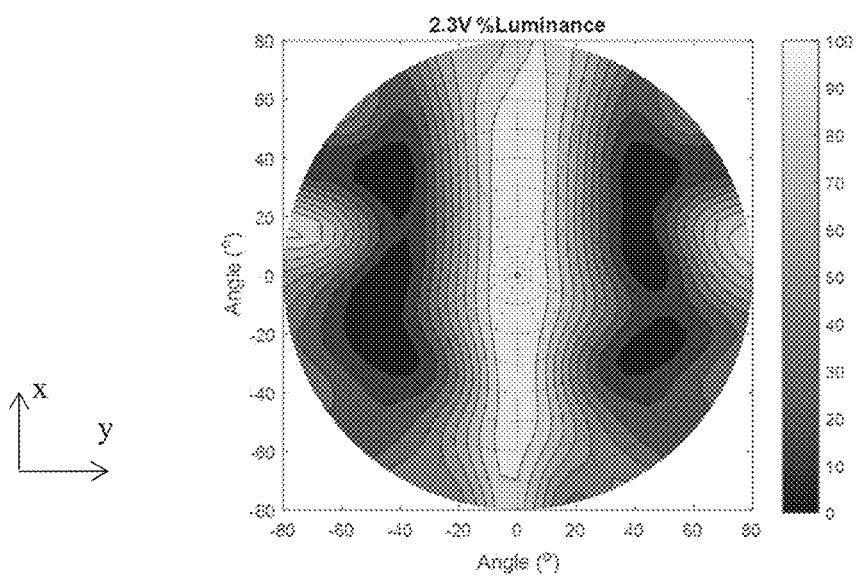
Figure 51A:
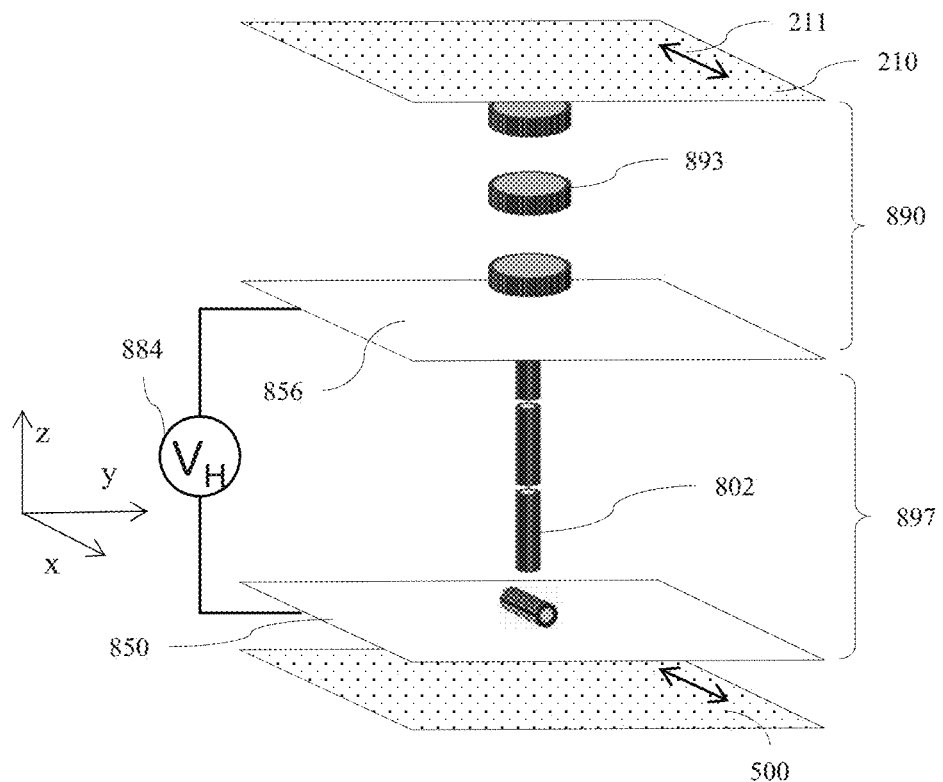
Figure 51B:
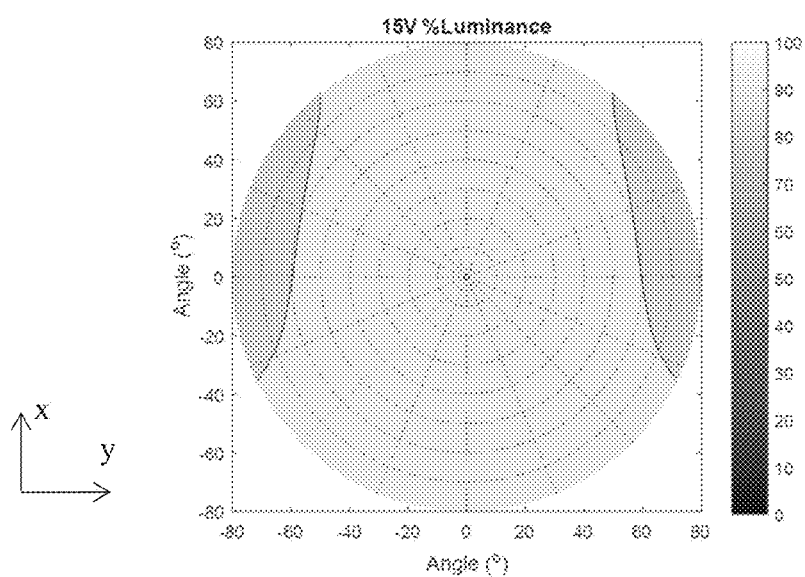
Figure 51C:
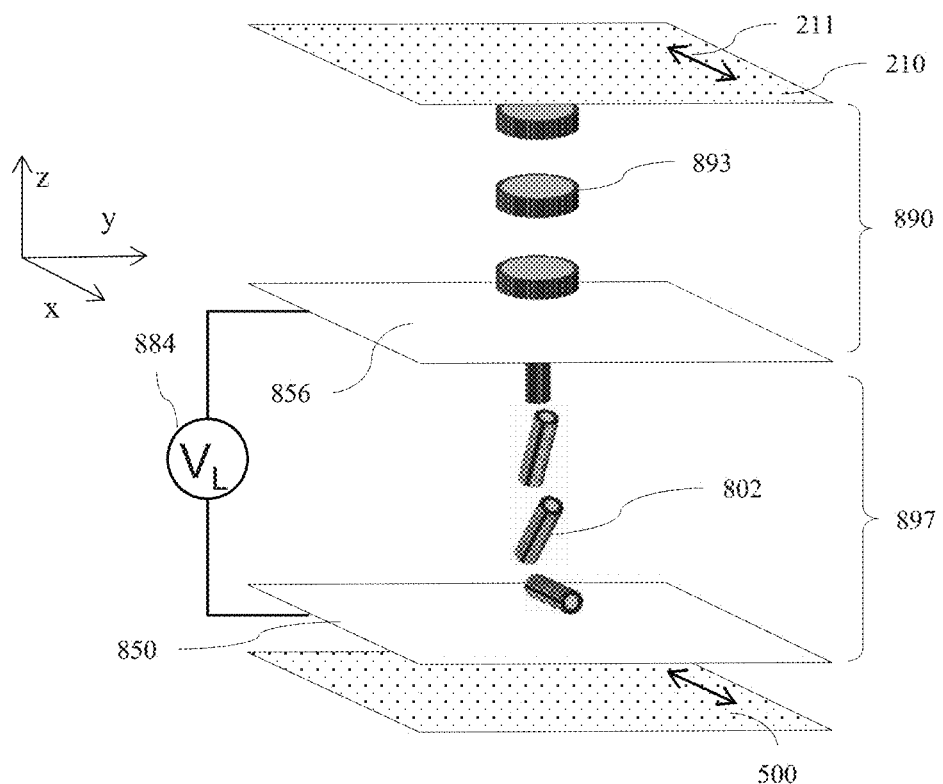
Figure 51D:
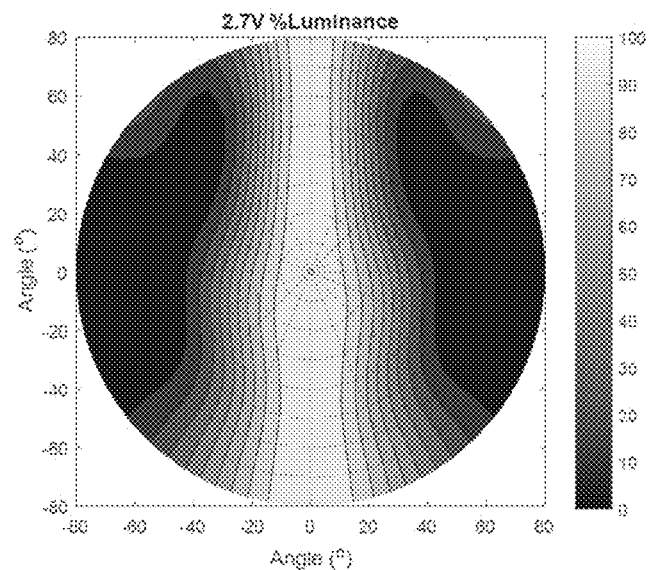
Figure 52A:
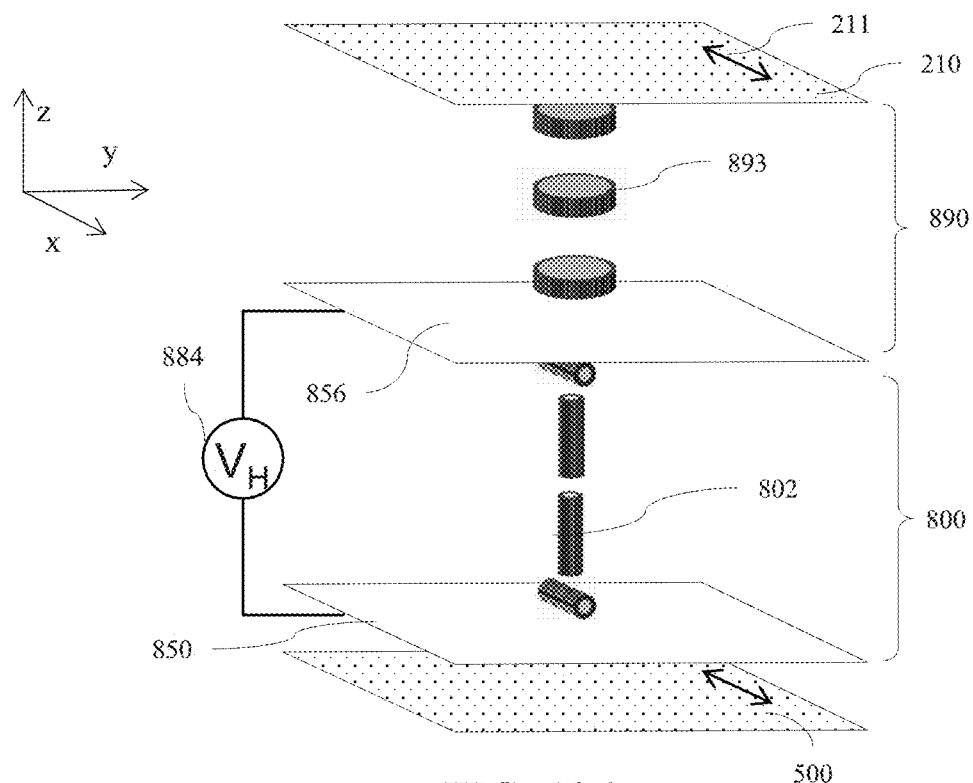
Figure 52B:
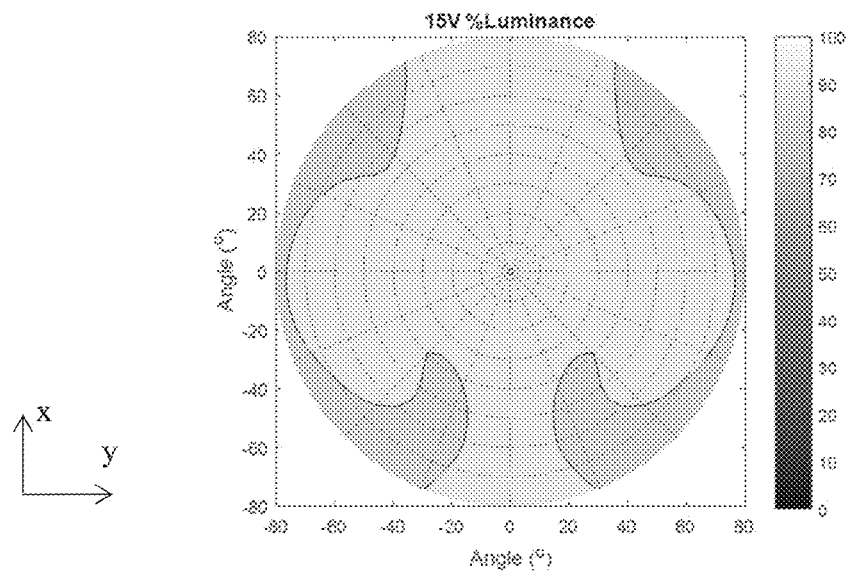
Figure 52C:
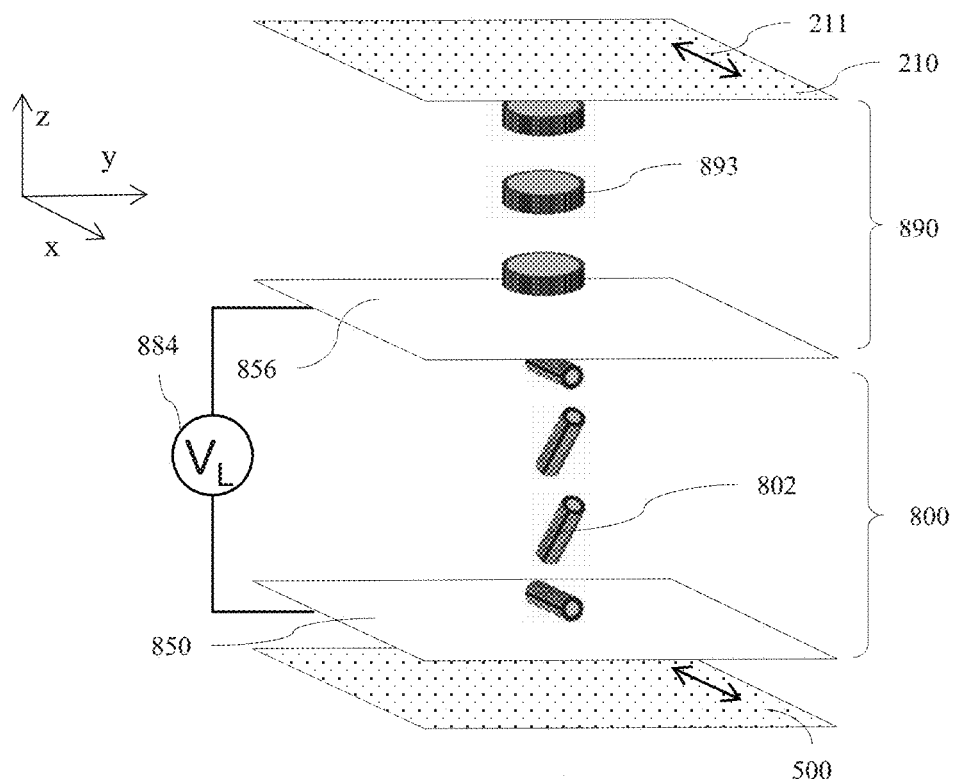
Figure 52D:
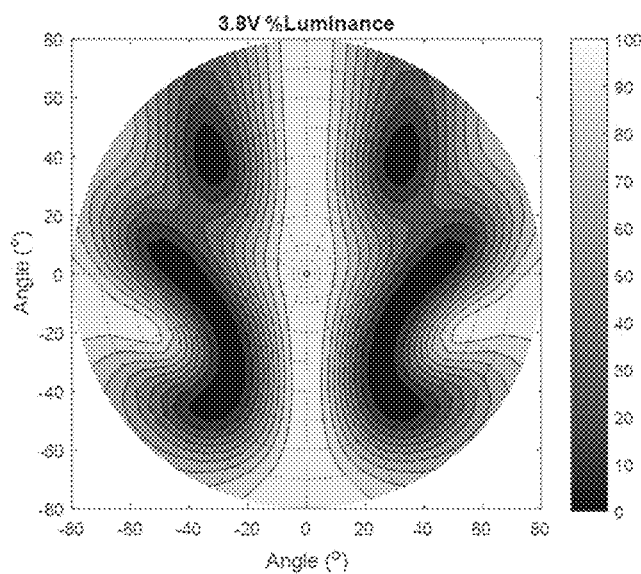
Figure 53A:
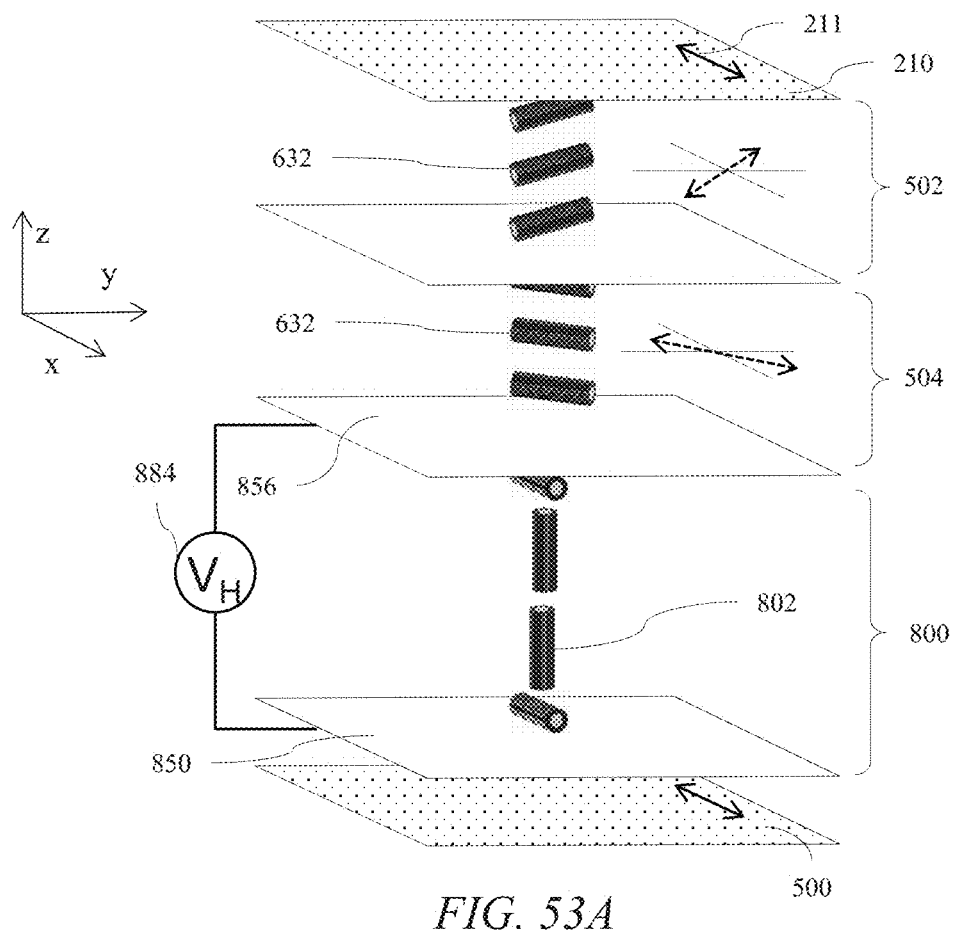
Figure 53B:
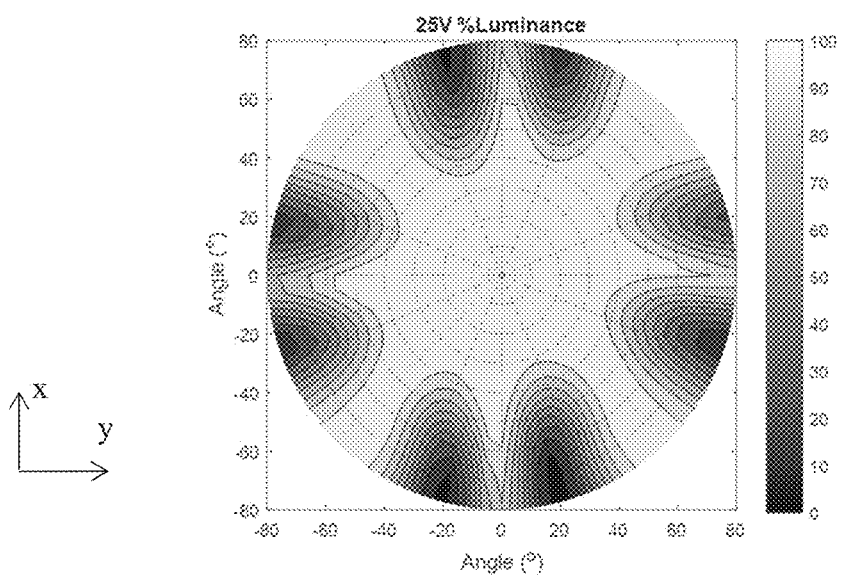
Figure 53C:
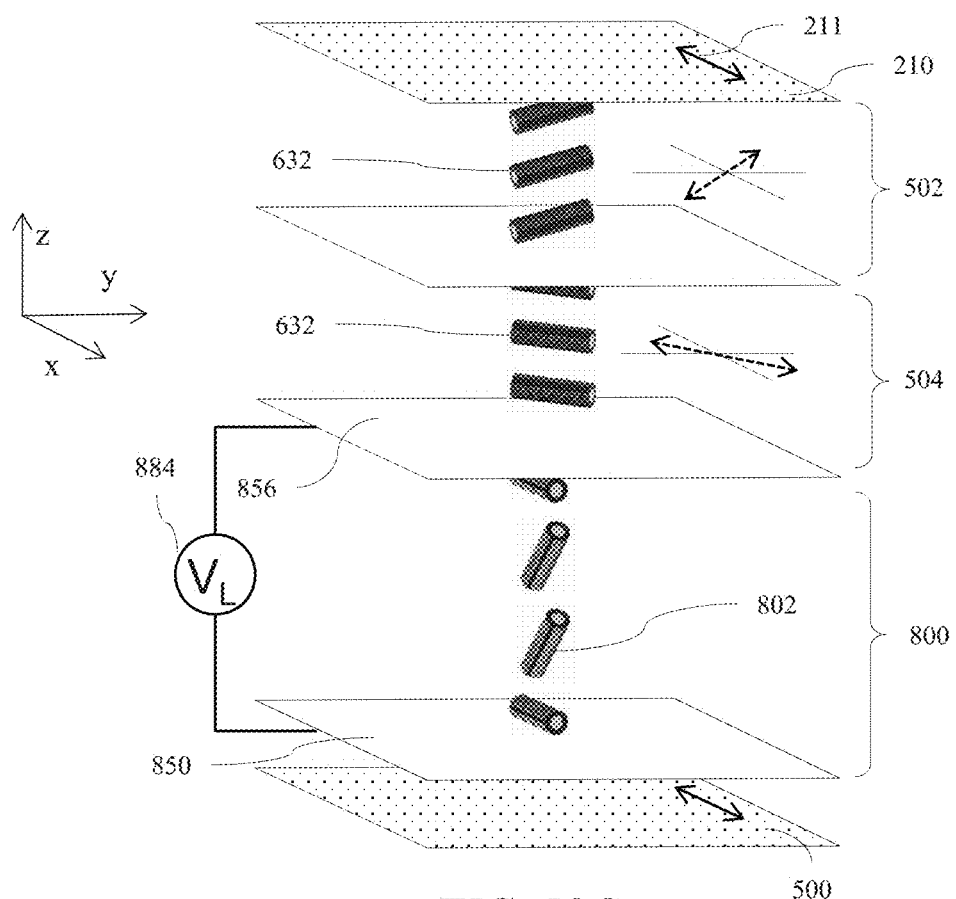
Figure 53D:
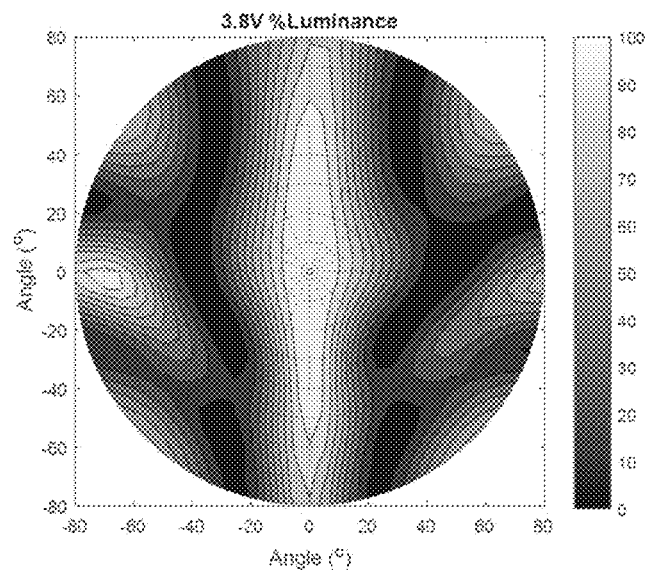
Figure 54:
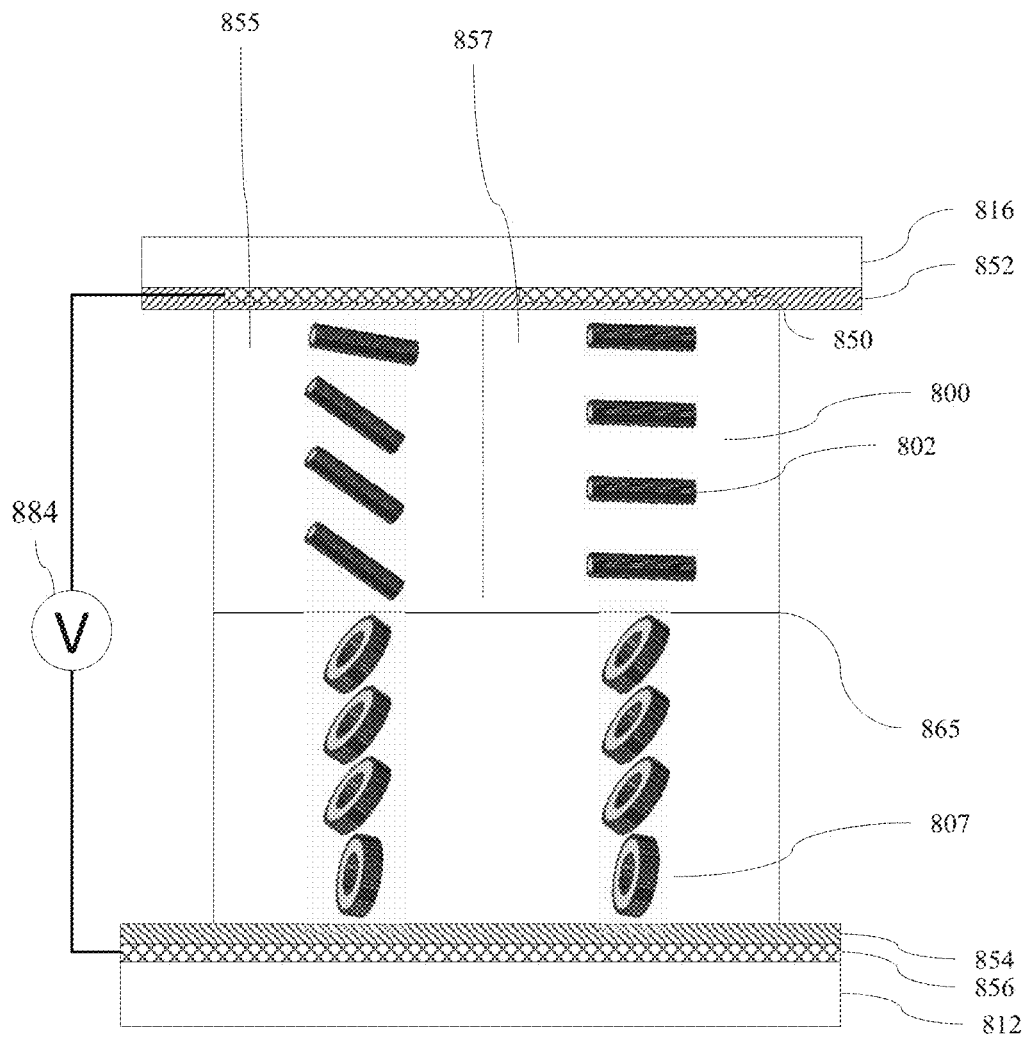
Figure 55:
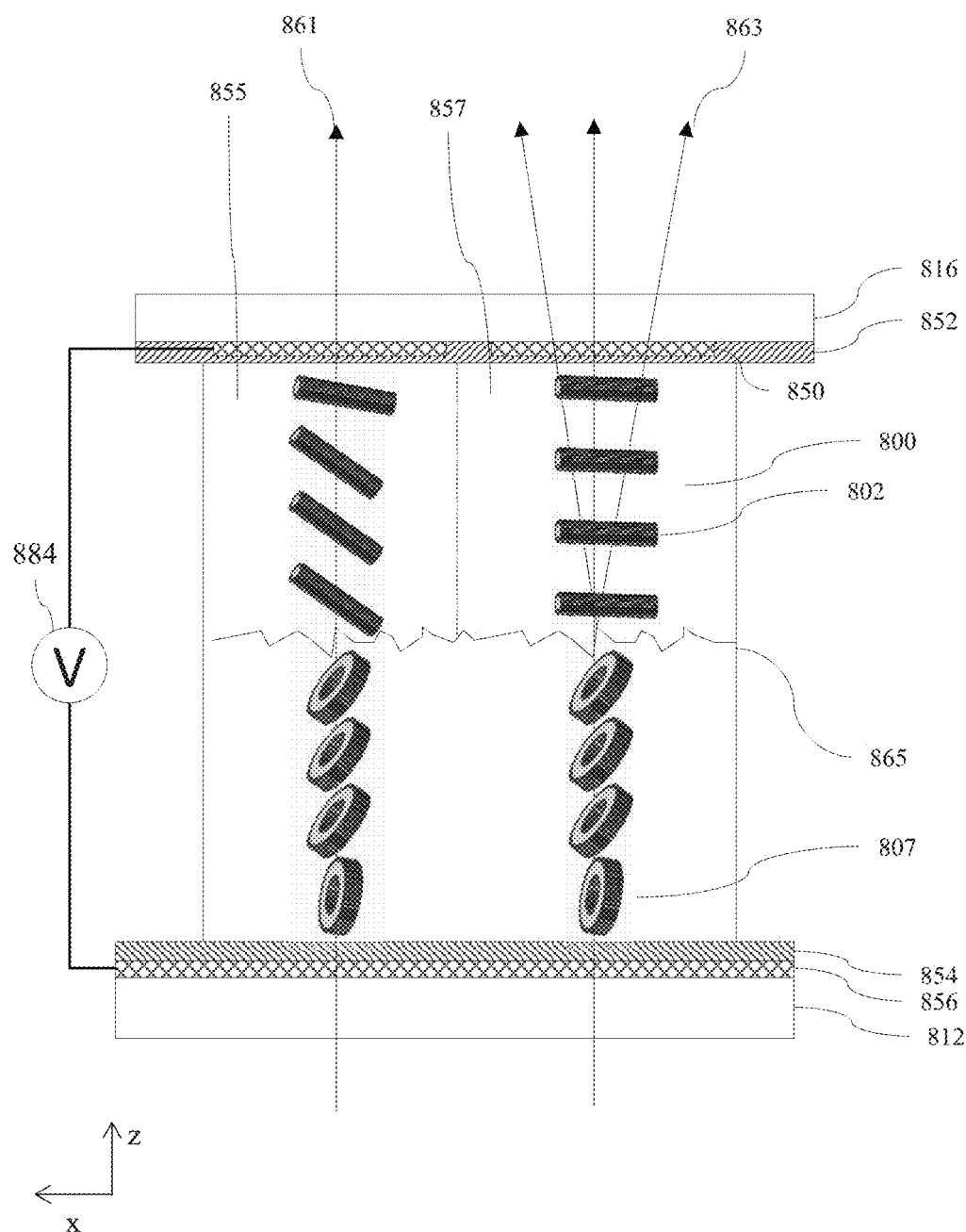
Figure 56:
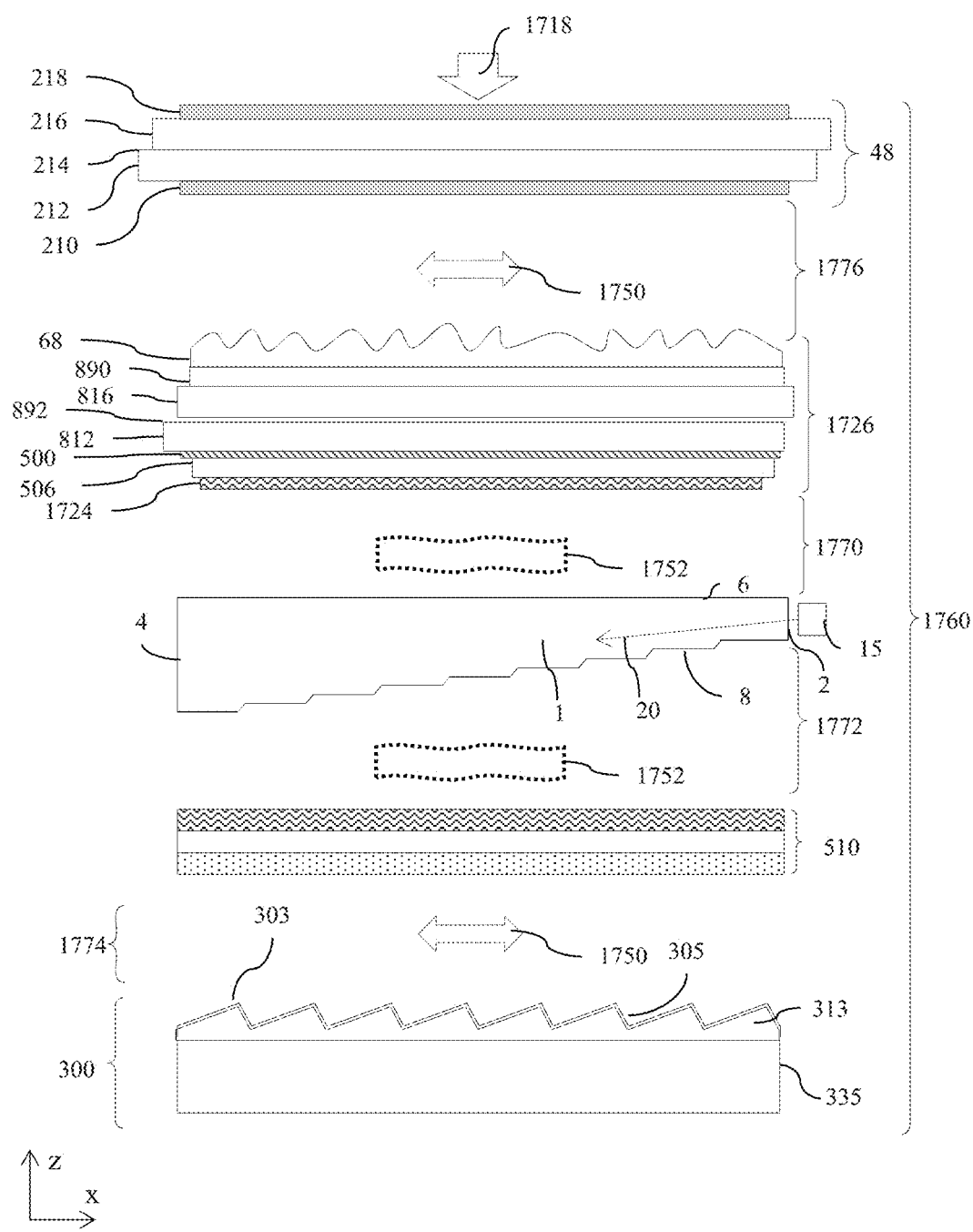
Figure 57:
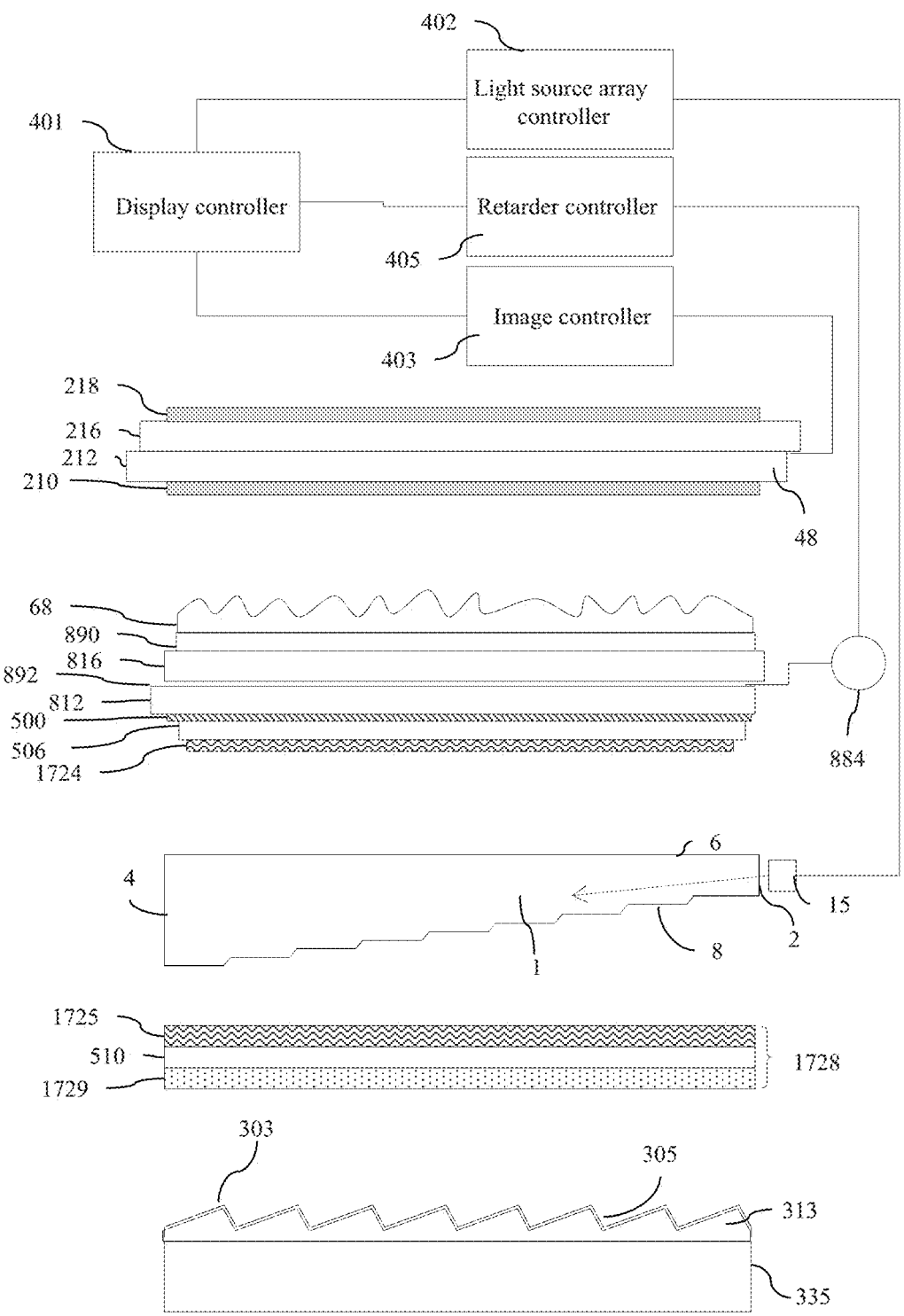
Figure 60:
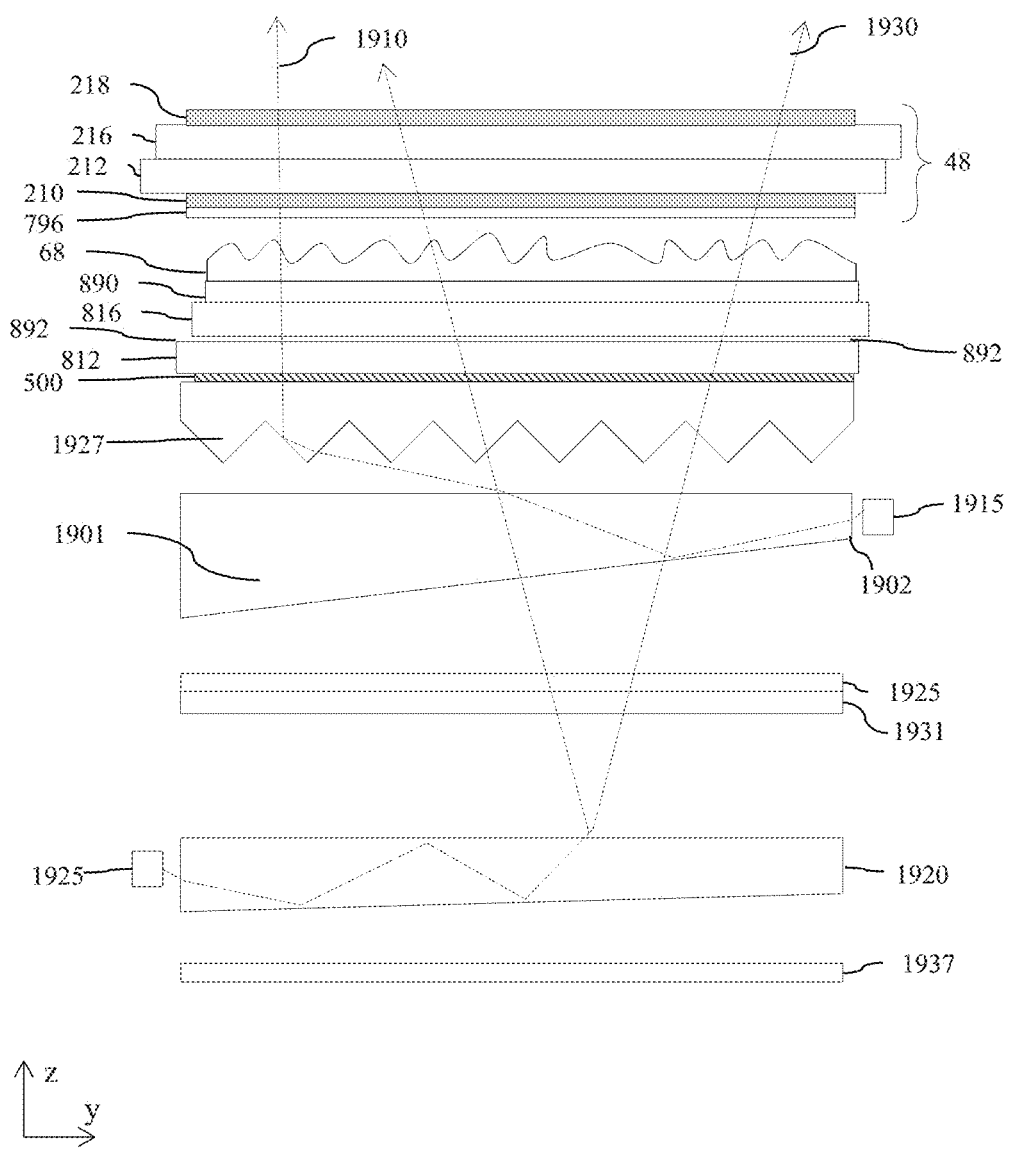
Figure 61:
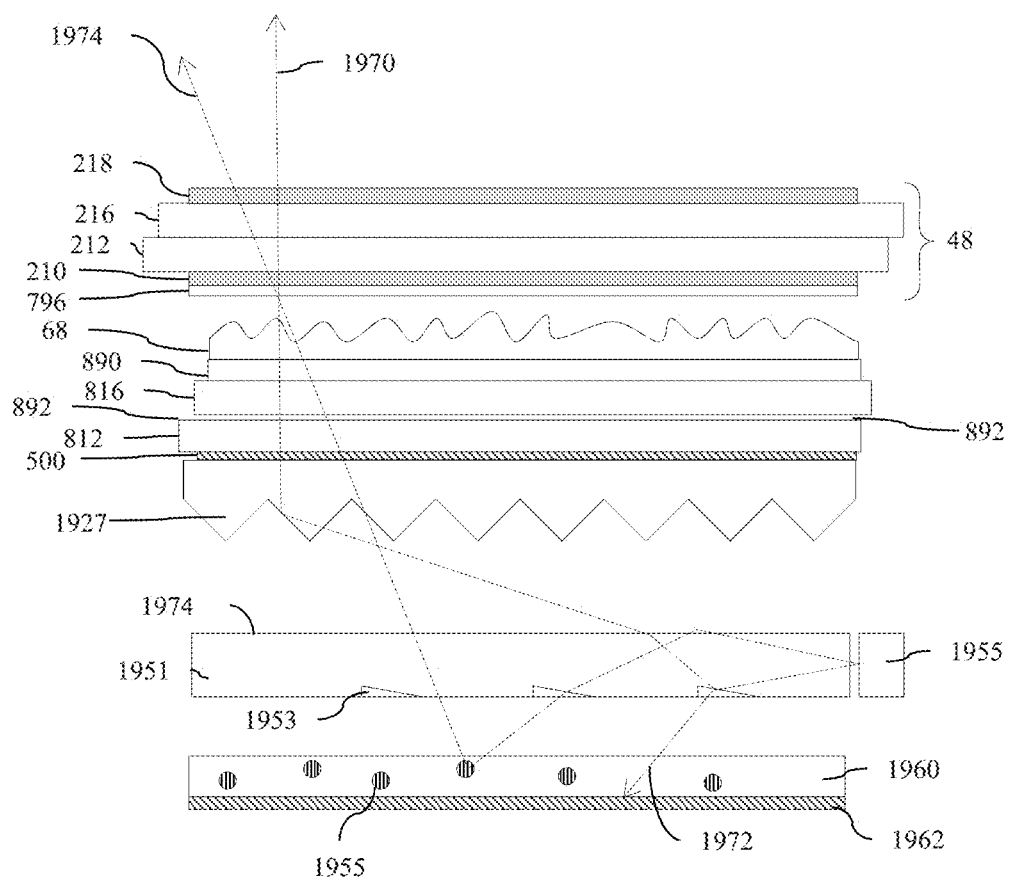

FIG. 48I is a schematic diagram illustrating in perspective side view orientation of multiple orthogonal homeotropically aligned switchable liquid crystal O-plates and correcting passive retarders arranged between a backlight and a spatial light modulator;

FIG. 48J is a schematic luminance field-of-view graph illustrating variation in transmitted luminance of the optical stack of FIG. 48I in a privacy mode of operation;

FIG. 49A is a schematic diagram illustrating in perspective side view orientation of a homeotropically aligned patterned switchable liquid crystal O-plate arranged between a directional backlight and a spatial light modulator in a privacy mode of operation arranged to comprise switchable camouflage regions;

FIG. 49B is a schematic diagram illustrating in perspective front view illumination of a primary viewer and a snooper by a camouflaged luminance controlled privacy display;

FIG. 49C is a schematic diagram illustrating in perspective side view illumination of a snooper by a camouflaged luminance controlled privacy display;

FIG. 50A is a schematic diagram illustrating in perspective side view orientation of a homeotropically aligned switchable liquid crystal O-plate arranged between a directional backlight and a spatial light modulator and crossed A-plates arranged between the spatial light modulator and an additional polariser in a wide angle mode of operation;

FIG. 50B is a schematic luminance field-of-view graph illustrating variation in transmitted luminance of the optical stack of FIG. 50A in a wide angle mode of operation;

FIG. 50C is a schematic diagram illustrating in perspective side view orientation of a homeotropically aligned switchable liquid crystal O-plate arranged between a directional backlight and a spatial light modulator and crossed A-plates arranged between the spatial light modulator and an additional polariser in a privacy mode of operation;

FIG. 50D is a schematic luminance field-of-view graph illustrating variation in transmitted luminance of the optical stack of FIG. 50C in a privacy mode of operation;

FIG. 51A is a schematic diagram illustrating in perspective side view orientation of a hybrid aligned switchable liquid crystal O-plate arranged between a directional backlight and a spatial light modulator and a negative C-plate arranged between the spatial light modulator and an additional polariser in a wide angle mode of operation;

FIG. 51B is a schematic luminance field-of-view graph illustrating variation in transmitted luminance of the optical stack of FIG. 51A in a wide angle mode of operation;

FIG. 51C is a schematic diagram illustrating in perspective side view orientation of a hybrid aligned switchable liquid crystal O-plate arranged between a directional backlight and a spatial light modulator and a negative C-plate arranged between the spatial light modulator and an additional polariser in a privacy mode of operation;

FIG. 51D is a schematic luminance field-of-view graph illustrating variation in transmitted luminance of the optical stack of FIG. 51C in a privacy mode of operation;

FIG. 52A is a schematic diagram illustrating in perspective side view orientation of a homogeneously aligned switchable liquid crystal O-plate arranged between a directional backlight and a spatial light modulator and a negative C-plate arranged between the spatial light modulator and an additional polariser in a wide angle mode of operation;

FIG. 52B is a schematic luminance field-of-view graph illustrating variation in transmitted luminance of the optical stack of FIG. 52A in a wide angle mode of operation;

FIG. 52C is a schematic diagram illustrating in perspective side view orientation of a homogeneously aligned switchable liquid crystal O-plate arranged between a directional backlight and a spatial light modulator and a negative C-plate arranged between the spatial light modulator and an additional polariser in a privacy mode of operation;

FIG. 52D is a schematic luminance field-of-view graph illustrating variation in transmitted luminance of the optical stack of FIG. 52C in a privacy mode of operation;

FIG. 53A is a schematic diagram illustrating in perspective side view orientation of a homogeneously aligned switchable liquid crystal O-plate arranged between a directional backlight and a spatial light modulator and crossed A-plates arranged between the spatial light modulator and an additional polariser in a wide angle mode of operation;

FIG. 53B is a schematic luminance field-of-view graph illustrating variation in transmitted luminance of the optical stack of FIG. 51A in a wide angle mode of operation;

FIG. 53C is a schematic diagram illustrating in perspective side view orientation of a homogeneously aligned switchable liquid crystal O-plate arranged between a directional backlight and a spatial light modulator and a negative C-plate arranged between the spatial light modulator and an additional polariser in a privacy mode of operation;

FIG. 53D is a schematic luminance field-of-view graph illustrating variation in transmitted luminance of the optical stack of FIG. 51C in a privacy mode of operation;

FIG. 54 is a schematic diagram illustrating in side view orientation of a switchable liquid crystal O-plate and a fixed O-plate that may be arranged with a directional backlight and a spatial light modulator wherein the interface between the O-plates is substantially planar;

FIG. 55 is a schematic diagram illustrating in side view orientation of a switchable liquid crystal O-plate and a fixed O-plate that may be arranged with a directional backlight and a spatial light modulator wherein the interface between the O-plates is roughened;

FIG. 56 is a schematic diagram illustrating a side view of a directional display apparatus optical stack comprising a directional waveguide, wherein a switchable retarder is arranged between the waveguide and the spatial light modulator and surfaces are arranged to provide reduced damage by an external compressive force;

FIG. 57 is a schematic diagram illustrating a side view of a directional display control system comprising control of spatial light modulator, retarder layer and light source array;

FIG. 58A, FIG. 58B, FIG. 58C, FIG. 58D, and FIG. 58E are schematic diagrams illustrating the operation of a directional display in privacy mode wherein a primary image is provided on the spatial light modulator in at least one phase of operation;

FIG. 59A, FIG. 59B, FIG. 59C, FIG. 59D, and FIG. 59E are schematic diagrams illustrating the operation in a second phase of a directional display in privacy mode wherein a primary image is provided on the spatial light modulator in a first phase and a secondary image is provided on the spatial light modulator in a second phase;

FIG. 60 is a schematic diagram illustrating a side view of a directional display apparatus optical stack comprising a collimating waveguide, a wide angle waveguide, a switchable liquid crystal O-plate and a correcting passive retarder; and FIG. 61 is a schematic diagram illustrating a side view of a directional display apparatus optical stack comprising a collimating waveguide and switchable diffuser, a switchable liquid crystal O-plate and a correcting passive retarder.

DETAILED DESCRIPTION

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. Pat. No. 9,519,153 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kalil Kalantar et al., Backlight Unit With Double Surface Light Emission, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. Pat. No. 9,519,153, which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input surface to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. Pat. No. 9,519,153 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
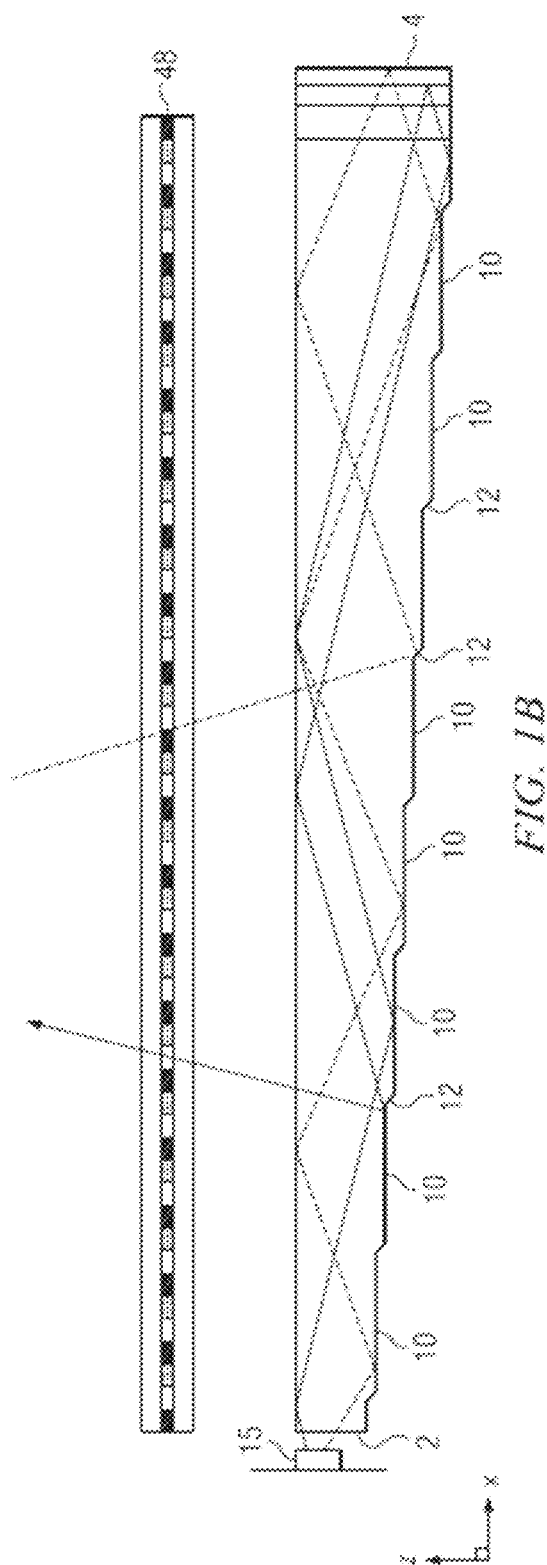
FIG. 1B is a schematic diagram illustrating a side view of light propagation in one embodiment of the directional display device of FIG. 1A.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
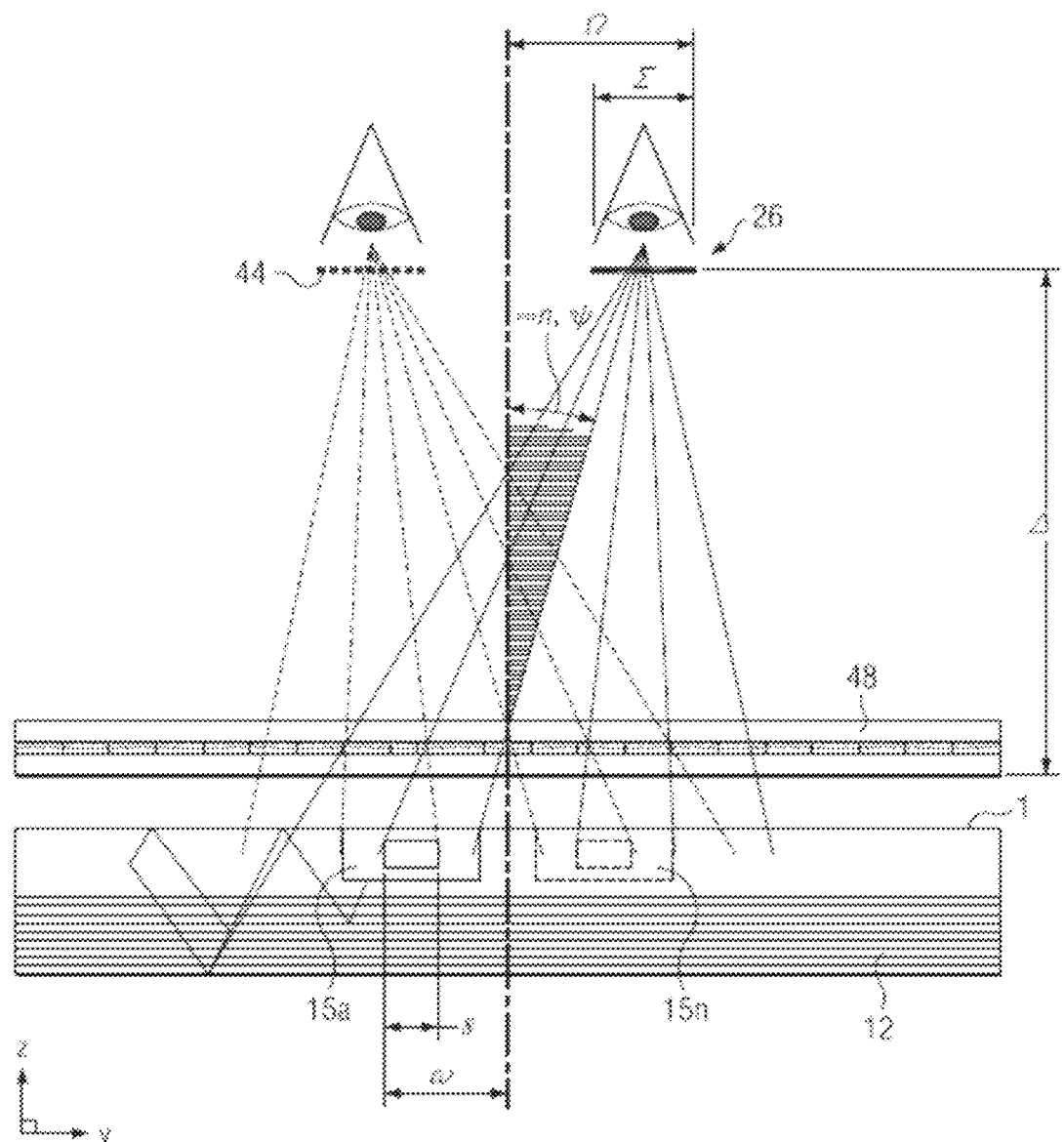
FIG. 2A is a schematic diagram illustrating in a top view of light propagation in another embodiment of a directional display device.
Figure 2B:
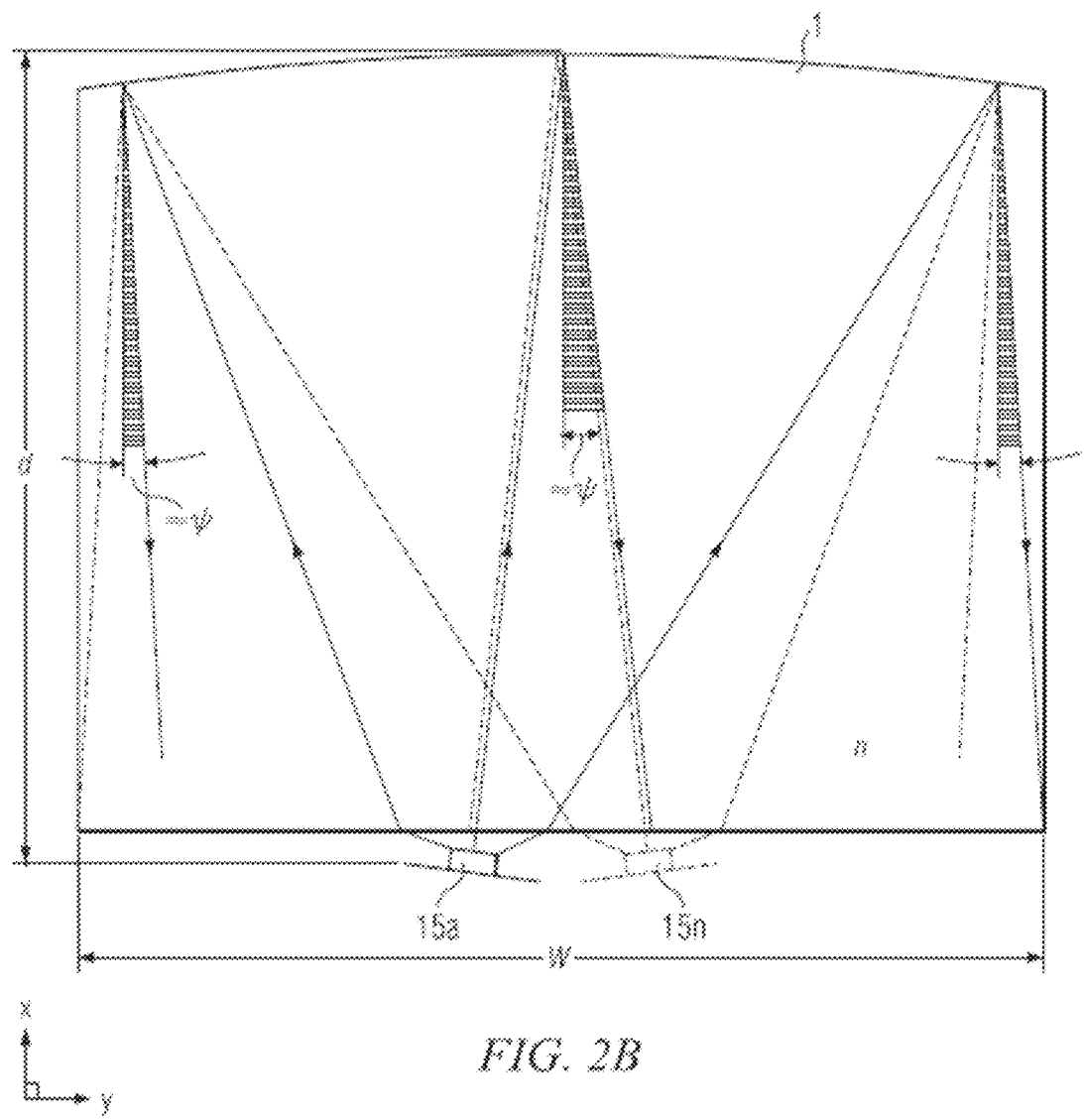
FIG. 2B is a schematic diagram illustrating light propagation in a front view of the directional display device of FIG. 2A.
Figure 2C:
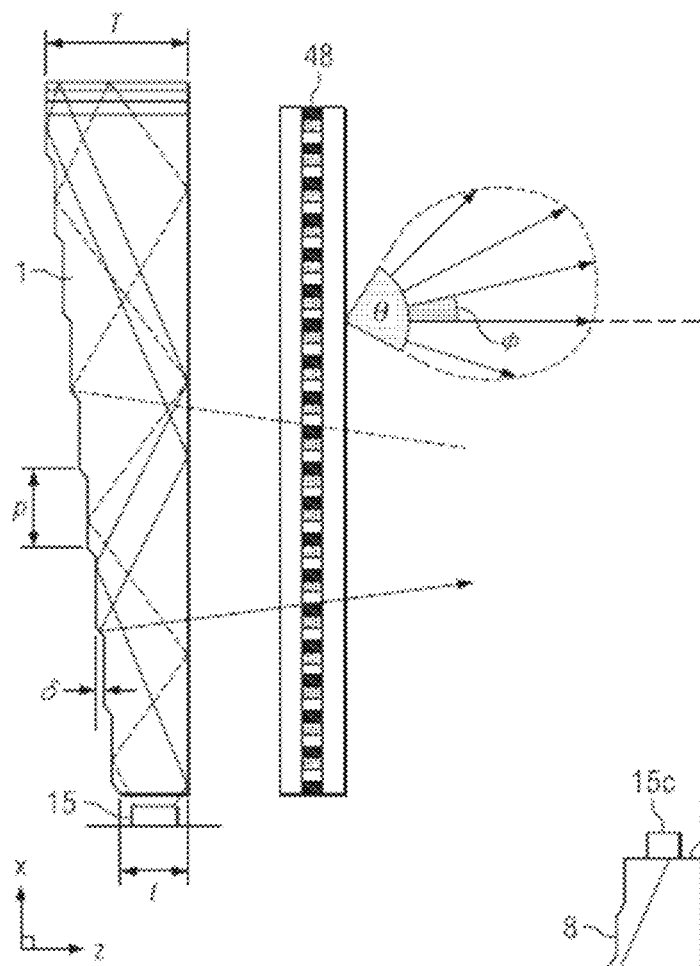
FIG. 2C is a schematic diagram illustrating light propagation in a side view of the directional display device of FIG. 2A.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide 1. In other words, the reflective end may have positive optical power in a direction extending between sides of the waveguide that extend between the first and second guide surfaces and between the input end and the reflective end. The light extraction features 12 may have positive optical power in a direction between sides of the waveguide that extend between the first and second guide surfaces 6, 8 and between the input end 2 and the reflective end.

The waveguide 1 may further comprising a reflective end 4 for reflecting input light from the light sources back along the waveguide 1, the second guide surface 8 being arranged to deflect the reflected input light through the first guide surface 6 as output light, and the waveguide 1 being arranged to image the light sources 15a-n so that the output light from the light sources is directed into respective optical windows 26a-n in output directions that are distributed laterally in dependence on the input positions of the light sources.

In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
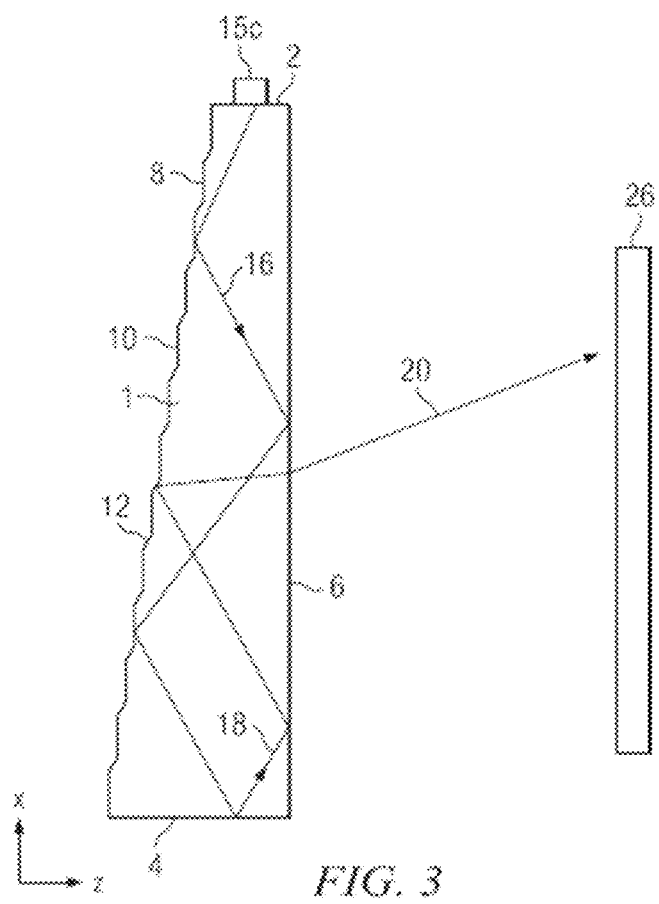
FIG. 3 is a schematic diagram illustrating in a side view of a directional display device.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
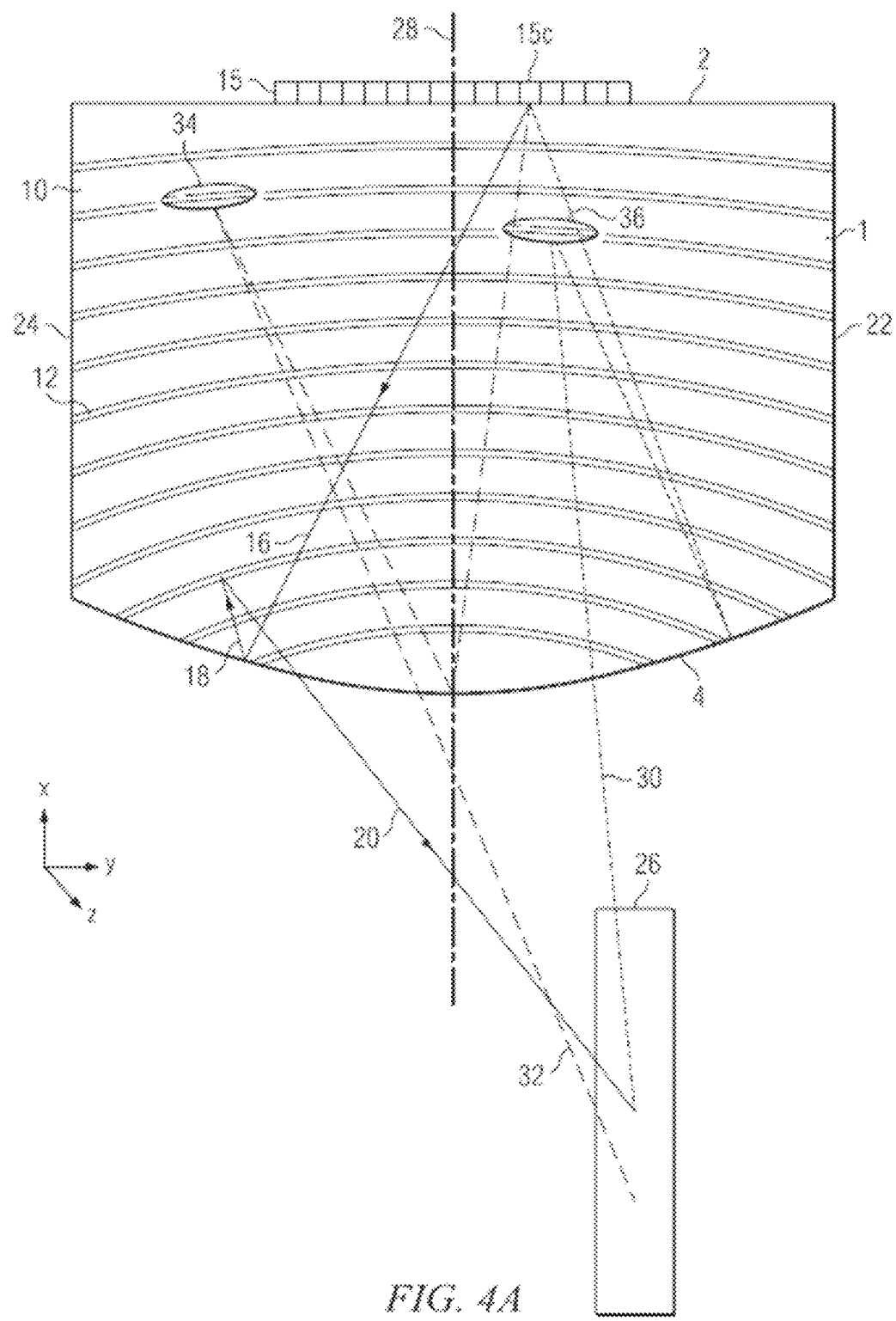
FIG. 4A is schematic diagram illustrating in a front view, generation of a viewing window in a directional display device including curved light extraction features.

FIG. 4A is a schematic diagram illustrating in front view a directional display device which may be illuminated by a first illuminator element and including curved light extraction features. Further, FIG. 4A shows in front view further guiding of light rays from illuminator element 15*c* of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
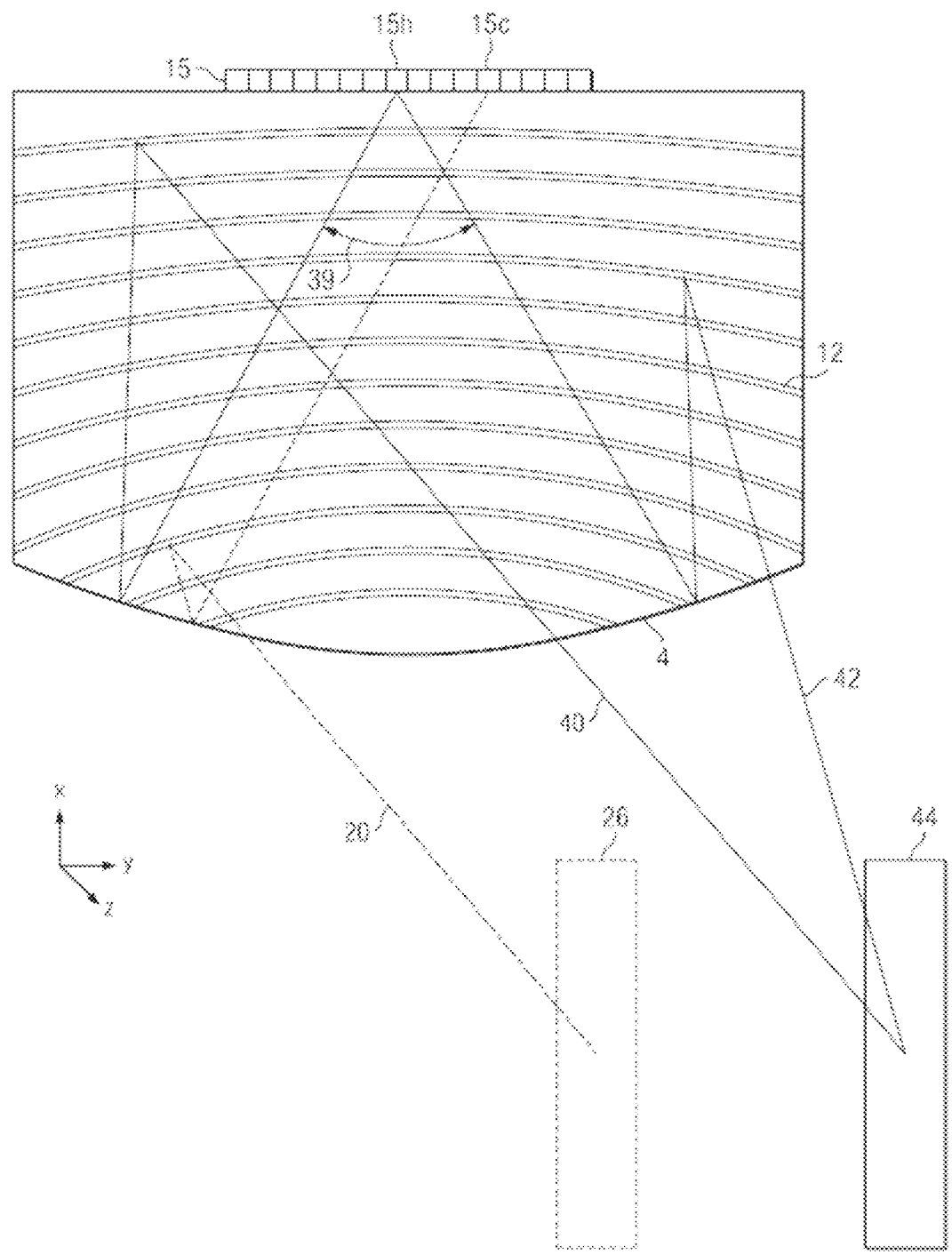
FIG. 4B is a schematic diagram illustrating in a front view, generation of a first and a second viewing window in a directional display device including curved light extraction features.

FIG. 4B is a schematic diagram illustrating in front view an optical valve which may illuminated by a second illuminator element. Further, FIG. 4B shows the light rays 40, 42 from a second illuminator element 15*h* of the illuminator array 15. The curvature of the reflective end on the side 4 and the light extraction features 12 cooperatively produce a second viewing window 44 laterally separated from the viewing window 26 with light rays from the illuminator element 15*h*.

Advantageously, the arrangement illustrated in FIG. 4B may provide a real image of the illuminator element 15*c* at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15*c* to lateral positions in viewing window 26. Improved aberrations may achieve an extended viewing freedom for an autostereoscopic display while achieving low cross talk levels.

Figure 5:
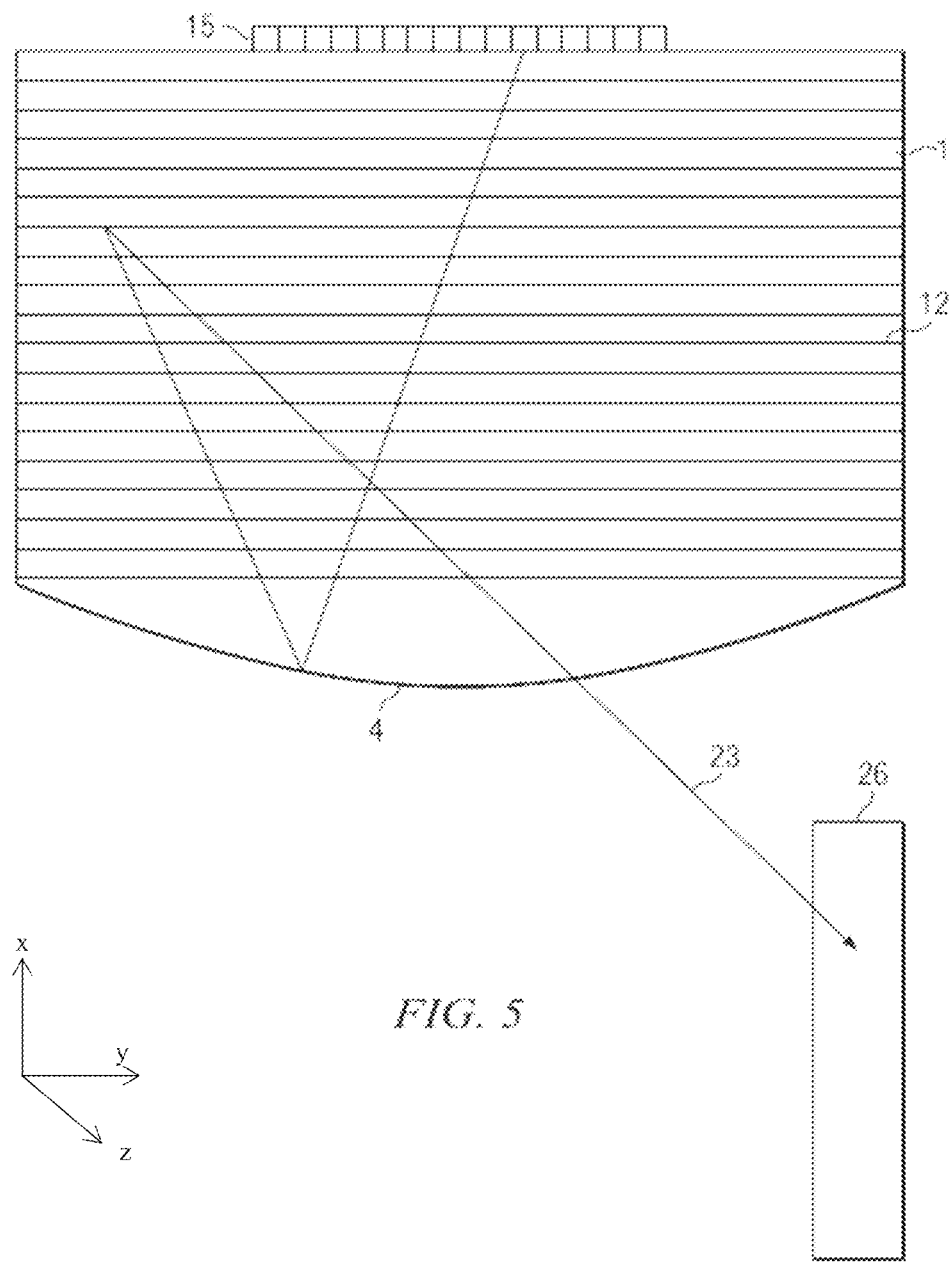
FIG. 5 is a schematic diagram illustrating generation of a first viewing window in a directional display device including linear light extraction features.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
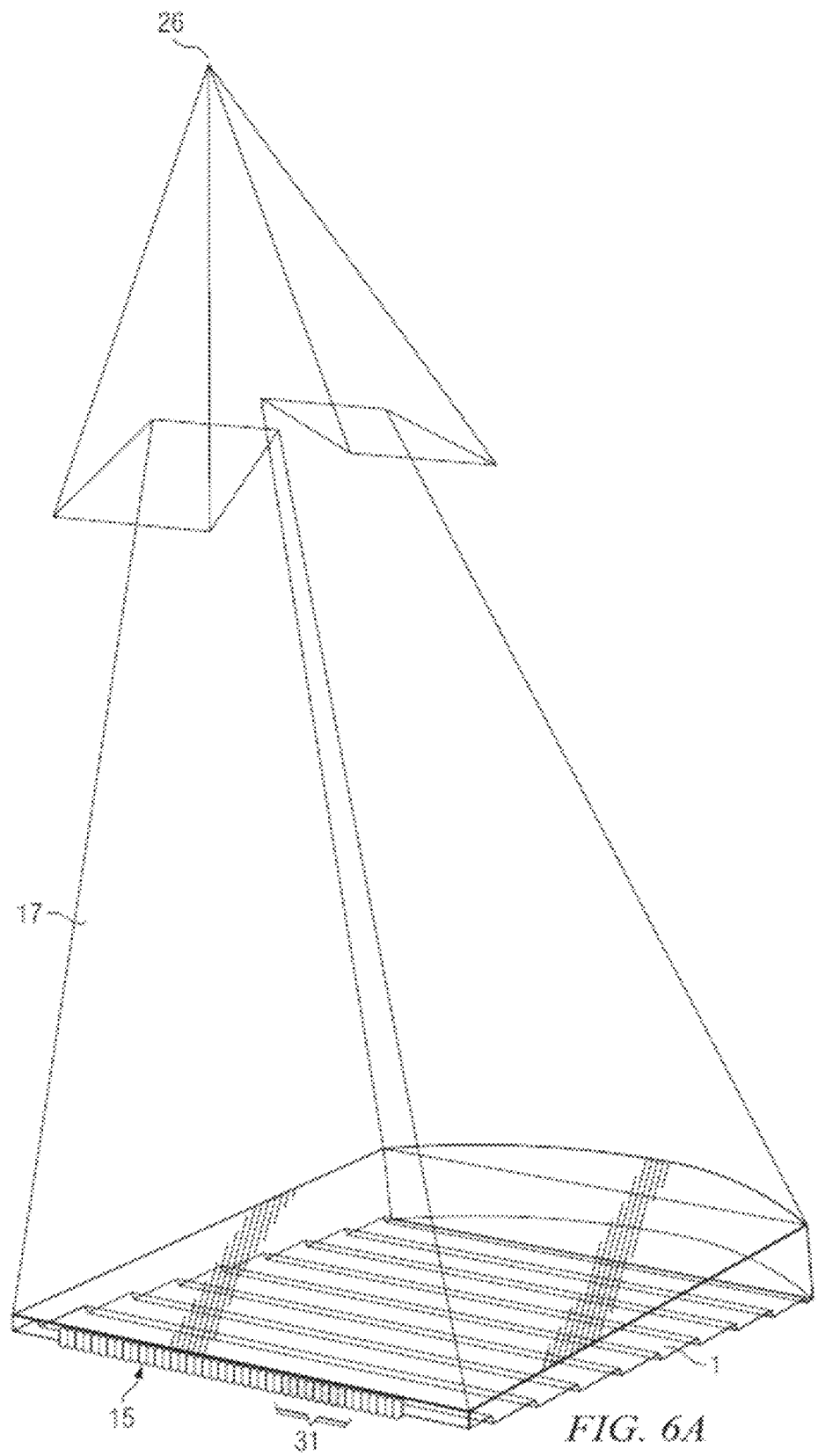
FIG. 6A is a schematic diagram illustrating one embodiment of the generation of a first viewing window in a time multiplexed directional display device in a first time slot.
Figure 6B:
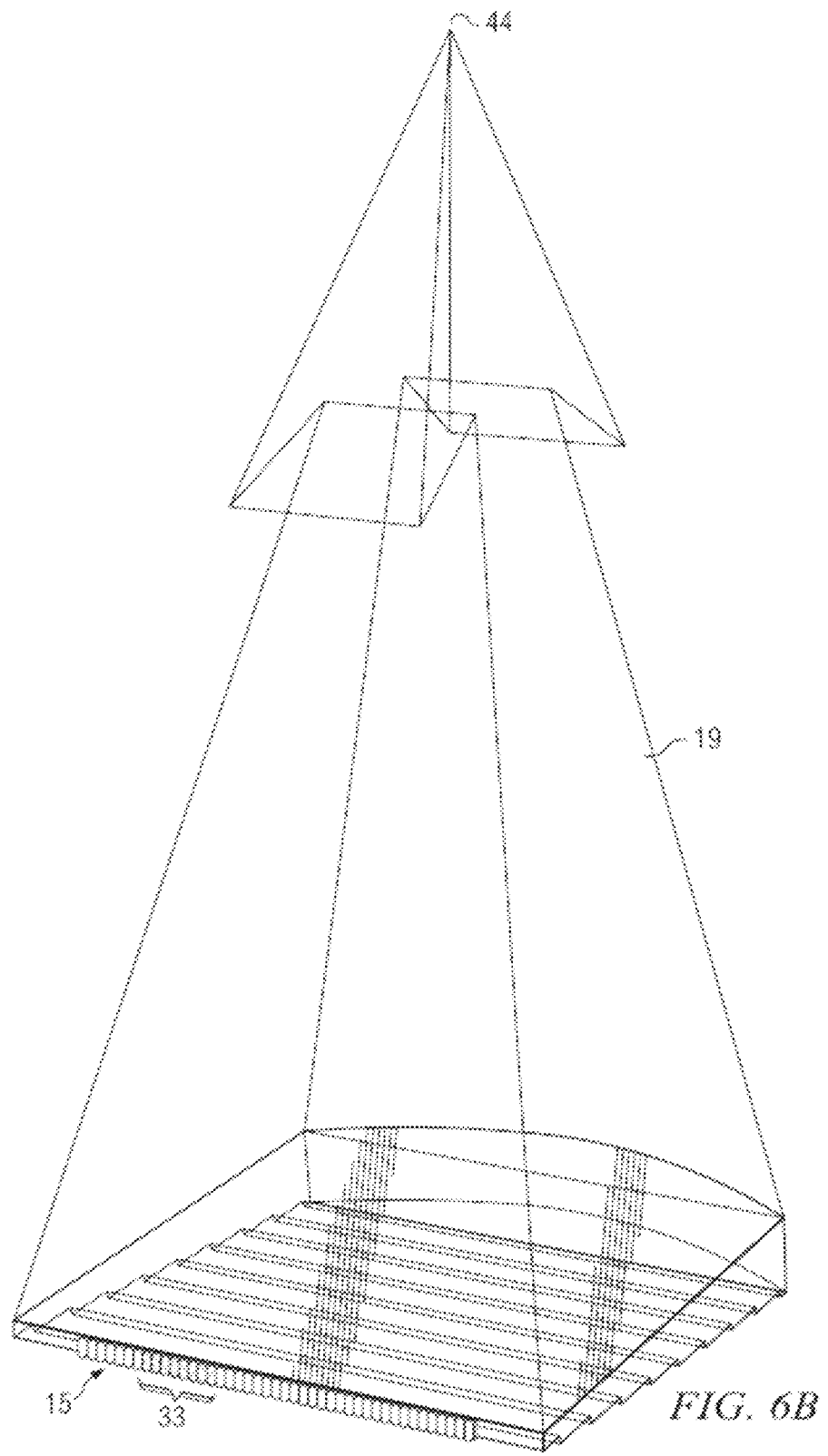
FIG. 6B is a schematic diagram illustrating another embodiment of the generation of a second viewing window in a time multiplexed directional display device in a second time slot.
Figure 6C:
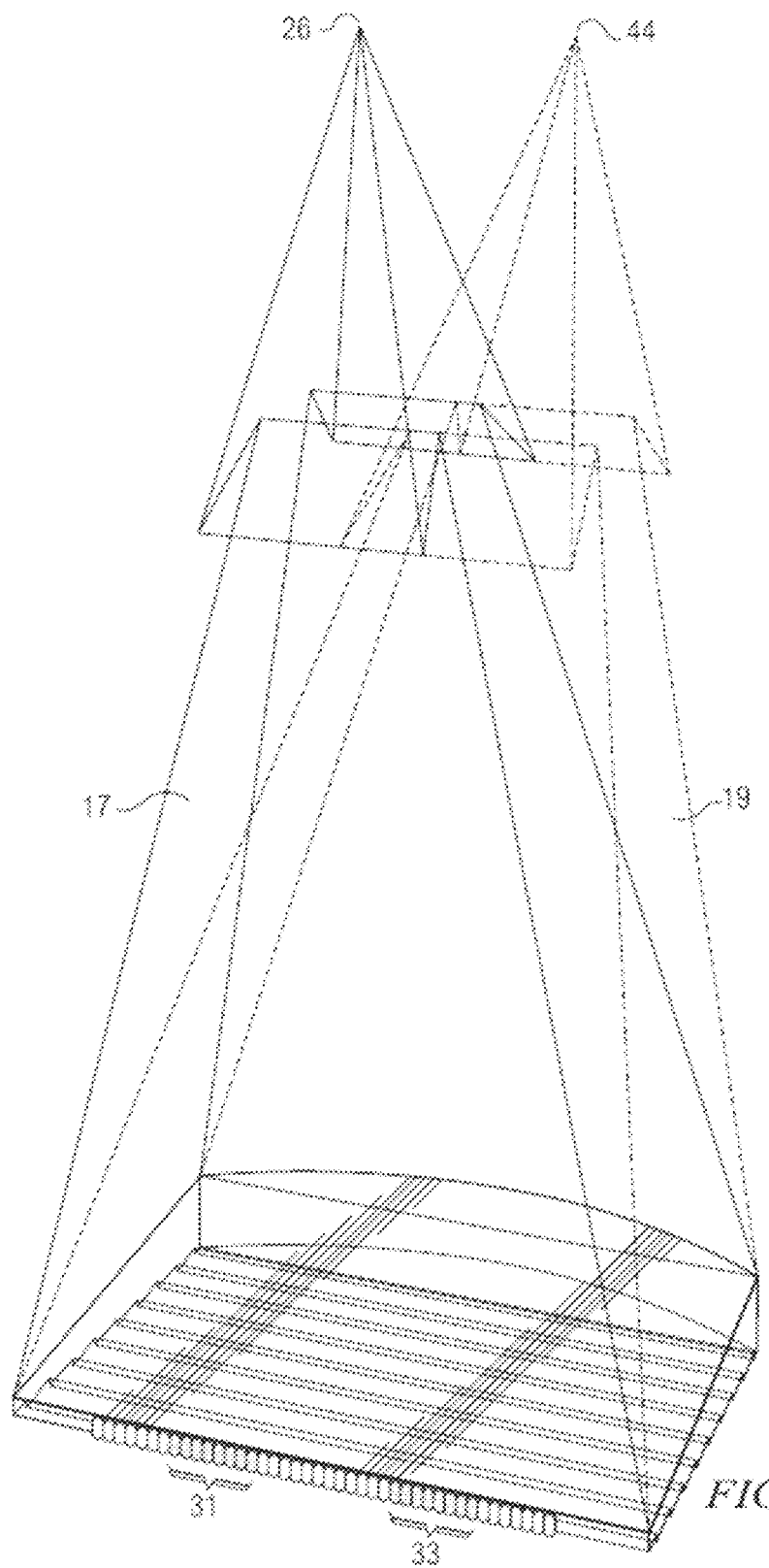
FIG. 6C is a schematic diagram illustrating another embodiment of the generation of a first and a second viewing window in a time multiplexed directional display device.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15*a* to 15*n*, where n is an integer greater than one.

Figure 7:
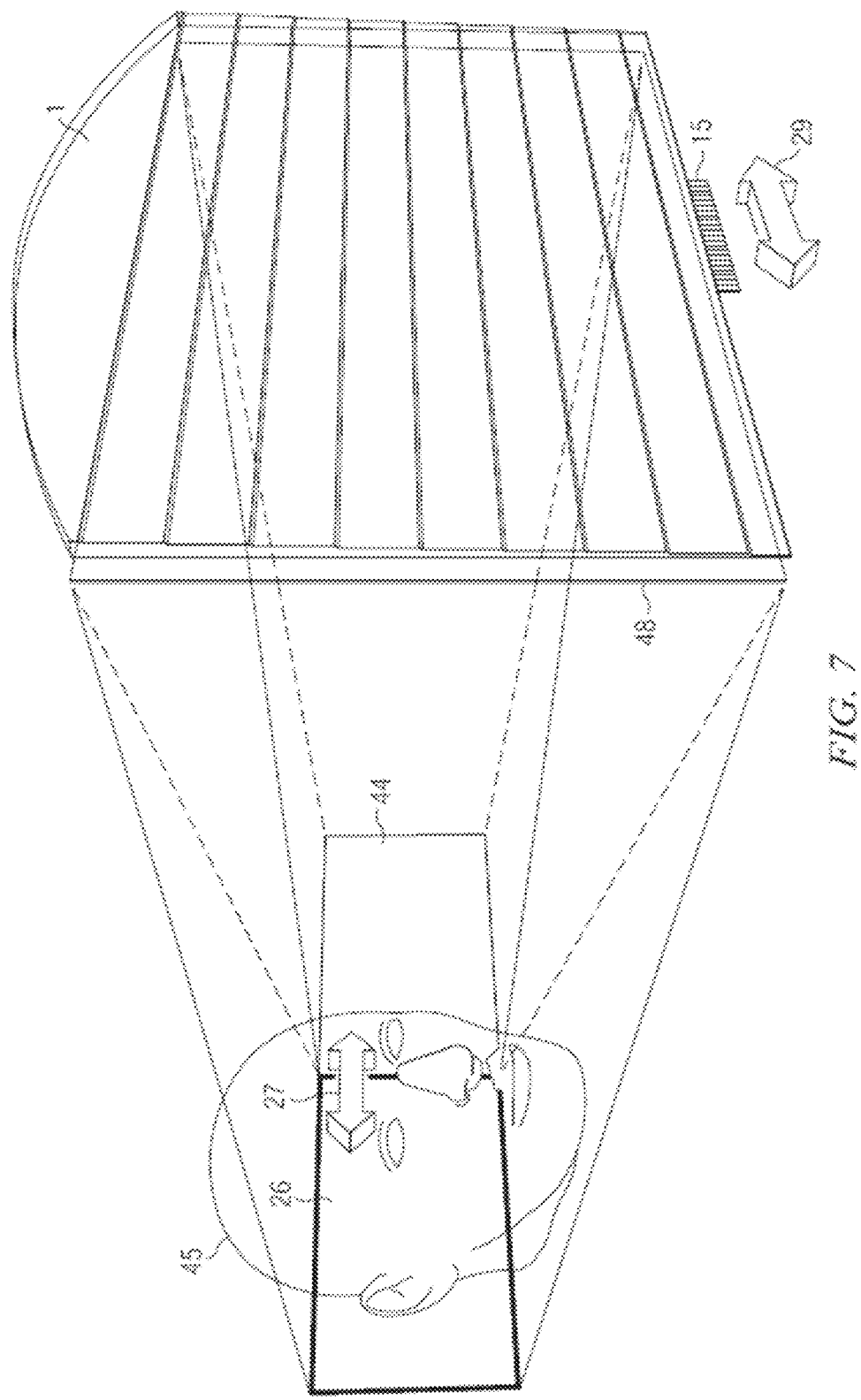
FIG. 7 is a schematic diagram illustrating an observer tracking autostereoscopic directional display device.

FIG. 7 is a schematic diagram illustrating one embodiment of an observer tracking autostereoscopic directional display device. As shown in FIG. 7, selectively turning on and off illuminator elements 15*a* to 15*n* along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
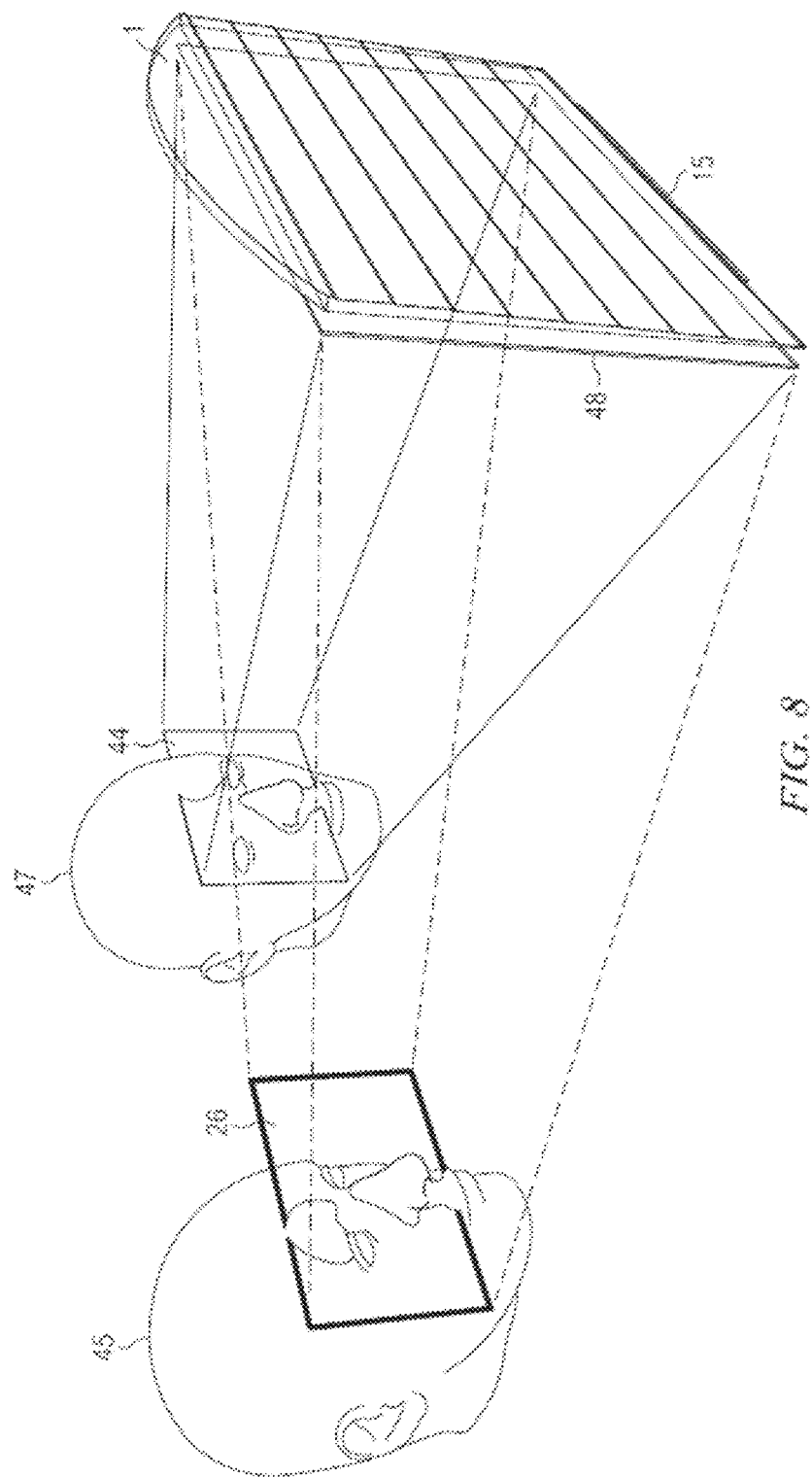
FIG. 8 is a schematic diagram illustrating a multi-viewer directional display device.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
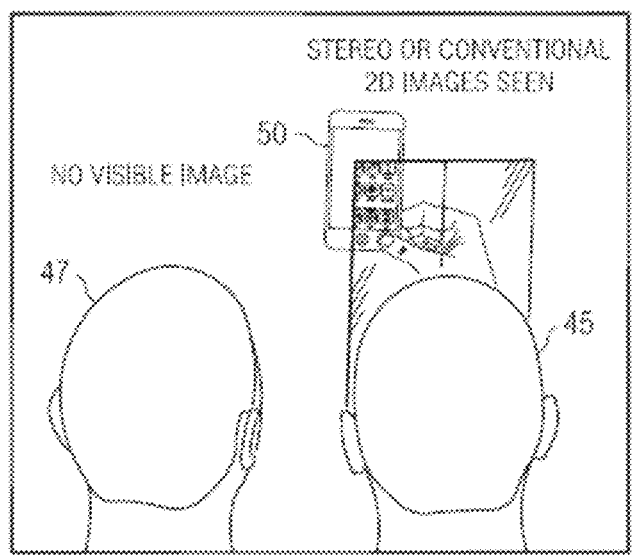
FIG. 9 is a schematic diagram illustrating a privacy directional display device.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
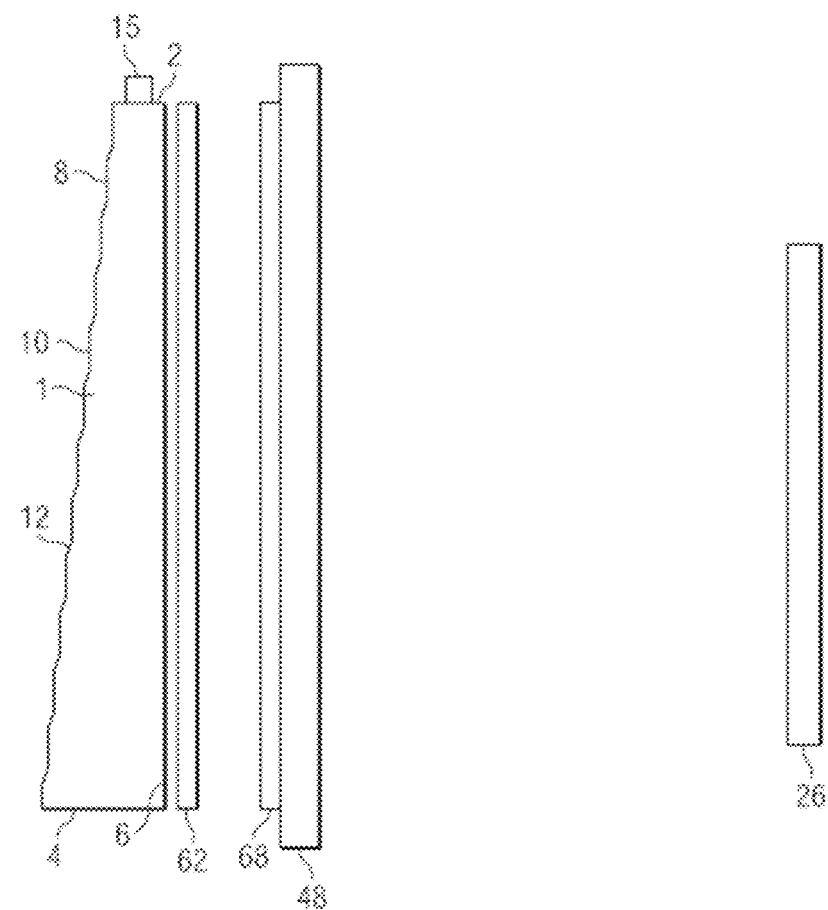
FIG. 10 is a schematic diagram illustrating in side view, the structure of a time multiplexed directional display device.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
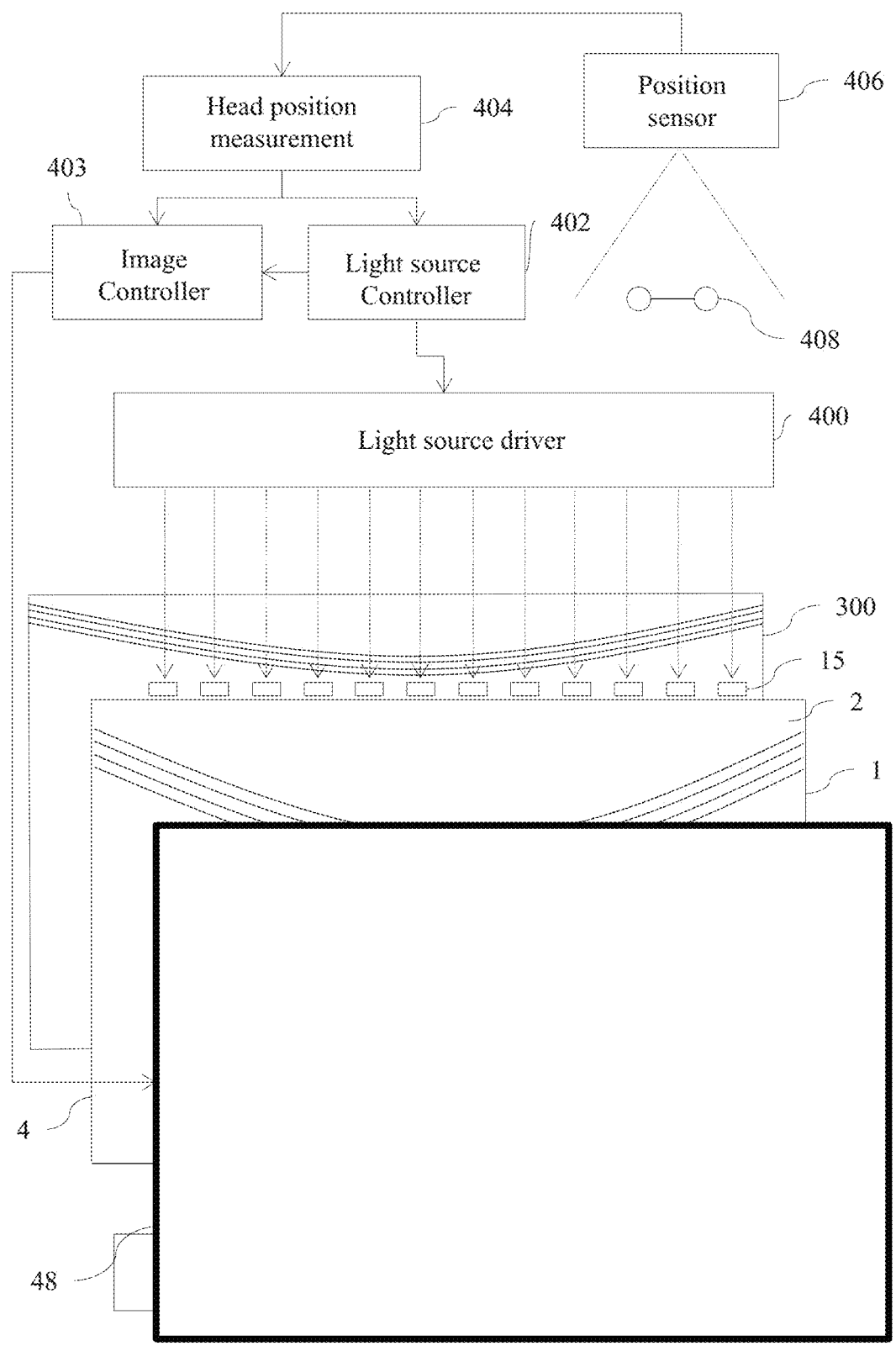
FIG. 11 is a schematic diagram illustrating a directional display apparatus comprising a directional display device and a control system.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Thus a directional display apparatus may comprise a directional display device and a control system arranged to control the light sources 15a-n.

Figure 12A:
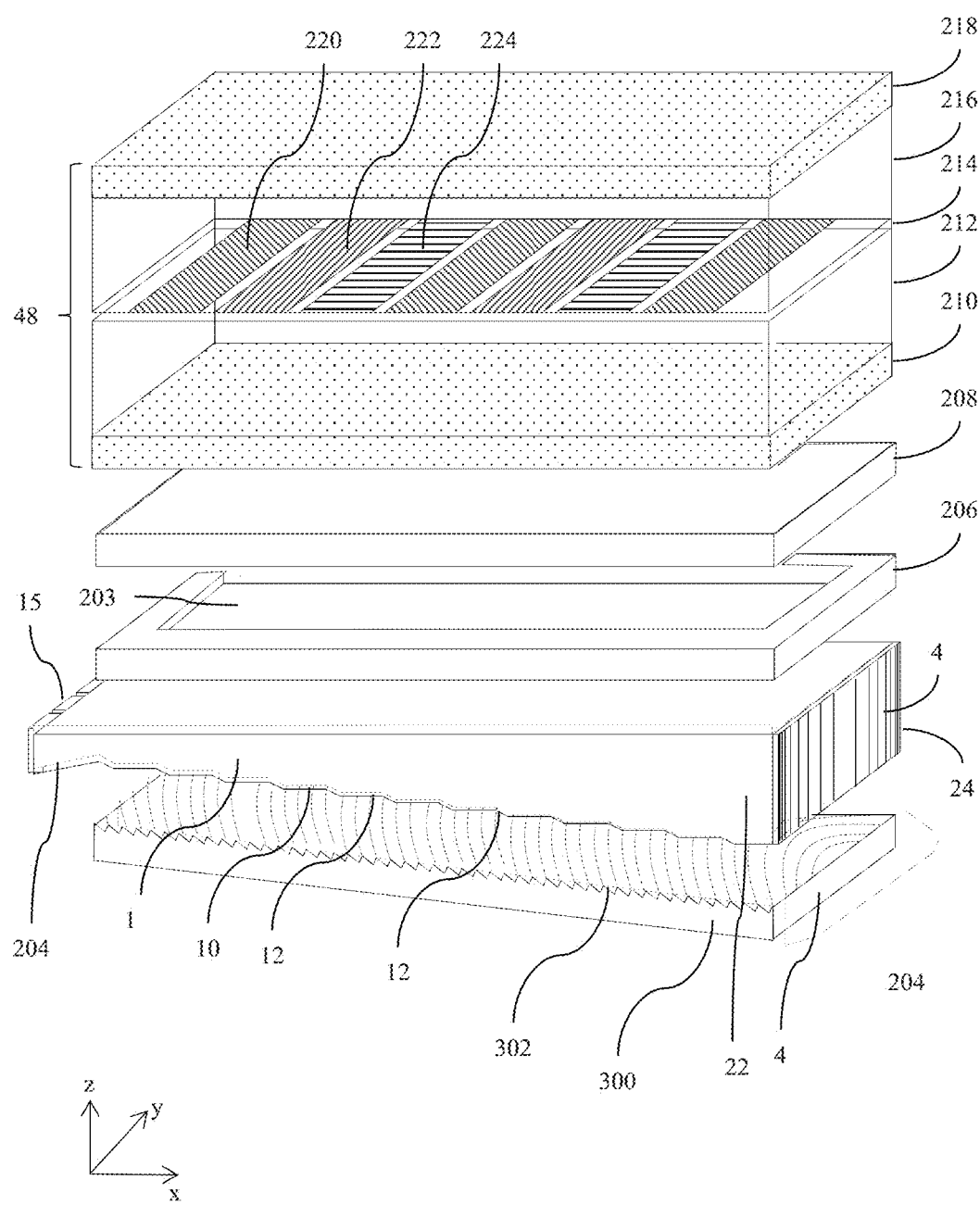
FIG. 12A is a schematic diagram illustrating a perspective view of a directional display apparatus optical stack comprising a directional waveguide with light input at a side that is opposite a reflective side.

FIG. 12A is a schematic diagram illustrating a perspective view of a directional display apparatus optical stack comprising a directional waveguide with light input at a side that is opposite a reflective side.

Reflective end 4 may be provided by a Fresnel mirror. Further taper region 204 may be arranged at the input to the waveguide 1 to increase input coupling efficiency from the light sources 15a-15n of the array of illuminator elements 15 and to increase illumination uniformity. Shading layer 206 with aperture 203 may be arranged to hide light scattering regions at the edge of the waveguide 1. Rear reflector 300 may comprise facets 302 that are curved and arranged to provide viewing windows from groups of optical windows provided by imaging light sources of the array 15 to the window plane. An optical stack 208 may comprise reflective polarizers, retarder layers and diffusers. Rear reflectors 300 and optical stack 208 are described further in U.S. Patent Publ. No. 2014-0240828, incorporated herein by reference in its entirety.

Spatial light modulator 48 may comprise a liquid crystal display that may comprise an input polarizer 210, TFT glass substrate 212, liquid crystal layer 214, color filter glass substrate 216 and output polarizer 218. Red pixels 220, green pixels 222 and blue pixels 224 may be arranged in an array at the liquid crystal layer 214. White, yellow, additional green or other color pixels (not shown) may be further arranged in the liquid crystal layer to increase transmission efficiency, color gamut or perceived image resolution.

Figure 12B:
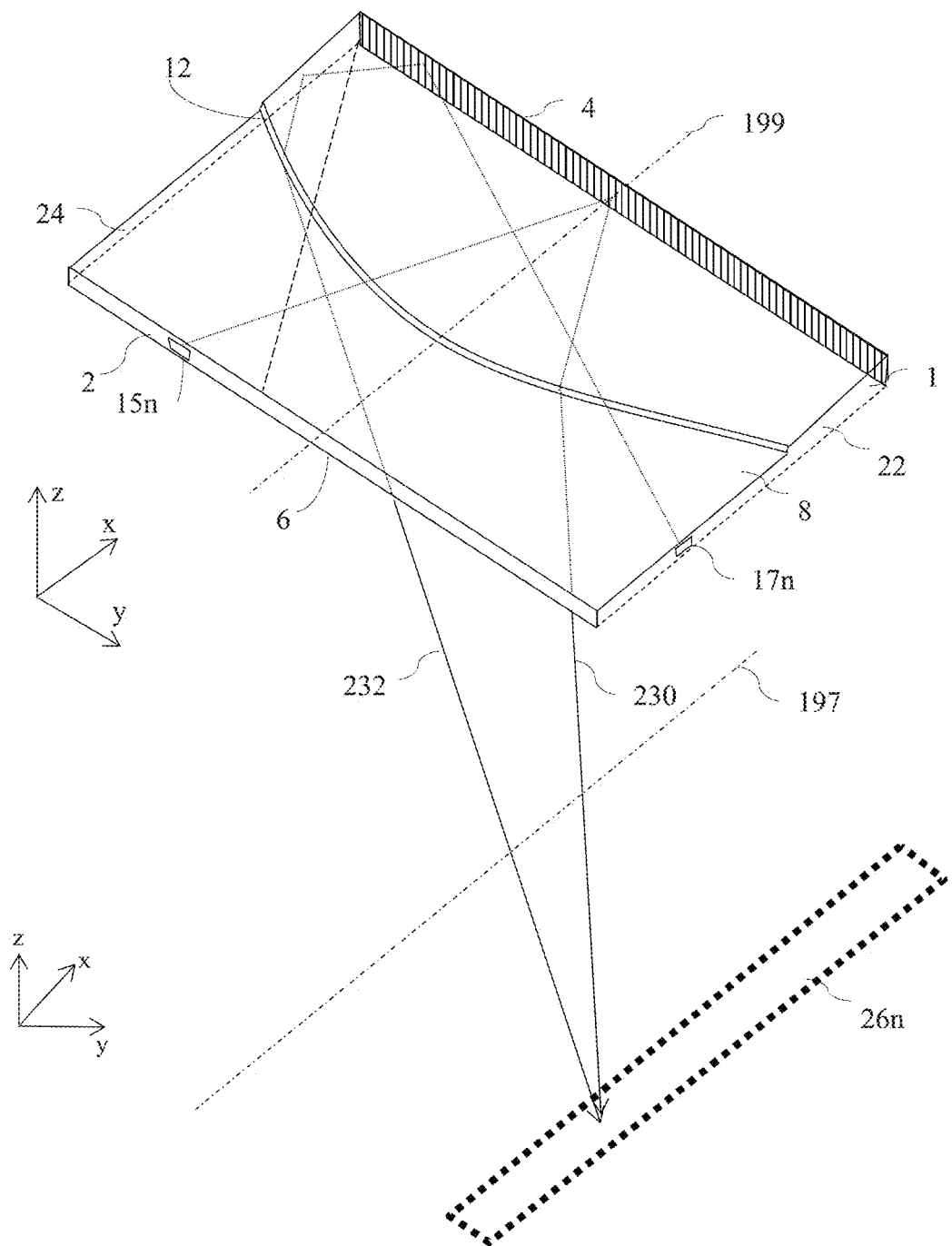
FIG. 12B is a schematic diagram illustrating a perspective view of the formation of optical windows by a directional display apparatus comprising a directional waveguide with light input at a side that is opposite a reflective side.

FIG. 12B is a schematic diagram illustrating a perspective view of the formation of optical windows by a directional display apparatus comprising a directional waveguide with light input at a side that is opposite a reflective side. The input surface 2 may thus be an end of the waveguide 1 may be opposite to the reflective end.

Figure 12C:
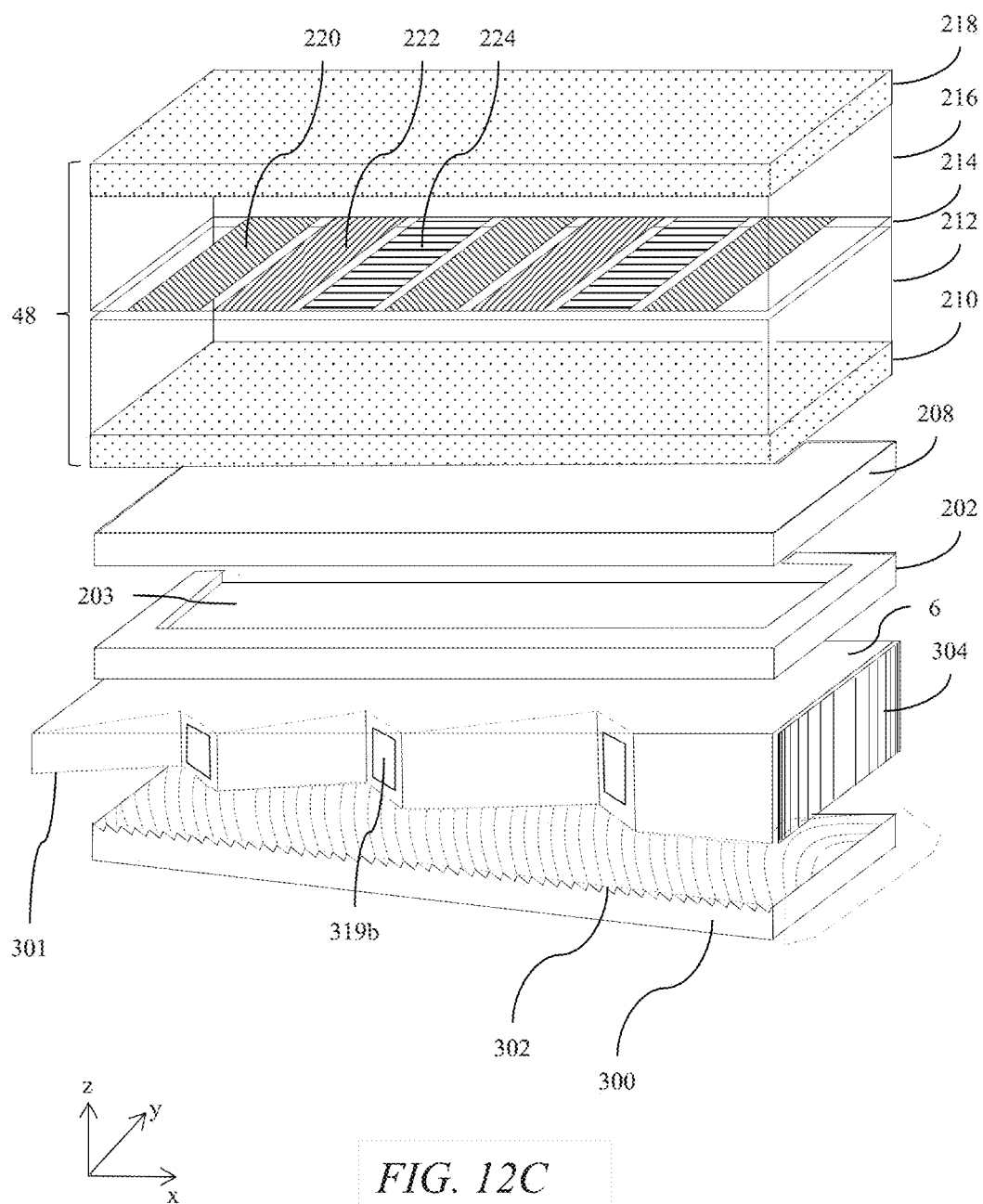
FIG. 12C is a schematic diagram illustrating a perspective view of a directional display apparatus optical stack comprising a directional waveguide with light input at a side that is adjacent a reflective side.

FIG. 12C is a schematic diagram illustrating a perspective view of a directional display apparatus optical stack comprising a directional waveguide with light input at a side that is adjacent a reflective side as described elsewhere in U.S. Patent Publ. No. 2016-0349444, incorporated by reference herein in its entirety. Waveguide 301 comprises input sides 322, 324 with aligned light sources 317a-n and 319a-n on respective sides. End 302 opposite reflective end 304 may be arranged to be absorbing or reflective to provide low levels of cross talk or increased efficiency respectively.

Figure 12D:
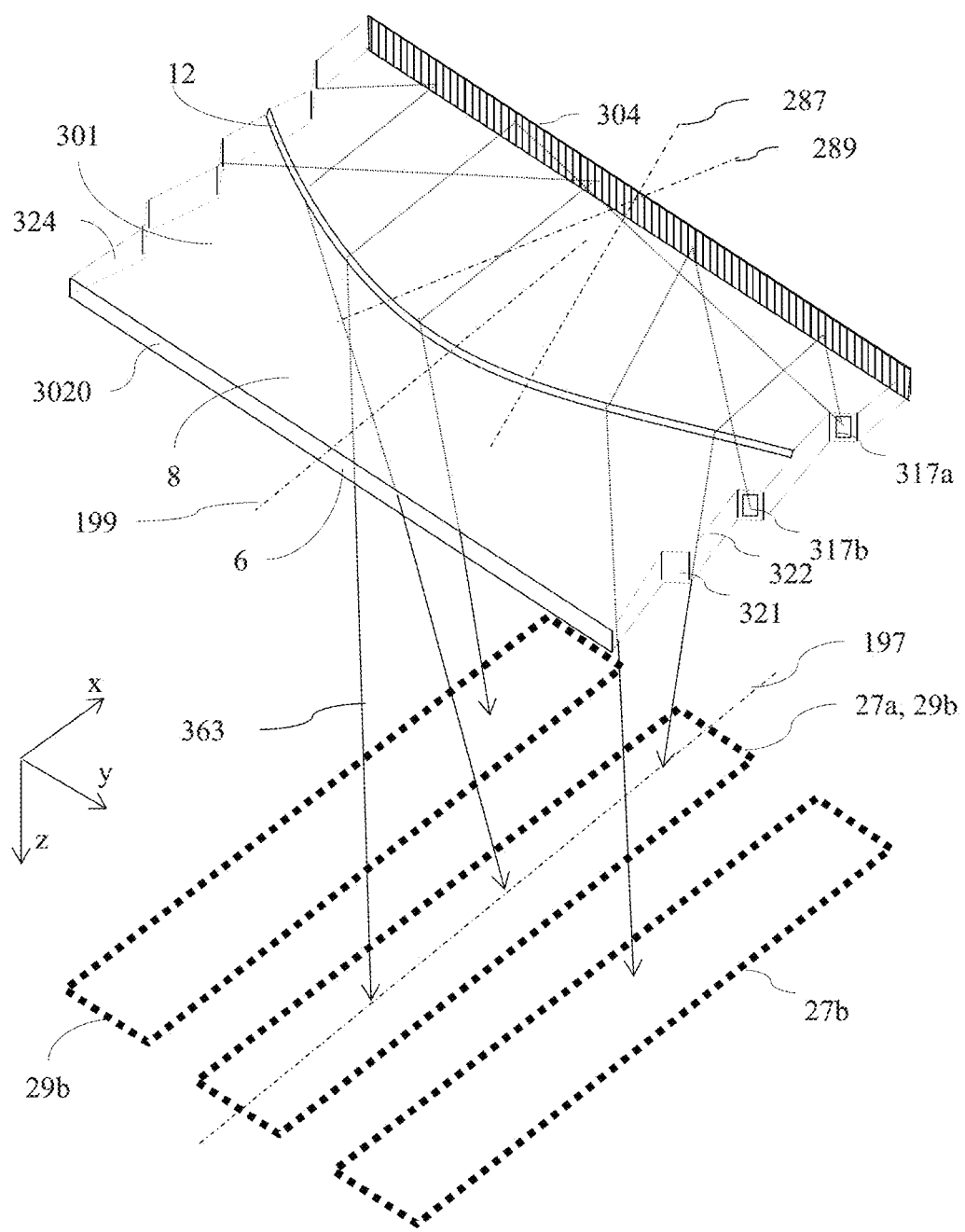
FIG. 12D is a schematic diagram illustrating a perspective view of the formation of optical windows by a directional display apparatus comprising a directional waveguide with light input at a side that is adjacent a reflective side.

FIG. 12D is a schematic diagram illustrating a perspective view of the formation of optical windows by a directional display apparatus comprising a directional waveguide with light input at a side that is adjacent a reflective side. Light sources 317a-n and 319a-n at input facets 321 are arranged to provide optical windows 27a-n and 29a-n respectively about an axis 197. Fresnel mirror 304 is arranged with first and second optical axes 287, 289. The input surface may thus be a side surface 322 of the waveguide 301 extending away from the reflective end 304 towards a thinner end 3020.

A directional backlight thus comprises a first guide surface 6 arranged to guide light by total internal reflection and the second guide surface 8 comprising a plurality of light extraction features 12 oriented to direct light guided along the waveguide 1, 301 in directions allowing exit through the first guide surface 6 as the output light and intermediate regions 10 between the light extraction features 12 that are arranged to guide light along the waveguide 1, 301.

Considering the arrangements of FIGS. 12A-D, the second guide surface 6 may have a stepped shape in which said light extraction features 12 are facets between the intermediate regions 10. The light extraction features 12 may have positive optical power in a direction between the side surfaces 22, 24 or 322, 324 of the waveguide 1, 301 that extend between the first and second guide surfaces 6,8. The reflective end 4, 304 may have positive optical power in a direction extending between the sides 22, 24 or 322, 324 of the reflective end 4, 304 that extend between the first and second guide surfaces 6, 8.

Thus all sides 2, 4, 6, 8, 22, 24 provide reflections to achieve uniform illumination and low cross talk in privacy mode of operation. If features are applied to many areas of the surface then non-uniformities may be provided due to the spatial location of the waveguide extraction loss at the features.

Thus a directional display device may comprise a waveguide wherein the input surface 322 is a surface of a side of the waveguide 1 extending away from the reflective end 304.

It would be desirable to optimize the efficiency of polarization recirculation in a directional display apparatus. The present disclosure relates to the propagation of polarized light in a directional backlight.

Figure 13:
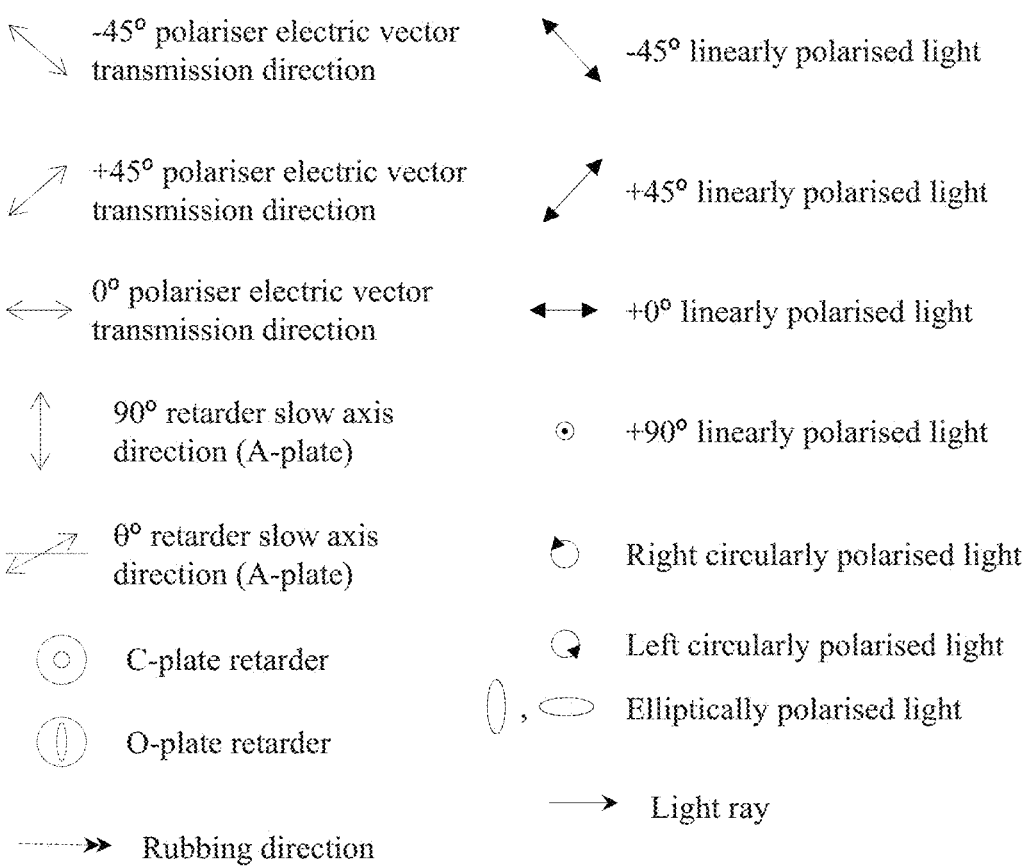
FIG. 13 is a key illustrating orientation of polarizer electric vectors, retarder slow axes, and polarization states for other figures in the present disclosure.

FIG. 13 is a key illustrating symbols that illustrate orientation of polarizer electric vectors, retarder slow axes, and polarization states, and direction of light ray propagation for other figures in the present disclosure unless otherwise stated. Said symbols are located on or adjacent to respective rays in the figures herein.

Figure 14A:
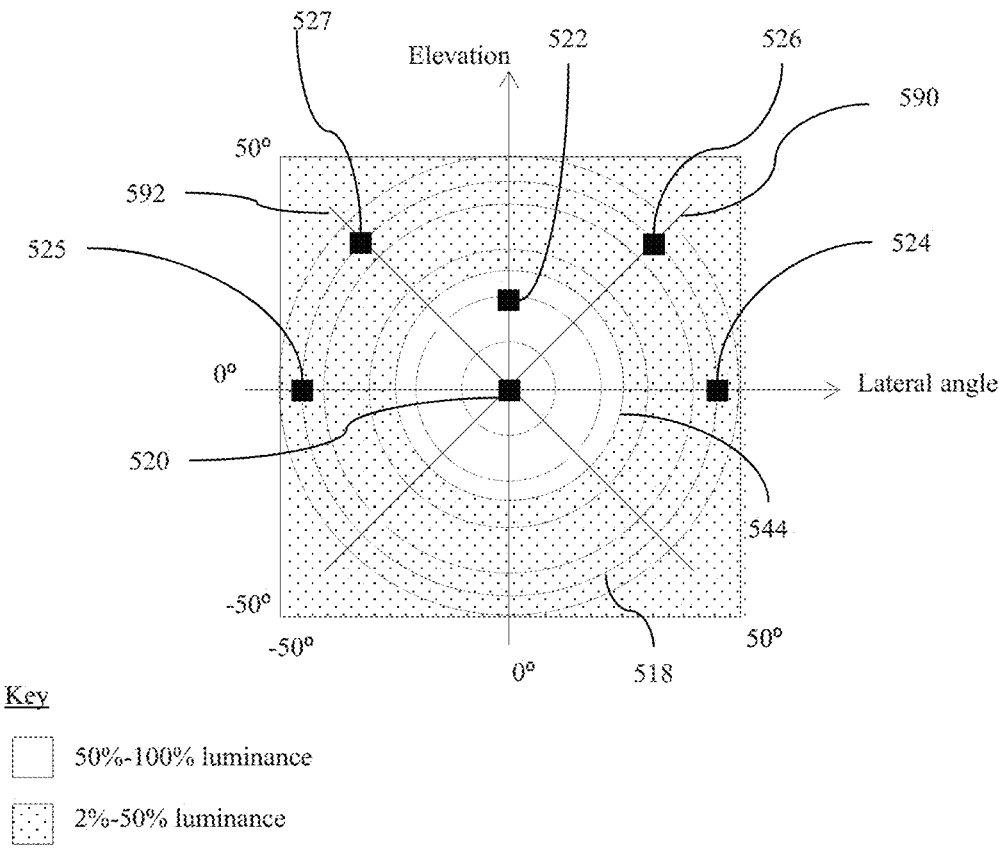
FIG. 14A is a schematic luminance field-of-view graph illustrating variation in luminance of a wide angle mode of operation of a directional display.

FIG. 14A is a schematic luminance field-of-view graph illustrating variation in luminance of a wide angle mode of operation of a directional display. Isoluminance contours 518, 544 may be substantially rotationally symmetric in polar coordinates.

Angular viewing location 520 represents a desirable on-axis viewing direction with zero degrees elevation and zero degrees lateral angle.

Angular viewing location 522 represents a desirable off-axis viewing direction with 20 degrees elevation and zero degrees lateral angle. Such a viewing location may be provided for rotation of the display about a horizontal axis for a centrally located user.

Angular viewing locations 524, 525 represent occasionally desirable off-axis viewing direction with zero degrees elevation and +/−45 degrees lateral angle. In wide angle mode such viewing locations may be occupied by desired users so that relatively high luminance is desirable.

Angular viewing locations 526, 527 represent occasionally desirable off-axis viewing directions that have a 45 degrees off-axis location along respective axes 590, 592 at 45 degrees to the lateral and elevation directions.

Figure 14B:
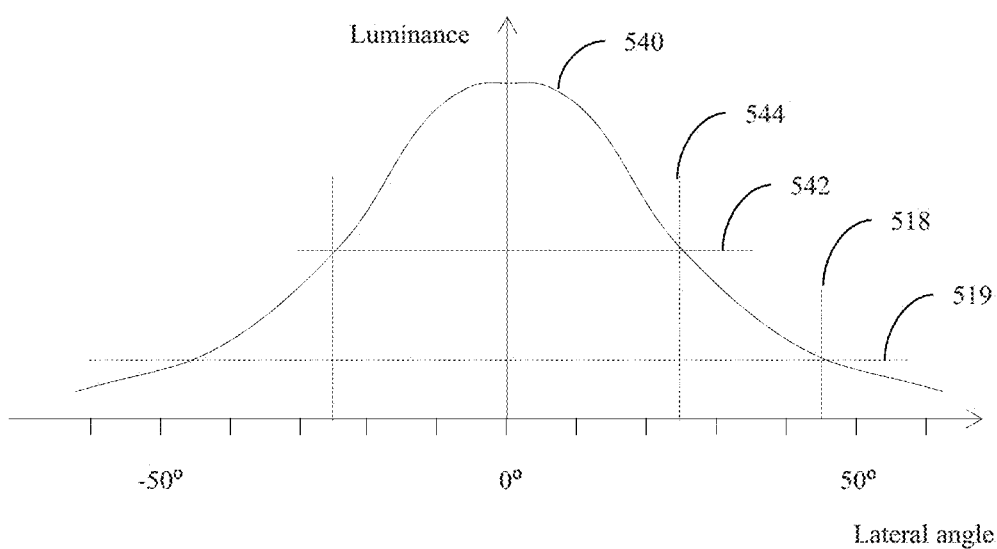
FIG. 14B is a schematic graph illustrating variation of luminance with viewing angle of a wide angle mode of operation of a directional display.

FIG. 14B is a schematic graph illustrating the lateral variation of luminance with viewing angle of a wide angle mode of operation of a directional display. Thus the luminance profile 540 at lateral angle location 544 may have half the peak luminance as illustrated by line 542. The full width half maximum of the lateral angle luminance profile 540 may thus in this illustrative example be 50 degrees. Further the luminance profile may have greater than 10% of peak luminance at lateral angle location 518 of 45 degrees as illustrated by the line 519.

Figure 14C:
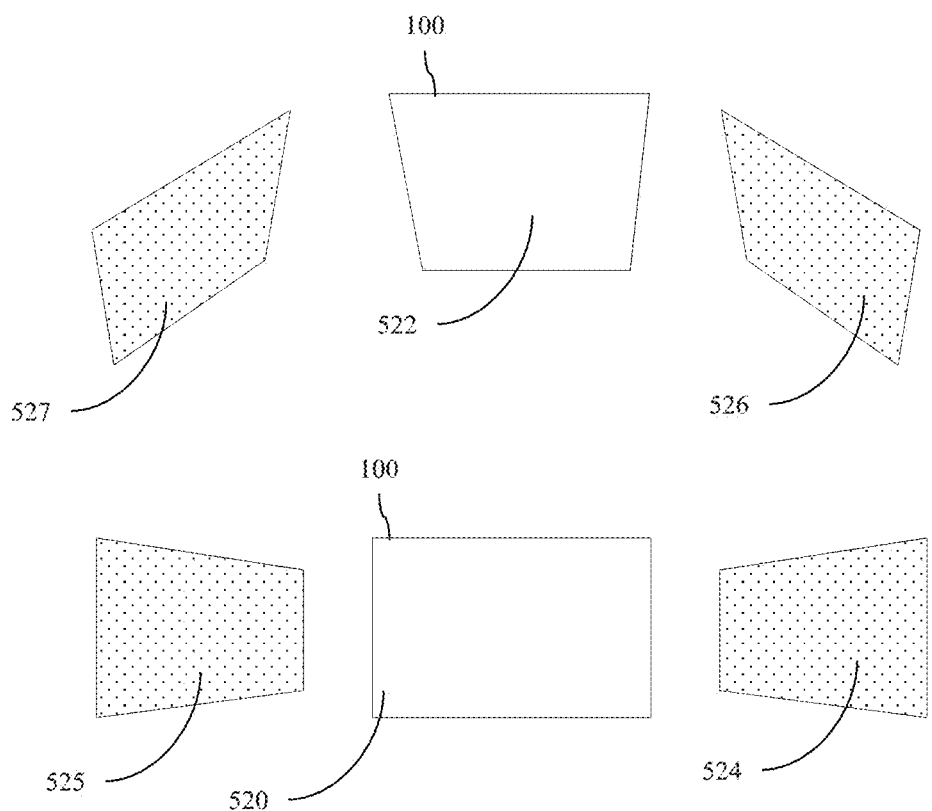
FIG. 14C is a schematic diagram illustrating variation of display luminance with viewing angle of a wide angle mode of operation of a directional display.

FIG. 14C is a schematic diagram illustrating variation of display luminance with viewing angle of a wide angle mode of operation of a directional display. The appearance of the display 100 when a uniform white image is provided on the spatial light modulator in wide angle mode at viewing angular locations 520, 522 is thus provided so that from each respective viewing angular location, the display luminance is greater than 50% of the peak luminance. Said peak luminance may be provided at the center of the display when viewed from location 520.

Advantageously the display may be conveniently rotated about a horizontal axis while maintaining comfortable luminance for a viewer that is on-axis in the lateral direction (0 degrees lateral angle).

Further the angular viewing locations 524, 526, 525, 527 as illustrated in FIG. 14A may have a luminance between 2% and 50%.

A display may thus be provided with a luminance field-of-view distribution such that the display can conveniently be seen from a wide range of viewing angles.

The angular luminance profile of a display operating in privacy mode of operation will now be described.

Figure 15A:
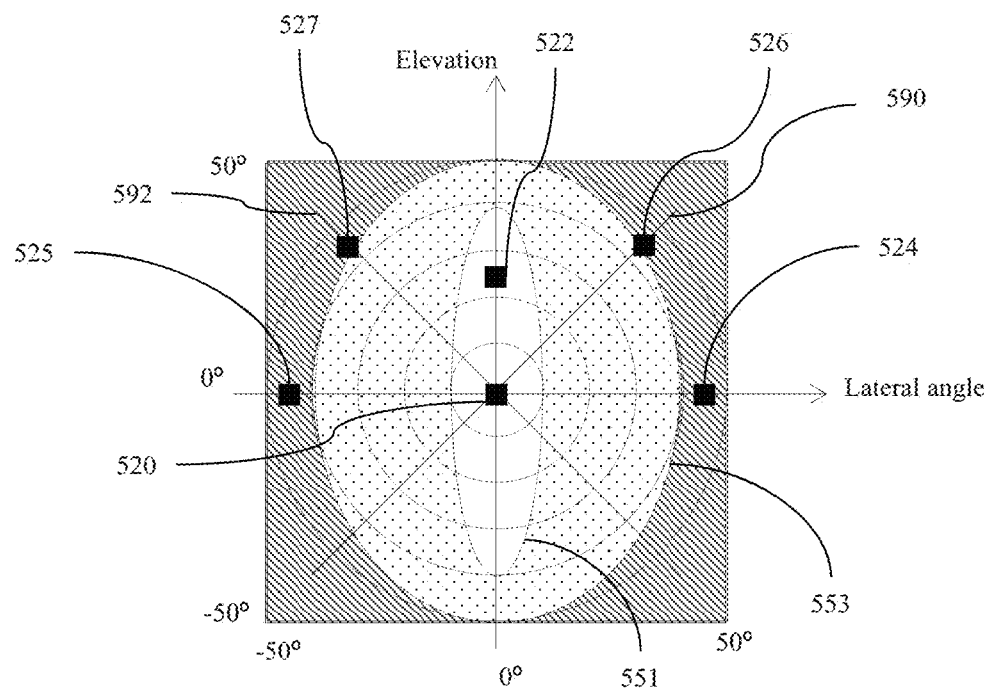
FIG. 15A is a schematic luminance field-of-view graph illustrating variation in luminance of a privacy mode of operation of a directional display.
Figure 15B:
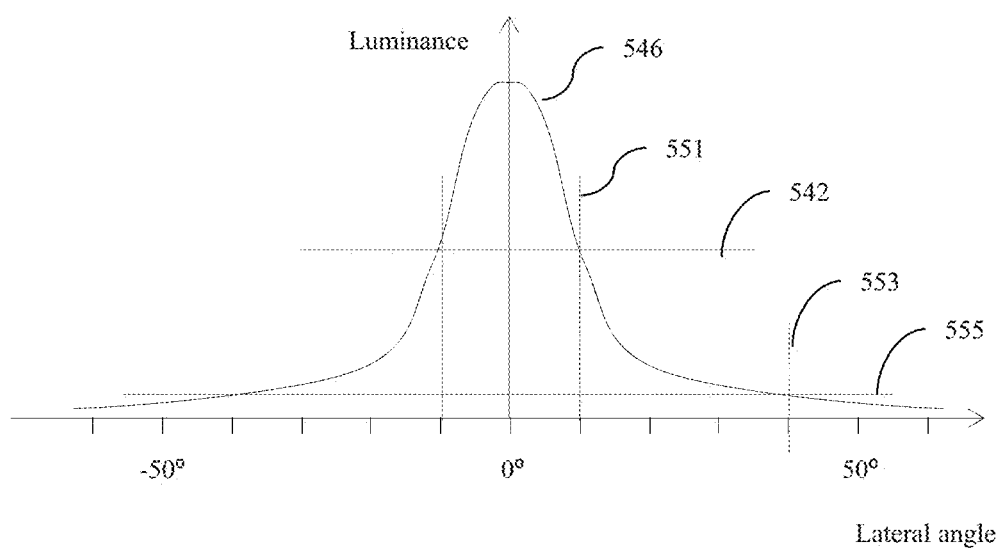
FIG. 15B is a schematic graph illustrating variation of luminance with viewing angle of a privacy mode of operation of a directional display.
Figure 15C:
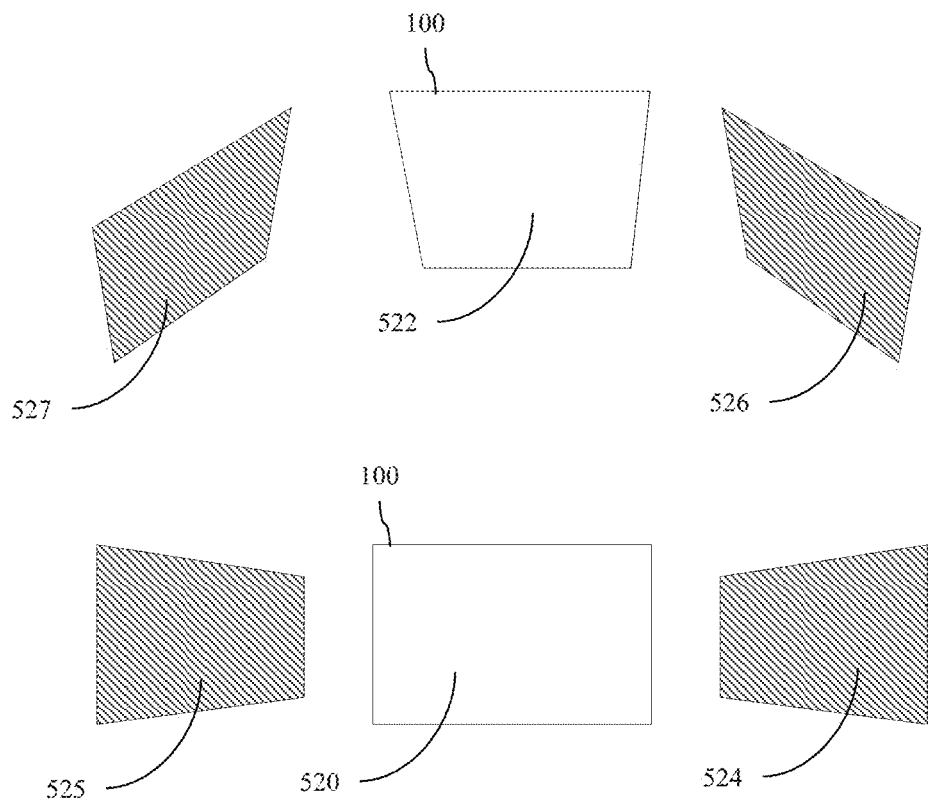
FIG. 15C is a schematic diagram illustrating variation of display luminance with viewing angle of a privacy mode of operation of a directional display.

FIG. 15A is a schematic luminance field-of-view graph illustrating variation in luminance of a privacy mode of operation of a directional display; FIG. 15B is a schematic graph illustrating variation of luminance with viewing angle of a privacy mode of operation of a directional display; and FIG. 15C is a schematic diagram illustrating variation of display luminance with viewing angle of a privacy mode of operation of a directional display.

Desirable and undesirable viewing locations in a privacy mode of operation will now be described with reference to snoopers—that is those observers undesirably attempting to view an image on the display while the display is operating in privacy mode.

Angular viewing location 520, 522 represent typically desirable viewing directions for a primary display user operating the display in privacy mode.

Angular viewing locations 524, 525 represent undesirable off-axis viewing directions for a snooper located laterally with respect to the display. It is desirable to reduce display luminance in privacy mode of operation to such snoopers.

Angular viewing locations 526, 527 represent further undesirable and common off-axis viewing directions for snoopers.

In privacy mode of operation, the lateral luminance profile may be adjusted by control of the directional backlight 101 so that rotationally asymmetric locus 551 for 50% luminance and rotationally asymmetric locus 553 for 2% luminance is provided.

At angular viewing location 524 of 45 degrees lateral angle and 0 degrees elevation the luminance may be less than for example 2%, preferably less than 1.5% and more preferably less than 1% of the peak luminance of the profile 546. In the present illustrative example, the relative luminance 555 at 40 degrees lateral angle and 0 degrees elevation may be 2%. A display may thus be provided with an angular luminance profile to achieve low luminance for laterally off-axis viewers, achieving privacy operation.

Thus angular viewing locations 520, 522 may see luminance greater than 50%. Advantageously a comfortable display appearance may be provided in privacy mode of operation for rotations of the display about a horizontal axis.

At angular viewing locations 524, 525 that have a zero degree elevation and angular viewing locations 526, 527 that have a 45 degrees off-axis location along respective axes 590, 592 at 45 degrees to the lateral angle and elevation directions, luminance of less than 2% may be provided. Advantageously the display may have limited visibility for such viewing locations.

Luminance levels of 2% may undesirably provide visibility of information on display content. It would be desirable to further reduce image visibility for snooper locations in upper quadrant locations 526, 527, for example to desirably reduce the privacy level to less than 1%.

Figure 16A:
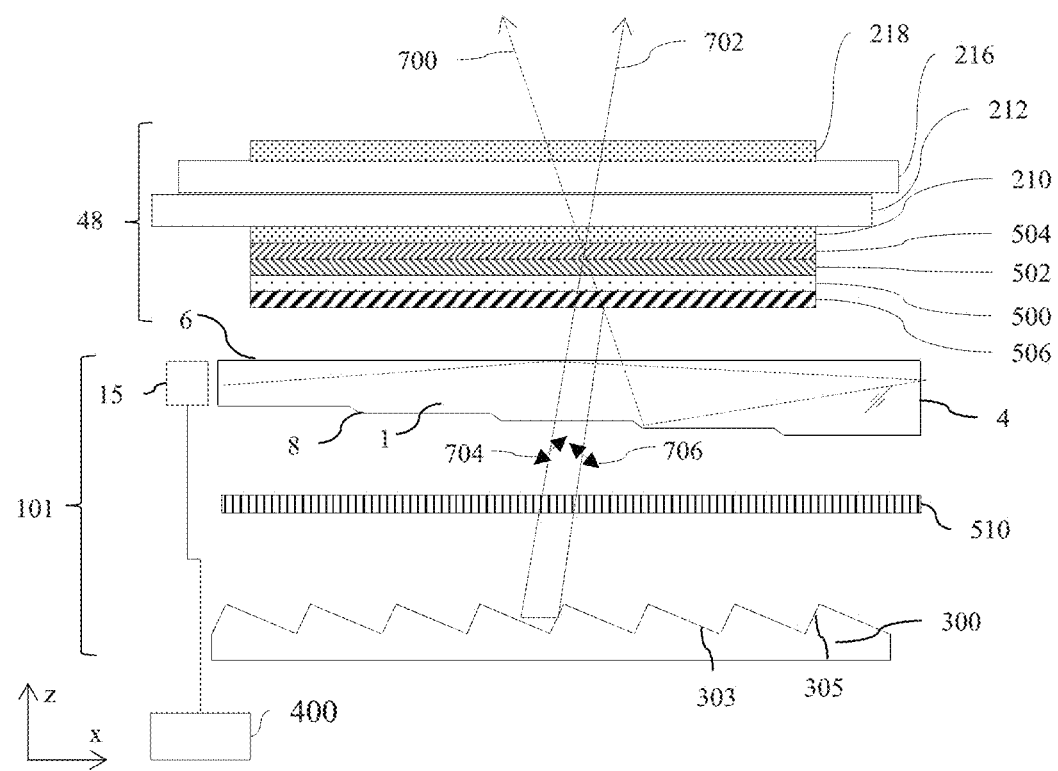
FIG. 16A is a schematic diagram illustrating in side view a directional display comprising a directional waveguide and crossed A-plates arranged between a spatial light modulator and a directional backlight.
Figure 16B:
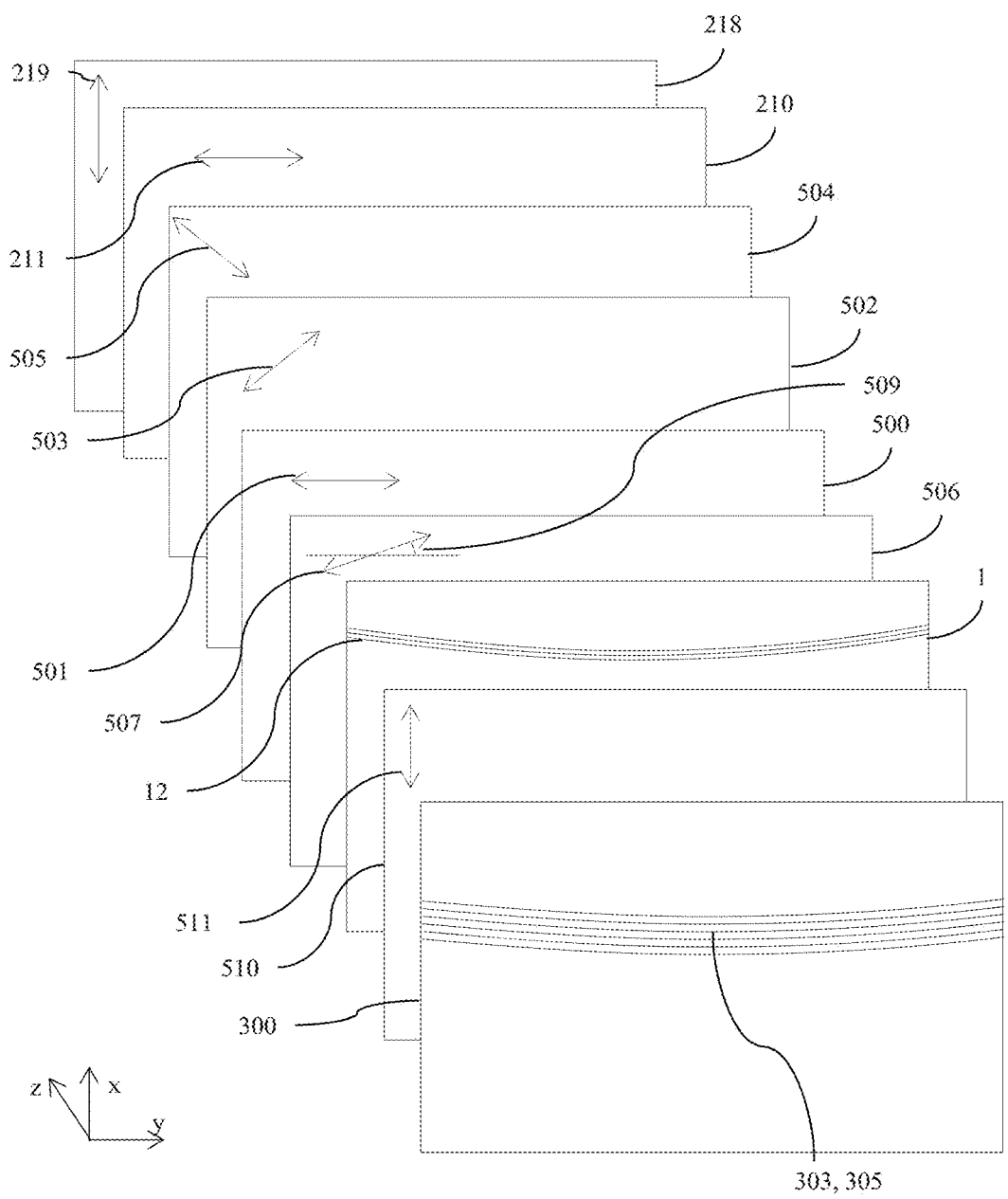
FIG. 16B is a schematic diagram illustrating in perspective front view orientation of retarder and polariser axes for the optical stack of a directional display comprising a directional waveguide and crossed A-plates.

FIG. 16A is a schematic diagram illustrating in side view a directional display comprising a directional waveguide and crossed A-plates 502, 504 arranged between a spatial light modulator 48 and a directional backlight 101 and FIG. 16B is a schematic diagram illustrating in perspective front view orientation of retarder and polariser axes for the optical stack of a directional display comprising a directional waveguide and crossed A-plates 502, 504.

A directional display thus comprises a directional backlight 101 and a transmissive spatial light modulator 48 arranged to receive output light from the backlight 101. The directional backlight 101 may comprise a rear reflector 300 comprising reflective facets 303, 305 as described in U.S. Patent Publ. No. 2014-0240828 and in U.S. Patent Publ. No. 2017-0339398, which are incorporated by reference herein in their entireties. A spacer layer 510 may comprise a retarder as described in U.S. patent application Ser. No. 15/860,853, filed Jan. 3, 2018, entitled "Optical stack for imaging directional backlights", which is incorporated by reference herein in its entirety.

Considering further FIGS. 12A, 12B and 16A, the backlight may further comprise an array of light sources 15; a waveguide 1 arranged to receive input light from the light sources 15 at different input positions and comprising first and second, opposed guide surfaces 6,8 for guiding the input light along the waveguide 1, sides 22, 24 that extend between the first and second guide surfaces 6,8 and a reflective end 4 for reflecting the input light back along the waveguide 1, wherein the second guide surface 8 is arranged to deflect the reflected input light through the first guide 6 surface as output light, and the waveguide 1 is arranged to image the light sources 15 in a lateral direction between the sides of the waveguide 1 so that the output light from the light sources is directed into respective optical windows 26 in output directions that are distributed in dependence on input positions of the light sources 15.

The first guide surface 6 may be arranged to guide light by total internal reflection, and the second guide surface 8 may comprise light extraction features 12 and intermediate regions 10 between the light extraction features 12, the light extraction features 12 being oriented to deflect the reflected input light through the first guide 6 surface as output light and the intermediate regions 10 being arranged to direct light through the waveguide 1 without extracting it.

The light extraction features may be curved and have positive optical power in the lateral direction between sides 22, 24 of the waveguide 1 that extend between the first and second guide surfaces 6, 8. The reflective end 4 may have positive optical power in the lateral direction extending between sides 22, 24 of the waveguide 1 that extend between the first and second guide surfaces 6, 8. The waveguide 1 may comprise an input end 2 opposite to the reflective end 4 and the light sources 15 may be arranged to input light into the waveguide 1 through the input end 2. As illustrated in FIG. 12C the light sources 15 may be arranged to input light into the waveguide 1 through the sides 22, 24 of the waveguide.

An input polariser 210 is arranged on the input side of the spatial light modulator 48 between the backlight 101 and the spatial light modulator 48 and an output polariser 218 is arranged on the output side of the spatial light modulator 48.

An additional polariser 500 is arranged on the input side of the input polariser 210 between the input polariser 210 and the backlight 101. The additional polariser may be a reflective polariser such as DBEF™ from 3M Corporation.

Thus the display device may comprise an additional polariser 500 that is a reflective polariser arranged on the input side of the input polariser 210 and is arranged to transmit a first polarisation component 704 of the output light rays 700 from the waveguide 1 and to reflect a second polarisation component 706 of the output light as light rays 702 having a polarisation state orthogonal to the polarisation state of first polarisation component 704, as rejected light; and a rear reflector 300 disposed behind the second guide surface 8 of the waveguide 1 and arranged to reflect the rejected light for supply back to the spatial light modulator 48, the rear reflector 300 comprising a linear array of pairs of reflective corner facets 303, 305 extending in a predetermined direction perpendicular to the normal to spatial light modulator 48 so that the rear reflector 300 converts the polarisation of the rejected light as light rays 702 that has a double reflection from a pair of corner facets into the polarisation of the first polarisation component 704. As illustrated further in FIG. 16B, the pairs of reflective corner facets 303, 305 may be curved and have optical power in the lateral direction.

A further correction retarder 506 may be arranged to rotate the polarisation component 706 that is reflected by the reflective polariser 500. In the illustrative example, the slow optical axis of the retarder 506 may be at an angle of 22.5 degrees to the electric vector transmission direction of the reflective additional polariser 500 that may be at 0 degree with respect to the lateral direction. Such an arrangement may for example comprise an in-plane switching LCD (IPS-LCD) wherein the output polariser 218 is provided at 90 degrees to the lateral direction. In embodiments comprising a twisted nematic LCD (TN-LCD), the correction retarder 506 may be omitted. Advantageously the polarisation component 706 that is reflected by the reflective polariser is incident at 45 degrees to the lateral direction onto the elongate facets 303, 305 of the rear reflector and is rotated to polarisation component 704 that is transmitted through the reflective additional polariser 500 and input polariser 210.

Thus the additional polariser 500 may be arranged to provide increased display luminance by means of recycling of light from the directional backlight 101 and the rear reflector 300. Advantageously display luminance may be increased in comparison to embodiments wherein the additional polariser 500 is an absorbing polariser.

As illustrated further in FIG. 11, the display apparatus may further comprise a display device according to any one of the preceding claims; and a control system 400 arranged to control the light sources 15. Advantageously a display may be provided that may be arranged to switch between a wide angle mode and a privacy mode.

The modification of angular privacy performance of the display will now be described further.

At least one retarder that may be a pair of crossed A-plates 502, 504 is arranged between the additional polariser 500 and the input polariser 210. In the embodiment of FIG. 16A, the additional polariser 500 is arranged on the input side of the input polariser 210 and said pair of crossed A-plates 502, 504 is arranged between the additional polariser 500 and the input polariser 210. In the present embodiments the at least one retarder may be one of a pair of crossed A-plates 502, 504 or a C-plate 560 as will be described elsewhere herein.

The operation of the display of FIGS. 16A-B will now be described with respect to the angular luminance viewing characteristics of the display.

Figure 17A:
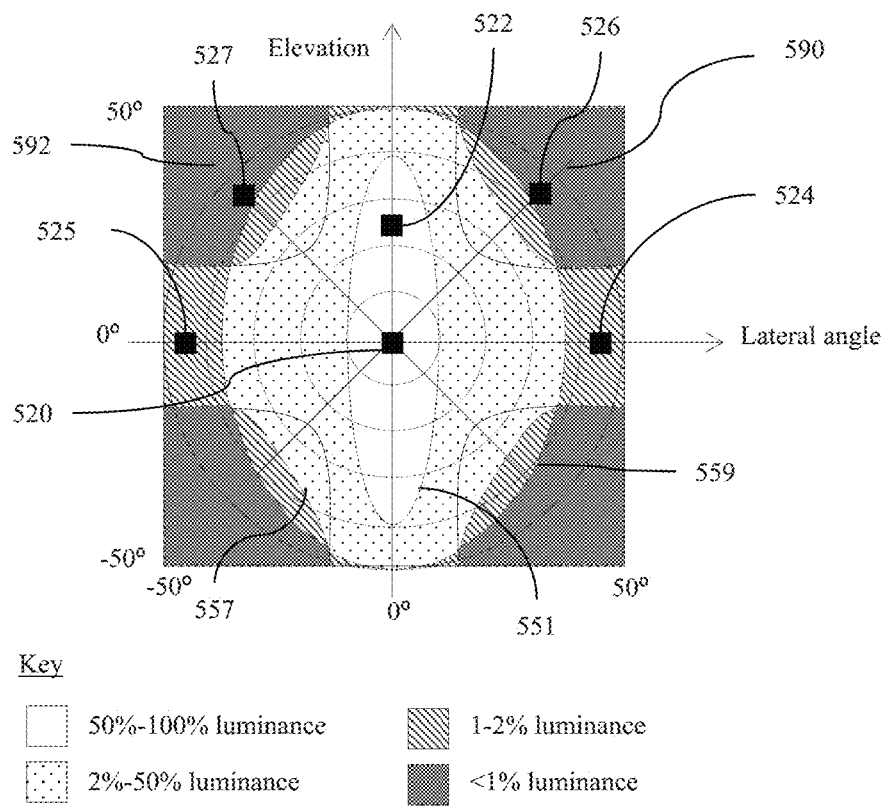
FIG. 17A is a schematic luminance field-of-view graph illustrating variation in luminance of the optical stack of FIG. 16B in a privacy mode of operation.
Figure 17B:
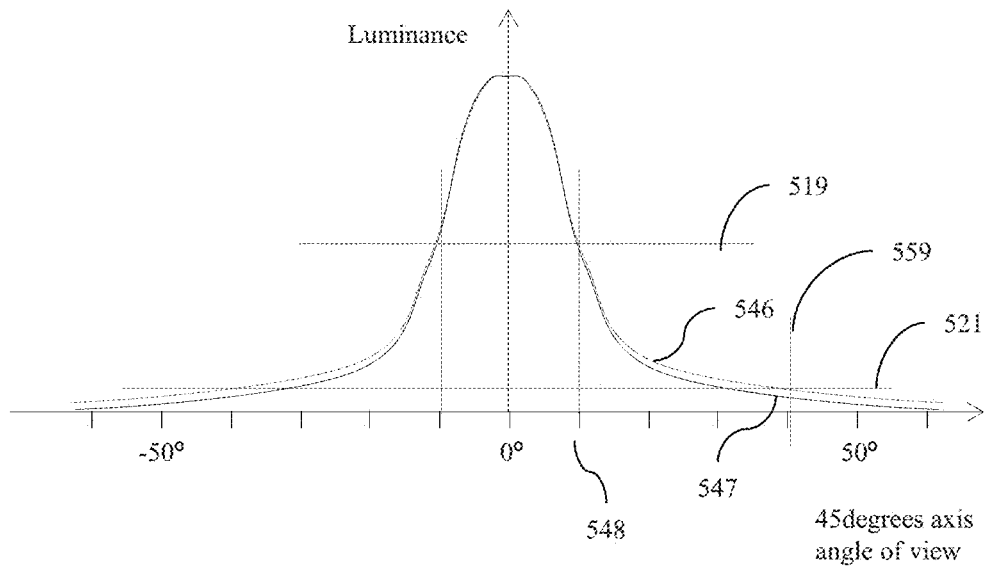
FIG. 17B is a schematic graph illustrating variation of luminance with viewing angle of a privacy mode of operation of a directional display.
Figure 17C:
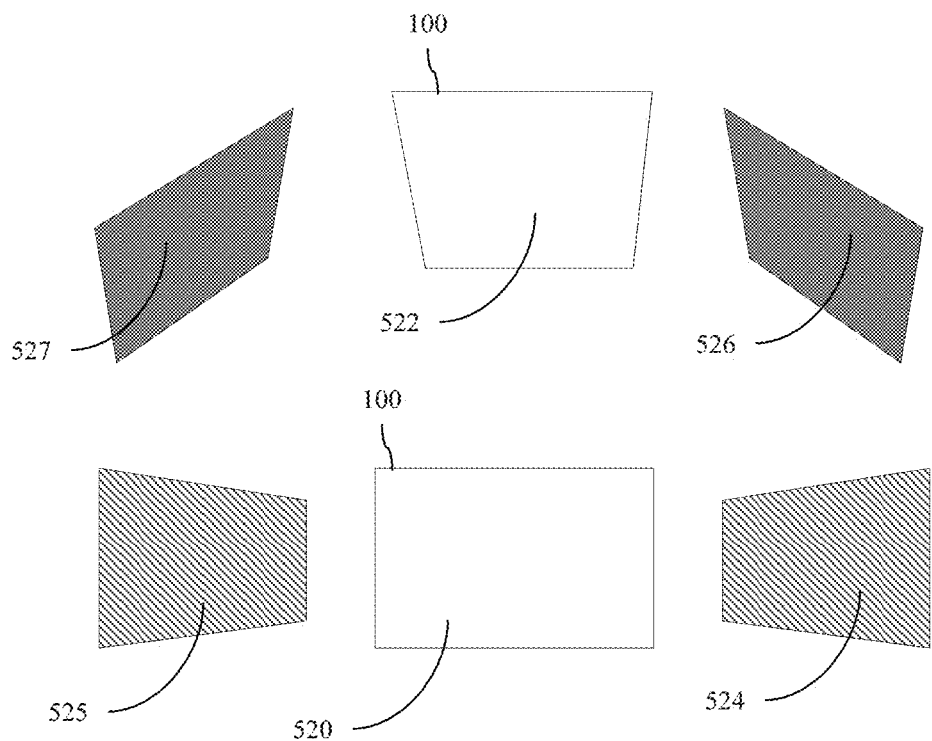
FIG. 17C is a schematic diagram illustrating the variation of display luminance with viewing angle of a privacy mode of operation of a directional display comprising the optical stack of FIG. 16B.

FIG. 17A is a schematic luminance field-of-view graph illustrating variation in luminance of the optical stack of FIG. 16B in a privacy mode of operation; FIG. 17B is a schematic graph illustrating variation of luminance with viewing angle of a privacy mode of operation of a directional display; and FIG. 17C is a schematic diagram illustrating the variation of display luminance with viewing angle of a privacy mode of operation of a directional display comprising the optical stack of FIG. 16B.

In the present disclosure, the coordinate of a location in polar space is described as a polar coordinate with a lateral angle that refers to the angle in the lateral direction (y-axis), and elevation that refers to the angle in the vertical direction (x-axis). These terms provide a coordinate in a luminance field-of-view graph as shown in FIG. 17A. Positive and negative lateral angles correspond to viewing of the display from the right and left hand side respectively; and positive and negative elevations correspond to viewing of the display from above or below respectively. The description of polar coordinates is not here in terms of polar angle (tilt from a normal direction) or azimuthal angle (rotational coordinate).

Crossed A-plates 502, 504 and additional polariser 500 may be arranged to provide reduced luminance regions 557 in viewing quadrants of the display. The luminance regions 557 are regions of reduced luminance in angular regions with non-zero lateral angle and elevation. The luminance quadrants may be arranged to be symmetric about the 45 degree axes 590, 592 of the luminance field-of-view profile, for example to advantageously reduce luminance to observer angular locations 526, 527.

As illustrated in FIG. 17B, along the 45 degree axes of the luminance field-of-view graphs, profile 547 may be provided that may have reduced luminance at locus 559 in comparison to the profile 546 of FIG. 15B with luminance 521.

Advantageously for snoopers 526, 527 in upper viewing quadrants luminance of undesirably outputted light is reduced. Further, as will be described herein the luminance of the head-on angular viewing locations 520 and off-axis viewing locations 522, 524, 525 may be minimally reduced. Thus as illustrated in FIG. 17C the privacy performance of the display may be increased for snoopers at angular viewing locations 526, 527, while not reducing display efficiency for the desirable viewing locations.

In an illustrative example, the luminance of the display at viewing locations 526, 527 may be reduced by 50% so that the privacy level may be reduced from 2% to 1%. In operation, it is the experience of the inventors that such a difference in perceived luminance provides an effective increase in privacy performance of the display.

The performance of the display of FIG. 16A in wide angle mode will now be described.

Figure 18A:
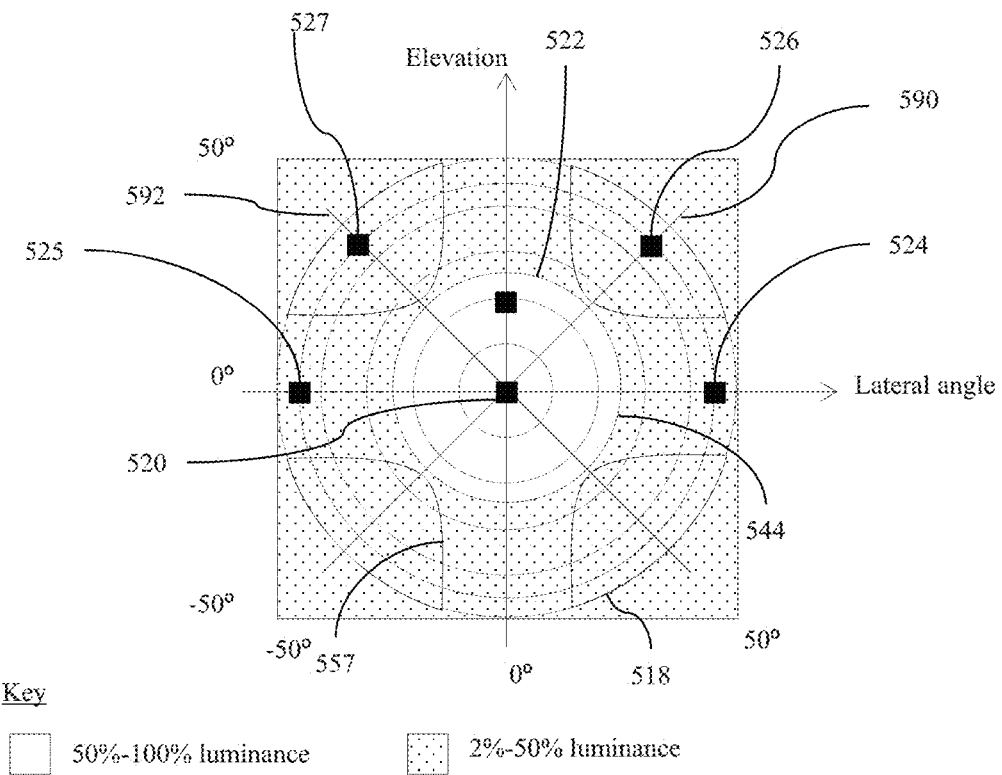
FIG. 18A is a schematic luminance field-of-view graph illustrating variation in luminance of the optical stack of FIG. 16B in a wide angle mode of operation.
Figure 18B:
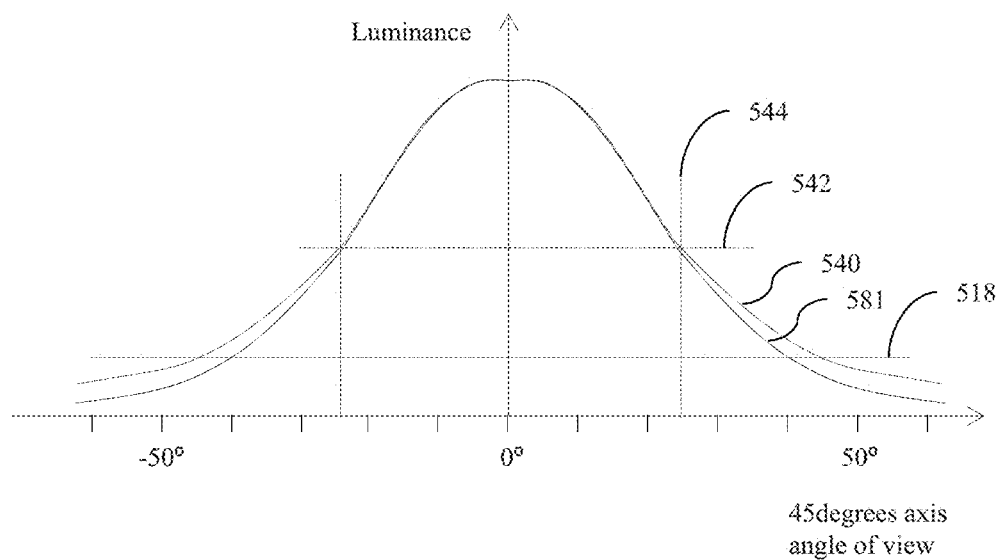
FIG. 18B is a schematic graph illustrating variation of luminance with viewing angle of a wide angle mode of operation of a directional display.
Figure 18C:
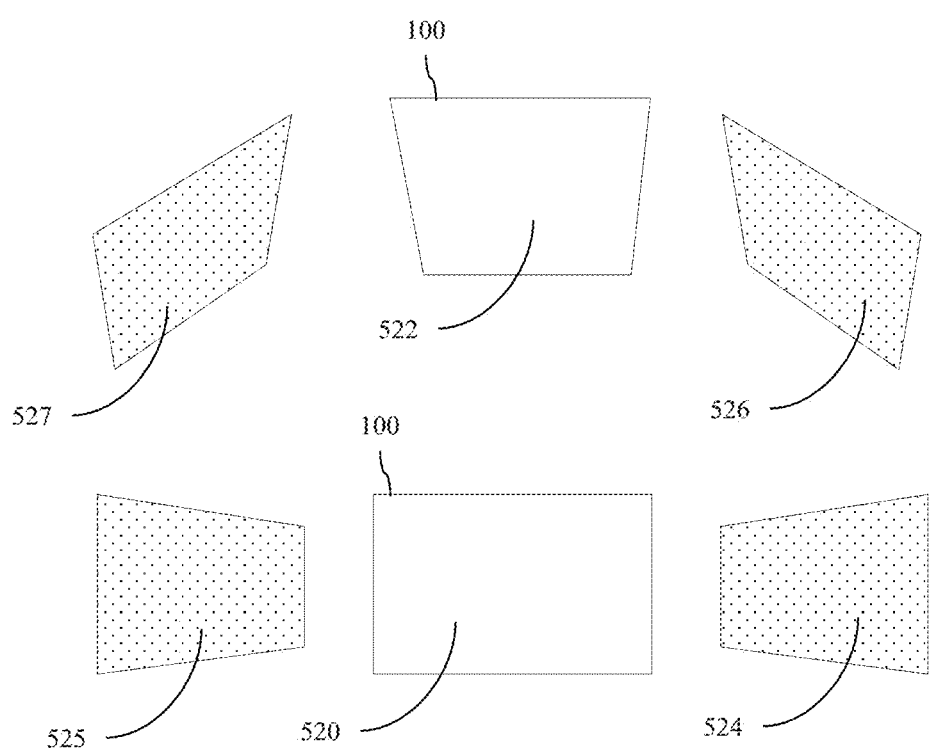
FIG. 18C is a schematic diagram illustrating the variation of display luminance with viewing angle of a wide angle mode of operation of a directional display comprising the optical stack of FIG. 16B.

FIG. 18A is a schematic luminance field-of-view graph illustrating variation in luminance of the optical stack of FIG. 16B in a wide angle mode of operation; FIG. 18B is a schematic graph illustrating variation of luminance with viewing angle of a wide angle mode of operation of a directional display; and FIG. 18C is a schematic diagram illustrating the variation of display luminance with viewing angle of a wide angle mode of operation of a directional display comprising the optical stack of FIG. 16B.

Thus the luminance in quadrants defined by locii 557 may be reduced by a similar proportion for a given polar angular location to that illustrated in FIG. 17A. The profile 581 along the 45 degree polar directions 590, 592 may advantageously achieve a small reduction of full width half maximum width. As the luminance in the upper quadrants may be substantially higher than the privacy mode of operation, the display may still be clearly visible to users in angular viewing locations 526, 527. Further as will be described, the luminance may be substantially unaltered in lateral (zero elevation) and vertical (zero lateral angle) directions which are more common viewing locations for display users in wide angle mode.

Advantageously the wide angle mode performance may have a low impact for conventional display use.

Figure 19A:
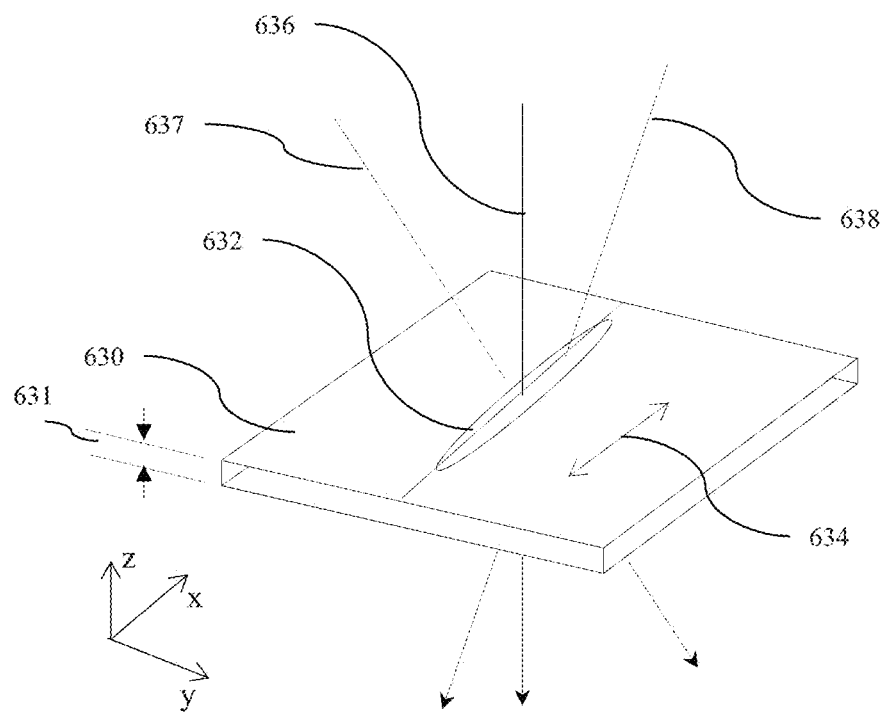
FIG. 19A is a schematic diagram illustrating in perspective view illumination of a retarder layer by off-axis light.

FIG. 19A is a schematic diagram illustrating in perspective view illumination of a retarder layer by off-axis light. Correction retarder 630 may comprise birefringent material, represented by refractive index ellipsoid 632 with slow axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 19B:
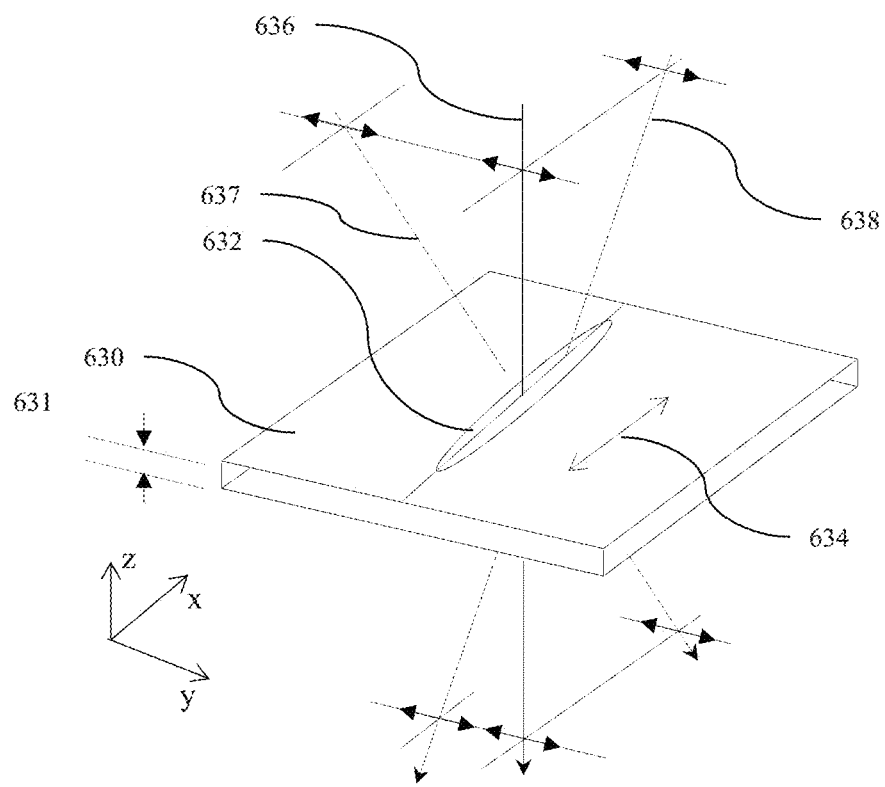
FIG. 19B is a schematic diagram illustrating in perspective view illumination of a retarder layer by off-axis light of a first linear polarization state at 0 degrees.
Figure 19C:
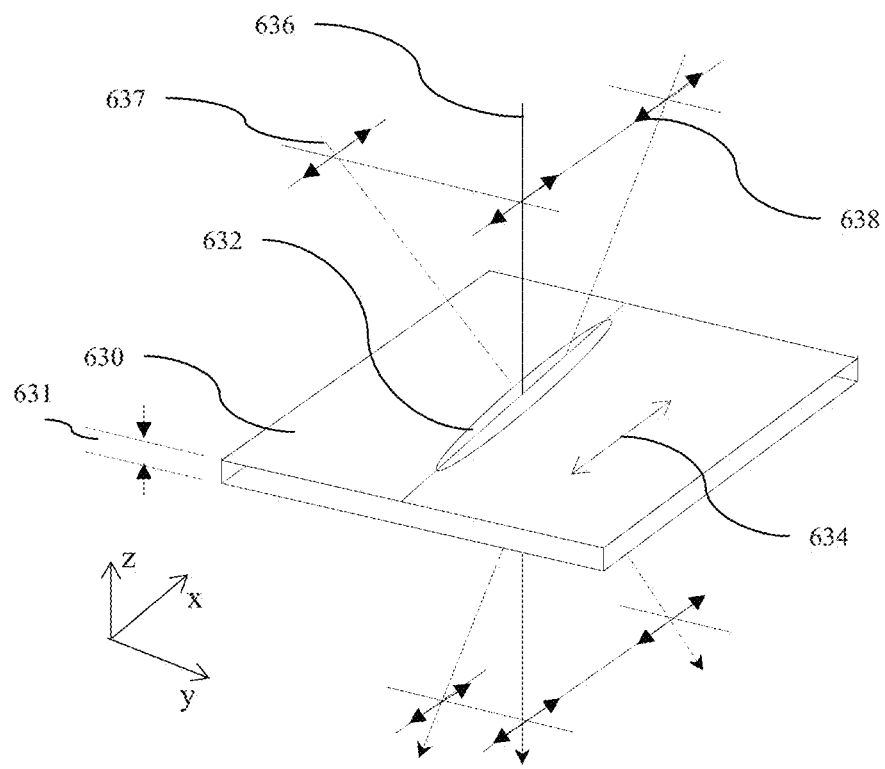
FIG. 19C is a schematic diagram illustrating in perspective view illumination of a retarder layer by off-axis light of a first linear polarization state at 90 degrees.

FIG. 19B is a schematic diagram illustrating in perspective view illumination of a retarder layer by off-axis light of a third linear polarization state at 90 degrees to the x-axis and FIG. 19C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638.

Figure 19D:
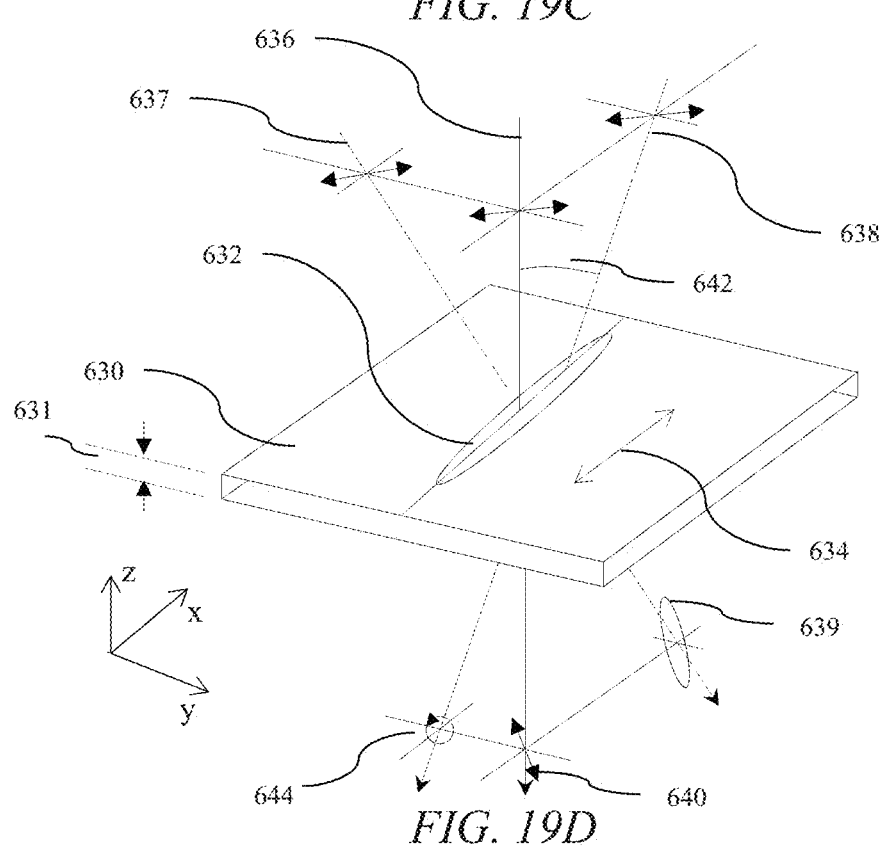
FIG. 19D is a schematic diagram illustrating in perspective view illumination of a retarder layer by off-axis light of a first linear polarization state at 45 degrees.

FIG. 19D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to slow axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642.

In the present embodiments, slow axis typically refers to the orientation orthogonal to the normal direction in which linearly polarized light has an electric vector direction parallel to the slow axis travels at the slowest speed. The slow axis direction is the direction of this light with the highest refractive index at the design wavelength.

For positive dielectric anisotropy uniaxial birefringent materials the slow axis direction is the extraordinary axis of the birefringent material. The ordinary axes in such materials are typically parallel to the normal direction, and orthogonal to the normal direction and the slow axis.

The terms half a wavelength and quarter a wavelength refer to the operation of a retarder for a design wavelength $\lambda_0$ that may typically be between 500 nm and 570 nm. The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

where $\Delta n$ is defined as the difference between the extraordinary and the ordinary index of refraction, i.e.

$$\Delta n = n_e - n_o \qquad \text{eqn. 2}$$

For a half wave retarder, the relationship between d, $\Delta n$, and $\lambda_0$ is chosen so that the phase shift between polarization components is $\Gamma = \pi$. For a quarter wave retarder, the relationship between d, $\Delta n$, and $\lambda_0$ is chosen so that the phase shift between polarization components is $\Gamma = \pi/2$.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the plane of the layer. The plane of the retarders refers to the slow axis of the retarders extend in a plane, that is the x-y plane.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plates, i.e. C-plates with a positive Δn.

In the present disclosure an 'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with an optical thickness Δn·d that varies with wavelength λ as $$\Delta n \cdot d / \lambda = \kappa \qquad \text{eqn. 3}$$

where κ is substantially a constant. Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

Homogeneous alignment refers to the alignment of liquid crystals in a switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which a rod-like liquid crystalline molecules aligns substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod like liquid crystal molecules. Negative retarders such as negative C-plates may be provided by stretched films or discotic like liquid crystal molecules.

Parallel liquid cell alignment refers to the alignment direction of homogeneous alignment layers being parallel or more typically antiparallel. In the case of pretilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Crossed A-plates, C-plates and O-plates are known retarder elements for use in LCD to compensate for contrast degradations for off-axis viewing locations, for example in European Patent Publ. No. EP1726987, herein incorporated by reference in its entirety.

Thus in prior art arrangements crossed A-plates, C-plates and O-plates may be provided between an input polariser and an output polariser to operate in cooperation with a liquid crystal layer that is also arranged between the input and output polarisers. In such prior art arrangements, said retarders are arranged to provide compensation for the variation in birefringence of liquid crystal molecules with viewing angles. Such compensation is arranged to provide increased display contrast for off-axis viewing locations. The contrast viewing angle properties of the display may thus be increased.

In the present embodiments crossed A-plates, C-plates or O-plates are provide between an additional polariser 500 and an input polariser 210. Such polariser and retarder arrangements do not change the contrast of the display apparatus for off-axis viewing locations and further reduce off-axis luminance that in prior art arrangements would be undesirable. Further such retarder layers do not operate in cooperation with liquid crystal material in the transmissive spatial light modulator 48.

The operation of FIG. 16B will now be described for on-axis light with reference to Poincare sphere illustrations.

Figure 19E:
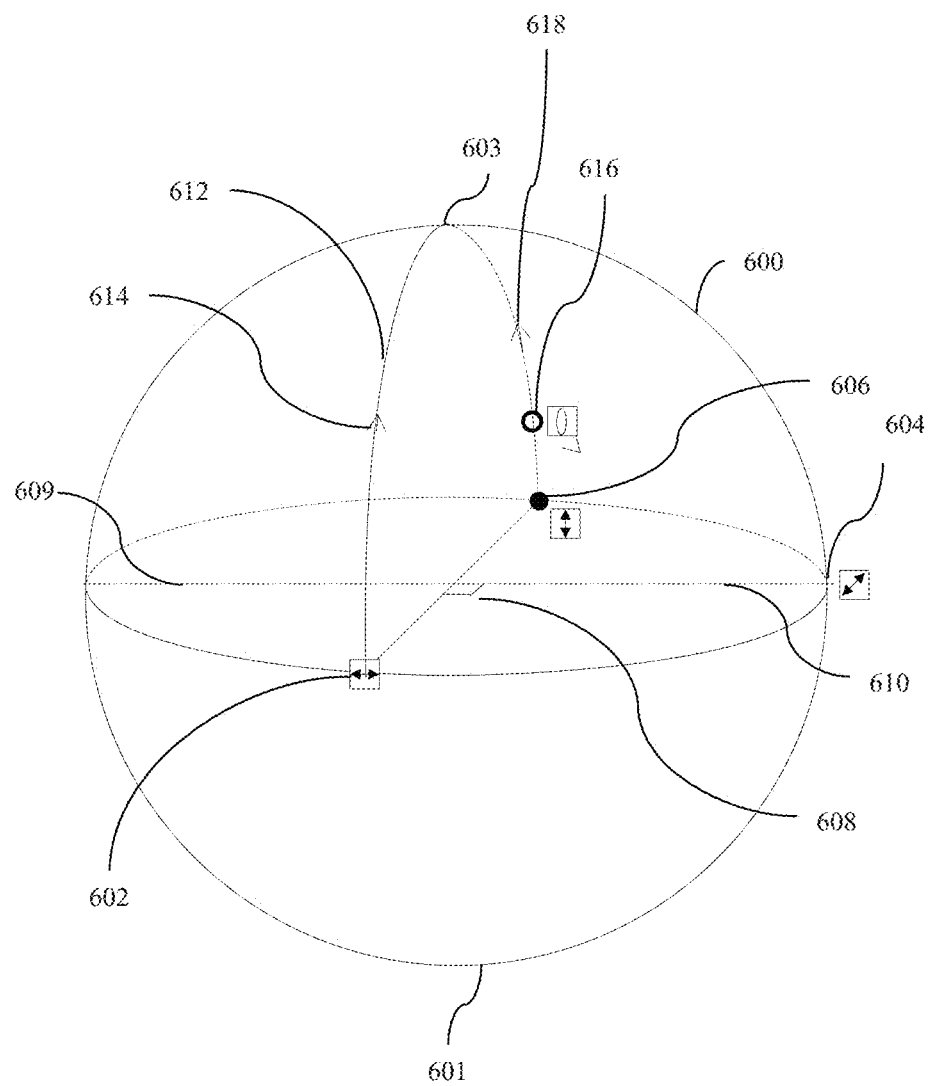
FIG. 19E is a schematic diagram illustrating in perspective front view a Poincare sphere representation of on-axis polarisation control for crossed A-plate retarders.

FIG. 19E is a schematic diagram illustrating in perspective front view a Poincare sphere 600 representation of on-axis polarisation control for crossed A-plate retarders for example as illustrated in FIG. 16B in the example of a half waveplate for the A-plates. The Poincare sphere may represent general elliptical polarisation states, with horizontal polarisation state location 602, +45 degrees linear polarisation state location 604, vertical polarisation state location 606 and circular polarisation state locations 601, 603. In operation, the input horizontal polarisation state 602 is rotated in direction of arrow 614 by the first A-plate 502 about an axis 610 at 90 degrees in the Poincare sphere, representing a 45 degrees orientation in real space to a polarisation state 606 for a first wavelength. If the retarder is dispersive, then the polarisation state 616 is provided for a second wavelength. Such polarisation state is elliptical, and thus provides reduced luminance if it were to be analysed, creating a chromatic output for the light from the first A-plate 502. The second A-plate with axis 609 rotates the polarisation states 606, 616 in the opposite direction as illustrated by arrow 618 so that the chromaticity of the A-plate 504 compensates for the chromaticity of the A-plate 502 and an achromatic polarisation state 602 is provided at the input polariser 210. Advantageously the chromaticity of the light for the viewing location 520 is the substantially same as for the input light.

The pair of retarders 502, 504 of FIG. 16B each comprise a single A-plate. It may be desirable to provide further control of chromaticity in reduced luminance angular viewing locations. Composite retarders will now be described.

Figure 19F:
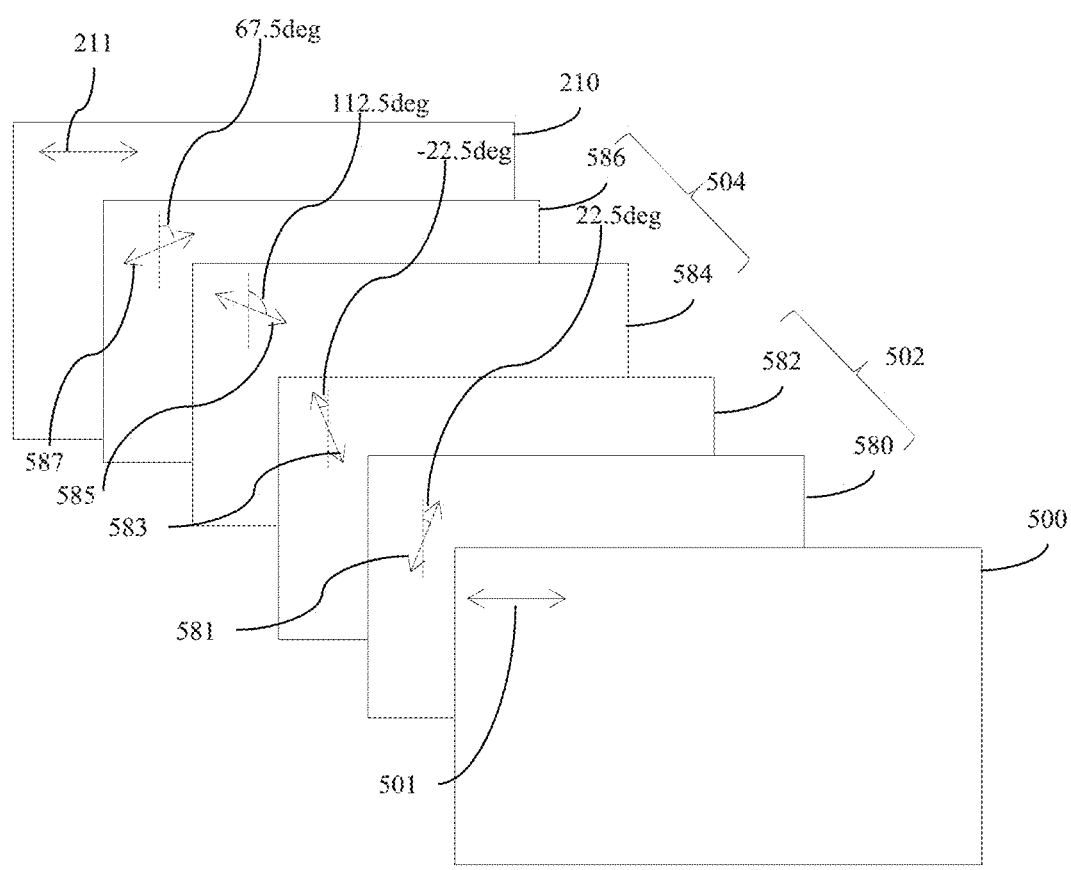
FIG. 19F is a schematic diagram illustrating in perspective front view orientation of retarder axes for achromatic A-plate retarders comprising composite retarders for use in the optical stack of FIG. 16B.

FIG. 19F is a schematic diagram illustrating in perspective front view orientation of retarder axes for A-plate retarders comprising composite retarders for use in the optical stack of FIG. 16B. The functions of A-plates 502, 504 may each be provided by two A-plates that are arranged at respective orientations as will be described. In an illustrative example, A-plate 502 may alternatively be provided by A-plates 580, 582 with retarder orientations 581, 583 of −22.5 degrees and +22.5 degrees. Further A-plate 504 may alternatively be provided by A-plates 584, 586 with retarder orientations 585, 587 of 67.5 degrees and +112.5 degrees. Thus A-plate 580 is crossed with A-plate 584 and A-plate 582 is crossed with A-plate 586.

Thus the pair of retarders 502, 504 each comprise plural A-plates 580, 582 and 584, 586 having respective slow axes 581, 583 and 585, 587 aligned at different angles from each other.

In the present embodiments "crossed", means that the slow axes are at an angle of 90°, or sufficiently close to 900 to function as crossed A-plates. Therefore, the slow axes of the pair of A-plates in FIG. 19F that together function as a single A-plate are not "crossed" in this sense, although they do literally cross each other at angles of less than 90°.

The operation of FIG. 19F will now be described for on-axis light with reference to Poincare sphere illustrations.

Figure 19G:
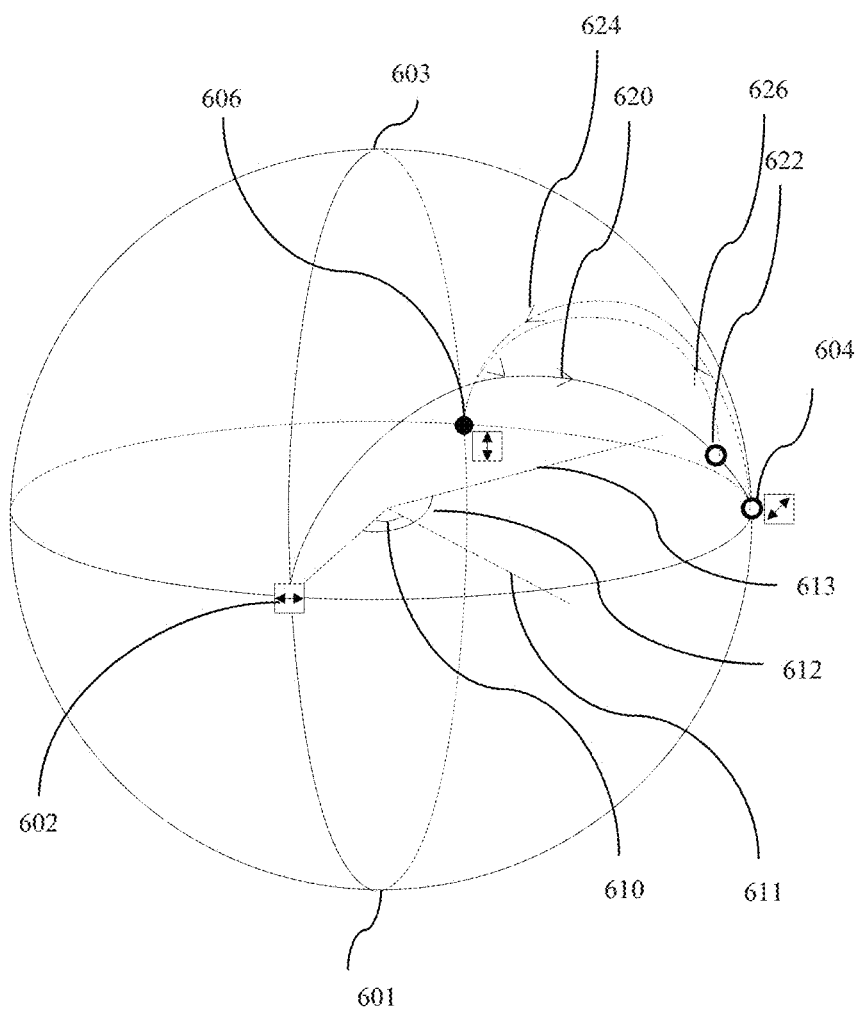
FIG. 19G is a schematic diagram illustrating in perspective front view a Poincare sphere representation of on-axis polarisation control for the first composite A-plate retarder pair of FIG. 19E.

FIG. 19G is a schematic diagram illustrating in perspective front view a Poincare sphere 600 representation of on-axis polarisation control for the first composite A-plate retarder pair 580, 582 of FIG. 19F. In operation the first retarder 580 provides a polarisation state rotation in direction 620 about axis 611 at angle 610 to polarisation states 604, 622 for respective first and second wavelengths.

The second retarder 582 provides a further polarisation state rotation about axis 613 at angle 612 to state 606 in directions 624, 626 that is substantially achromatic because of the compensation in retardation for the two respective wavelengths corresponding to states 604, 622. Thus the composite retarder 580, 582 achieves a substantially achromatic linear polarisation state 606 for incidence onto the second composite retarder 584, 586.

Figure 19H:
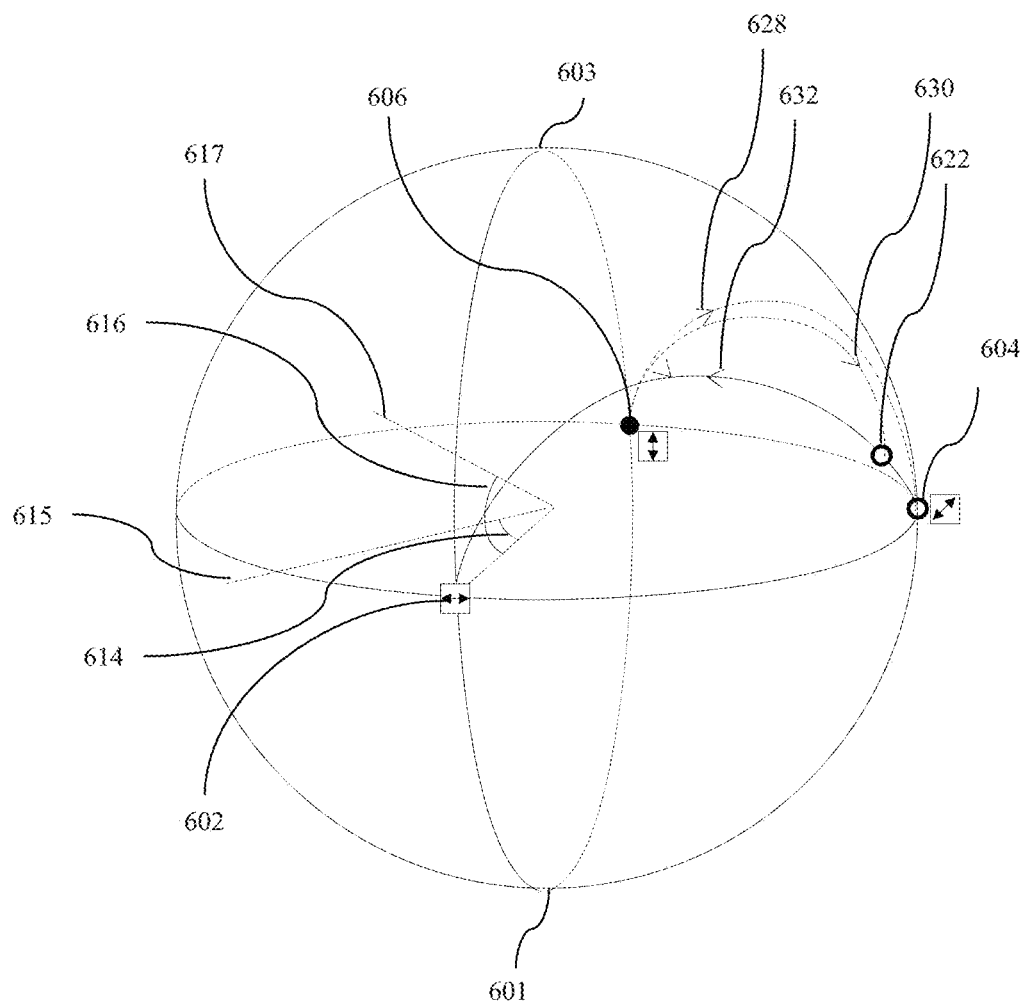
FIG. 19H is a schematic diagram illustrating in perspective front view a Poincare sphere representation of on-axis polarisation control for the second composite A-plate retarder pair of FIG. 19E.

FIG. 19H is a schematic diagram illustrating in perspective front view a Poincare sphere 600 representation of on-axis polarisation control for the second composite A-plate retarder pair 584, 586 of FIG. 19F. Thus the linear polarisation state 606 from the first pair 580, 582 is rotated in directions 628, 630 about axis 615 at angle 614 and further rotated in direction 632 about the axis 617 at angle 616 to the horizontal linear polarisation state 602. Thus the composite retarders 580, 582, 584, 586 operate in a similar manner to the single A-plates of FIG. 19E.

Thus advantageously composite retarders may be provided in place of the single retarders of the arrangement of FIG. 16B. Advantageously further degrees of freedom for design of retarder stacks may be provided to achieve improved off-axis chromaticity compensation.

In the present embodiments, in cooperation with a privacy directional backlight 101 apparatus, desirably off-axis luminance is reduced to achieve improved privacy characteristics in certain viewing directions.

The angular luminance control of crossed A-plates 502, 504 between an additional polariser 500 and input polariser 210 will now be described for various off-axis illumination arrangements.

Figure 20A:
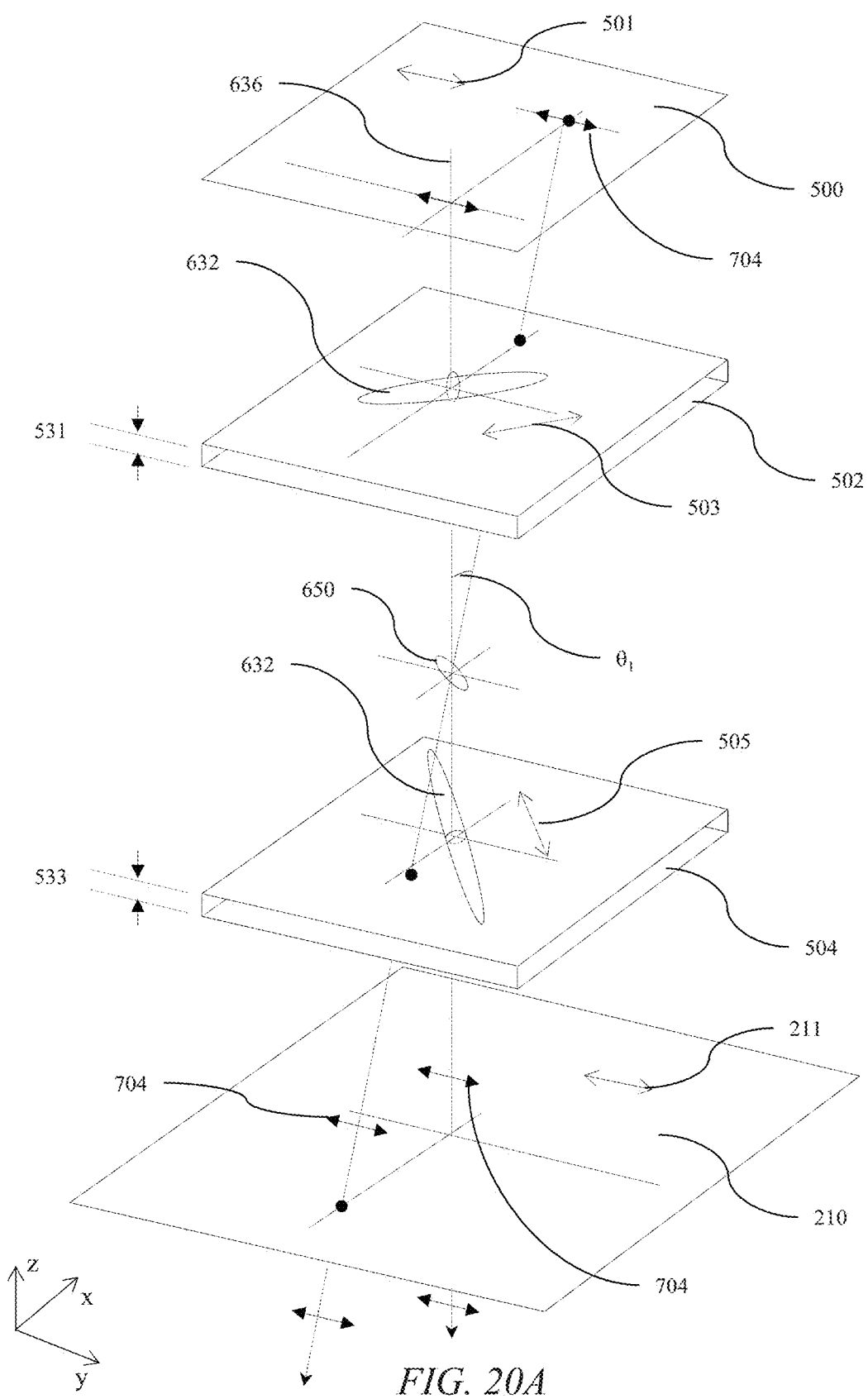
FIG. 20A is a schematic diagram illustrating in perspective view illumination of crossed A-plate retarder layers by off-axis polarised light with a positive elevation.

FIG. 20A is a schematic diagram illustrating in perspective view illumination of crossed A-plate retarder layers by off-axis polarised light with a positive elevation. Linear polariser 500 with electric vector transmission direction 501 is used to provide a linear polarisation state 704 that is parallel to the lateral direction onto first A-plate 502 of the crossed A-plates 502, 504. The slow axis direction 503 is inclined at +45 degrees to the lateral direction. The retardance of the retarder 502 for the off-axis angle $\theta_1$ in the positive elevation direction provides a resultant polarisation component 650 that is generally elliptical on output. Polarisation component 650 is incident onto the second A-plate 504 of the crossed A-plates 502, 504 that has a slow axis direction 505 that is orthogonal to the slow axis direction 503 of the first A-plate 502. In the plane of incidence of FIG. 20A, the retardance of the second A-plate 504 for the off-axis angle $\theta_1$ is equal and opposite to the retardance of the first A-plate 502. Thus a net zero retardation is provided for the incident polarisation component 704 and the output polarisation component is the same as the input polarisation component 704.

The output polarisation component is aligned to the electric vector transmission direction of the LCD input polariser 210, and thus is transmitted efficiently. Advantageously substantially no losses are provided for light rays that have zero lateral angle angular component so that full transmission efficiency is achieved.

Figure 20B:
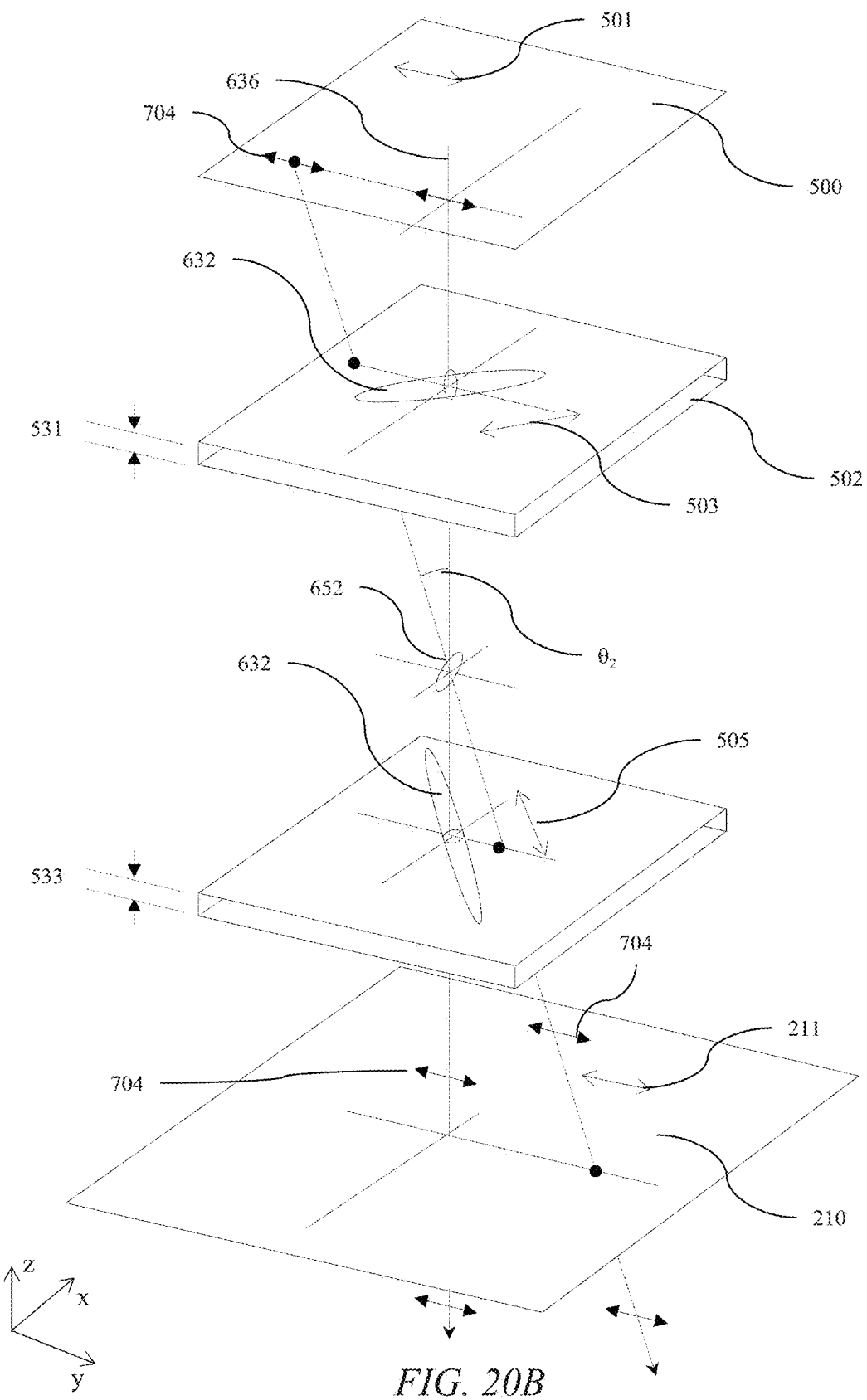
FIG. 20B is a schematic diagram illustrating in perspective view illumination of crossed A-plate retarder layers by off-axis polarised light with a negative lateral angle.

FIG. 20B is a schematic diagram illustrating in perspective view illumination of crossed A-plate retarder layers by off-axis polarised light with a negative lateral angle. Thus input polarisation component is converted by the first A-plate 502 to an intermediate polarisation component 652 that is generally an elliptical polarisation state. The second A-plate 504 again provides an equal and opposite retardation to the first A-plate so that the output polarisation component is the same as the input polarisation component 704 and light is efficiently transmitted through the input polariser 210.

Thus the at least one retarder comprises a pair of retarders 502, 504 which have slow axes in the plane of the retarders 502, 504 that are crossed, that is the x-y plane in the present embodiments. The pair of retarders 502, 504 have slow axes 503, 505 that each extend at 450 with respect to an electric vector transmission direction that is parallel to the electric vector transmission of the input polariser 210 in the case that the additional polariser 500 is arranged on the input side of the input polariser 210 or is parallel to the electric vector transmission of the output polariser 218 in the case that the additional polariser 500 is arranged on the output side of the input polariser 210.

Advantageously substantially no losses are provided for light rays that have zero elevation angular component so that full transmission efficiency is achieved.

Figure 20C:
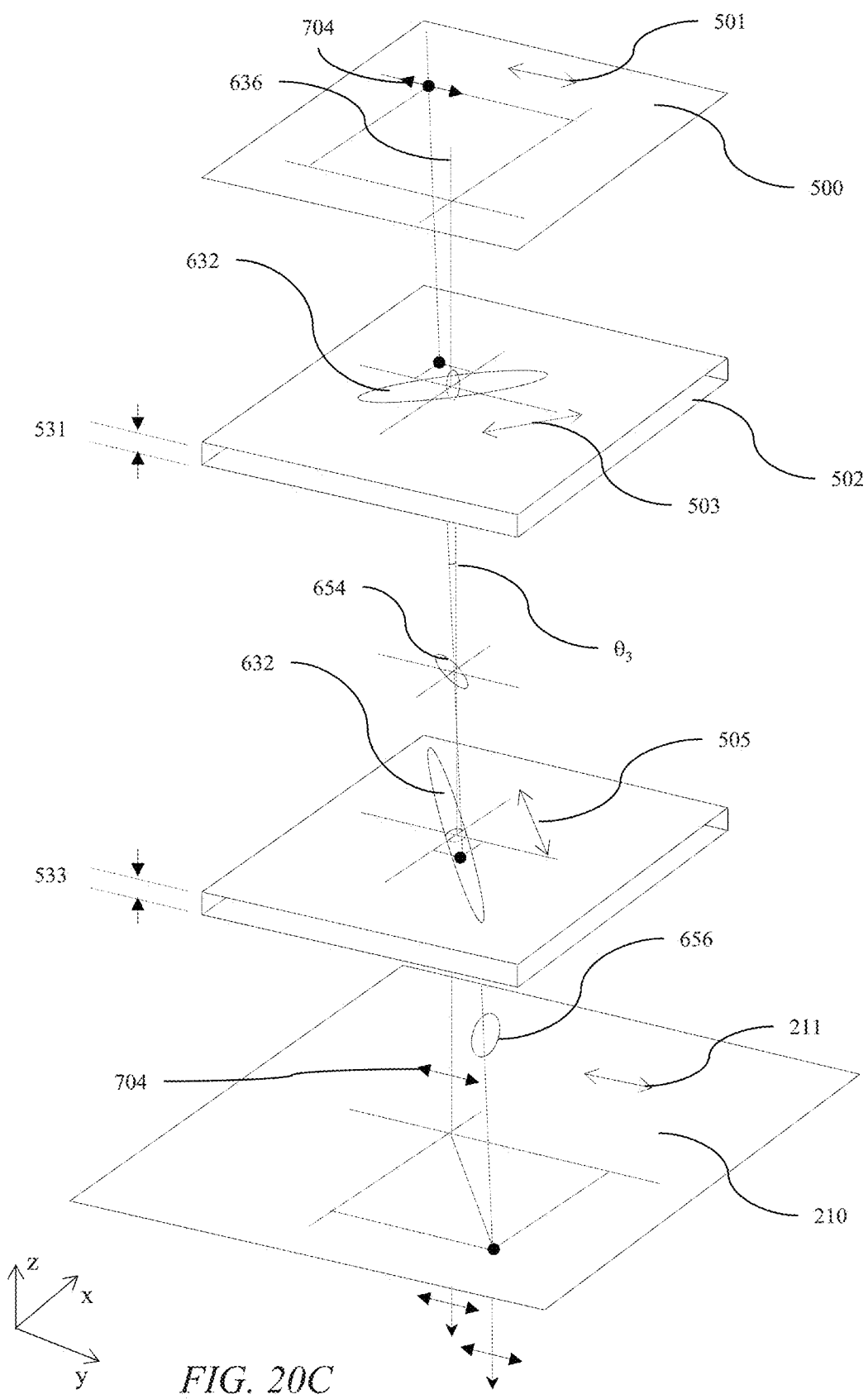
FIG. 20C is a schematic diagram illustrating in perspective view illumination of crossed A-plate retarder layers by off-axis polarised light with a positive elevation and negative lateral angle.

FIG. 20C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 502. In comparison to the arrangements of FIGS. 20A-B, the birefringent material of the second A-plate 504 is not aligned at a compensatory angle to the birefringent material of the first A-plate 502, and so a resultant elliptical component 656 is output from the second A-plate 504. Elliptical component 656 is analysed by input polariser 210 with reduced luminance in comparison to the input luminance of the first polarisation component 704.

Figure 20D:
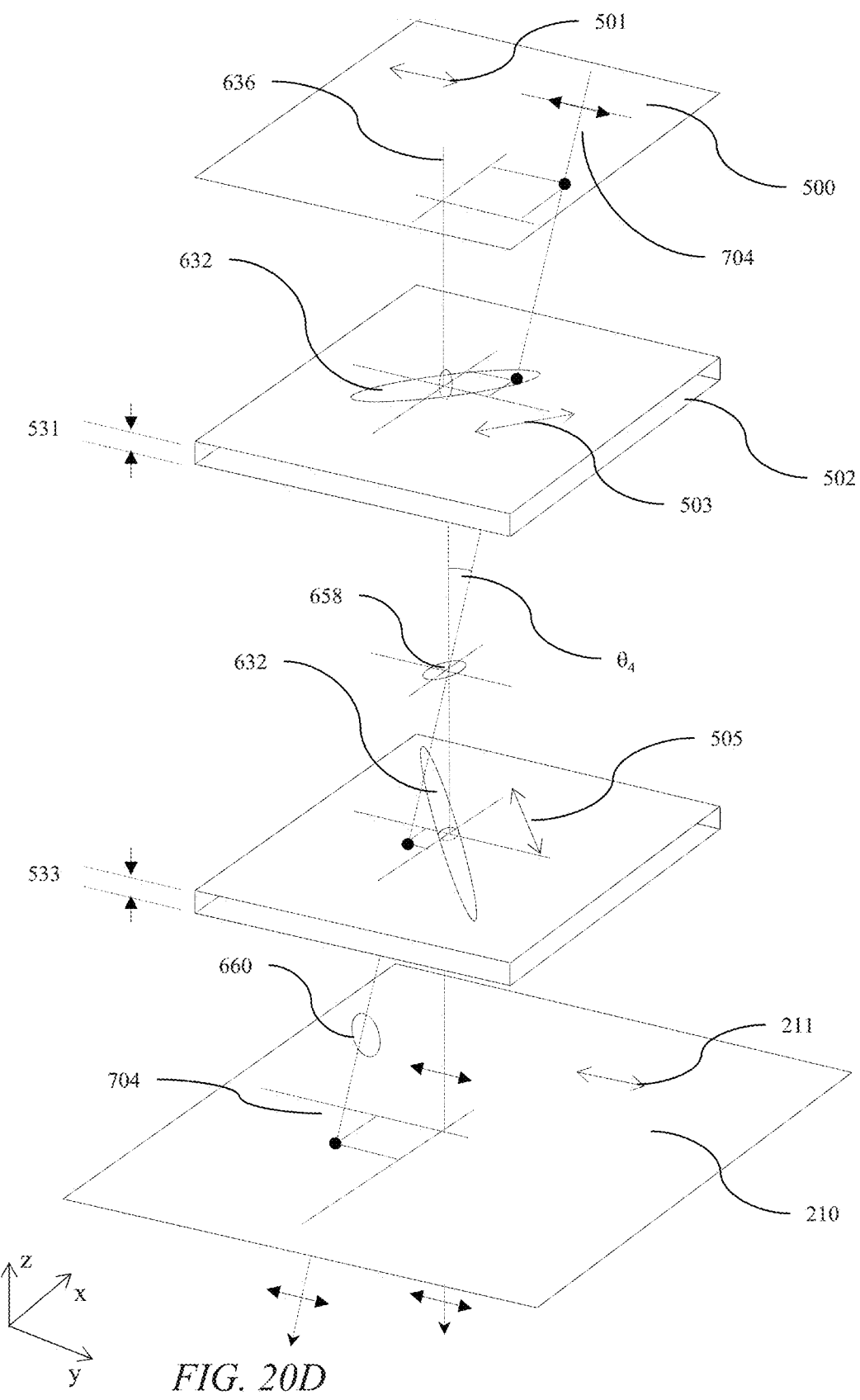
FIG. 20D is a schematic diagram illustrating in perspective view illumination of crossed A-plate retarder layers by off-axis polarised light with a positive elevation and positive lateral angle.

FIG. 20D is a schematic diagram illustrating in perspective view illumination of crossed A-plate retarder layers by off-axis polarised light with a positive elevation and positive lateral angle. In a similar manner to that illustrated for FIG. 20C, polarisation components 658 and 660 are provided by first and second A-plates 502, 504 as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 21A:
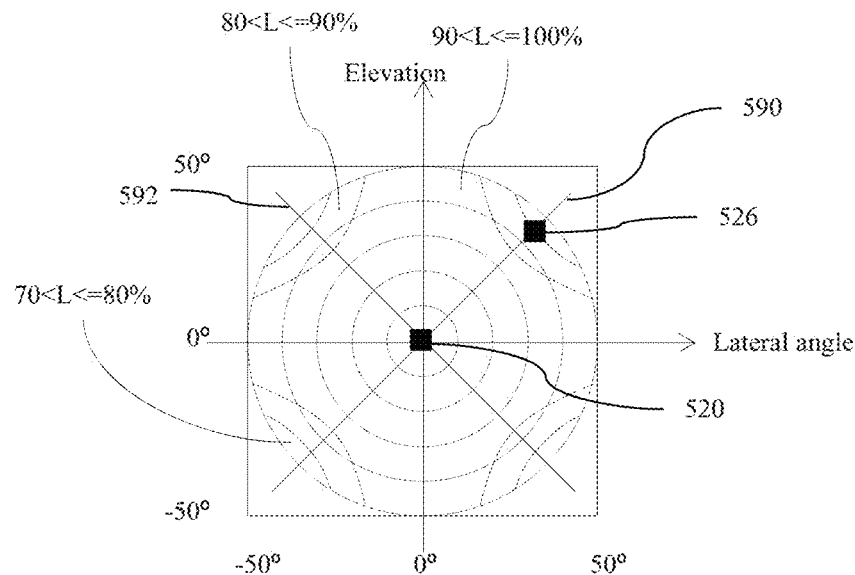
FIG. 21A is a schematic luminance field-of-view graph illustrating variation in transmitted luminance of the optical stack of FIG. 16B wherein the retarder layers are quarter waveplates.
Figure 21B:
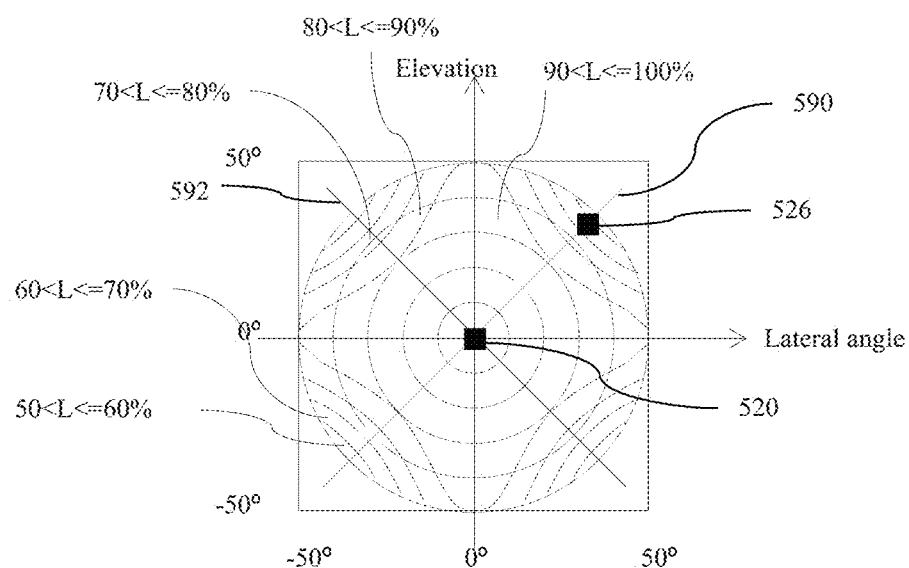
FIG. 21B is a schematic luminance field-of-view graph illustrating variation in transmitted luminance of the optical stack of FIG. 16B wherein the retarder layers are half waveplates.

The simulated variation of transmitted luminance field of view will now be described with reference to FIG. 21A which is a schematic luminance field-of-view graph illustrating variation in transmitted luminance of the optical stack of FIG. 16B wherein the A-plates 502, 504 are quarter waveplates at a design wavelength $\lambda_o$ for on-axis light rays; and FIG. 21B is a schematic luminance field-of-view graph illustrating variation in transmitted luminance of the optical stack of FIG. 16B wherein the retarder layers are half waveplates at a design wavelength $\lambda_o$ for on-axis light rays.

FIG. 21A illustrates iso-luminance contours in 10% steps such that the luminance for angular viewing location 526 is 80% of the peak luminance. By way of comparison, for the arrangement of FIG. 21B, the luminance at angular viewing location 526 is approximately 65% of peak luminance. In both arrangements, head-on luminance for angular viewing location 520 is unchanged.

Advantageously, selection of retardance of the A-plates may be used to provide desirable reduction of luminance in viewing quadrants. Further, achromatic retarders may be used to minimise color changes with viewing angle.

It may be desirable to provide further reduction of luminance of a privacy display for off-axis angles that are vertically and horizontally oriented with respect to the display orientation.

Figure 21C:
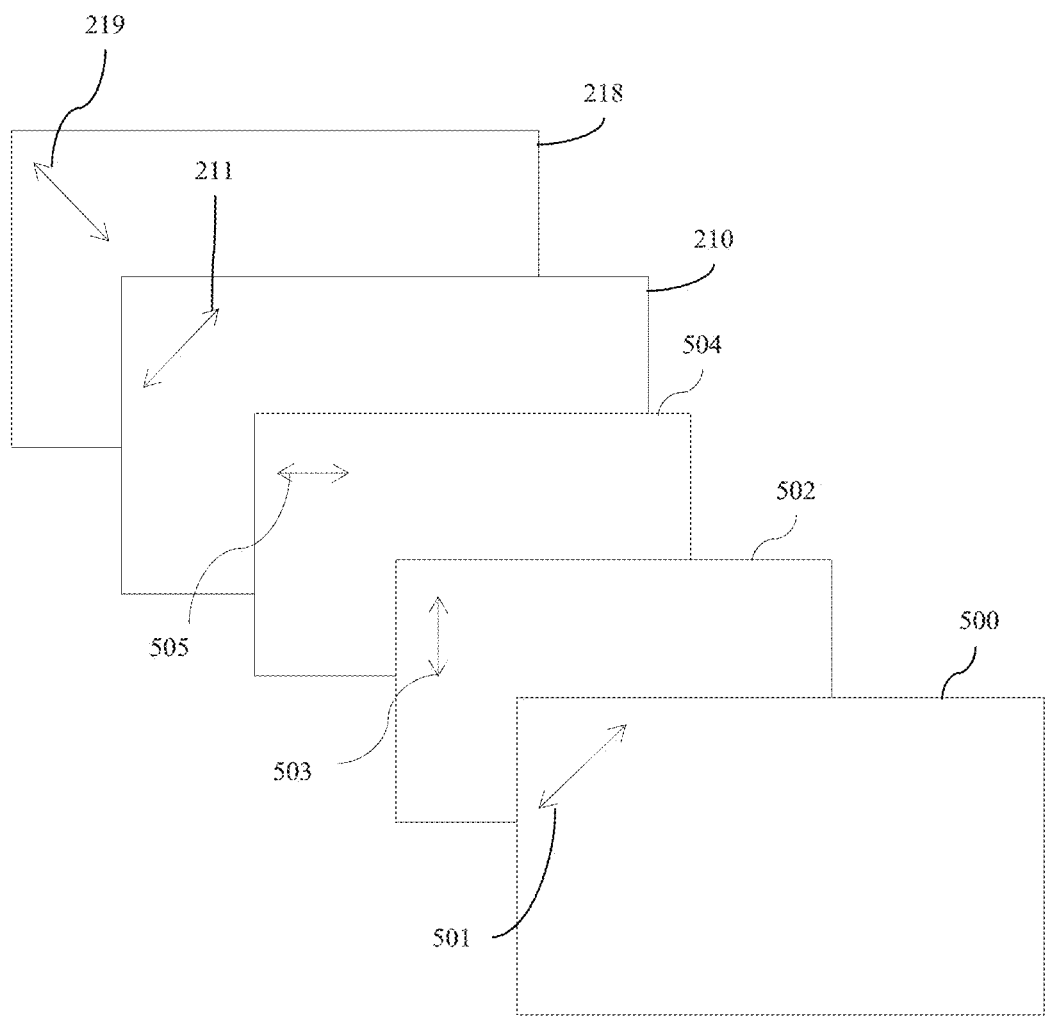
FIG. 21C is a schematic diagram illustrating in perspective front view orientation of retarder and polariser axes for an optical stack of a directional display comprising additional and input polarisers arranged at +/−45 degrees and crossed A-plates.

FIG. 21C is a schematic diagram illustrating in perspective front view orientation of retarder and polariser axes for an optical stack of a directional display comprising additional and input polarisers arranged at +/−45 degrees and crossed A-plates. Such an arrangement may be provided for a twisted nematic (TN) LCD. Alternatively an In-Plane Switching (IPS) LCD may further comprise retarders (not shown) arranged to rotate the polarisation state with respect to the additional polariser 500 and the input polariser 210. Thus additional polariser 500 and input polariser 210 may have polariser transmission directions 501, 211 orientations at +45 degrees and retarders 502, 504 may have retarder orientations 503, 505 at 90 degrees and 0 degrees respectively.

Figure 21D:
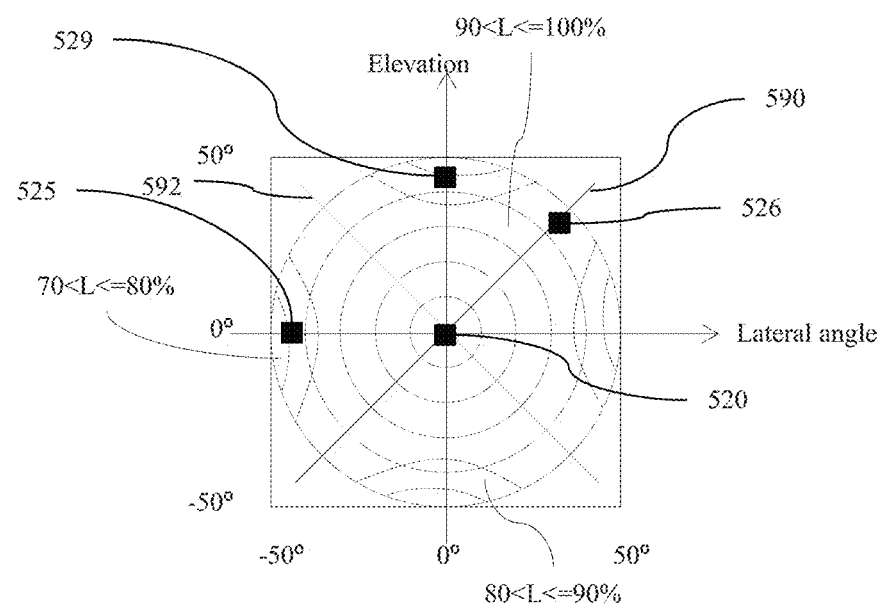
FIG. 21D is a schematic luminance field-of-view graph illustrating variation in transmitted luminance of the optical stack of FIG. 21C wherein the retarder layers are quarter waveplates.

FIG. 21D is a schematic luminance field-of-view graph illustrating variation in transmitted luminance of the optical stack of FIG. 21C wherein the retarder layers are quarter waveplates. Thus reduced luminance transmission may be provided for viewing locations 525, 529 whereas locations 520, 526 may be provided with substantially no reduction of luminance.

Advantageously vertical and lateral viewing locations may have reduced luminance, improving privacy levels in vertical and horizontal viewing directions.

The construction of optical stacks comprising crossed A-plates will now be described.

Figure 22A:
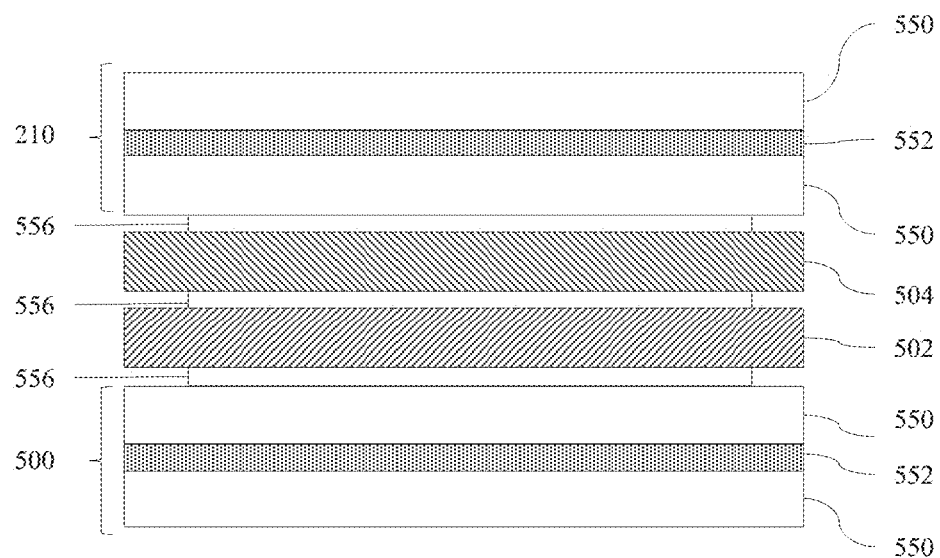
FIG. 22A, FIG. 22B, FIG. 22C, and FIG. 22D are schematic diagrams illustrating in side views optical stacks comprising crossed A-plates.

FIGS. 22A-D are schematic diagrams illustrating in side views optical stacks comprising crossed A-plates. FIG. 22A illustrates that input polariser 210 and additional polariser 500 may comprise protective layers 550 that may be TAC (cellulose triacetate) for example surrounding an absorbing polariser layer 552 such as an iodine doped PVA layer. Adhesive layers 556 that may be optically clear adhesive layers and/or pressure sensitive adhesive layers may be arranged to attach the crossed A-plates 502, 504.

Figure 22B:
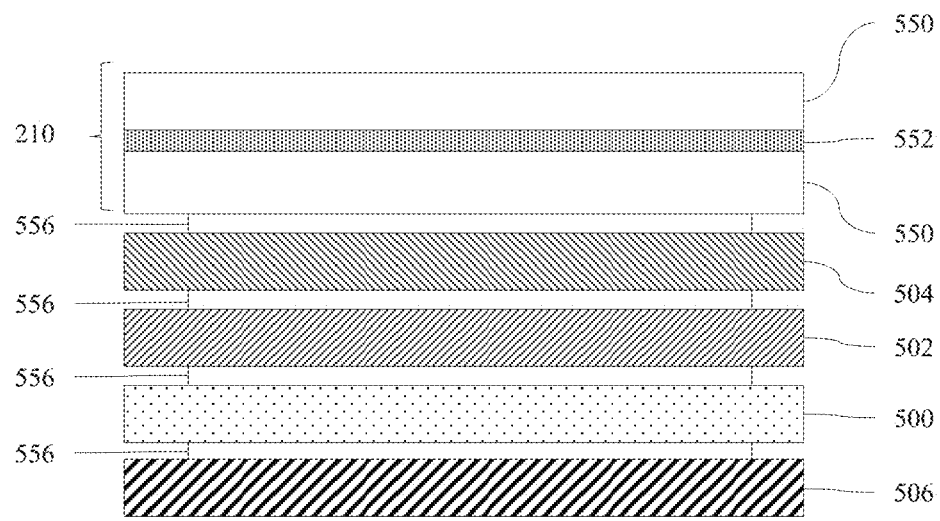

FIG. 22B illustrates that absorbing polariser 500 may be provided by a reflective polariser and that further retarder layer 506 may be provided as illustrated in FIGS. 16A-B previously.

It would be desirable to reduce the thickness of the input polariser stack.

Figure 22C:
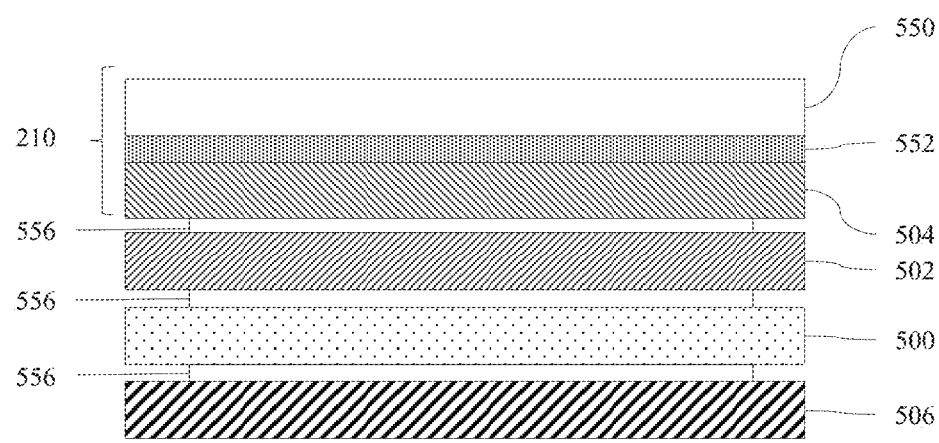

FIG. 22C illustrates that one of the protective layers of the input polariser may be provided by the second A-plate 504. For example a birefringent TAC substrate may be provided with combined protective and A-plate properties. Advantageously thickness and cost may be reduced.

Figure 22D:

FIG. 22D illustrates an arrangement wherein the additional polariser 500 is provided by (i) absorbing polariser 552, 550 and a protective layer comprising A-plate 502 and (ii) reflective polariser 549. Advantageously leakage from the reflective polariser 549 may be reduced.

Arrangements wherein the crossed A-plates are arranged on the output of the spatial light modulator 48 will now be described.

Figure 23A:
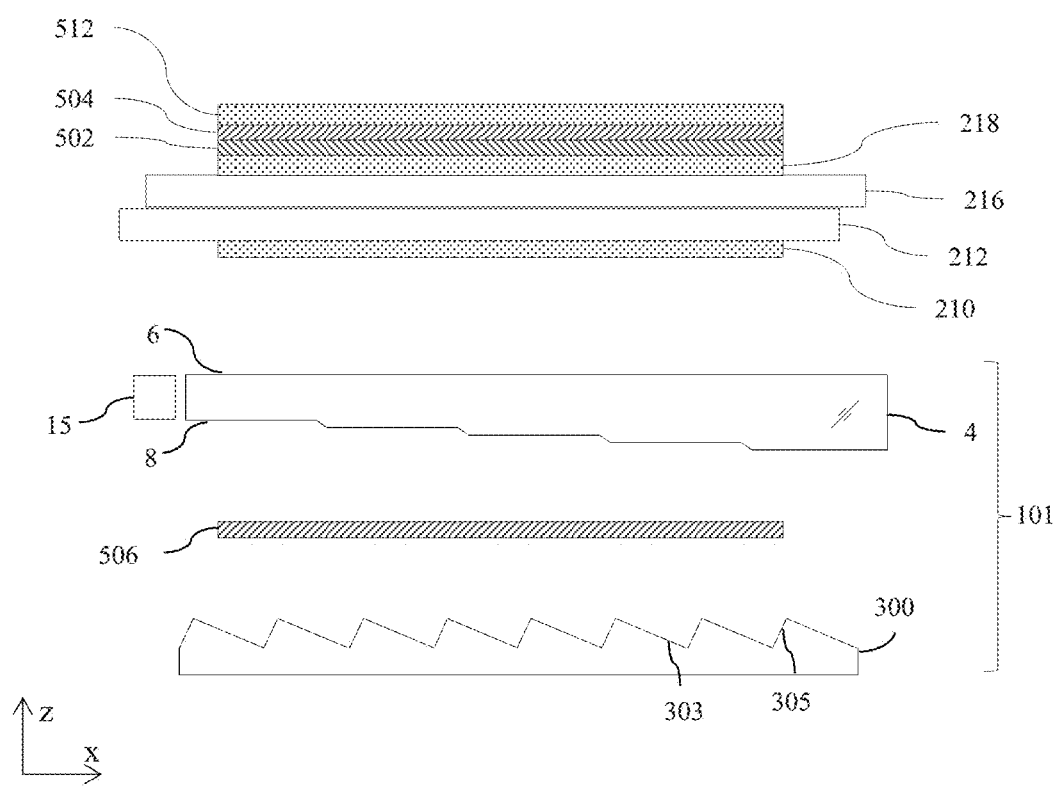
FIG. 23A is a schematic diagram illustrating in side view a directional display comprising a directional waveguide and crossed A-plates arranged on the front of a spatial light modulator.
Figure 23B:
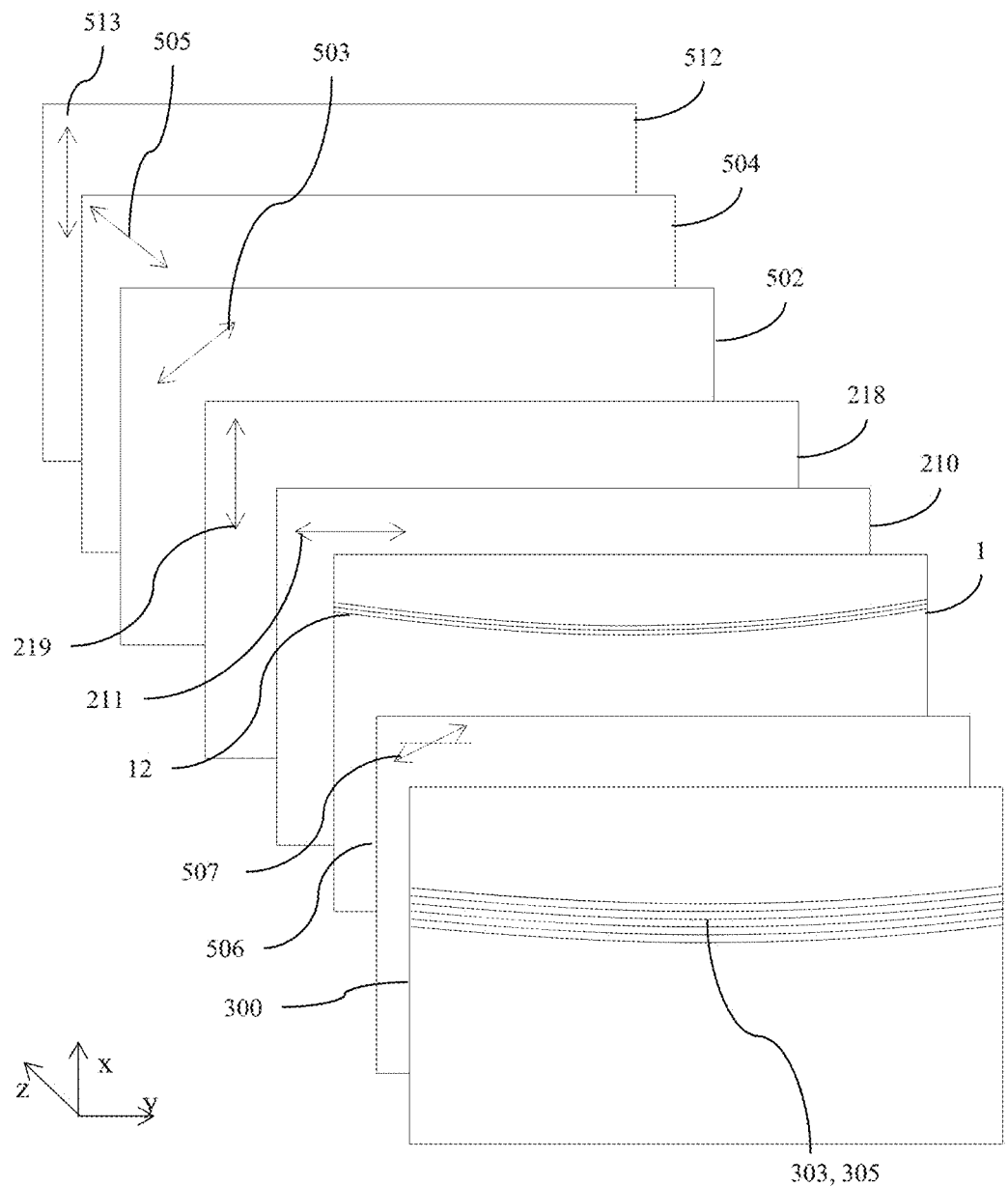
FIG. 23B is a schematic diagram illustrating in perspective front view orientation of retarder and polariser axes for the optical stack of FIG. 23A.

FIG. 23A is a schematic diagram illustrating in side view a directional display comprising a directional waveguide 1 and crossed A-plates 502, 504 arranged on the front of a spatial light modulator 48; and FIG. 23B is a schematic diagram illustrating in perspective front view orientation of retarder and polariser axes for the optical stack of FIG. 23A.

Additional polariser 500 is arranged on the output side of the output polariser 218; and a pair of crossed A-plates is arranged between the additional polariser 500 and the output polariser 218. The additional polariser 500 is arranged on the output side of the output polariser and said pair of crossed A-plates 502, 504 is arranged between the additional polariser and the input polariser.

The operation and advantages of the display are similar to that described with reference to FIGS. 17A-18C. Such an arrangement may be provided in displays without reflective polarisers.

It would be desirable to reduce the number of separate optical layers in a switchable directional display comprising mitigation for snoopers in viewing quadrants.

Figure 24A:
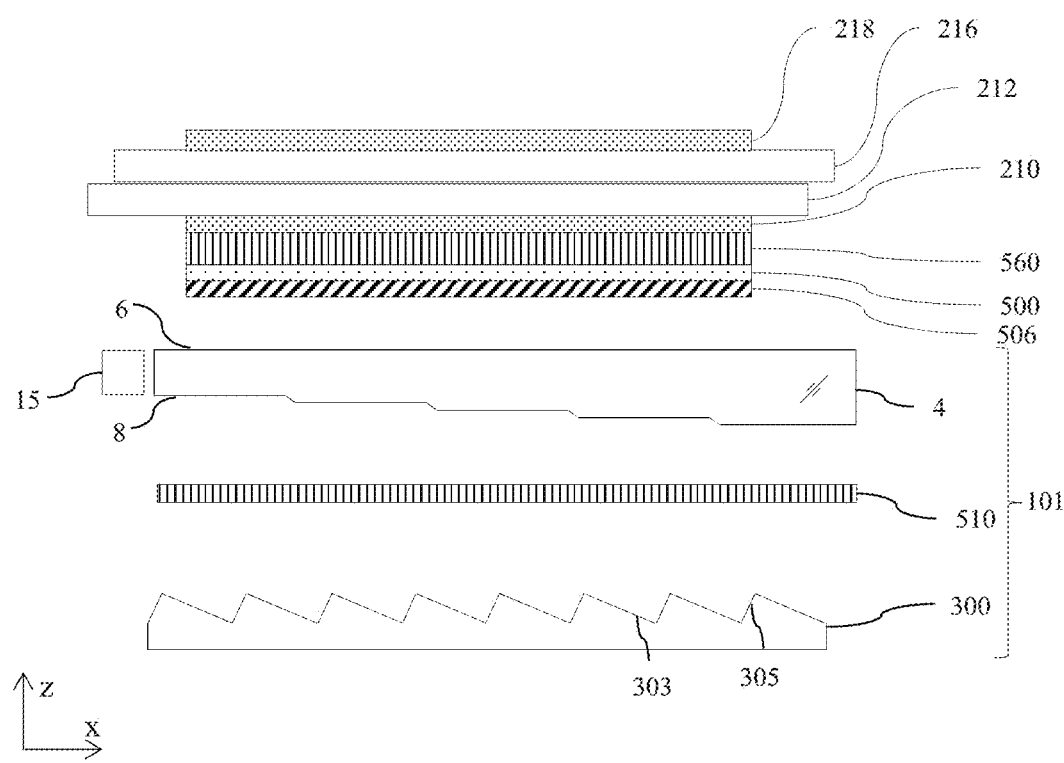
FIG. 24A is a schematic diagram illustrating in side view a directional display comprising a directional waveguide and C-plate arranged between a spatial light modulator and a directional backlight.
Figure 24B:
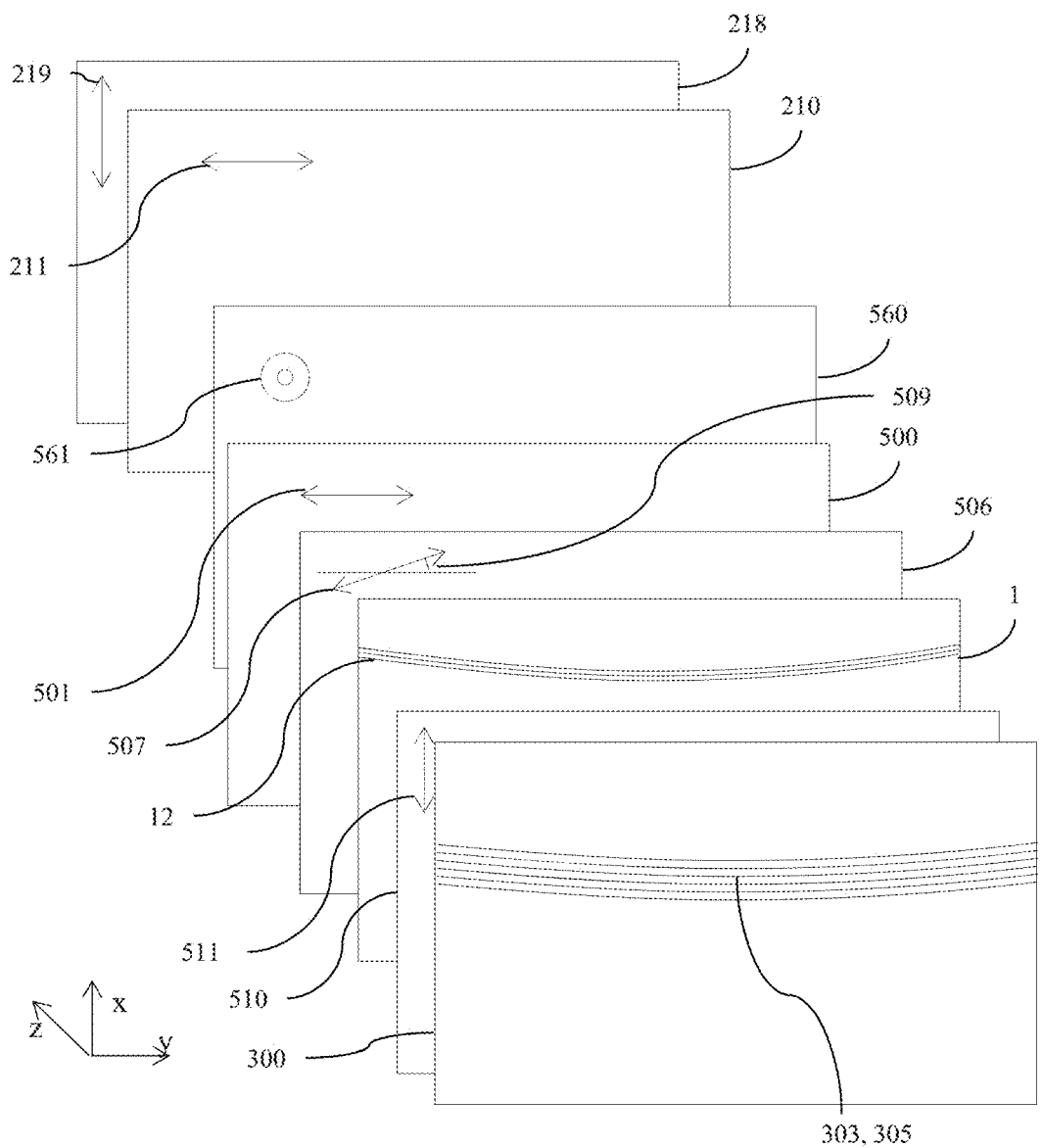
FIG. 24B is a schematic diagram illustrating in perspective front view orientation of retarder and polariser axes for the optical stack of FIG. 24A.

FIG. 24A is a schematic diagram illustrating in side view a directional display comprising a directional waveguide and C-plate 560 arranged between a spatial light modulator 48 and a directional backlight 101; and FIG. 24B is a schematic diagram illustrating in perspective front view orientation of retarder and polariser axes for the optical stack of FIG. 24A.

C-plate 560 with optical axis direction 561 is arranged between the additional polariser 500 and the input polariser 210 with polarisation transmission direction 211 parallel to the polarisation transmission direction 501 of the additional polariser 500. Thus the additional polariser 500 is arranged on the input side of the input polariser 210 and said C-plate is arranged between the additional polariser 500 and the input polariser 210.

Figure 25A:
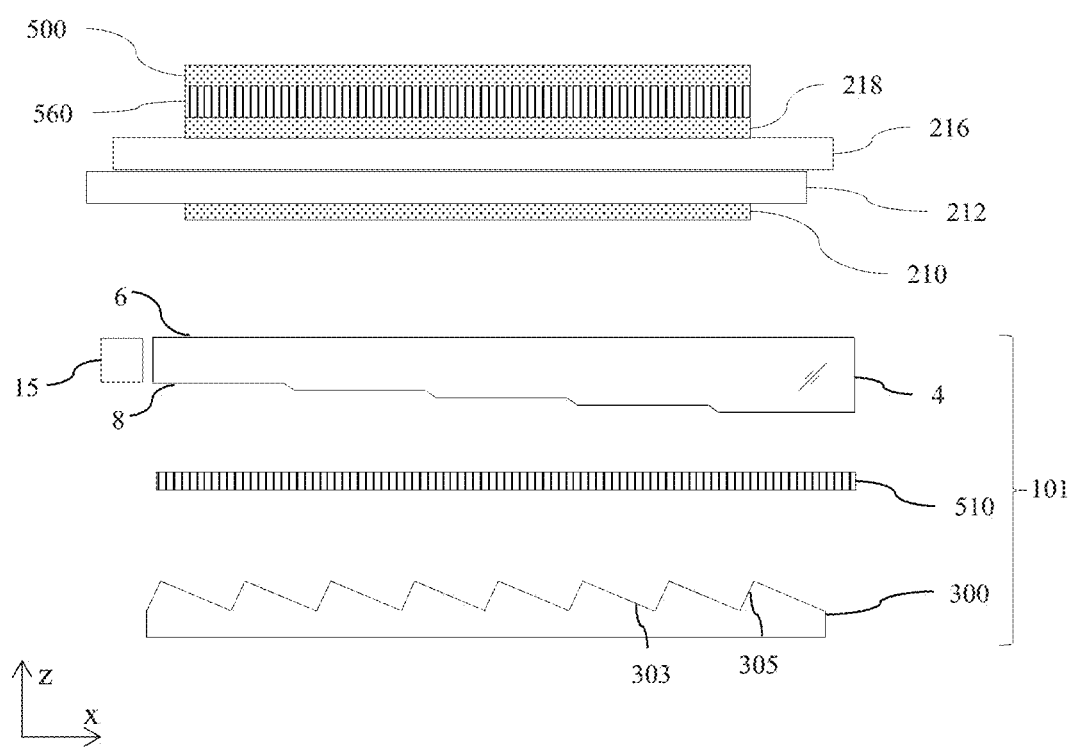
FIG. 25A is a schematic diagram illustrating in side view a directional display comprising a directional waveguide and a C-plate arranged on the front of a spatial light modulator.
Figure 25B:
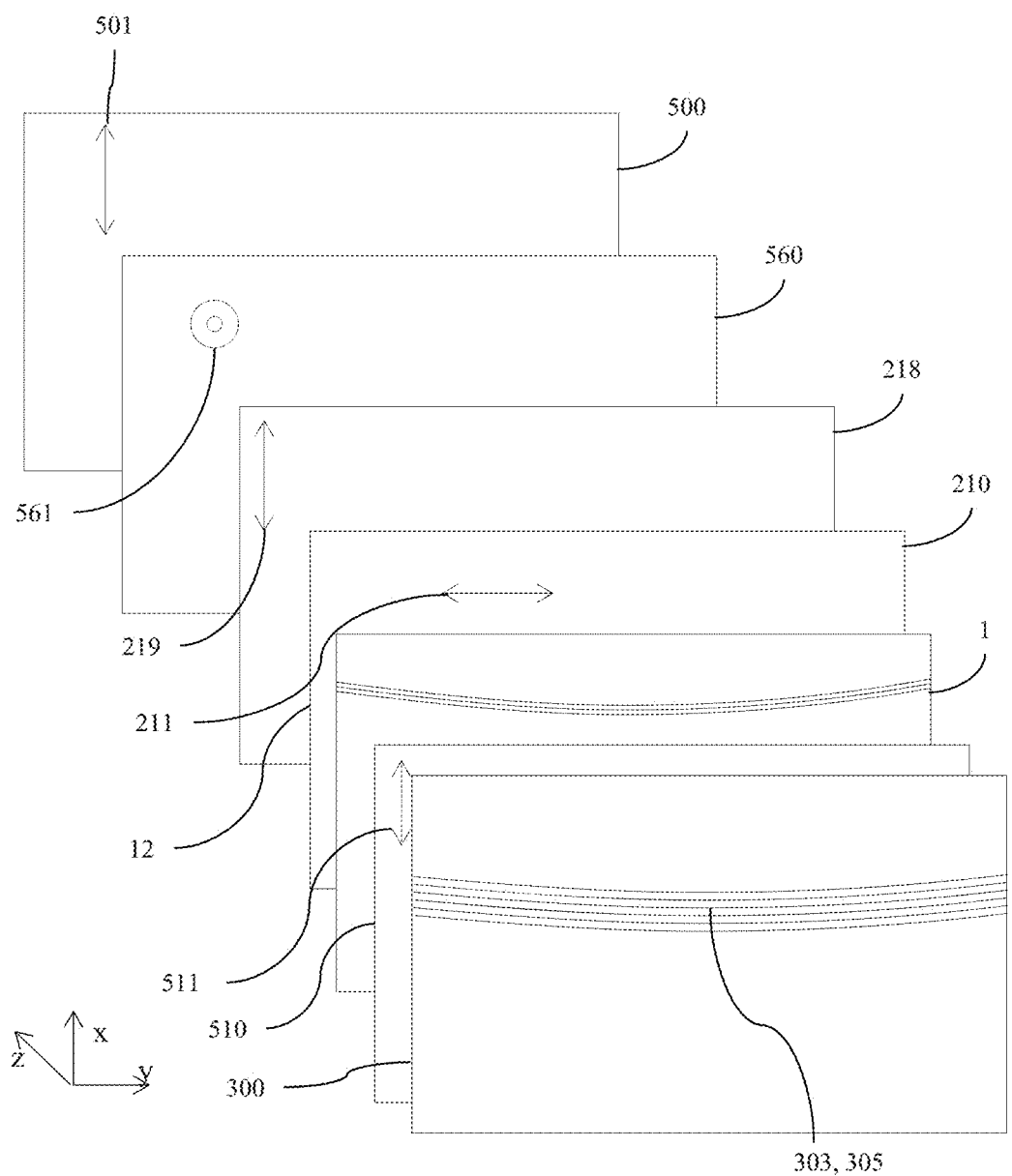
FIG. 25B is a schematic diagram illustrating in perspective front view orientation of retarder and polariser axes for the optical stack of FIG. 25A.

FIG. 25A is a schematic diagram illustrating in side view a directional display comprising a directional waveguide 1 and a C-plate 560 arranged on the front of a spatial light modulator 48; and FIG. 25B is a schematic diagram illustrating in perspective front view orientation of retarder and polariser axes for the optical stack of FIG. 25A. Additional polariser 500 is arranged on the output side of the output polariser 218; and a C-plate 560 is arranged between the additional polariser 500 and the output polariser 218.

C-plate 560 with optical axis direction 561 is arranged between the additional polariser 500 and the output polariser 218 with polarisation transmission direction 219 parallel to the polarisation transmission direction 501 of the additional polariser 500. Thus the additional polariser 500 is arranged on the output side of the output polariser 218 and said C-plate is arranged between the additional polariser 500 and the output polariser 218.

The operation of the C-plate between the parallel polarisers 500, 210 will now be described.

Figure 26A:
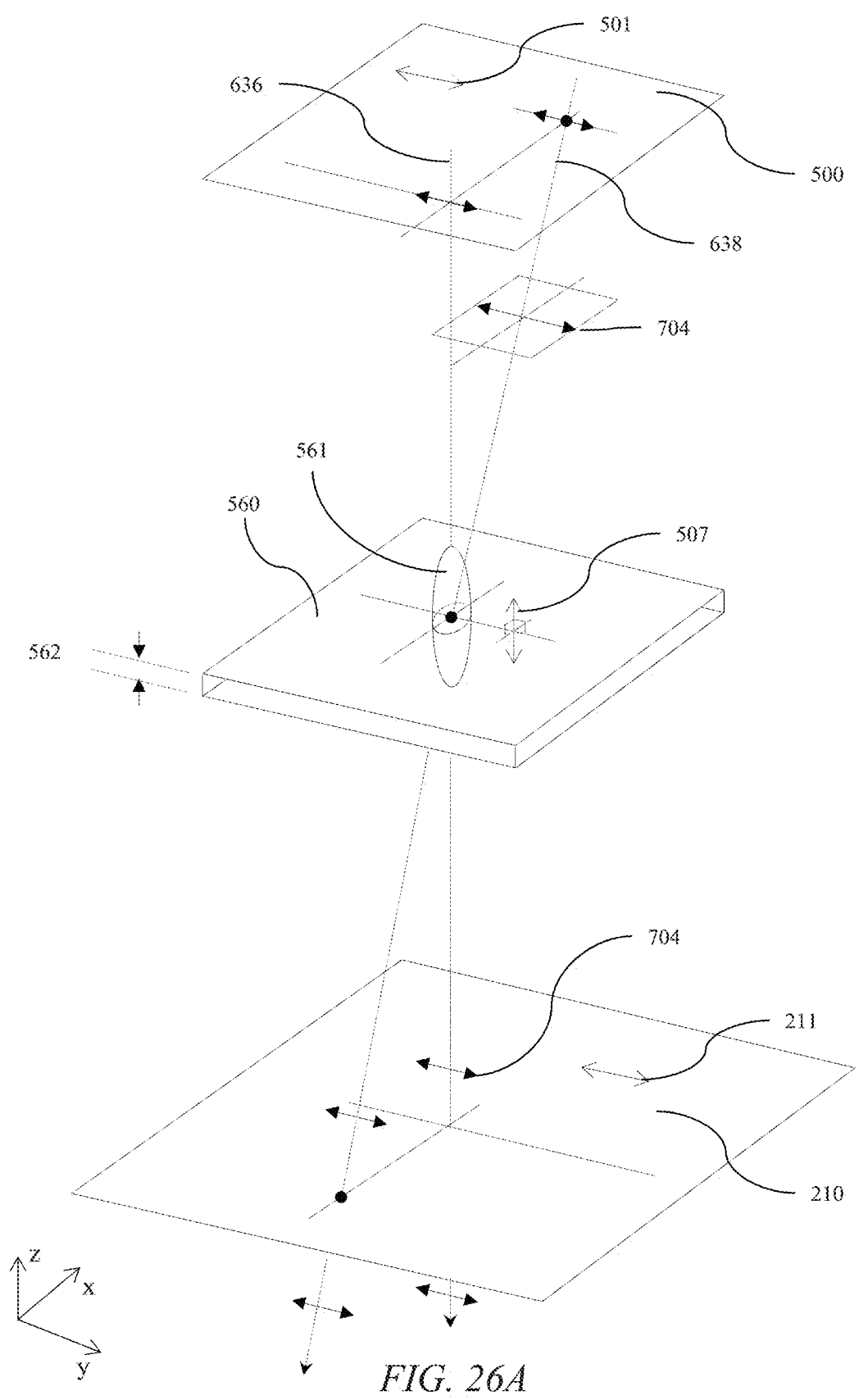
FIG. 26A is a schematic diagram illustrating in perspective view illumination of a C-plate layer by off-axis polarised light with a positive elevation.

FIG. 26A is a schematic diagram illustrating in perspective view illumination of a C-plate layer by off-axis polarised light with a positive elevation. Incident linear polarisation component 704 is incident onto the birefringent material 632 of the C-plate 560 with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the at least one retarder comprises a retarder 560 having a slow axis 561 perpendicular to the plane of the retarder 560, that is the x-y plane. The retarder 560 having a slow axis perpendicular to the plane of the retarder comprises a C-plate.

C-plates may comprise transparent birefringent materials such as: polycarbonates or reactive mesogens that are cast onto a substrate that provides homeotropic alignment for example; Zeonex™ Cyclo Olefin Polymer (COP); discotic polymers; and Nitto Denko™ double stretched polycarbonates.

Figure 26B:
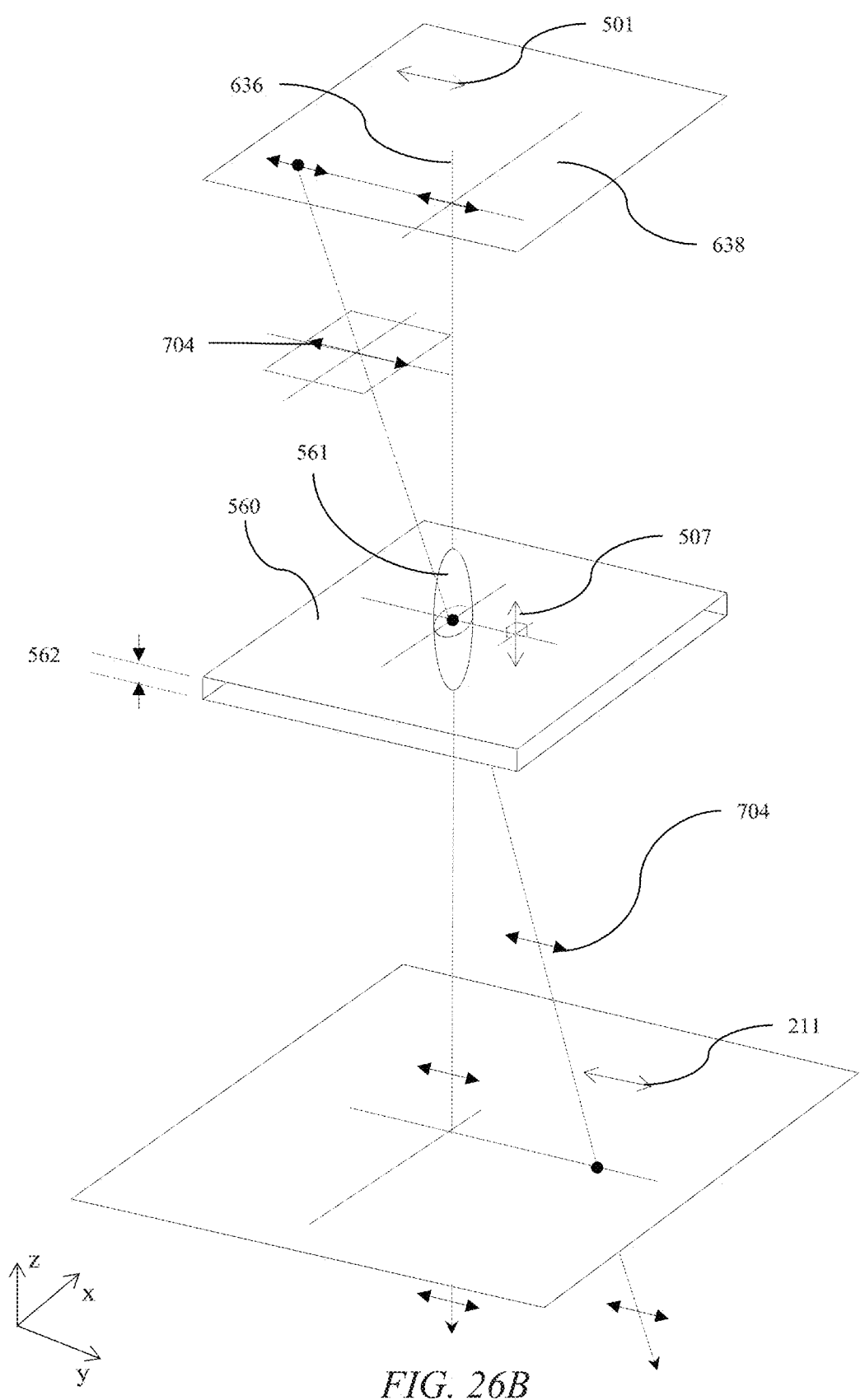
FIG. 26B is a schematic diagram illustrating in perspective view illumination of a C-plate layer by off-axis polarised light with a negative lateral angle.

FIG. 26B is a schematic diagram illustrating in perspective view illumination of a C-plate layer by off-axis polarised light with a negative lateral angle. As with the arrangement of FIG. 26A polarisation state 704 sees no net phase difference and is transmitted with maximum luminance.

Figure 26C:
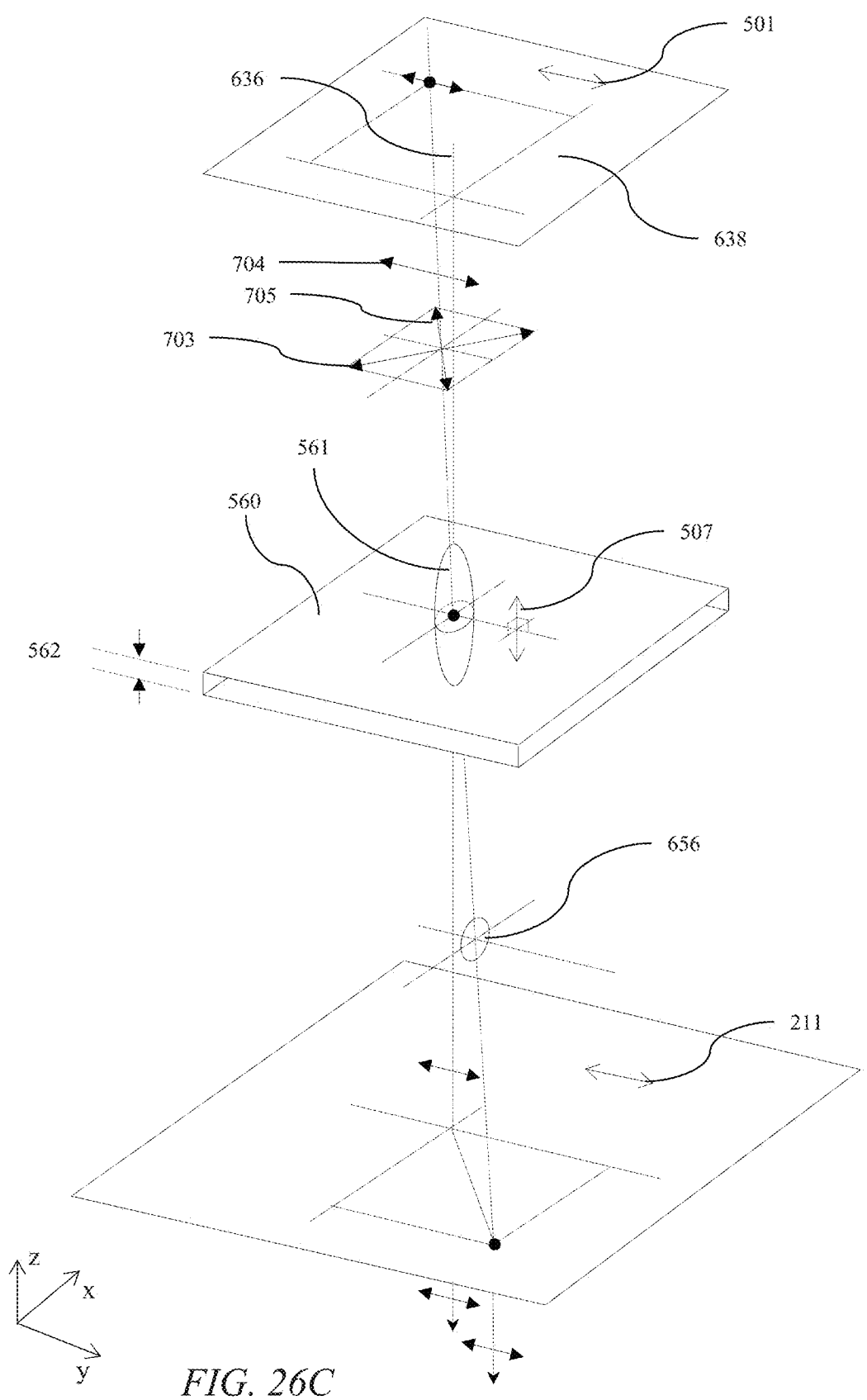
FIG. 26C is a schematic diagram illustrating in perspective view illumination of a C-plate layer by off-axis polarised light with a positive elevation and negative lateral angle.

FIG. 26C is a schematic diagram illustrating in perspective view illumination of a C-plate layer by off-axis polarised light with a positive elevation and negative lateral angle. In comparison to the arrangement of FIGS. 26A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 26A-B.

Figure 26D:
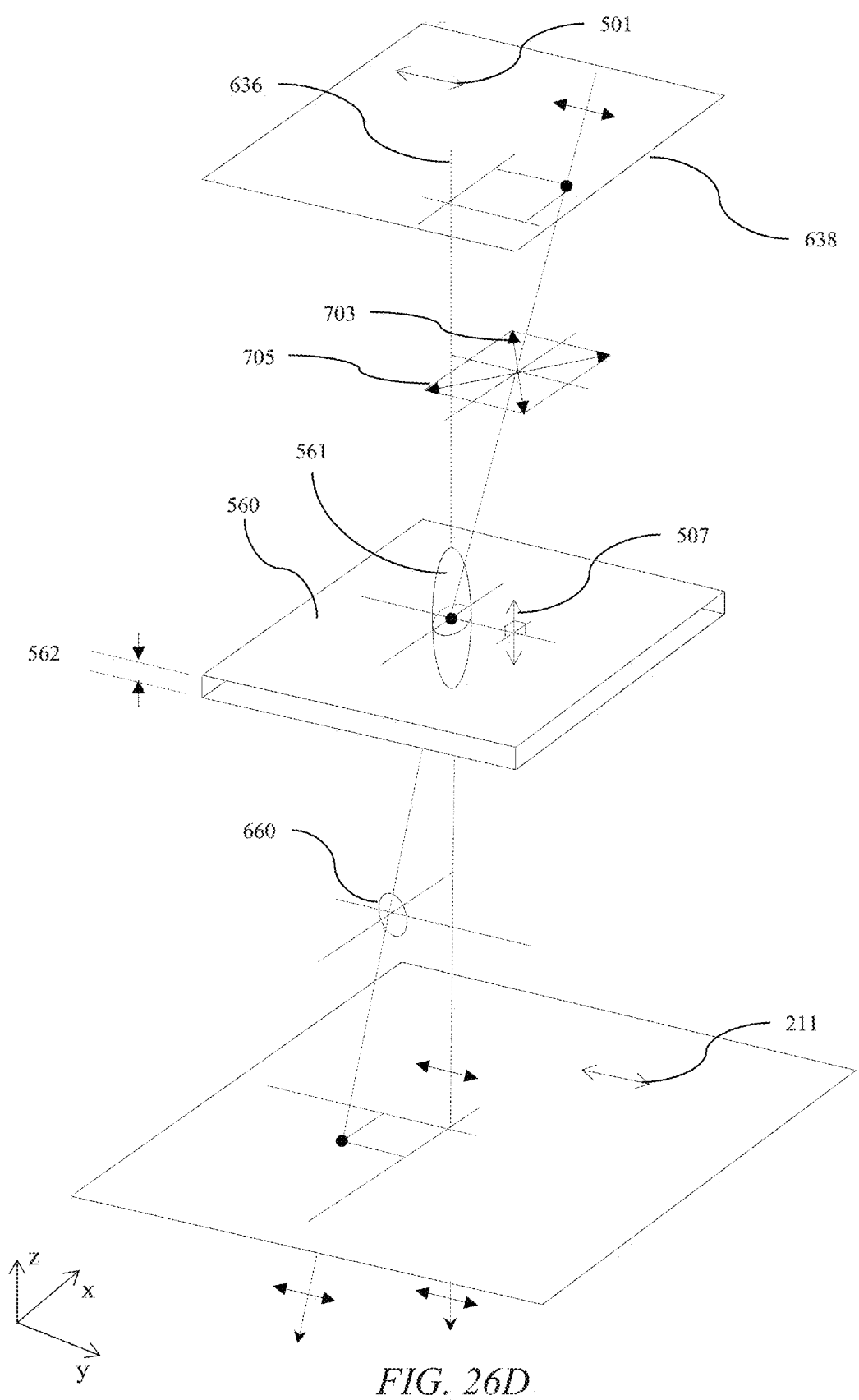
FIG. 26D is a schematic diagram illustrating in perspective view illumination of a C-plate layer by off-axis polarised light with a positive elevation and positive lateral angle.

FIG. 26D is a schematic diagram illustrating in perspective view illumination of a C-plate layer by off-axis polarised light with a positive elevation and positive lateral angle. In a similar manner to FIG. 26C, the polarisation component 704 is resolved into eigenstates 703, 705 that undergo a net phase difference, and elliptical polarisation component 660 is provided, which after transmission through the polariser reduces the luminance of the respective off-axis ray.

In comparison to single plates, advantageously the crossed A-plates may each comprise single stretched materials that are cheaper than C-plates. Further achromatic compensation can be provided more readily.

Figure 27A:
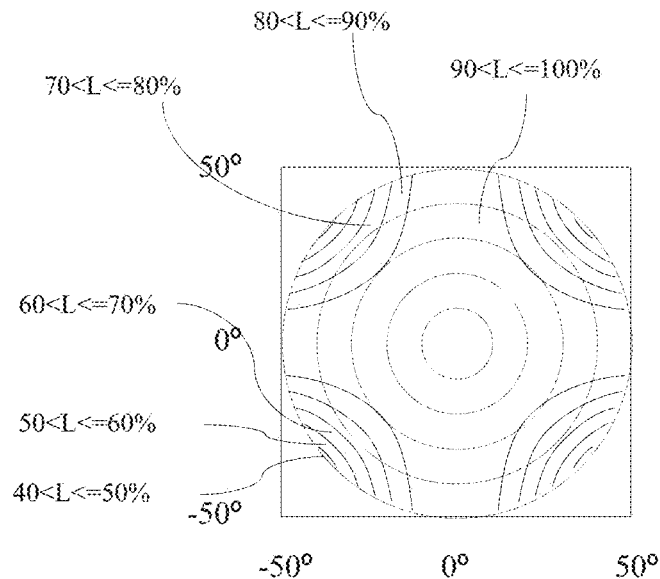
FIG. 27A is a schematic luminance field-of-view graph illustrating variation in transmitted luminance of the optical stack of FIG. 24B wherein the retarder layers are half waveplates.

FIG. 27A is a schematic luminance field-of-view graph illustrating variation in transmitted luminance of the optical stack of FIG. 24B wherein the retarder layers are half waveplates. The luminance field-of-view profile is thus similar to that of FIG. 21B comprising crossed A-plates.

In the present disclosure, luminance field-of-view graphs represent the polar variation of transmitted luminance with viewing angle.

Figure 27B:
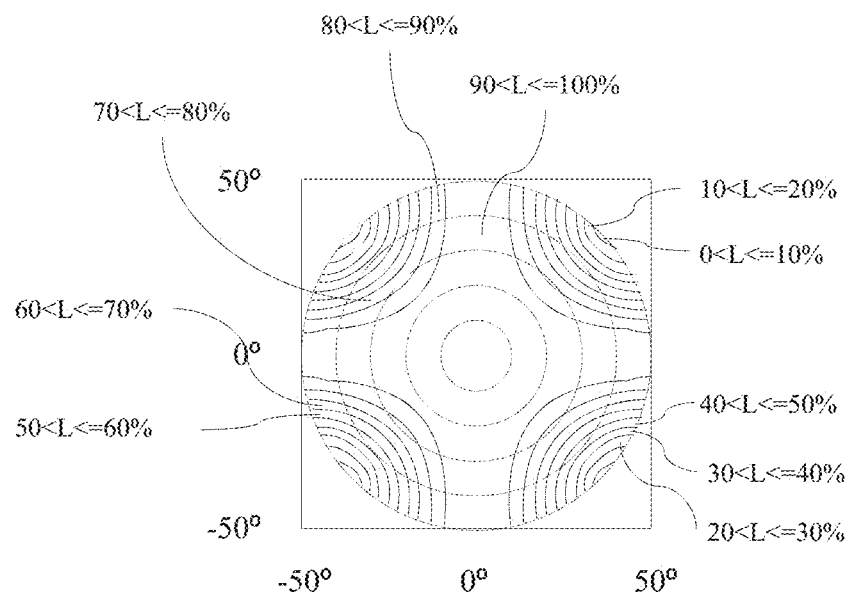
FIG. 27B is a schematic luminance field-of-view graph illustrating variation in transmitted luminance of the optical stack of FIG. 24B wherein the retarder layers are full waveplates.

FIG. 27B is a schematic luminance field-of-view graph illustrating variation in transmitted luminance of the optical stack of FIG. 24B wherein the retarder layers are full waveplates. Increased luminance reduction may be provided in viewing quadrants for observer angular locations 226, 227 in FIG. 17A for example.

Advantageously enhanced image privacy against snoopers in viewing quadrants may be provided without reduction in head-on luminance in comparison to arrangements with no C-plate between a parallel input or output polariser and an additional polariser. Further the thickness and complexity of optical stack may be reduced, reducing cost.

It would be desirable to provide yet further reduction of chromaticity variation with respect to viewing angle. An illustrative example simulation of a high retardance C-plate will now be described, comprising a 650 nm retardance for a 500 nm nominal wavelength.

Figure 28A:
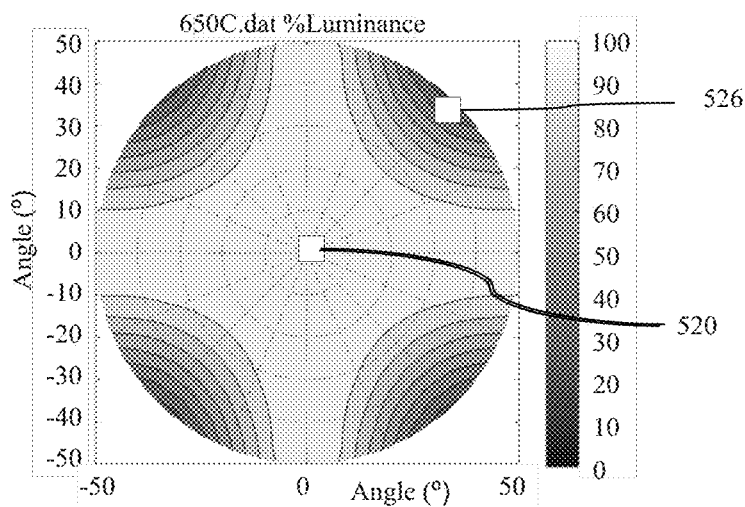
FIG. 28A is a schematic luminance field-of-view graph illustrating variation in transmitted luminance of the optical stack of FIG. 24B comprising high retardance layers.

FIG. 28A is a schematic luminance field-of-view graph illustrating variation in transmitted luminance of the optical stack of FIG. 24B comprising high retardance layers.

Figure 28B:
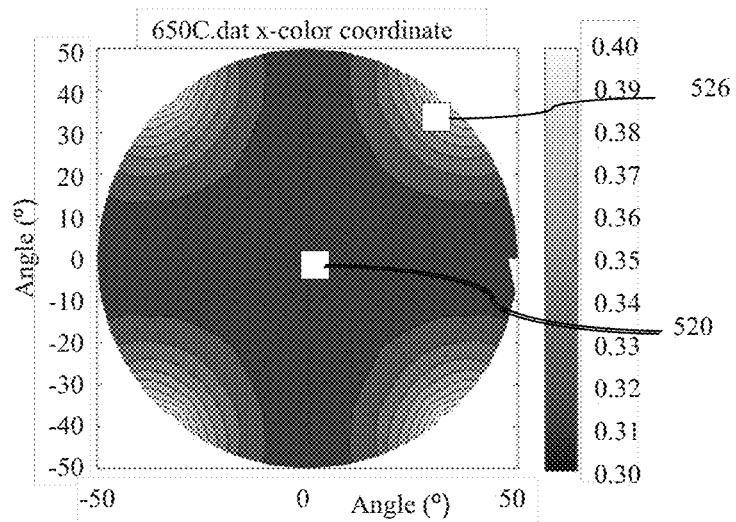
FIG. 28B and FIG. 28C are schematic luminance field-of-view graphs illustrating variation in chromatic coordinates of the optical stack of FIG. 24B comprising high retardance layers.
Figure 28C:
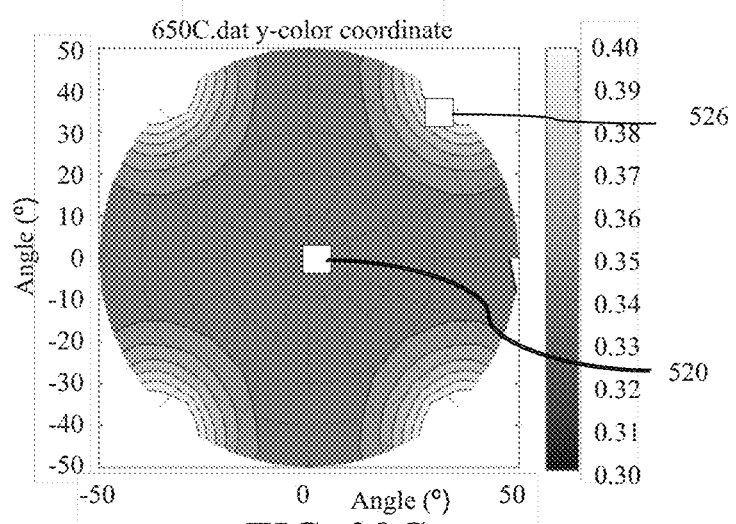

FIGS. 28B-C are schematic luminance field-of-view graphs illustrating variation in CIE 1931 x and y chromatic coordinates respectively of the optical stack of FIG. 24B comprising high retardance layers. Undesirably a chromatic shift between viewing locations 520 and 526 of approximately 0.07 in x-coordinate and 0.06 in y-coordinate may be provided for a luminance drop of 70% from the peak luminance. Such a chromatic color shift in viewing quadrants may be clearly visible and undesirable.

Figure 29A:
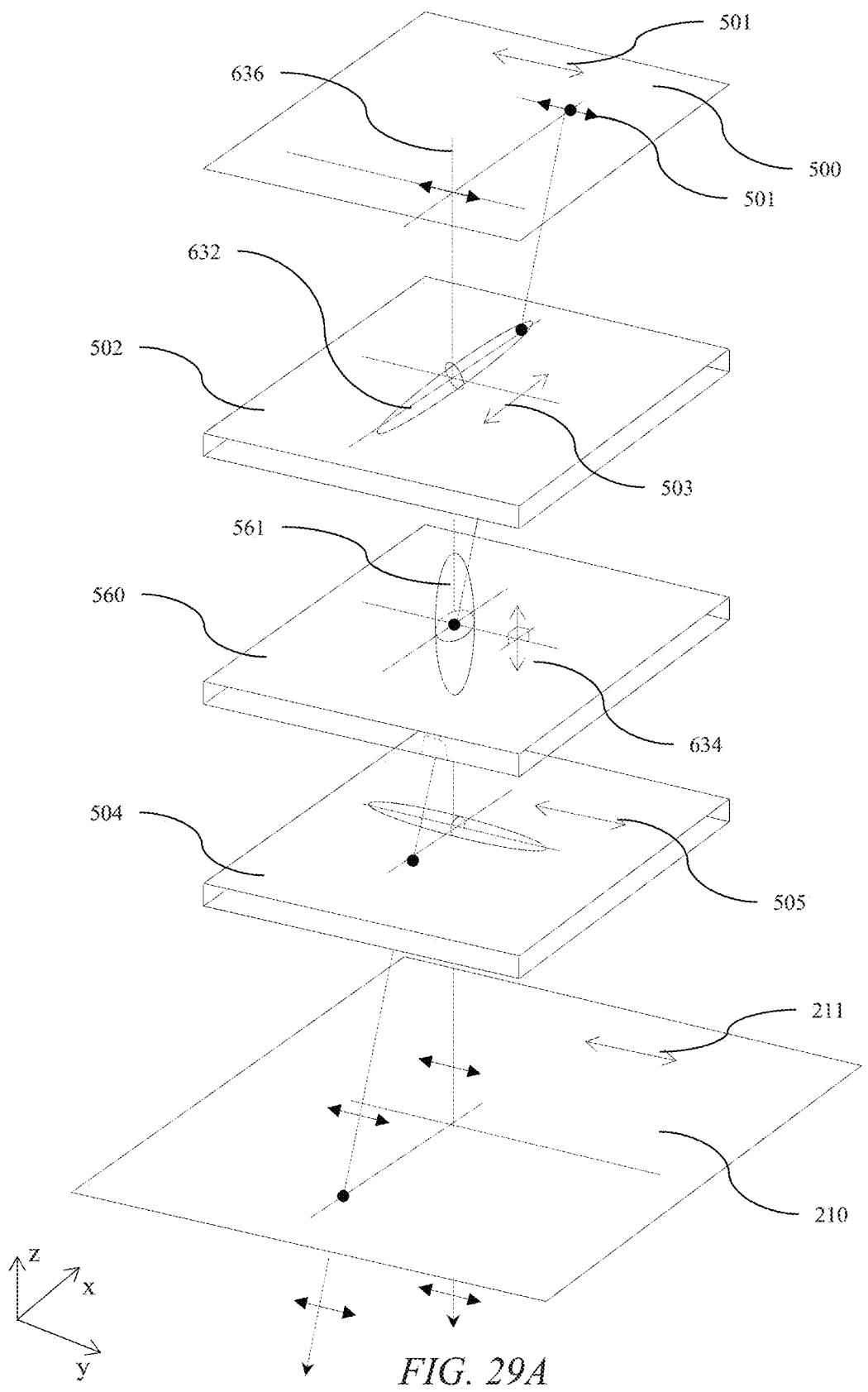
FIG. 29A is a schematic diagram illustrating in perspective view illumination of a C-plate layer and crossed A-plate layers by off-axis polarised light with a positive elevation.
Figure 29B:
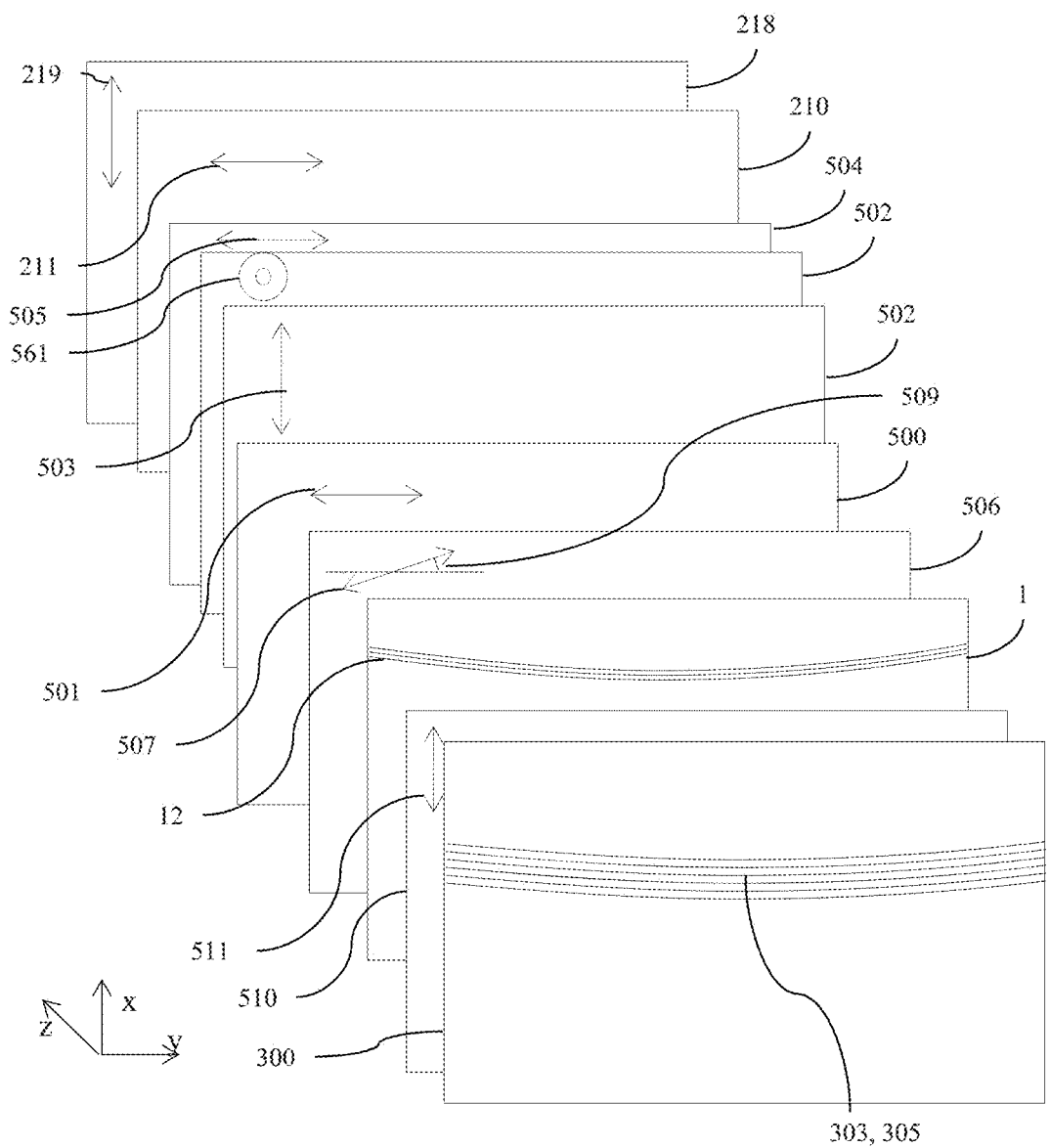
FIG. 29B is a schematic diagram illustrating in perspective front view orientation of retarder and polariser axes for the optical stack of FIG. 29A.

FIG. 29A is a schematic diagram illustrating in perspective view illumination of a C-plate layer and crossed A-plate layers by off-axis polarised light with a positive elevation and FIG. 29B is a schematic diagram illustrating in perspective front view orientation of retarder and polariser axes for the optical stack of FIG. 29A. In comparison to the embodiment of FIG. 16B, the A-plate 502 may be aligned orthogonal to the polariser 500 and the A-plate 504 may be aligned parallel to the polariser 504. Thus the at least one retarder further comprises a pair of retarders 502, 504 which have slow axes in the plane (x-y plane) of the retarders 502, 504 that are crossed. The pair of retarders 502, 504 have slow axes 503, 505 that each extend at 0° and 90°, respectively, with respect to an electric vector transmission direction 211 that is parallel to the electric vector transmission of the input polariser 210 in the case that the additional polariser 500 is arranged on the input side of the input polariser or is parallel to the direction 219 of the electric vector transmission of the output polariser 218 in the case that the additional polariser 500 is arranged on the output side of the input polariser 210.

Figure 30A:
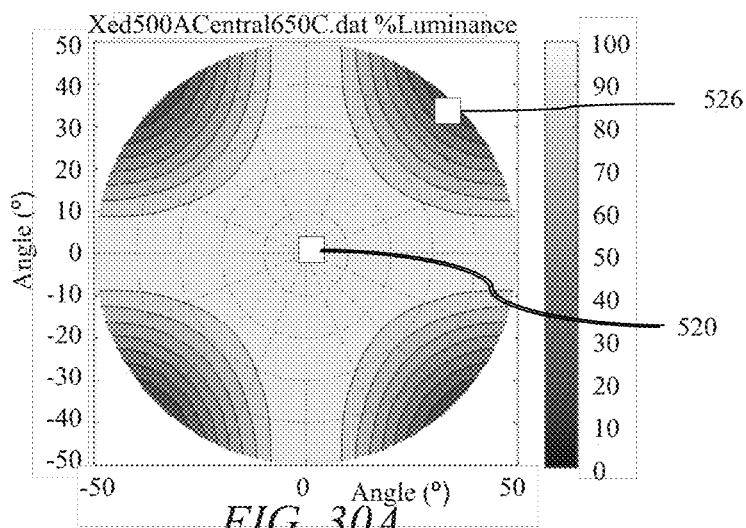
FIG. 30A is a schematic luminance field-of-view graph illustrating variation in transmitted luminance of the optical stack of FIG. 29B comprising high retardance layers.
Figure 30B:
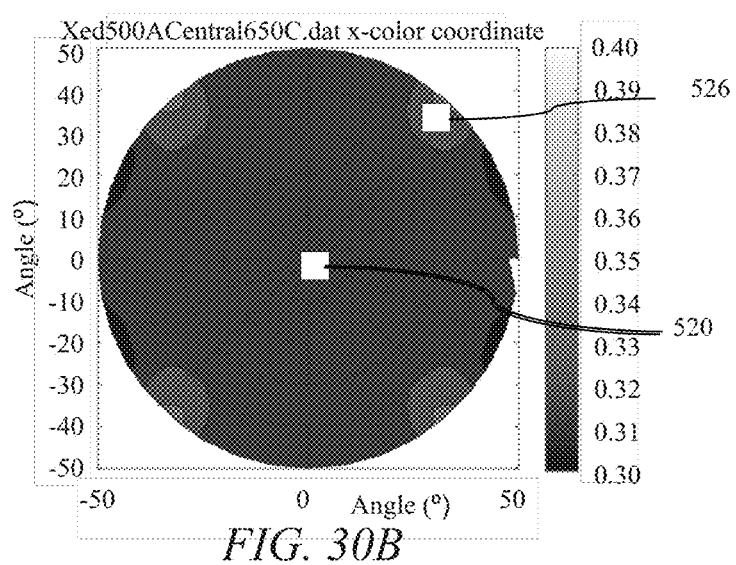
FIG. 30B and FIG. 30C are schematic luminance field-of-view graphs illustrating variation in chromatic coordinates of the optical stack of FIG. 29B comprising high retardance layers.
Figure 30C:
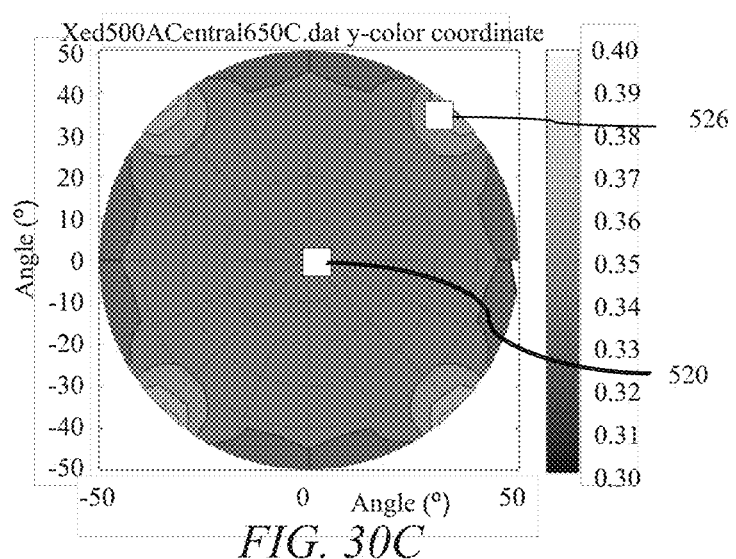

FIG. 30A is a schematic luminance field-of-view graph illustrating variation in transmitted luminance of the optical stack of FIG. 29B comprising high retardance layers and FIGS. 30B-C are schematic luminance field-of-view graphs illustrating variation in 1931 CIE x chromatic coordinates and y chromaticity coordinates of the optical stack of FIG. 29B comprising high retardance layers.

A chromatic shift between viewing locations 520 and 526 of approximately 0.01 in x-coordinate and 0.02 in y-coordinate may be provided for a luminance drop of 70% from the peak luminance. Advantageously the chromatic shift for viewing location 526 may be substantially reduced in comparison to the arrangement of FIGS. 28B-C.

The present embodiments may further be arranged with switchable directional displays other than those comprising imaging waveguides 1 with a reflective end 4.

Figure 31:
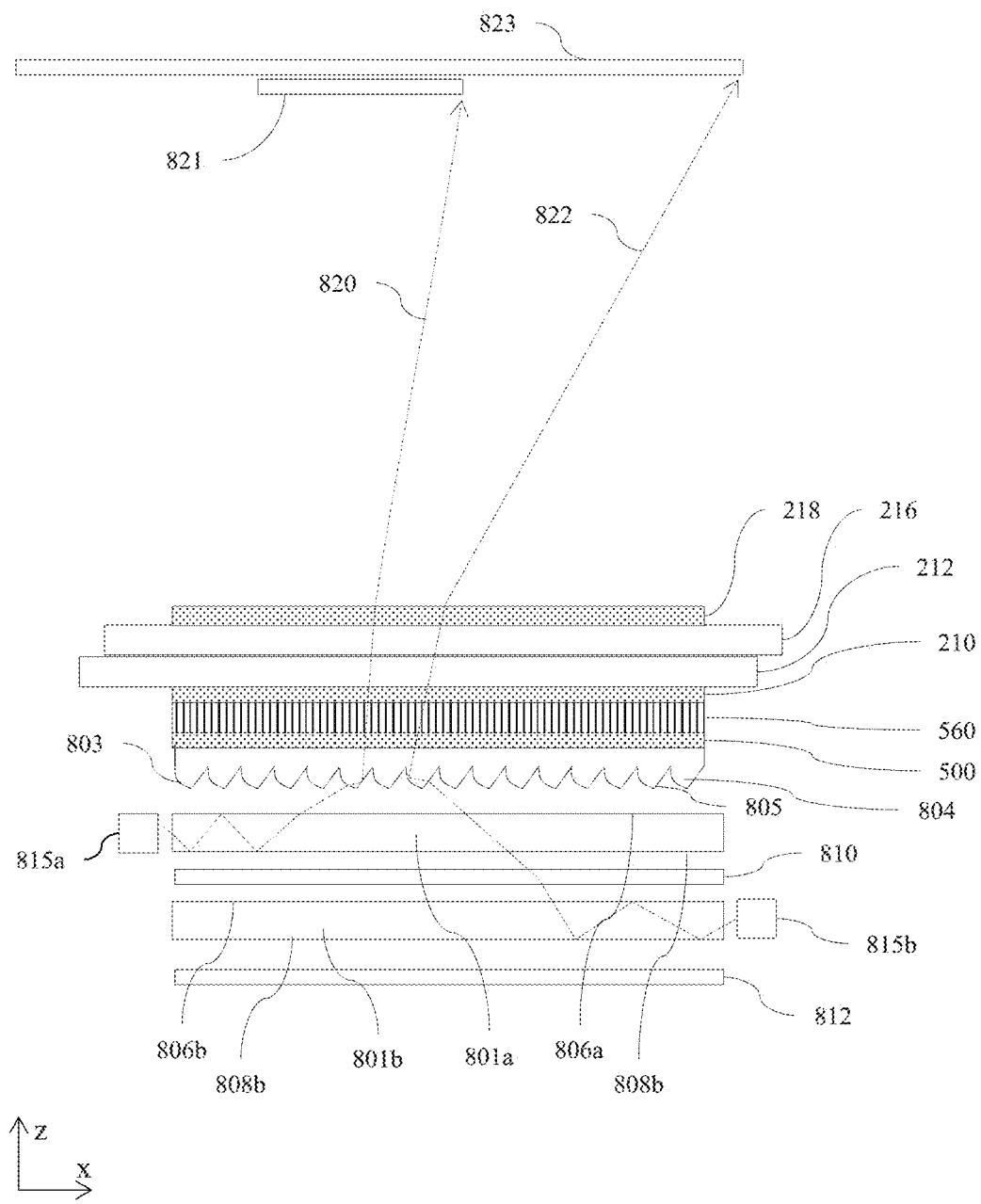
FIG. 31 is a schematic diagram illustrating in side view a directional display comprising a first directional waveguide, a second wide angle waveguide and a C-plate arranged on the rear of a spatial light modulator.

FIG. 31 is a schematic diagram illustrating in side view a directional display comprising a first directional waveguide 801a, a second wide angle waveguide 1b and a C-plate 560 arranged between additional polariser 500 and input polariser 210 arranged on the rear of a spatial light modulator 48. Alternatively the additional polariser and retarder layers may be arranged on the front of the spatial light modulator as described elsewhere herein.

Light sources 815a may be arranged along at least one edge of waveguide 801a and light sources 815b may be arranged along at least one edge of waveguide 801b.

The switchable directional display may further comprise rear scattering reflector 812, intermediate diffuser layer 810 and a prismatic input layer 804 comprising first and second input facets 803, 805.

In operation in a narrow angle mode, light sources 815a may be arranged to provide light rays 820 into first waveguide 801a. Upper surface 806a and lower surface 808a of the waveguide 801a may be provided with scattering microstructures that are arranged to extract light from waveguide 801a in a substantially grazing direction, that is close to parallel to the surface 806a. Light rays 820 are incident on surface 803 of the prismatic input layer 804 and are directed by total internal reflection at surface 805 to be incident on the spatial light modulator in directions that have a narrow cone angle to provide viewing window 821 of a first narrow width.

In operation in a wide angle mode, light sources 815b may be arranged to provide light rays 822 into second waveguide 801b. Upper surface 806b and lower surface 808b of the waveguide 801b may be provided with scattering microstructures that are arranged to extract light from waveguide 801b with a cone angle with a nominal angle that is close to parallel to the surface 806b. Light rays 822 are incident on surface 805 of the prismatic input layer 804 and are directed by total internal reflection at surface 803 to be incident on the spatial light modulator in directions that have a wide cone angle. Further diffusion for reflected light rays at the scattering reflector 812 and diffuser 810 may be arranged to increase the output cone angle to provide a second viewing window 823 of greater width than the first viewing window 821.

Further, both light sources 815a, 815b may be illuminated in wide angle mode to give some control of output directionality.

In this manner a different type of directional display in comparison to that of FIG. 12A for example may be provided. More generally there is provided a directional backlight 101 that is switchable between modes in which the output light is output into viewing windows 821, 823 of differing width.

Such an arrangement uses scattering to provide narrow and wide directional light cones for rays 820, 822 respectively. Such scattering may provide some high angle light in narrow angle mode of operation and degrade privacy performance.

The present embodiments provide additional reduction of luminance in viewing cone angles that may be observed by snoopers. Advantageously, privacy performance may be enhanced as described elsewhere herein.

Figure 32A:
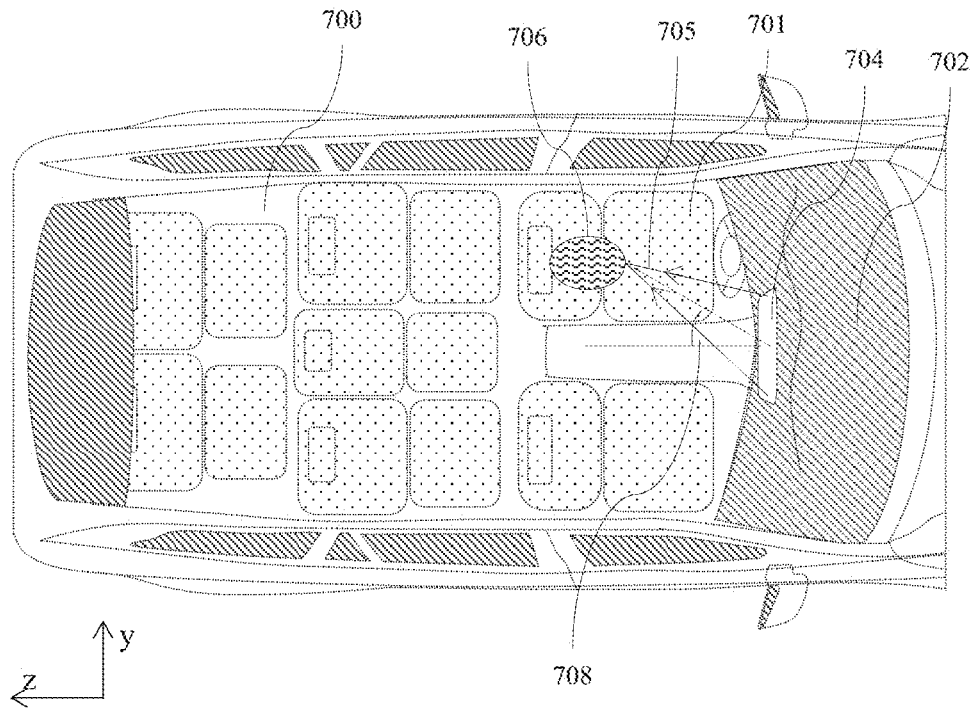
FIG. 32A is a schematic diagram illustrating in top view an automotive cabin and illumination of a driver from a centrally mounted display.
Figure 32B:
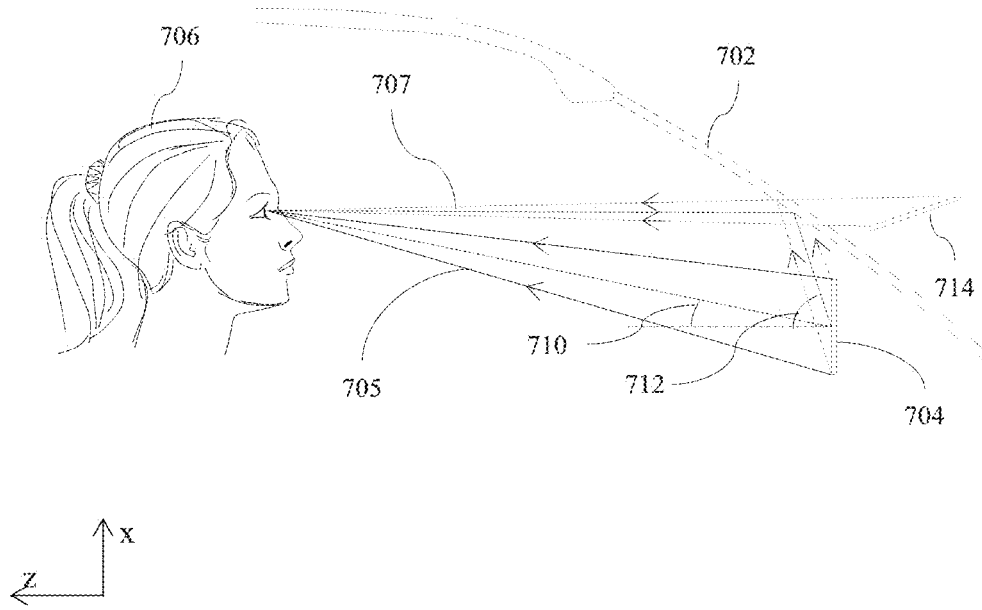
FIG. 32B is a schematic diagram illustrating in side view an automotive cabin and illumination of a driver from a centrally mounted display.

FIG. 32A is a schematic diagram illustrating in top view an automotive cabin 700 and illumination of a driver 706 from a centrally mounted display device 704 and FIG. 32B is a schematic diagram illustrating in side view an automotive cabin 700 and illumination of a driver 706 from a centrally mounted display 704, wherein the display device is arranged in a vehicle and is arranged beneath a window 702 in the vehicle and is arranged in front of a seat 701 in the vehicle.

In the present disclosure viewing windows are different from transparent windows. Viewing windows refer to angular illumination cones of a display device at a desirable viewing distance. Transparent windows refer to physical transparent surfaces such as windscreens, windshields, side windows or other transparent surfaces and are typically made from glass, glass composites or other transparent materials.

The display device 704 may be alternatively arranged with respect to the driver at non-central regions, in either embodiment to provide off-axis illumination of light rays 705 from the center of the display 704 to driver 706 in the negative lateral angle direction, at lateral angle 708. In operation, light rays 705 are directed to the driver 706 and further light rays 707 are directed to the driver 706 by means of reflection at the windscreen 702, forming a virtual image 714. Image 714 may be distracting to the driver and reduction of its luminance would thus be desirable.

The lateral angle direction 708 of light output from the display 704 may be the same for light rays 705, 707, however the respective elevation directions 710, 712 are different.

Figure 32C:
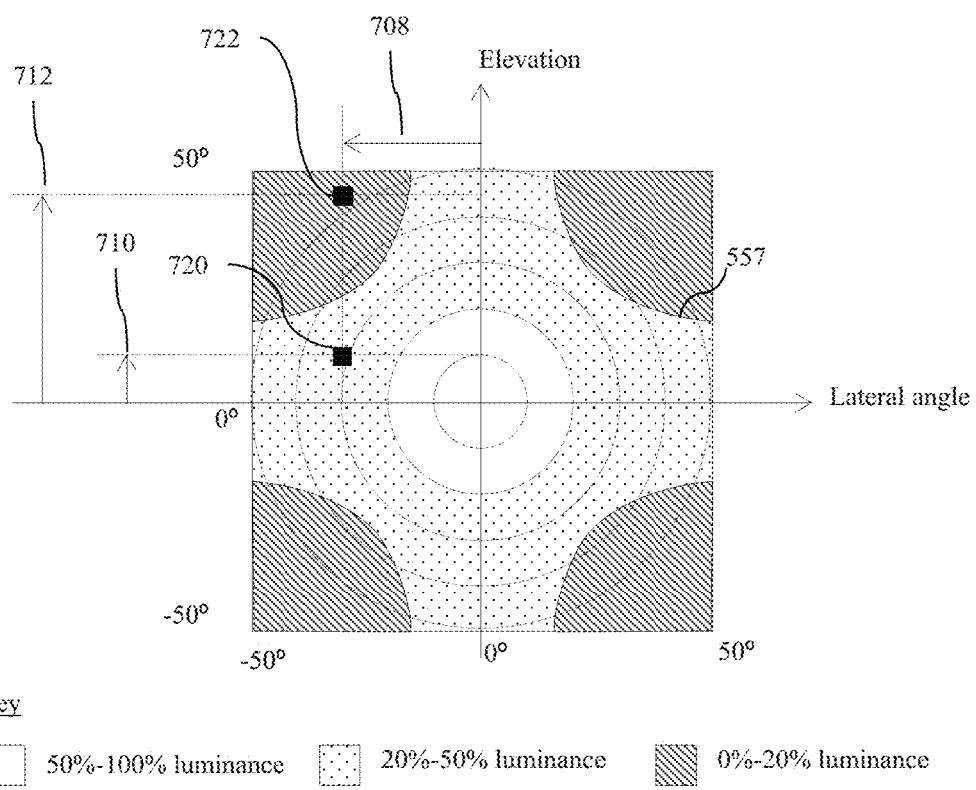
FIG. 32C is a schematic luminance field-of-view graph illustrating luminance of display and windscreen reflection in an automotive.

FIG. 32C is a schematic luminance field-of-view graph illustrating luminance of display and windscreen reflection in an automotive cabin 700.

In an illustrative example, the lateral angle 708 for both light rays 705, 707 may be −30 degrees, whereas the respective elevation angles may be 10 degrees and 45 degrees. Thus polar location 720, 722 for the directly viewed display 704 and for the virtual image 714 of the display 704 are in different polar locations. The luminance roll-off provided by locus 557 of the polarisation control arrangements of the present embodiments achieve substantial reduction of luminance of the virtual image 714 that is reflected from the windscreen in comparison to the directly viewed light. Further the Fresnel reflectivity of the light rays 707 from the windscreen 702 provide a substantially lower luminance of the virtual image 714 of the display 704.

Advantageously windscreen reflections may be substantially reduced for the viewing direction of the driver by means of the polariser arrangements of the present embodiments.

It would be desirable to provide reduced off-axis luminance and reduced visibility of off-axis non-uniformities in the lateral direction to achieve reduced visibility of user image content for a snooper.

Figure 33A:
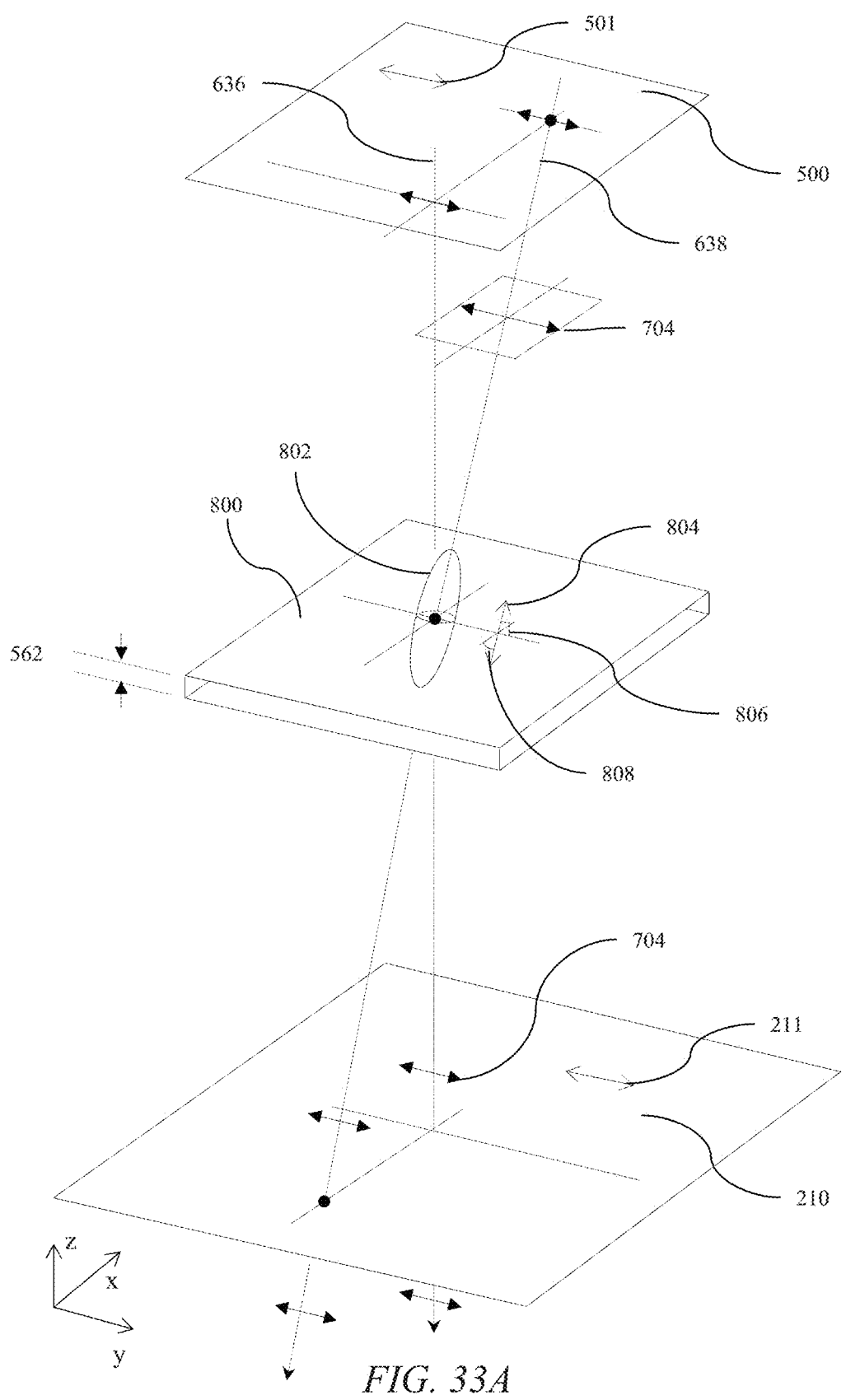
FIG. 33A is a schematic diagram illustrating in perspective view illumination of an O-plate layer by off-axis polarised light with a positive elevation.

FIG. 33A is a schematic diagram illustrating in perspective view illumination of an O-plate layer 800 by off-axis polarised light ray 638 with a positive elevation. By way of comparison with FIG. 26A, O-plate retarder layer 800 comprises a birefringent molecule 802 that has a slow axis 804 that is tilted about the y-axis with inclination 808. The molecule 802 may have angle 806 to the x-z plane that is substantially 90 degrees. Thus an O-plate may be considered as a tilted C-plate. The optical properties of the O-plate retarder 800 between parallel polarisers 500, 210 will be described in further detail below.

Figure 33B:
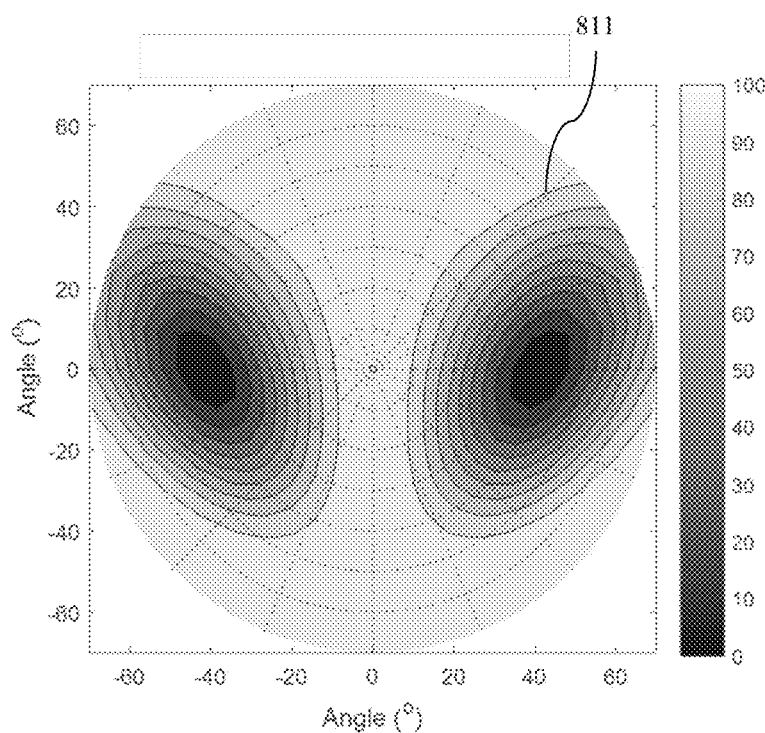
FIG. 33B is a schematic luminance field-of-view graph illustrating variation in transmitted luminance of the O-plate arranged between parallel polarisers of FIG. 33A.

FIG. 33B is a schematic luminance field-of-view graph illustrating an example of the variation in transmitted luminance of an O-plate arranged between parallel polarisers. Luminance field-of-view contours 811 representing 10% increment iso-luminance are thus provided so that the luminance may vary in the lateral direction, and may be provided with high transmittance in the zero lateral angle direction.

Figure 33C:
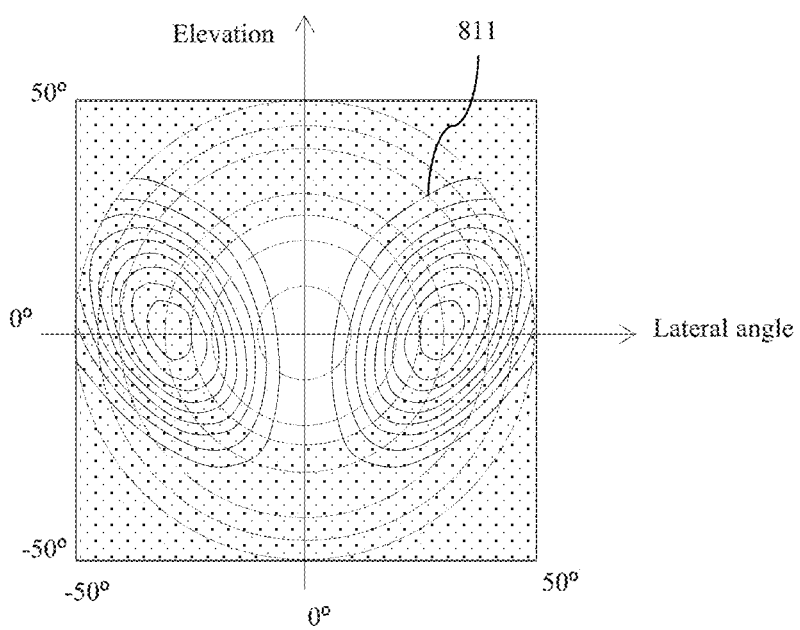
FIG. 33C is a schematic luminance field-of-view graph illustrating variation in transmitted luminance of a wide angle display further comprising the O-plate arranged between parallel polarisers of FIG. 33A.

FIG. 33C is a schematic luminance field-of-view graph illustrating variation in transmitted luminance of a wide angle display further comprising the O-plate arranged between parallel polarisers of FIG. 33A, device luminance being the multiplication of directional backlight 101 luminance field-of-view distribution and retarder luminance field-of-view distribution.

Thus the contours 811 are overlaid on the wide angle profile of FIG. 14A. The luminance profile of the display is thus provided by the multiplication of the luminance profile of FIG. 33B and the luminance profile of FIG. 14A. The resultant luminance is not illustrated in FIG. 33C.

Figure 33D:
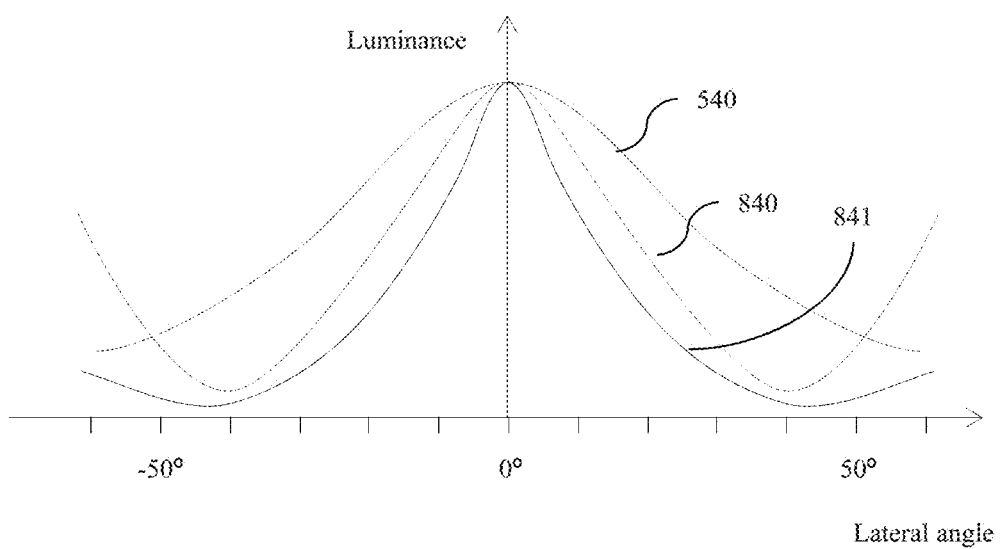
FIG. 33D is a schematic graph illustrating variation of luminance with viewing angle of a wide angle display further comprising the O-plate arranged between parallel polarisers of FIG. 33A.

FIG. 33D is a schematic graph illustrating variation of luminance with viewing angle of a wide angle display further comprising the O-plate arranged between parallel polarisers of FIG. 33A. A typical wide angle display luminance profile 540 is modified by the lateral angular profile 841 of the O-plate retarder 800 and polariser 210, 500 arrangement of FIG. 33A.

The viewing properties of a display comprising a typical wide angle display comprising for example an LCD and conventional scattering wide angle non-directional backlight, together with the O-plate arrangement of FIG. 33A will now be described.

At typical snooper viewing angles, such as 45 degrees off-axis in the lateral direction the wide angle backlight may have a luminance of for example 20% of peak head-on luminance. An O-plate may have a luminance of 10% or less, achieving a combined luminance of less than 2%. However at wider viewing angles, such as 60 degrees, the backlight may have a luminance of 10% but the transmission of the O-plate may be 50%, providing a luminance of 5% to a snooper. Such a value provides high visibility of the private image to the snooper.

It would be desirable to provide a private image that has less than 2% and more preferably less than 1% over a wide range of lateral snooper viewing directions.

Figure 34:
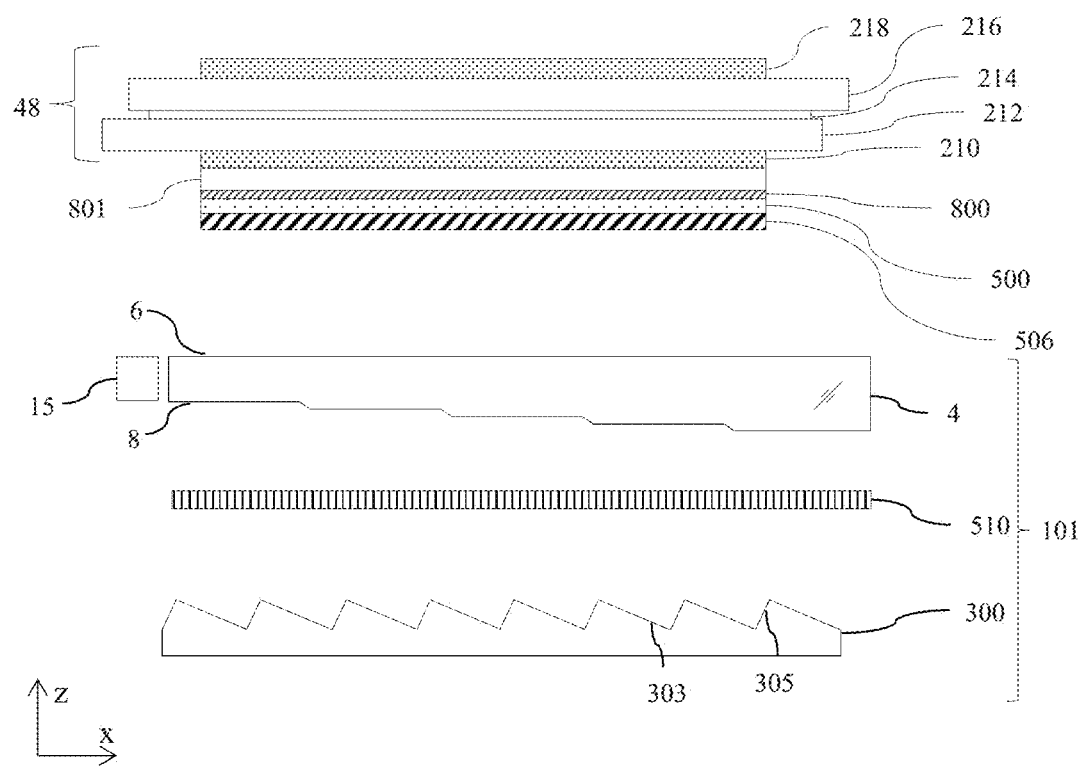
FIG. 34 is a schematic diagram illustrating in side view a directional display comprising a directional waveguide and an O-plate arranged between a spatial light modulator and a directional backlight.
Figure 35:
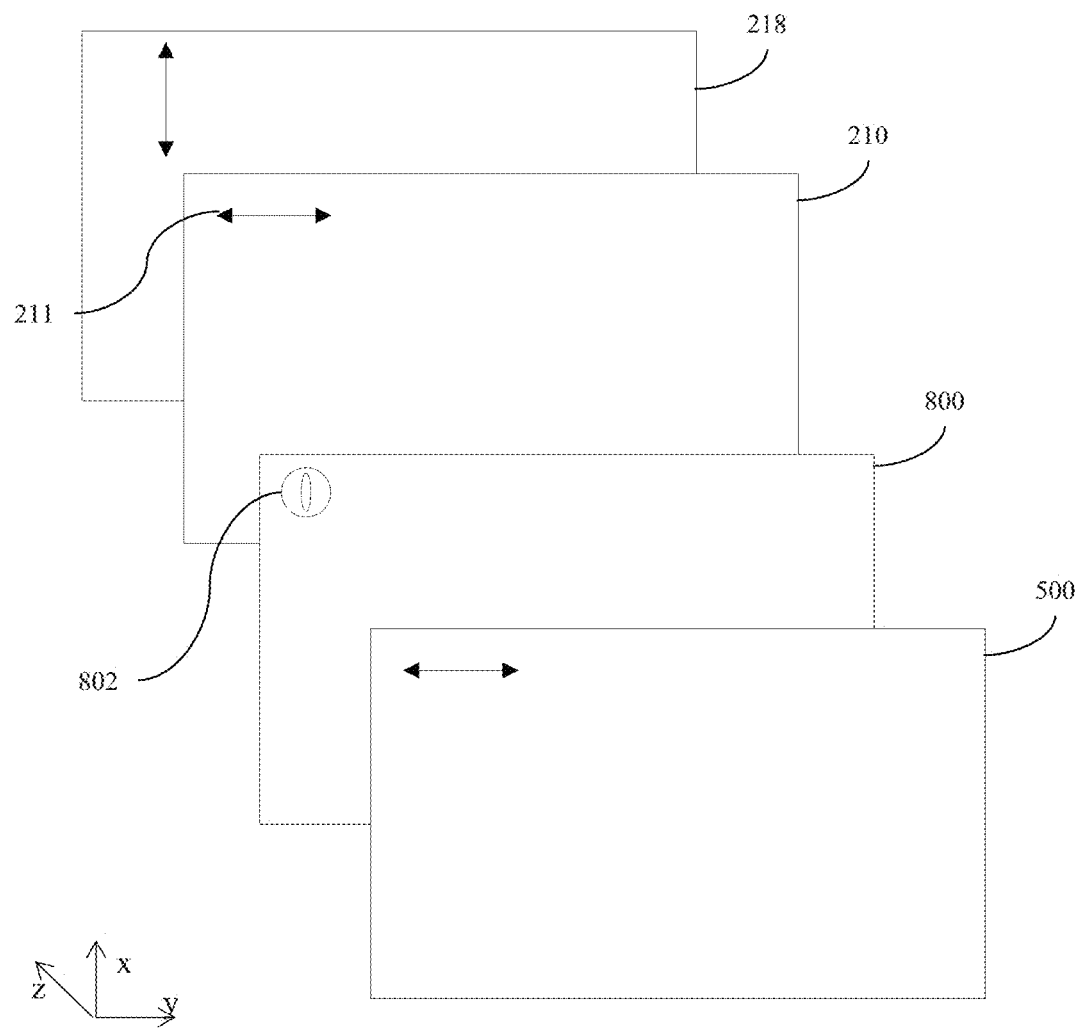
FIG. 35 is a schematic diagram illustrating in perspective front view orientation of some of the retarder and polariser axes for the optical stack of FIG. 34.

FIG. 34 is a schematic diagram illustrating in side view a directional display comprising a directional waveguide and an O-plate arranged between a spatial light modulator and a directional backlight 101; and FIG. 35 is a schematic diagram illustrating in perspective front view orientation of some of the retarder and polariser axes for the optical stack of FIG. 34.

Figure 36A:
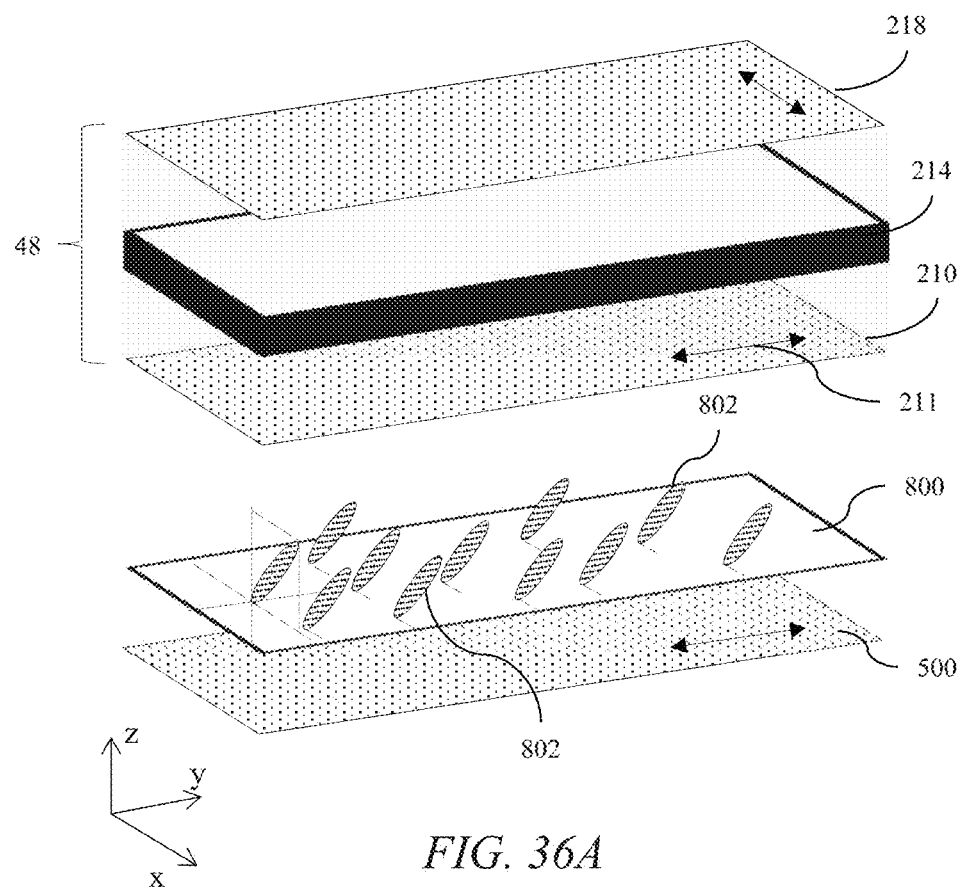
FIG. 36A is a schematic diagram illustrating in perspective side view orientation of some of the retarder and polariser axes for the optical stack of FIG. 34.
Figure 36B:
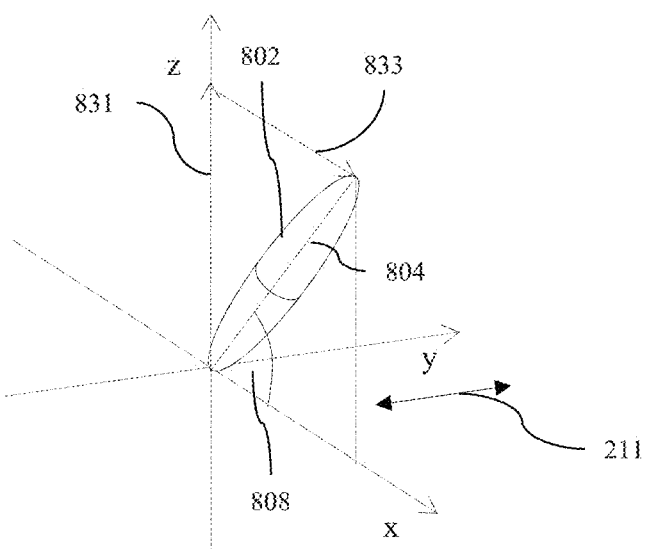
FIG. 36B is a schematic diagram illustrating in perspective side view orientation of birefringent molecules in the arrangement of FIG. 36A.

The arrangement of the O-plate and display components is further described with reference to FIG. 36A which is a schematic diagram illustrating in perspective side view orientation of some of the retarder and polariser axes for the optical stack of FIG. 34; and FIG. 36B is a schematic diagram illustrating in perspective side view orientation of birefringent molecules in the arrangement of FIG. 36A, further illustrating inclined molecules 802 of the O-plate arranged in the retarder layer 800.

The retarder 800 comprises an O-plate. Thus the at least one retarder of the present embodiments comprises a retarder 800 having a slow axis 804 orientation with a component 831 perpendicular to the plane of the retarder 800, and at least one component in the plane of the retarder 800. Further, in the present embodiment the at least one retarder comprises a retarder 800 having a slow axis 804 orientation with a component 531 perpendicular to the plane of the retarder 800, a component 833 that is orthogonal in the plane of the retarder 800 to the electric vector transmission direction 211 of the input polariser 210 and substantially no component that is parallel in the plane of the retarder 800 to the electric vector transmission direction of the input polariser 210.

O-plate retarder layer 800 may be formed by example by a cured reactive mesogen material that has been aligned on an aligned substrate prior to cross linking, for by example by exposure to UV light. Examples of reactive mesogen materials are Licriview™ materials by Merck. As illustrated in the C-plate and A-plate retarder embodiments herein, the retarder 800 may be arranged between a reflective polariser 500 that is aligned with an absorbing polariser 210. Advantageously thickness may be reduced and transmission increased. The O-plate may further be arranged on a transparent support substrate 801 to achieve convenient alignment substrate and for handling. Alternatively the O-plate may be formed directly on a polariser 210 or reflective polariser 500, advantageously achieving reduced thickness.

Figure 36C:
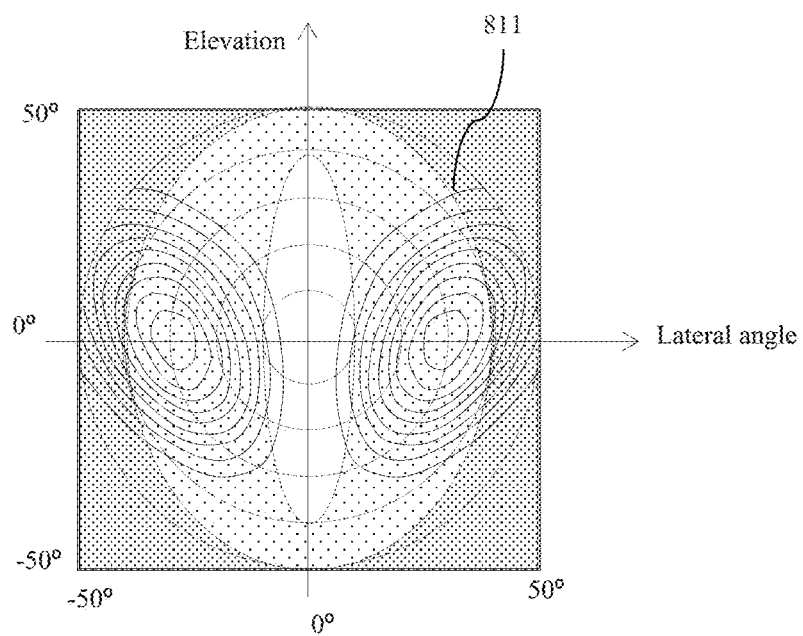
FIG. 36C is a schematic luminance field-of-view graph illustrating variation in transmitted luminance of the optical stack of FIG. 34.
Figure 36D:
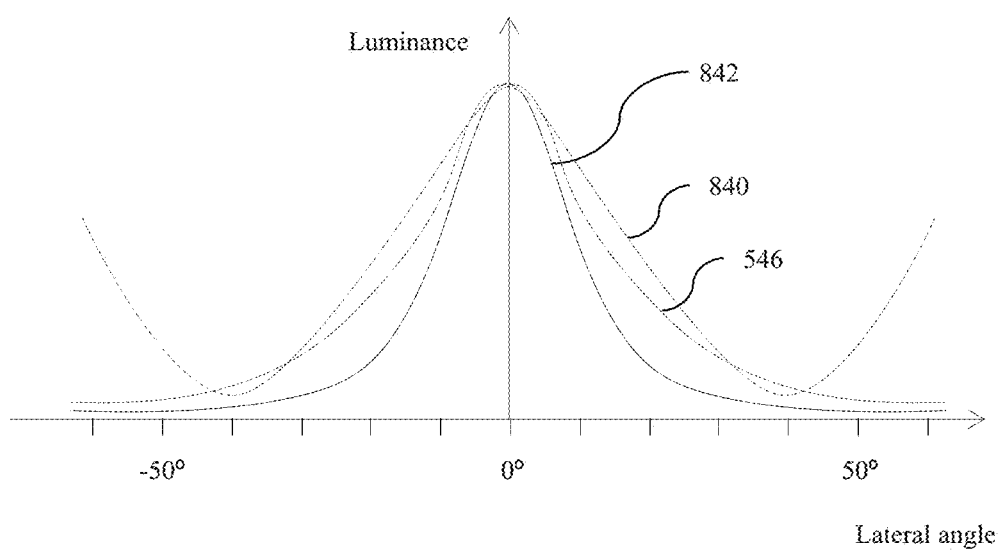
FIG. 36D is a schematic graph illustrating variation of luminance with viewing angle of a privacy mode of operation of a directional display comprising an O-plate.

FIG. 36C is a schematic luminance field-of-view graph illustrating variation in transmitted luminance of the optical stack of FIG. 34, device luminance being the multiplication of underlying directional backlight 101 luminance field-of-view distribution and retarder luminance field-of-view distribution; and FIG. 36D is a schematic graph illustrating variation of luminance with viewing angle of a privacy mode of operation of a directional display comprising an O-plate. By way of comparison with the non-directional display arrangement of FIG. 33D, angular profile 546 of the directional backlight 101 has substantially reduced luminance at high viewing angles, for example less than 2%. Further providing the O-plate retarder of the present embodiments may provide privacy levels that remain substantially less than 2% for a wide range of off-axis viewing locations.

A further illustrative embodiment will now be described.

Figure 36E:
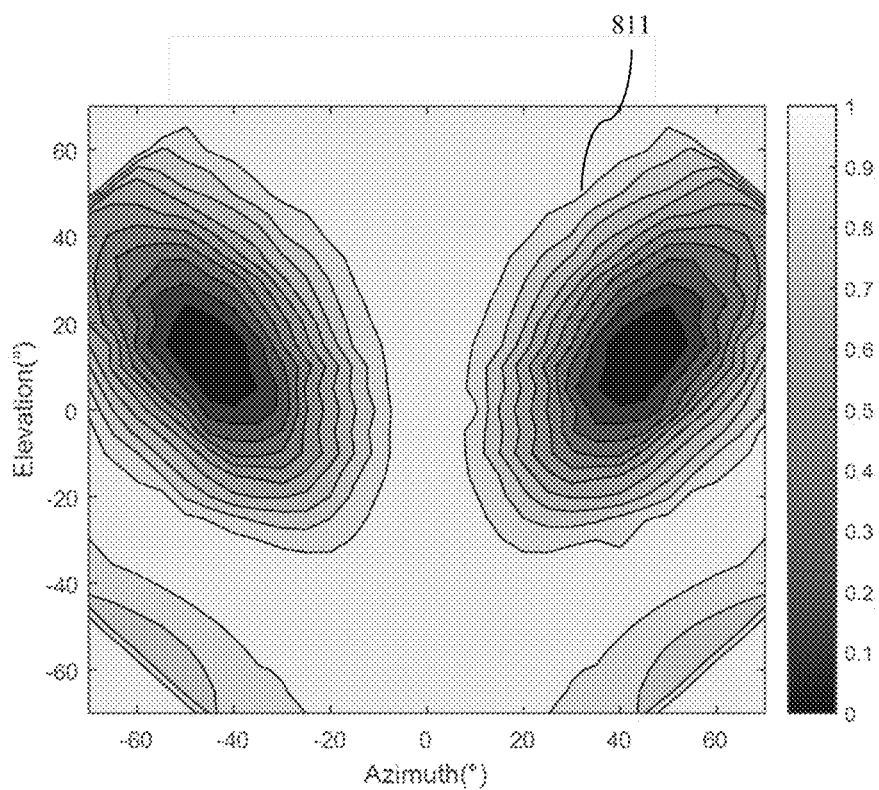
FIG. 36E is a schematic luminance field-of-view graph illustrating variation in transmitted luminance of an O-plate.
Figure 36F:
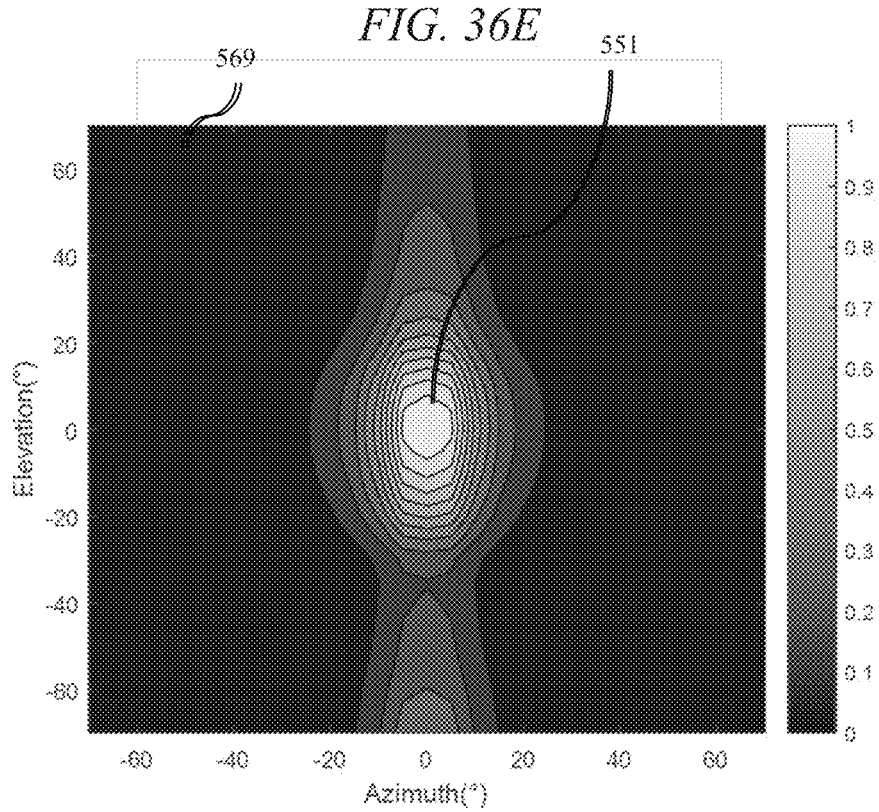
FIG. 36F is a schematic luminance field-of-view graph illustrating variation in transmitted luminance of a directional backlight.

FIG. 36E is a schematic luminance field-of-view graph illustrating variation in transmitted luminance of an O-plate 800; FIG. 36F is a schematic luminance field-of-view graph illustrating variation in transmitted luminance of a directional backlight 101.

Figure 36G:
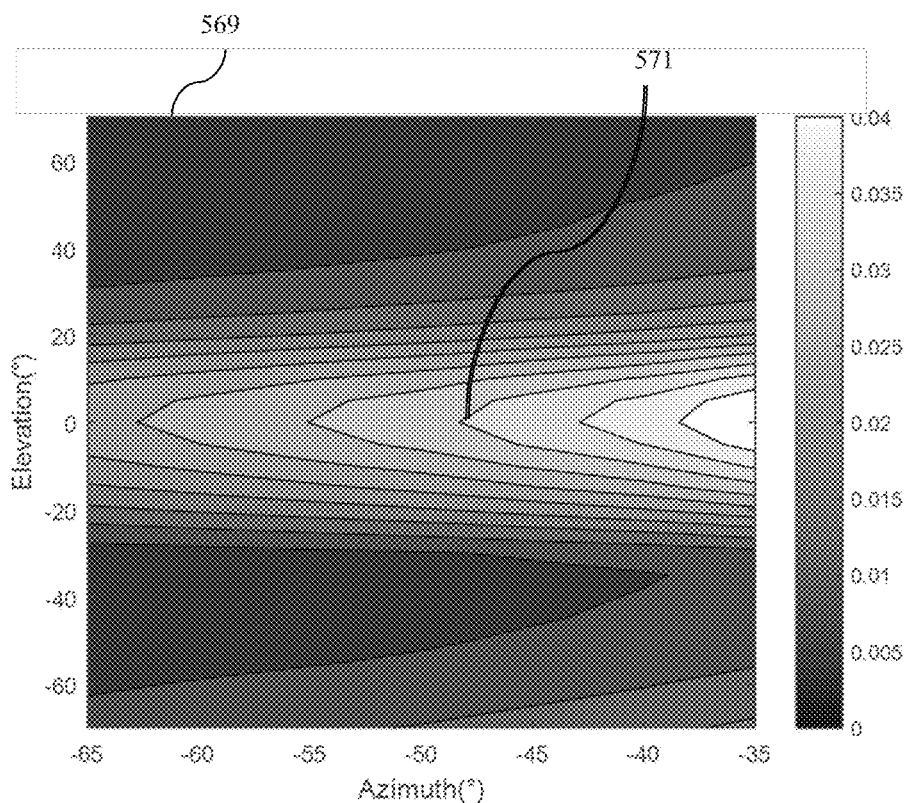
FIG. 36G is a schematic luminance field-of-view graph illustrating variation in transmitted luminance of a directional backlight of FIG. 34 in angular regions of privacy viewing.

In operation, the region of interest for off-axis privacy viewing is illustrated in FIG. 36G which is a schematic luminance field-of-view graph illustrating variation in transmitted luminance of a directional backlight 101 of FIG. 36F in angular regions 569 of privacy viewing.

Figure 36H:
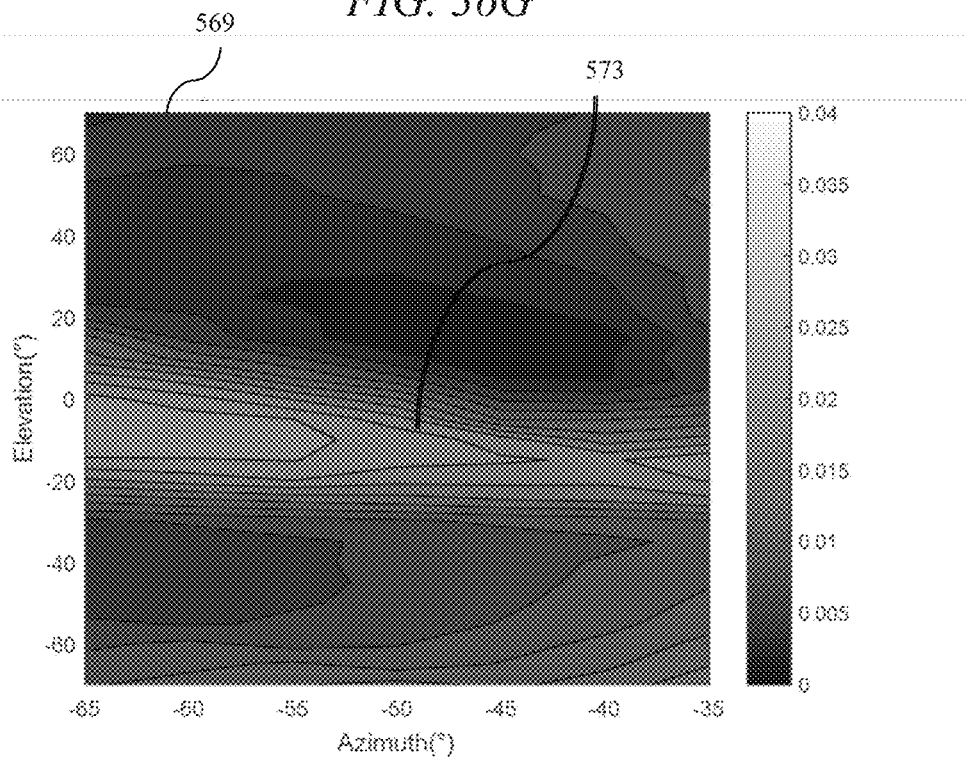
FIG. 36H is a schematic luminance field-of-view graph illustrating variation in transmitted luminance of the optical stack of FIG. 34 in angular regions of privacy viewing.

FIG. 36H is a schematic luminance field-of-view graph illustrating variation in transmitted luminance of the optical stack 101, 800 of FIG. 34 in the angular regions 569 for privacy viewing. Thus as illustrated in FIG. 36C, the luminance in the region of privacy viewing can be reduced. Advantageously, the above axis luminance for privacy viewing can be substantially reduced, that is the likely direction for snoopers.

Advantageously privacy levels are reduced. Further, the luminance of non-uniformities in the off-axis privacy image is reduced, achieving reduced visibility of said non-uniformities.

It may be desirable to provide reduction of luminance off-axis in a single quadrant of a display, for example to provide reduced light to a passenger or driver in an automotive application.

Figure 37A:
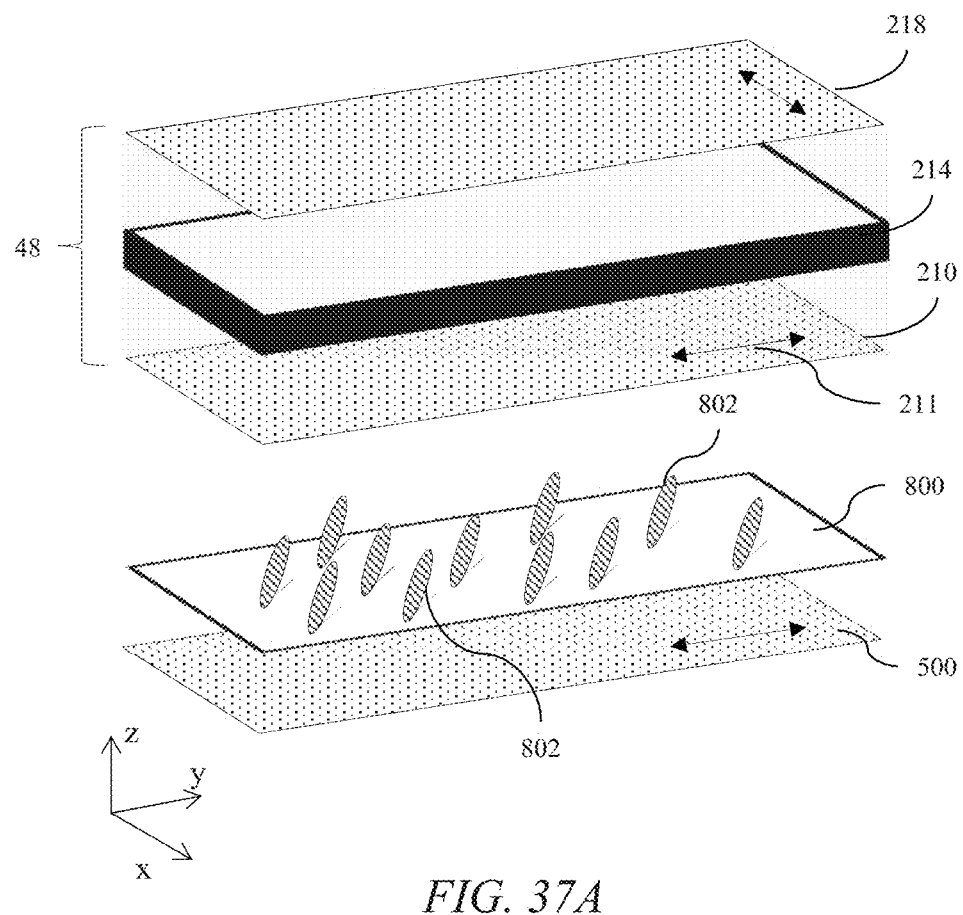
FIG. 37A is a schematic diagram illustrating in perspective side view orientation of some of the retarder and polariser axes for the optical stack of FIG. 34 wherein the birefringent molecules are arranged to provide control of luminance in a single viewing quadrant.

FIG. 37A is a schematic diagram illustrating in perspective side view orientation of some of the retarder 800 and polariser axes for the optical stack of FIG. 34 wherein the birefringent molecules 802 are arranged to provide control of luminance in a single upper viewing quadrant.

Figure 37B:
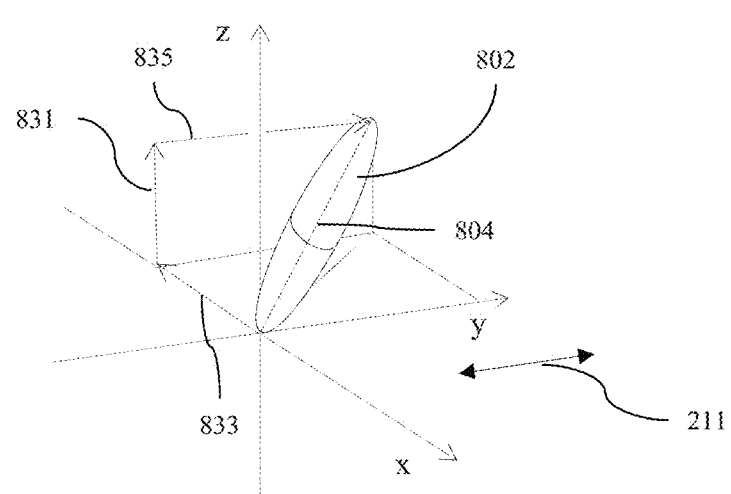
FIG. 37B is a schematic diagram illustrating in perspective side view orientation of birefringent molecules in the arrangement of FIG. 37A.

FIG. 37B is a schematic diagram illustrating in perspective side view orientation of birefringent molecules in the arrangement of FIG. 37A. The at least one retarder comprises a retarder 800 having a slow axis 804 orientation with a component 531 perpendicular to the plane of the retarder 800, a component 833 that is orthogonal in the plane of the retarder 800 to the electric vector transmission direction 211 of the input polariser 210 and a component 835 that is parallel in the plane of the retarder 800 to the electric vector transmission direction 211 of the input polariser 210.

Figure 37C:
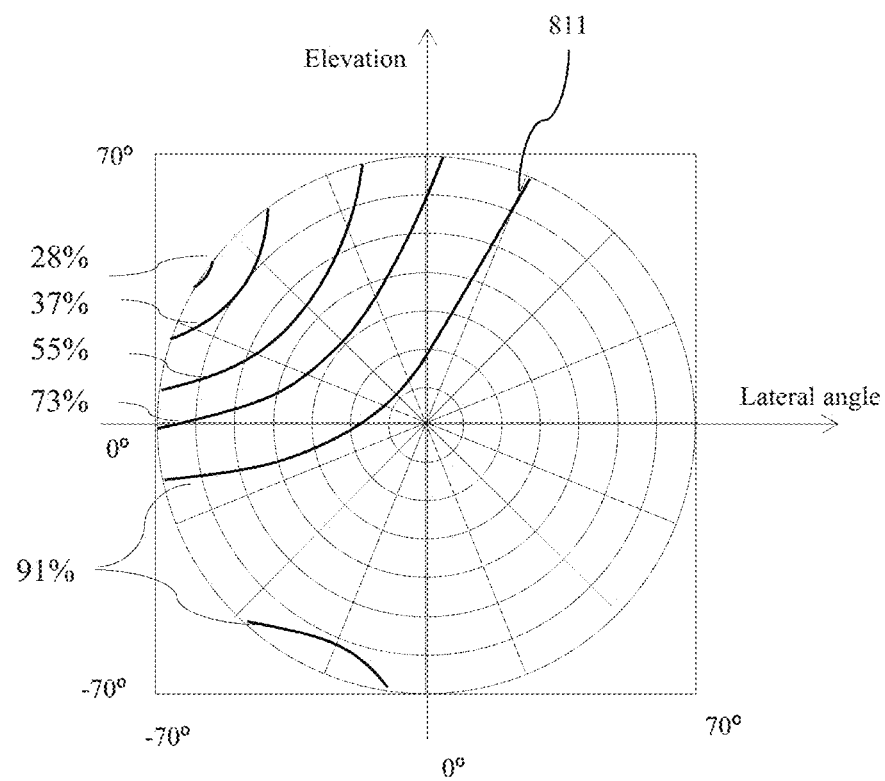
FIG. 37C is a schematic luminance field-of-view graph illustrating variation in transmitted luminance of the optical stack of FIG. 37A.
Figure 37D:
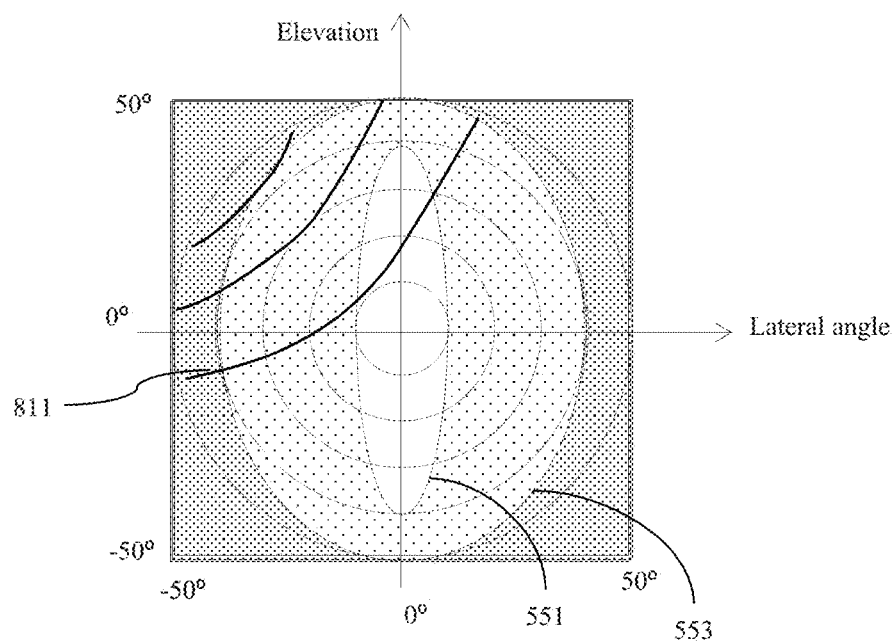
FIG. 37D is a schematic luminance field-of-view graph illustrating variation in transmitted luminance of the optical stack of FIG. 37A.

FIG. 37C is a schematic luminance field-of-view graph illustrating variation in transmitted luminance of the optical stack of FIG. 37A; and FIG. 37D is a schematic luminance field-of-view graph illustrating variation in transmitted luminance of the optical stack of FIG. 37A, device luminance being the multiplication of directional backlight 101 luminance field-of-view distribution and retarder luminance field-of-view distribution.

Luminance may be reduced in upper quadrants in comparison to the directional backlight 101 luminance field-of-view distribution. Advantageously the display privacy level or stray level may be reduced in upper quadrants, achieving improved performance for users looking down onto the display.

It may be desirable to provide a privacy display with a narrow viewing angle in vertical directions as well as lateral directions for example to improve privacy level for a wider range of viewing positions.

Figure 38A:
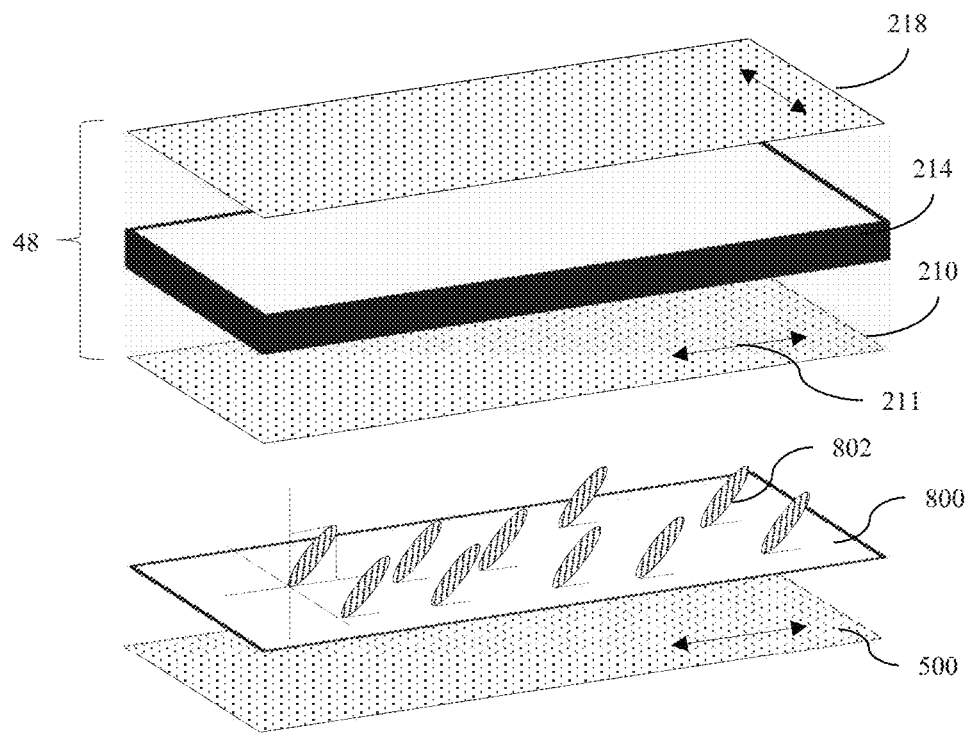
FIG. 38A is a schematic diagram illustrating in perspective side view orientation of some of the retarder and polariser axes for an optical stack wherein the O-plate orientation is aligned parallel to the lateral direction.
Figure 38B:
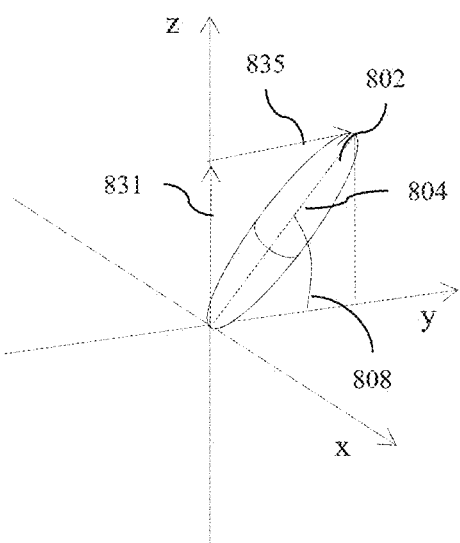
FIG. 38B is a schematic diagram illustrating in perspective side view orientation of birefringent molecules in the arrangement of FIG. 38A.

FIG. 38A is a schematic diagram illustrating in perspective side view orientation of some of the retarder and polariser axes for an optical stack wherein the O-plate retarder 800 slow axis 804 orientation is aligned parallel to the lateral direction; and FIG. 38B is a schematic diagram illustrating in perspective side view orientation of birefringent molecules in the arrangement of FIG. 38A. The at least one retarder comprises a retarder 800 having a slow axis 804 orientation with a component 831 perpendicular to the plane of the retarder, a component 835 that is parallel in the plane of the retarder to the electric vector transmission direction 211 of the input polariser 210 and substantially no component that is orthogonal in the plane of the retarder 800 to the electric vector transmission direction 211 of the input polariser 210.

Figure 38C:
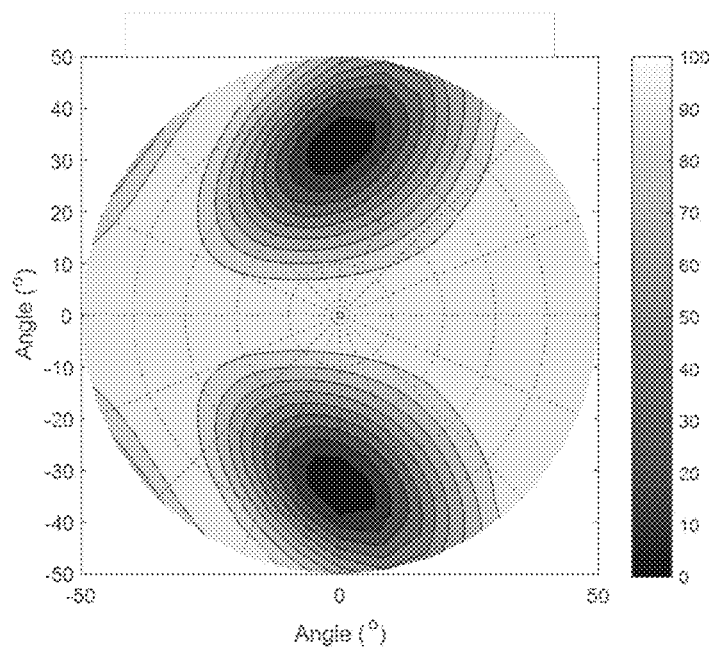
FIG. 38C is a schematic luminance field-of-view graph illustrating variation in transmitted luminance of the O-plate arranged between parallel polarisers of FIG. 38A.

FIG. 38C is a schematic luminance field-of-view graph illustrating variation in transmitted luminance of the O-plate retarder 800 arranged between parallel polarisers 500, 210 of FIG. 38A for an illustrative embodiment wherein an O-plate may comprise a birefringence of 0.12, a layer thickness of 10 micrometres and a tilt angle 808 of 70 degrees.

Figure 38D:
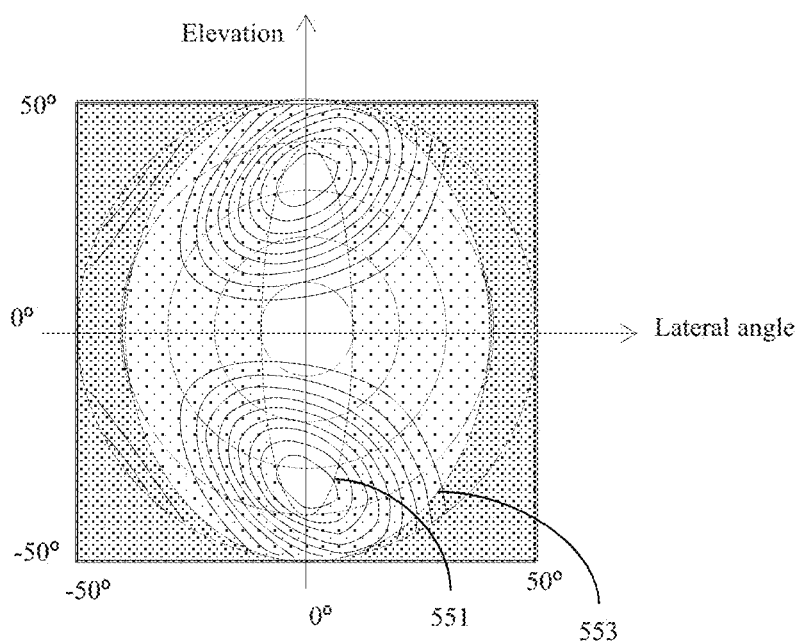
FIG. 38D is a schematic luminance field-of-view graph illustrating variation in transmitted luminance of the optical stack of FIG. 38A.
Figure 38D:
Figure 38D:
Figure 38D:

FIG. 38D is a schematic luminance field-of-view graph illustrating variation in transmitted luminance of the optical stack of FIG. 38A, device luminance being the multiplication of directional backlight 101 luminance field-of-view distribution and retarder luminance field-of-view distribution.

Thus luminance may be controlled in the vertical direction as well as the lateral direction, advantageously improving all-round privacy performance of the display.

It may be desirable to provide reduced luminance to an off-axis snooper in a privacy mode of operation of a directional backlight 101, while providing wide field of view in a wide mode of operation of the directional backlight 101. Further it may be desirable to provide reduced stray light for night time operation of a display; such operation can be achieved by use of privacy mode displays, even though no snooper may be present. Switchable privacy display operation will now be described.

Figure 39A:
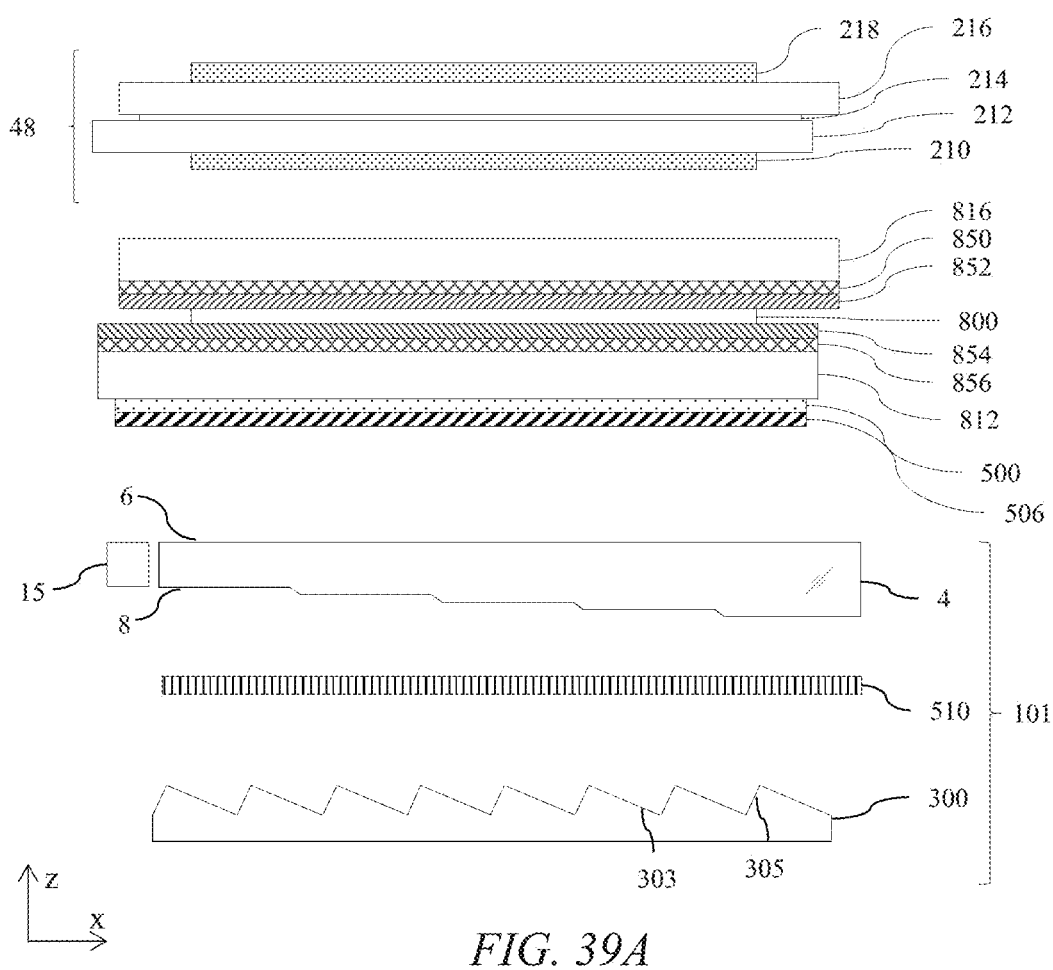
FIG. 39A is a schematic diagram illustrating in side view a directional display comprising a directional waveguide and a homogeneously aligned switchable liquid crystal O-plate arranged between a spatial light modulator and a directional backlight.
Figure 39B:
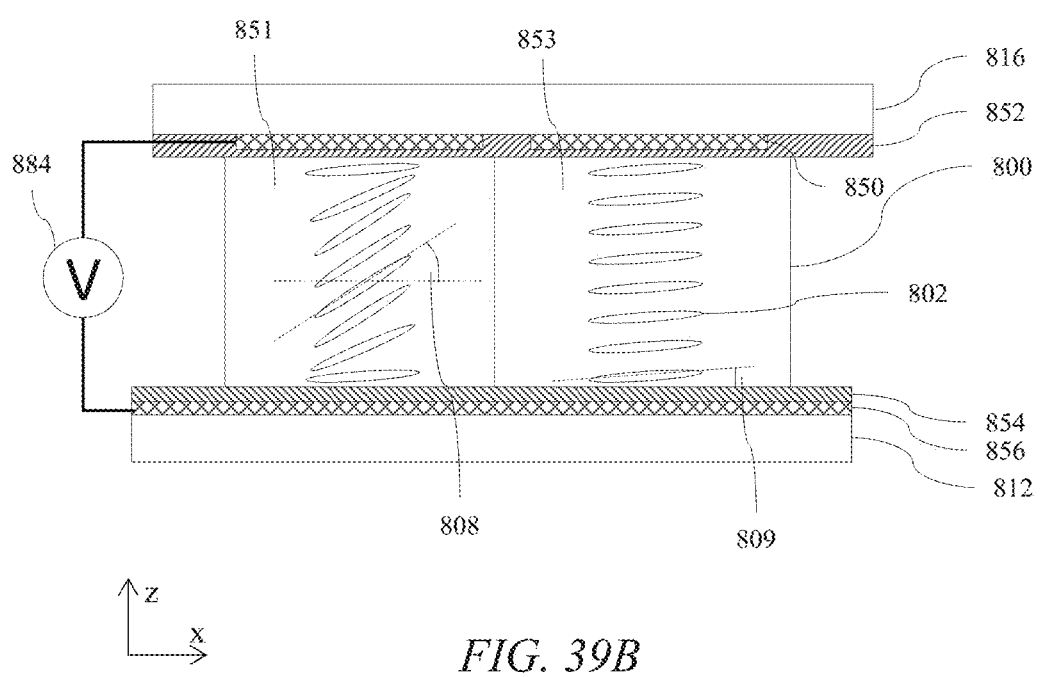
FIG. 39B is a schematic diagram illustrating in side view switching of the homogeneously aligned switchable liquid crystal O-plate in the directional display of FIG. 39A.

FIG. 39A is a schematic diagram illustrating in side view a directional display comprising a directional waveguide and a homogeneously aligned switchable liquid crystal O-plate retarder 800 arranged between a spatial light modulator 48 and a directional backlight 101. Homogeneously aligned switchable liquid crystal O-plate retarder 800 may be provided by a switchable liquid crystal layer between transparent substrates 812, 816 as illustrated in FIG. 39B which is a schematic diagram illustrating in side view switching of the homogeneously aligned switchable liquid crystal O-plate retarder 800 in the directional display of FIG. 39A.

The switchable retarder may for example be provided by a parallel homogeneously aligned liquid crystal cell. In operation in an undriven state as illustrated in region 853, molecules 802 are inclined with pretilt 809 by alignment layers 852, 854 that may for example be rubbed polyimide or photoalignment layers. The pretilt may for example be 2 degrees, and may be arranged to minimise degeneracy in switching of the liquid crystal retarder 800 layer. Such a retarder is thus substantially an in-plane A-plate retarder.

As illustrated in region 851, when driver 884 provides a voltage across the liquid crystal cell by means of electrodes 850, 856 then the molecules that are not close to the alignment layers 852 reorient to provide tilt 808 in the liquid crystal retarder 800 layer. Such a retarder is thus substantially an out of plane O-plate retarder.

Figure 39C:
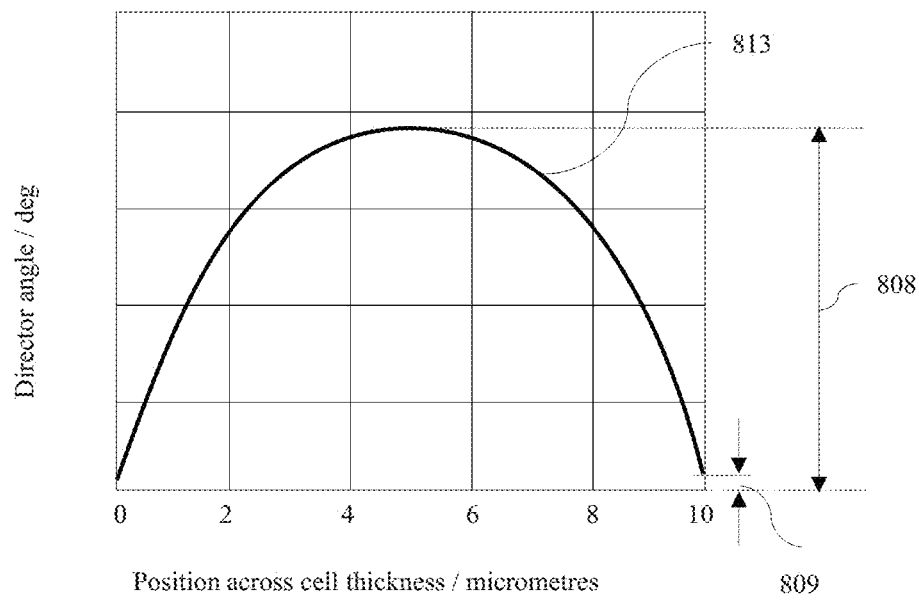
FIG. 39C is a schematic diagram illustrating a graph of liquid crystal director tilt against liquid crystal cell thickness for a cell with an applied voltage.

FIG. 39C is a schematic diagram illustrating a graph of liquid crystal director tilt against liquid crystal cell thickness for a cell with an applied voltage. In the illustrative embodiment of FIG. 39C, the slow axis of the retarder may be provided by the liquid crystal director and may have a tilt that varies across the thickness of the cell as illustrated by tilt profile 813. At the alignment surfaces, tilt 809 may be 2 degrees for example, whereas at the center of the cell, tilt 808 that may for example be 68 degrees is provided.

The tilt profile 8113 of the homogeneously aligned switchable liquid crystal O-plate retarder 800 may thus be provided by control of applied voltage from driver 884. Advantageously control of the angular viewing properties of a directional display may be provided as described elsewhere herein.

Figure 39D:
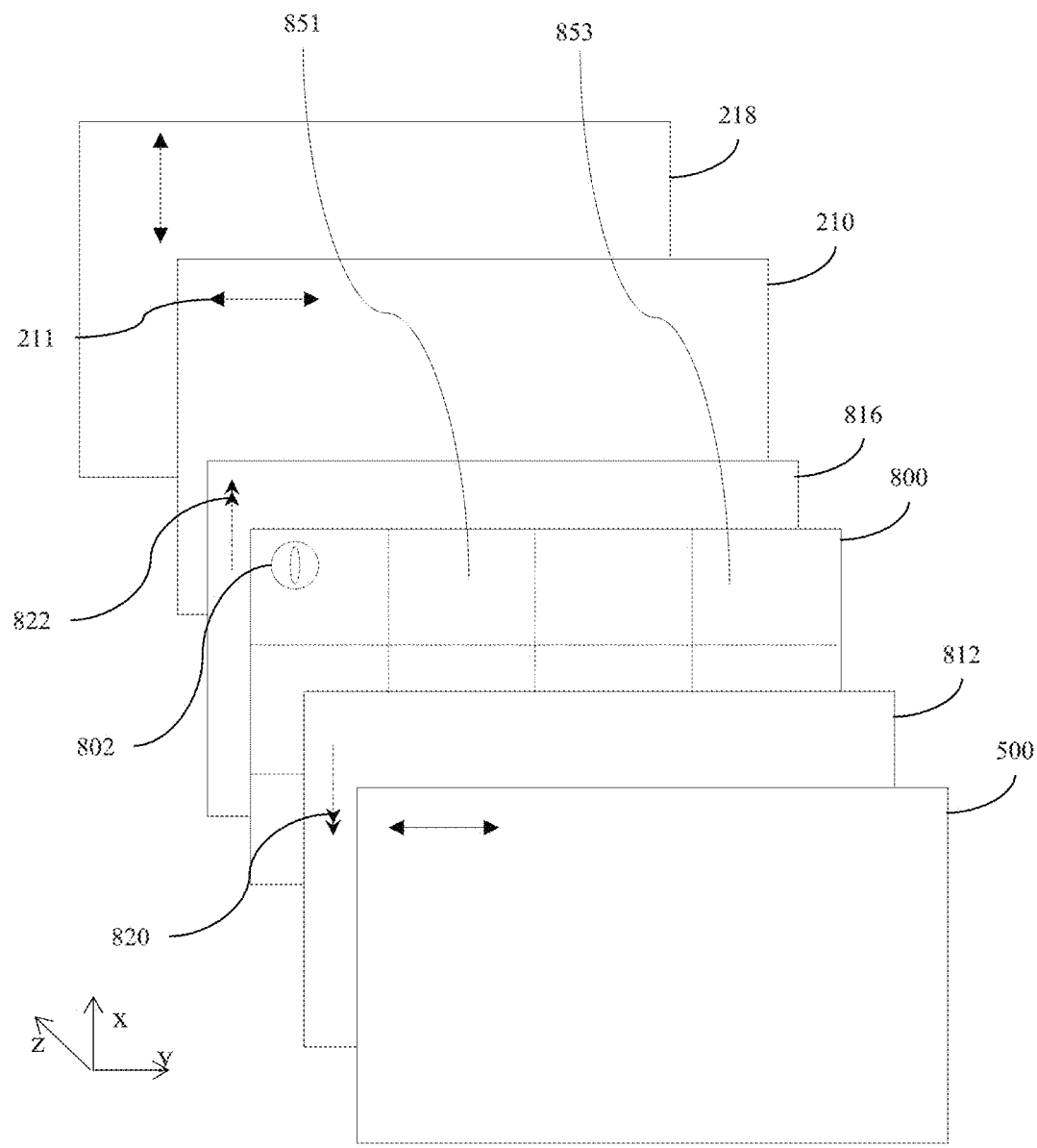
FIG. 39D is a schematic diagram illustrating in perspective front view orientation of some of the retarder, alignment layers and polariser axes for the optical stack of FIG. 39A.

FIG. 39D is a schematic diagram illustrating in perspective front view orientation of some of the retarder 800, alignment layers 812, 816 and polariser 500, 210, 218 for the optical stack of FIG. 39A. Alignment layer 812, 816 rubbing directions may be provided antiparallel and arranged to orient the directions of the slow axis components 833, 835 that are in the plane of the retarder 800.

The electrodes 850, 856 may be patterned to provide regions with different levels of control of privacy luminance for off-axis viewing positions. The switchable liquid crystal retarder 800 comprises at least first and second regions 851, 853 that are independently addressable with first and second applied voltages.

Advantageously different levels of privacy across the display area may be provided.

Figure 39E:
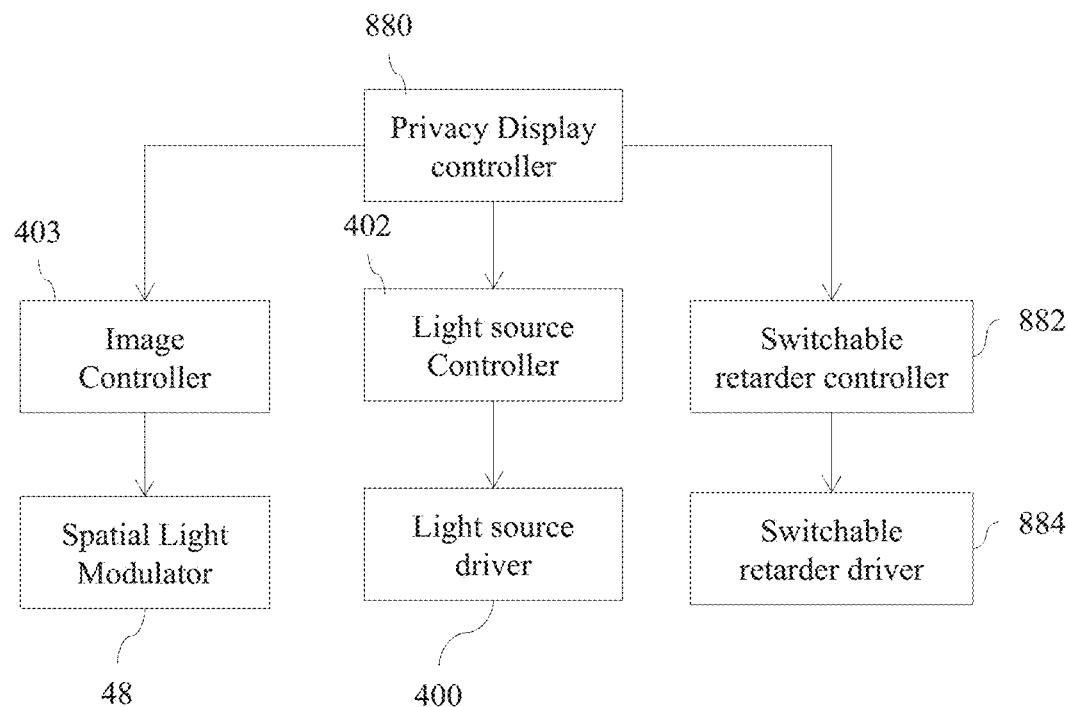
FIG. 39E is a schematic diagram illustrating a flowchart for control of a directional display apparatus comprising a switchable directional backlight, a switchable retarder and a privacy display control system.

FIG. 39E is a schematic diagram illustrating a flowchart for control of a directional display apparatus comprising a switchable directional backlight 101, a switchable retarder 800 and a privacy display control system 880. Privacy display controller may control backlight 101 and spatial light modulator 48 as illustrated in FIG. 11. Further controller 882 may be arranged to provide voltage output from the switchable retarder driver 884. The control system 880, 882, 884 is thus arranged to control the applied voltage across the switchable liquid crystal retarder 800.

Figure 39F:
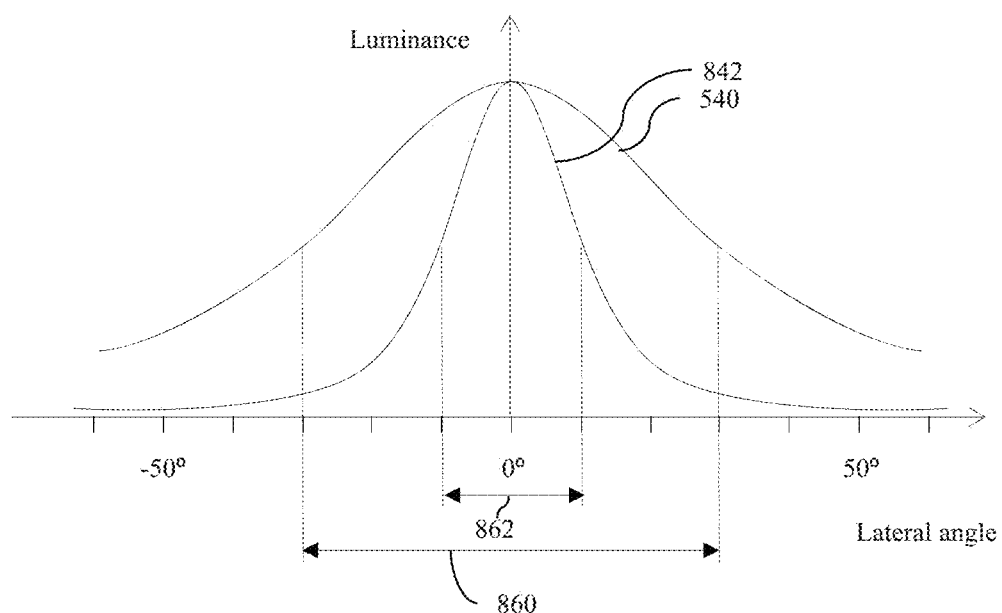
FIG. 39F is a schematic graph illustrating variation of luminance of a directional display apparatus comprising a switchable directional backlight, a switchable retarder and a privacy display control system.

FIG. 39F is a schematic graph illustrating variation of luminance of a directional display apparatus comprising a switchable directional backlight, a switchable retarder and a privacy display control system of FIG. 39E. Thus the control system may be arranged to provide switching between a first mode of operation and second mode of operation.

In the first mode of operation the light sources are controlled to provide an illumination profile 842 from the waveguide 1 with a first angular width 862 (that may be the full width half maximum for a desired elevation). A first applied voltage is provided across the switchable liquid crystal retarder to achieve reduction of off-axis luminance at the desired elevation.

In a second mode of operation the light sources are controlled to provide an illumination profile 540 from the waveguide 1 with a second angular width 860 that is larger than the first angular width 862; and a second applied voltage is provided across the switchable liquid crystal retarder 800 that is different to the first applied voltage. The second applied voltage is less than the first applied voltage and may be zero such that an A-plate is provided by the switchable retarder 800.

Advantageously the privacy mode of operation may be arranged to provide cooperation of the directional backlight with the switchable retarder, reducing luminance to a snooper and reducing stray light.

Figure 39G:
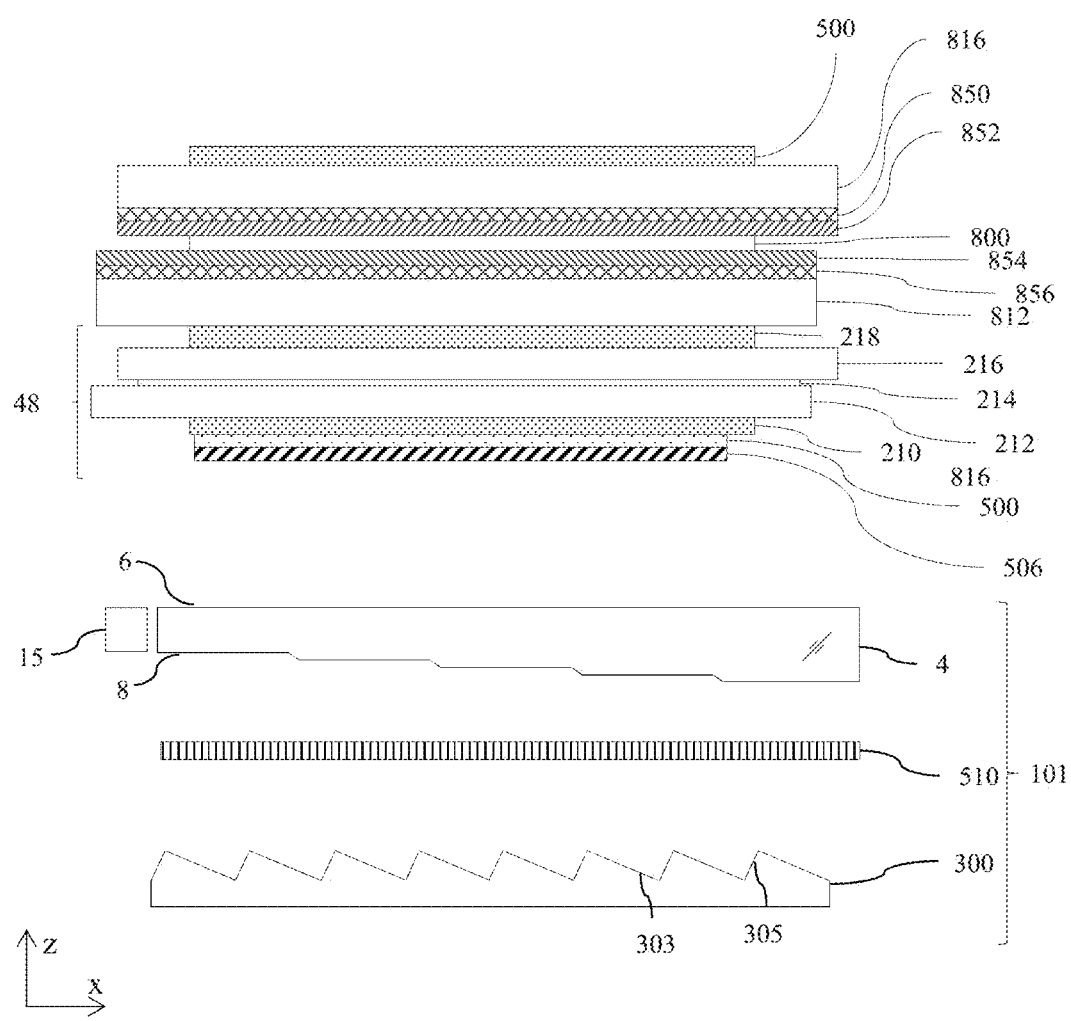
FIG. 39G is a schematic diagram illustrating in side view a directional display comprising a directional waveguide and a homogeneously aligned switchable liquid crystal O-plate arranged between a spatial light modulator and an output polariser.

FIG. 39G is a schematic diagram illustrating in side view a directional display comprising a directional waveguide and a homogeneously aligned switchable liquid crystal O-plate retarder 800 arranged between a spatial light modulator 48 and an output polariser 218. Such an arrangement may have similar optical properties to the embodiment of FIG. 39A. Further the homogeneously aligned switchable liquid crystal O-plate may be provided with a touch screen function.

The optical properties of the arrangements of FIGS. 39A and 39E will now be described further.

Figure 40A:
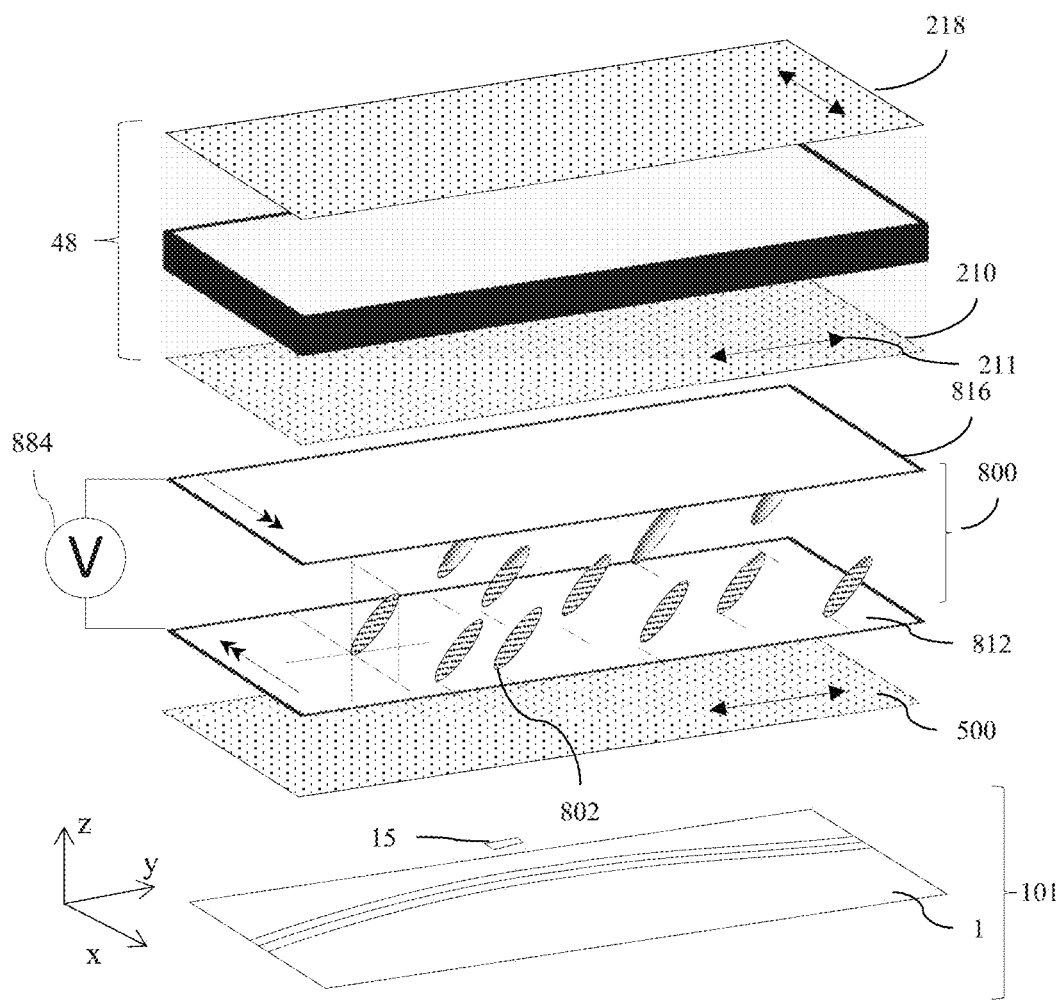
FIG. 40A is a schematic diagram illustrating in perspective side view orientation of some of the retarder, alignment layers and polariser axes for the optical stack of FIG. 39A for a first applied voltage.

FIG. 40A is a schematic diagram illustrating in perspective side view orientation of some of the retarder, alignment layers and polariser axes for the optical stack of FIG. 39A for a first applied voltage. Thus birefringent molecules 802 may have their slow axes aligned in the x-axis, in a similar manner to that illustrated in FIG. 36B. In comparison to the embodiment of FIG. 36A, the molecules 802 are aligned by the electric field provided by electrodes 850, 856 of the liquid crystal cell rather than being arranged as a fixed matrix as for a cured reactive mesogen film.

Figure 40B:
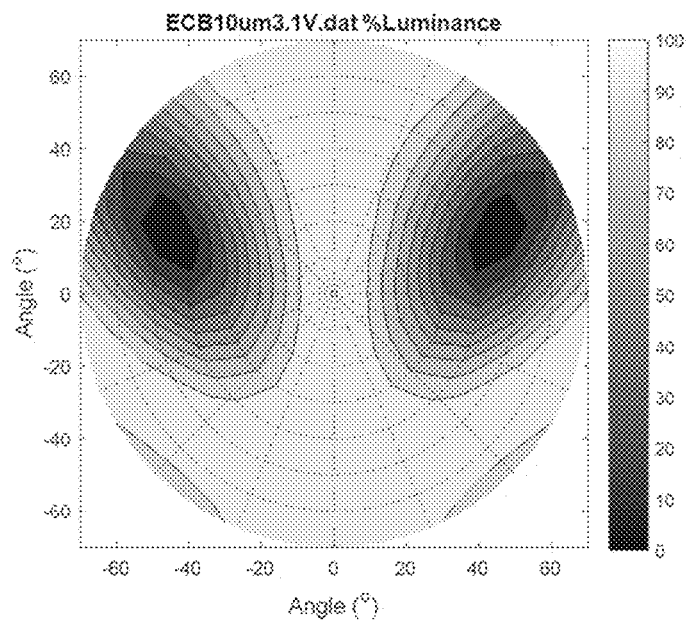
FIG. 40B is a schematic luminance field-of-view graph illustrating variation in transmitted luminance of the O-plate arranged between parallel polarisers of FIG. 40A.
Figure 40C:
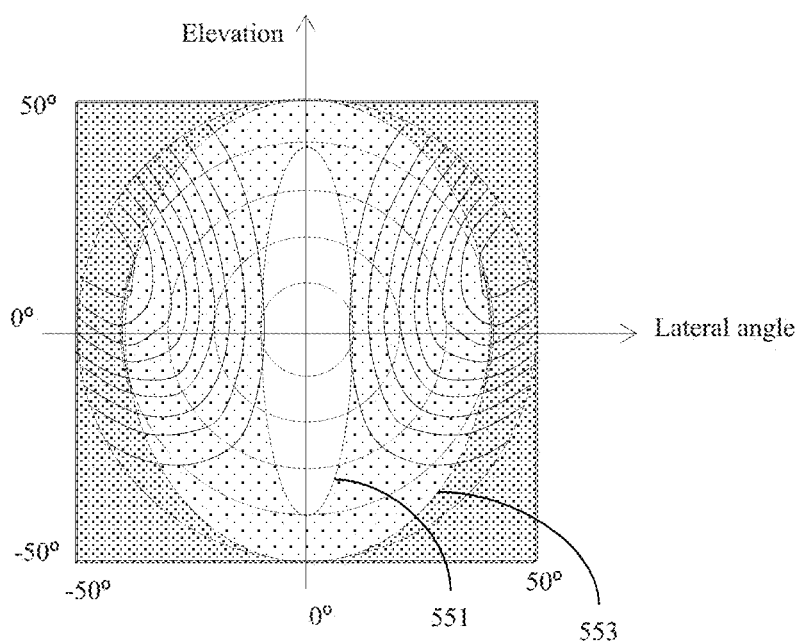
FIG. 40C is a schematic luminance field-of-view graph illustrating variation in transmitted luminance of the optical stack of FIG. 40A in a privacy mode of operation.
Figure 40C:
Figure 40C:
Figure 40C:

FIG. 40B is a schematic luminance field-of-view graph illustrating variation in transmitted luminance of the O-plate arranged between parallel polarisers of FIG. 40A and FIG. 40C is a schematic luminance field-of-view graph illustrating variation in transmitted luminance of the optical stack of FIG. 40A in a privacy mode of operation, device luminance being the multiplication of directional backlight 101 luminance field-of-view distribution and retarder luminance field-of-view distribution.

In the illustrative embodiment of FIG. 40B, a liquid crystal with birefringence 0.09 may be provided in a 10 micrometre thick cell with 2° pretilt and an applied voltage of 3.1V. Such a cell provides maximum luminance reduction at an elevation of 20 degrees and lateral angles of +/−45°.

Thus enhanced privacy performance can be achieved in a similar manner to that illustrated in FIG. 33C.

The present embodiment provides minimised luminance at a viewing angle of 45 degrees in lateral angle and 22.5 degrees in elevation.

The operation of the display in wide angle mode will now be described.

Figure 41A:
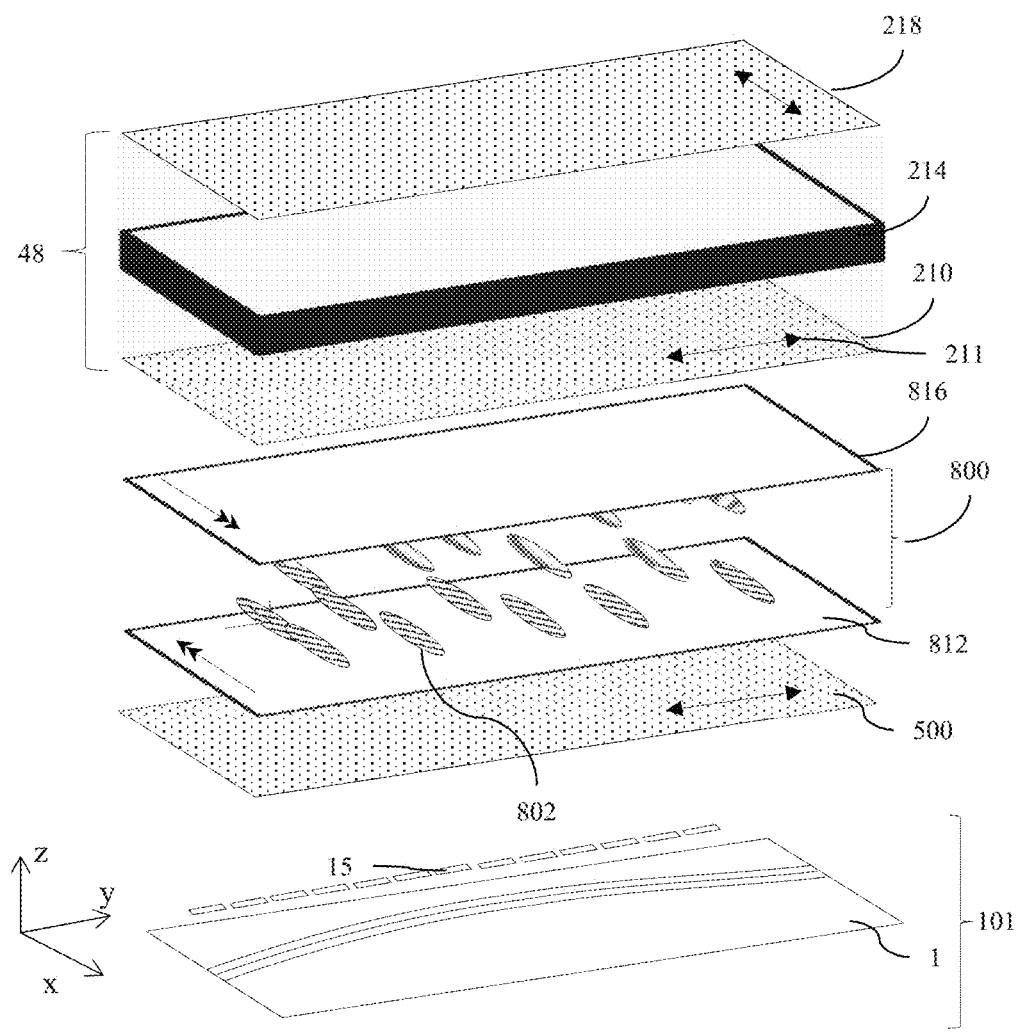
FIG. 41A is a schematic diagram illustrating in perspective side view orientation of some of the retarder, alignment layers and polariser axes for the optical stack of FIG. 39A for no applied voltage in a wide angle mode of operation.

FIG. 41A is a schematic diagram illustrating in perspective side view orientation of some of the retarder, alignment layers and polariser axes for the optical stack of FIG. 39A for no applied voltage. As illustrated in FIG. 39E, on operation in wide angle mode, the applied voltage may be controlled to control the switchable retarder 800. Typically the voltage may be removed so that the molecules 802 are aligned with the pre-tilt of the alignment layer 852, 854. As the pre-tilt is typically small, such as 2 degrees, the molecules are substantially arranged as an A-plate for the purposes of the present disclosure. The retarder thus comprises a switchable liquid crystal retarder 800 that is switchable between an O-plate retarder and an A-plate retarder with a slow axis orientation parallel to the x-axis, by means of control of the applied voltage across the switchable liquid crystal retarder 800. Further additional light sources of the array 15 may be illuminated to provide wide angle luminance distribution from the backlight.

An illustrative embodiment of the arrangement of FIGS. 41A and 40A are given in TABLE 1.

TABLE 1

| FIG. | Mode | Active LC retarder | | | | |
|---|---|---|---|---|---|---|
| | | Alignment layers | Pretilt/ deg | $\Delta n \cdot d$/ nm | $\Delta\varepsilon$ | Voltage/ V |
| FIG. 41A | Wide | Homogeneous | 2 | 900 | 4.3 | 0 |
| FIG. 40A | Privacy | Homogeneous | 2 | | | 3.1 |

Figure 41B:
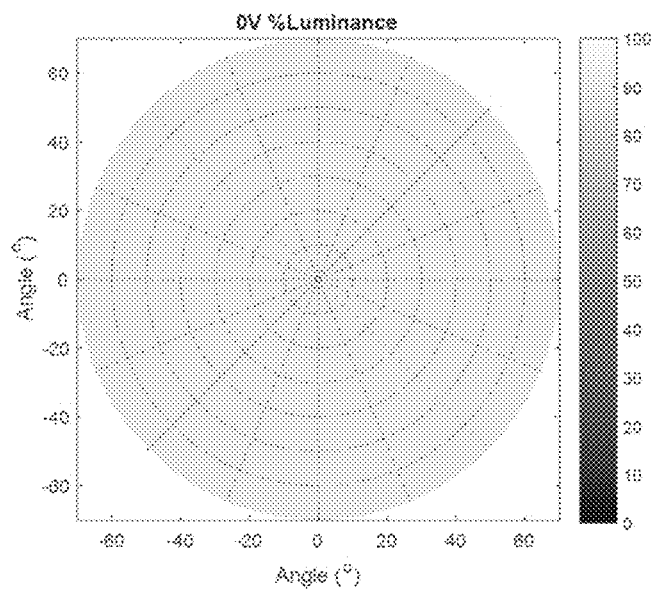
FIG. 41B is a schematic luminance field-of-view graph illustrating variation in transmitted luminance of the A-plate arranged between parallel polarisers of FIG. 41A for no applied voltage.
Figure 41C:
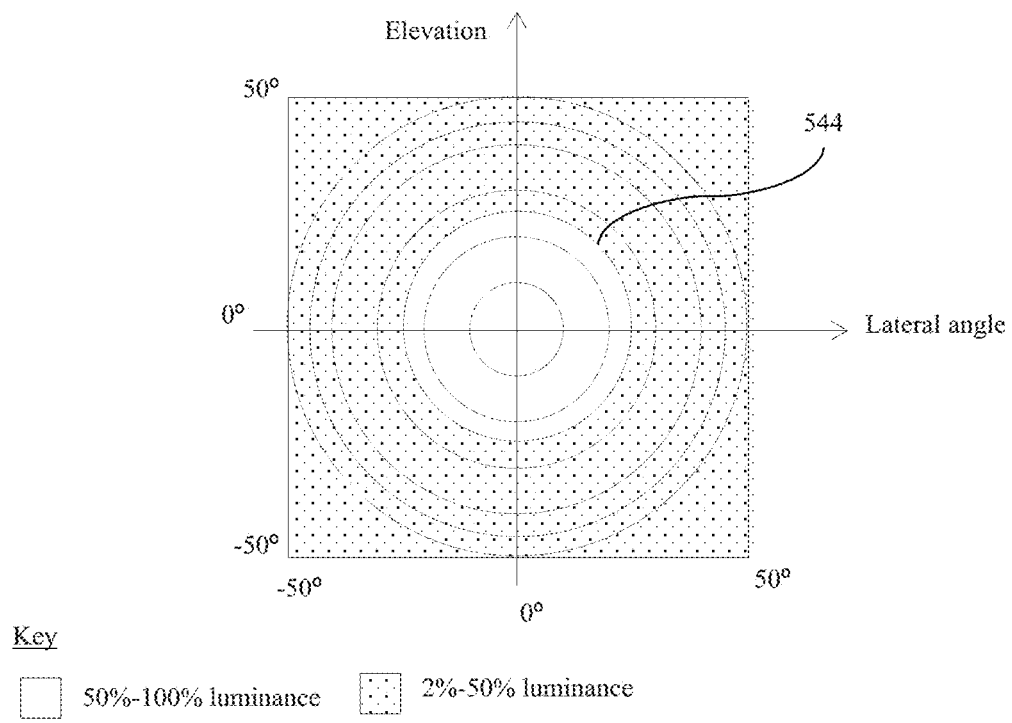
FIG. 41C is a schematic luminance field-of-view graph illustrating variation in transmitted luminance of the optical stack of FIG. 41A in a wide angle mode of operation.

FIG. 41B is a schematic luminance field-of-view graph illustrating variation in transmitted luminance of the A-plate 800 arranged between parallel polarisers of FIG. 41A for no applied voltage; and FIG. 41C is a schematic luminance field-of-view graph illustrating variation in transmitted luminance of the optical stack of FIG. 41A in a wide angle mode of operation, device luminance being the multiplication of directional backlight 101 luminance field-of-view distribution and retarder luminance field-of-view distribution. Thus the arrangement of FIG. 41A provides substantially no loss of light for off-axis viewing positions.

Advantageously high efficiency is achieved for wide mode viewing over a large range of viewing angles in comparison to the privacy mode of operation.

During assembly of the switchable directional backlight 101, light control structures such as light absorption regions at the input side 2 of the waveguide may be provided to reduce reflection of light that has reflected from the reflective end 4. The present embodiments achieve reduced off-axis privacy level and thus for example the amount of light absorbed at the input end 2 may be reduced while maintaining desirable privacy levels. The efficiency of light input from the input end may thus be increased while achieving desirable privacy levels. Advantageously display luminance for off-axis viewing positions may be increased in comparison to arrangements with no homogeneously aligned switchable liquid crystal O-plate. Further in wide angle mode of operation the full width half maximum of the luminance distribution may be increased, achieving increased display visibility in the wide mode of operation.

It may be desirable to provide control of the polar location of privacy level reduction regions provided by the homogeneously aligned switchable liquid crystal O-plate 800.

Figure 42A:
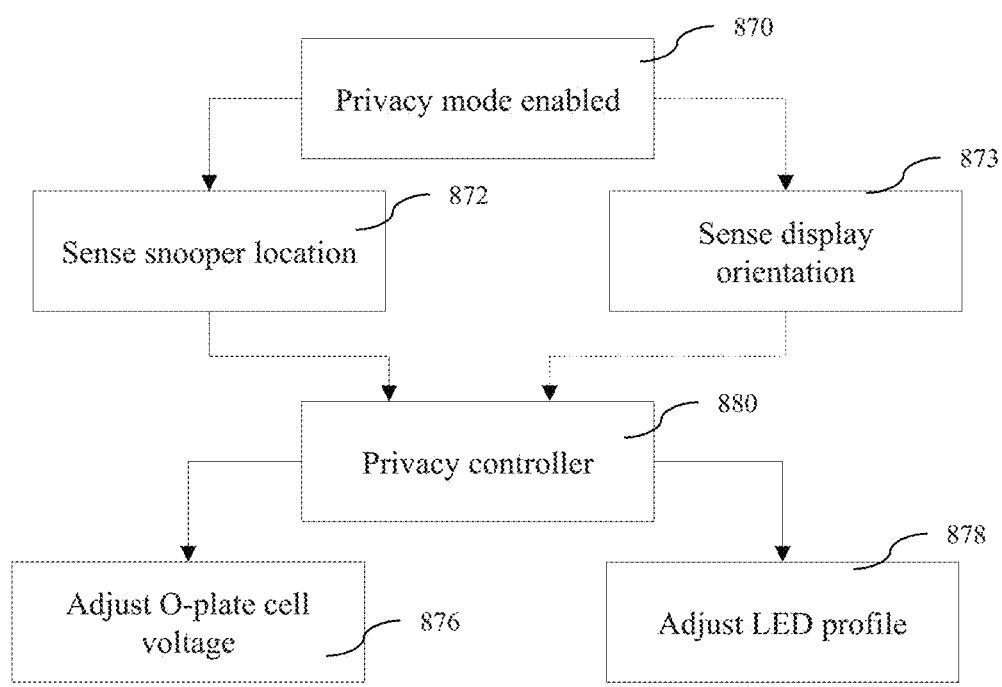
FIG. 42A is a flowchart describing adjustment of homogeneously aligned switchable liquid crystal O-plate voltage in correspondence with the display viewing conditions.
Figure 42B:
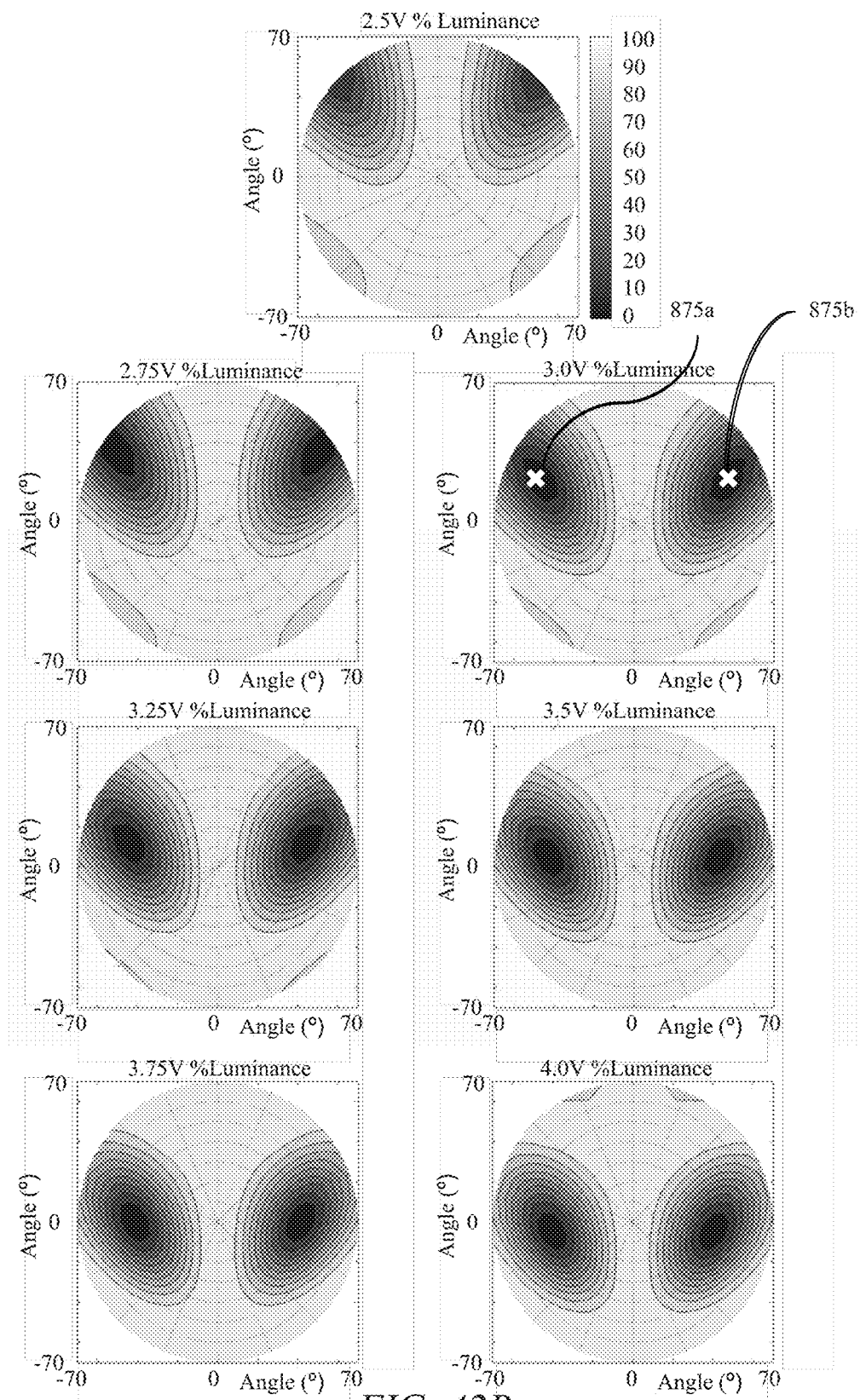
FIG. 42B are schematic luminance field-of-view graphs illustrating variation in transmitted luminance of the O-plate arranged between parallel polarisers of FIG. 41A for different voltages.

FIG. 42A is a flowchart describing adjustment of homogeneously aligned switchable liquid crystal O-plate voltage in correspondence with the display viewing conditions; and FIG. 42B are schematic luminance field-of-view graphs illustrating variation in transmitted luminance of the O-plate arranged between parallel polarisers of FIG. 41A for different voltages from 2.5V to 4V. Thus the applied voltage may provide control of the luminance field-of-view minima locations in the privacy mode of operation. Further the luminance minima may be controlled between an elevation that is zero or less to elevations that are in the upper quadrants of the polar profile.

In a first step 870 a user may enable a privacy mode of operation. Such a privacy mode setting may be provided by manual setting (for example a keyboard operation) or by automatic sensing using sensor to locate the presence of a snooper as described for example in U.S. Patent Publ. No. 2017-0236494, incorporated herein by reference in its entirety.

In a second step 872 the snooper location may be detected for example by means of a camera or by a keyboard setting or other method. In an illustrative example, an OFFICE setting may be provided wherein it may be desirable to optimise privacy performance for snoopers that are moving around a shared office environment and thus optimise performance for look-down viewing quadrants. By way of comparison in a FLIGHT setting, it may be desirable to provide privacy level optimisation for sitting snoopers, with improved privacy level for lower elevations than desirable for OFFICE setting.

In a third step 876 the O-plate cell voltage may be adjusted and in a fourth step 878 the LED profile may be adjusted with the control system as illustrated in FIG. 39E.

Thus the control system may further comprise a means to determine the location of a snooper with respect to the display wherein the control system is arranged to adjust the first applied voltage in response to the snooper location.

Advantageously the privacy operation of the display may be controlled to optimise for snooper viewing geometry.

It may further be desirable to optimise the privacy appearance of a display that has a single control line to the voltage driver 844 in which voltage tuning for snooper location is not provided.

Typical primary observer locations have a lateral angle that is close to zero, for example +/−10 degrees in a privacy mode of operation. Typical snooper observer locations have a lateral angle at higher angles, for example greater than +/−30 degrees. Typical primary observer locations have an elevation of for example +/−25 degrees in a privacy mode of operation that depends on seating position, desirable display tilt and to minimise reflections from the ambient environment. By way of comparison with privacy displays that have been tuned for zero elevation snooper locations it has been appreciated in the present embodiments that typical snooper observer locations for devices such as laptops, cell phones and tablets in public places have an elevation of greater than zero degrees and typically between 20 and 60 degrees and more typically between 20 and 45 degrees.

The switchable liquid crystal retarder 800 between the additional polariser 500 and the input polariser 210 in the case that an additional polariser 500 is arranged on the input side of the input polariser 210 or between the additional polariser 512 and the output polariser 218 in the case that an additional polariser 512 is arranged on the output side of the input polariser 210 have a maximum attenuation luminance field of view that has an elevation that is greater than zero with respect to the direction of the normal direction to the spatial light modulator 48. In embodiments where the luminance profile is symmetric, then the maximum attenuation polar coordinates 875a, 875b may be provided by equal and opposite lateral angles for example.

Thus the maximum attenuation polar coordinate has an elevation between 10 degrees and 50 degrees, preferably between 15 degrees and 35 degrees and most preferably between 20 degrees and 30 degrees. The maximum attenuation polar coordinate has a lateral angle from 30 degrees to 60 degrees, preferably 40 degrees to 50 degrees and most preferably at 45 degrees.

Advantageously the control system for the voltage driver 844 may have reduced complexity and reduced cost. Further the most likely location for a snooper may be provided with the lowest luminance, reducing visibility and increasing privacy performance.

It may be desirable to provide increased reduction of privacy image visibility to a snooper. Further, it may be desirable to improve the width 860 of the wide angle mode profile 540.

Figure 43:
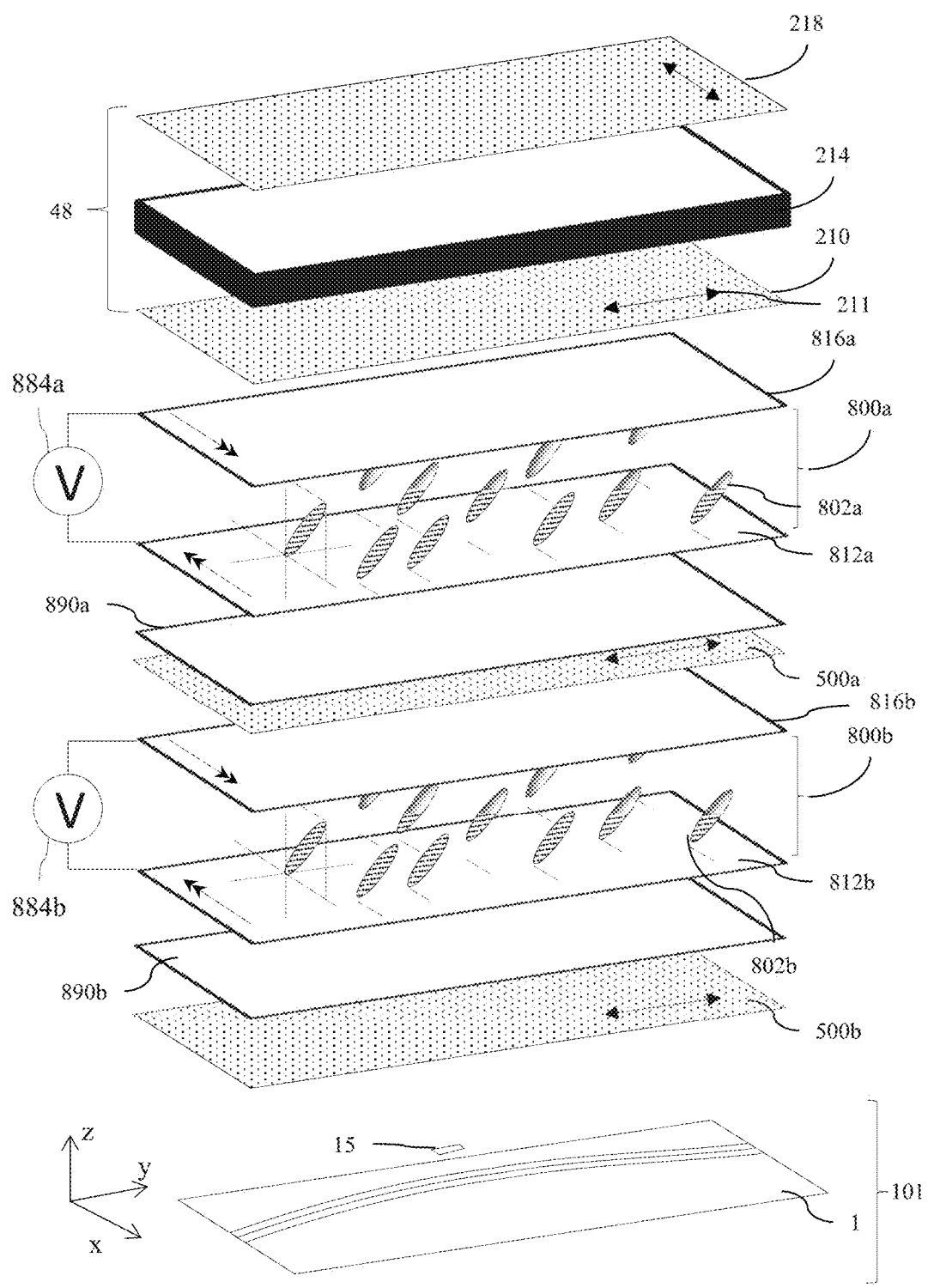
FIG. 43 is a schematic diagram illustrating in perspective side view orientation of multiple parallel homogeneously aligned switchable liquid crystal O-plates arranged between a directional backlight and a spatial light modulator.

FIG. 43 is a schematic diagram illustrating in perspective side view orientation of some of multiple parallel homogeneously aligned switchable liquid crystal O-plates arranged between a directional backlight and a spatial light modulator 48.

First and second homogeneously aligned switchable liquid crystal O-plate retarders and first and second additional polarisers 500a, 500b are provided. Alternatively one or both of the homogeneously aligned switchable liquid crystal O-plate retarders may be provided on the output side of the output polariser 218 of the spatial light modulator 48. The combined output in the privacy mode of operation will be provided by the multiplicative luminance of the two switchable retarders 800. The display luminance field-of-view output profile in privacy mode may thus provide increased luminance reduction for a given lateral angle, or may provide an extended range of elevations that have reduced luminance in comparison to the arrangements of FIG. 42B for example.

Further correcting passive retarder 890a is provided between additional polariser 500a and input polariser 210, and correcting passive retarder 890b is provided between a further additional polariser 500b and additional polariser 890a. The operation of the corrective retarders 890a, 890b increases the polar region over which luminance is reduced and is described further below.

Advantageously privacy performance can be improved in luminance or increased polar distribution for a given privacy level. Further head-on luminance is substantially maintained other than the losses due to the additional polariser 500b.

Light control methods in the backlight may be reduced, thus providing higher efficiency and wider profile 540 width 860 and with higher efficiency.

It may be desirable to provide enhanced privacy performance for high elevations for zero lateral angle operation.

Figure 44A:
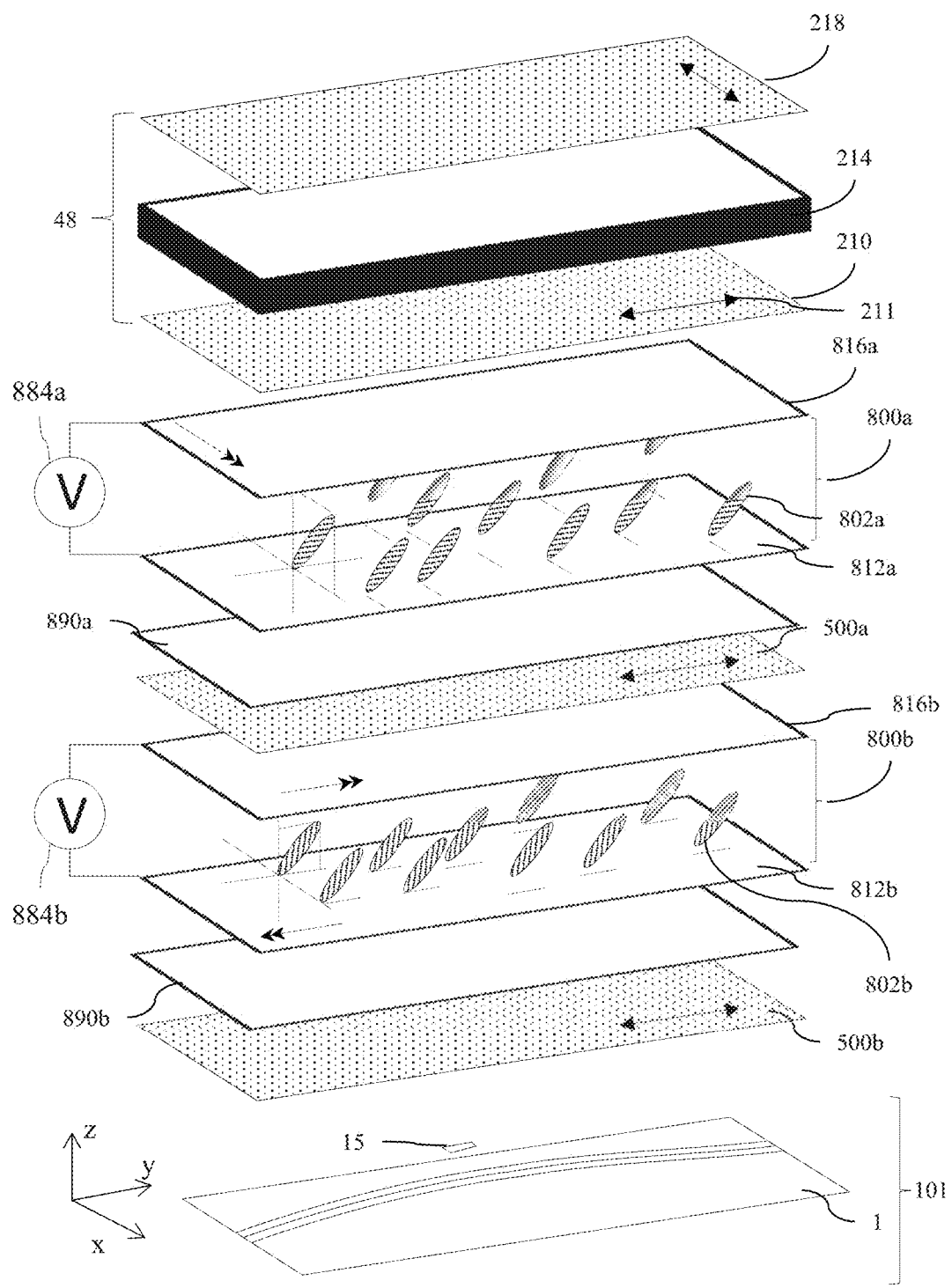
FIG. 44A is a schematic diagram illustrating in perspective side view orientation of multiple orthogonally oriented homogeneously aligned switchable liquid crystal O-plates arranged between a directional backlight and a spatial light modulator.
Figure 44B:
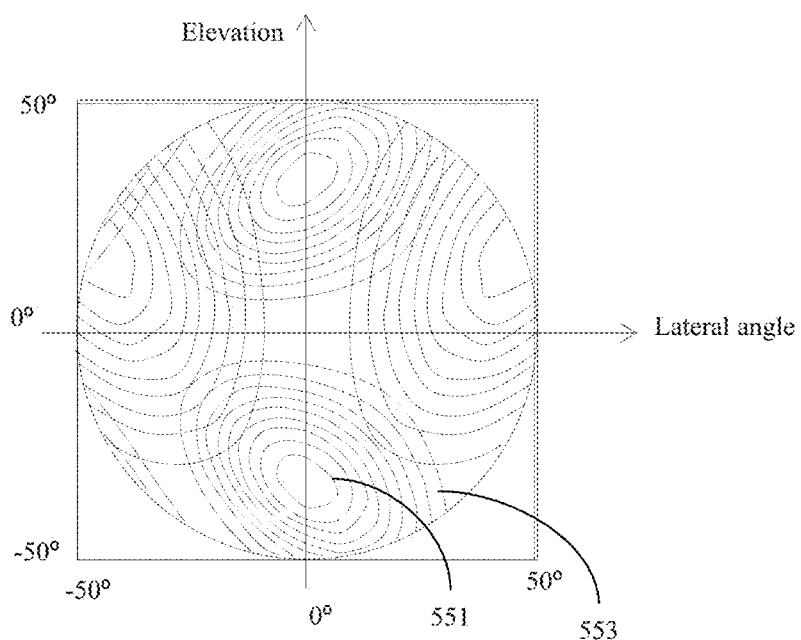
FIG. 44B is a schematic luminance field-of-view graph illustrating variation in transmitted luminance of the multiple homogeneously aligned switchable liquid crystal O-plates of FIG. 44A for an applied voltage.
Figure 44C:
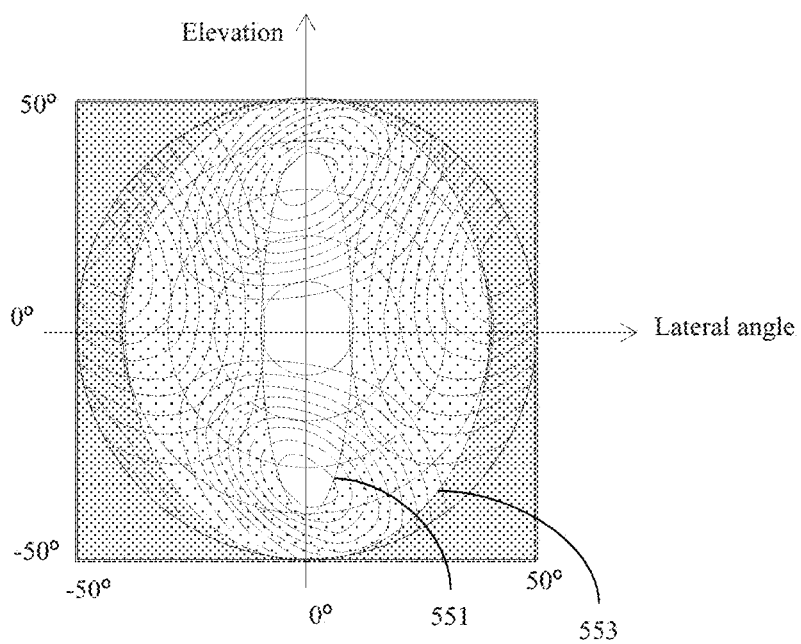
FIG. 44C is a schematic luminance field-of-view graph illustrating variation in transmitted luminance of the optical stack of FIG. 44A in a wide angle mode of operation.
Figure 44C:
Figure 44C:
Figure 44C:

FIG. 44A is a schematic diagram illustrating in perspective side view orientation of multiple orthogonal homogeneously aligned switchable liquid crystal O-plates arranged between a directional backlight and a spatial light modulator 48; FIG. 44B is a schematic luminance field-of-view graph illustrating variation in transmitted luminance of the multiple homogeneously aligned switchable liquid crystal O-plates of FIG. 44A for an applied voltage; and FIG. 44C is a schematic luminance field-of-view graph illustrating variation in transmitted luminance of the optical stack of FIG. 44A in a wide angle mode of operation, device luminance being the multiplication of directional backlight 101 luminance field-of-view distribution and retarder luminance field-of-view distribution.

The operation of the display is similar to that shown in FIG. 43 for arrangements in which the effect of the correcting passive retarders 890a, 890b as will be described below is not included, for illustrative purposes. The alignment direction of one of the layers is orthogonal to provide rotated privacy reduction by the switchable retarder 800b.

Advantageously privacy operation may be provided for all-round viewing of the display by a snooper.

It may be desirable to enhance privacy levels for zero elevation viewing and also for viewing from viewing quadrants.

Figure 45:
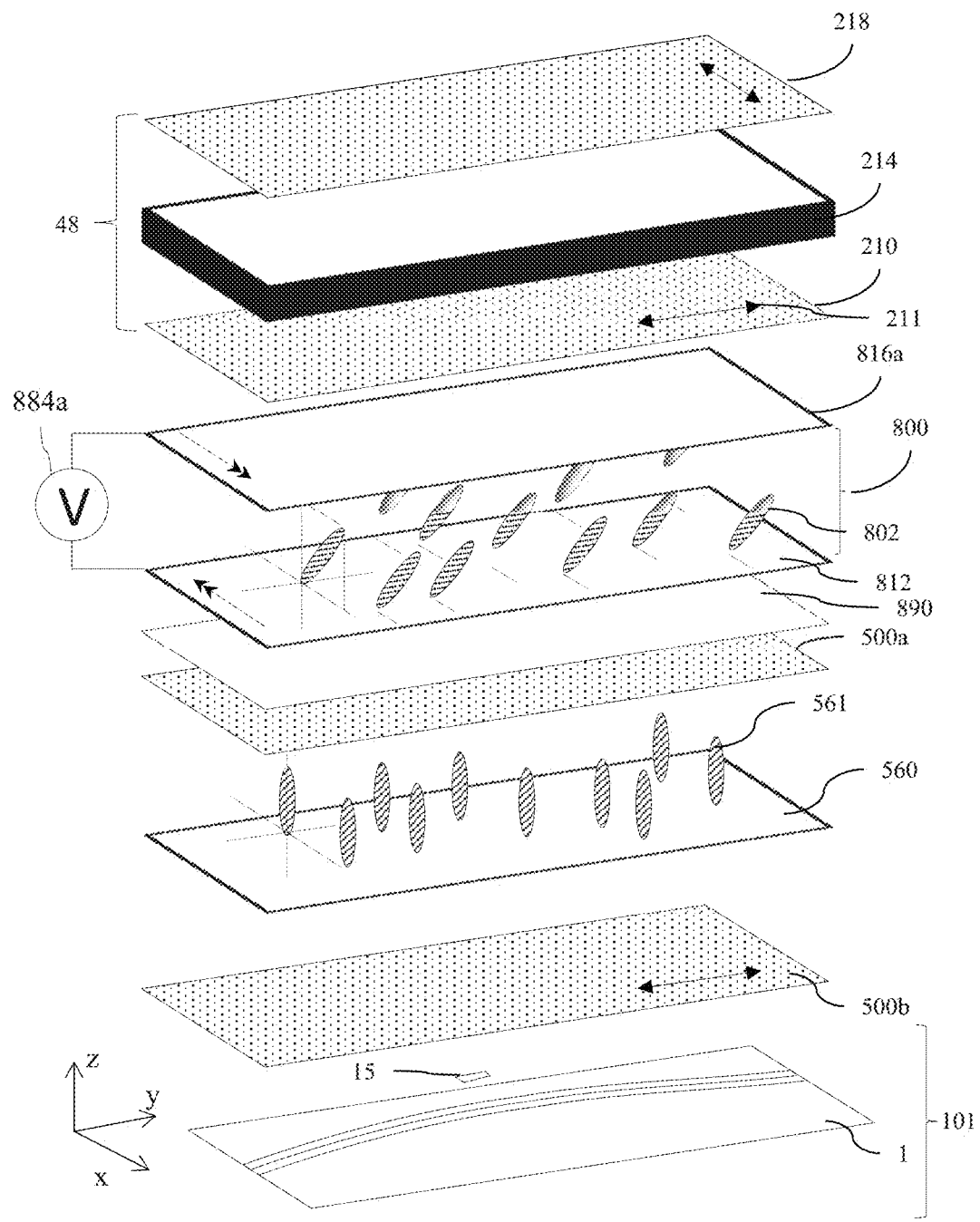
FIG. 45 is a schematic diagram illustrating in perspective side view orientation of a homogeneously aligned switchable liquid crystal O-plate and a C-plate arranged between a directional backlight and a spatial light modulator.

FIG. 45 is a schematic diagram illustrating in perspective side view orientation of a homogeneously aligned switchable liquid crystal O-plate 800 and a C-plate 560 arranged between a directional backlight 101 and a spatial light modulator 48.

Figure 46A:
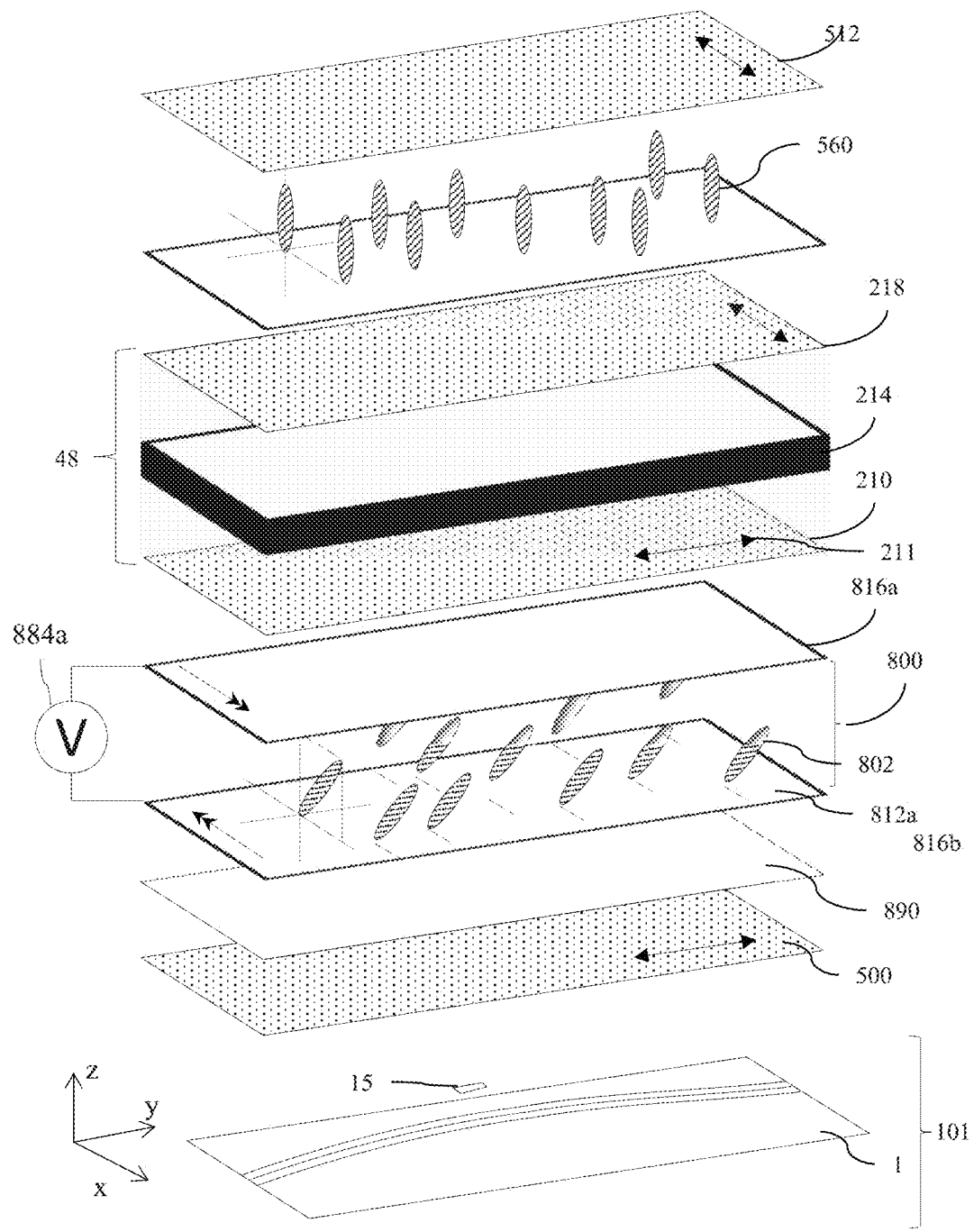
FIG. 46A is a schematic diagram illustrating in perspective side view orientation of a homogeneously aligned switchable liquid crystal O-plate arranged between a directional backlight and a spatial light modulator and a C-plate arranged between the spatial light modulator and an additional polariser.

FIG. 46A is a schematic diagram illustrating in perspective side view orientation of a homogeneously aligned switchable liquid crystal O-plate 800 arranged between a directional backlight 101 and a spatial light modulator 48 and a C-plate 560 arranged between the spatial light modulator and a further additional polariser 512 Further compensating passive retarder 890 as will be described below may be provided between the additional polariser 500 and input polariser 210.

Figure 46B:
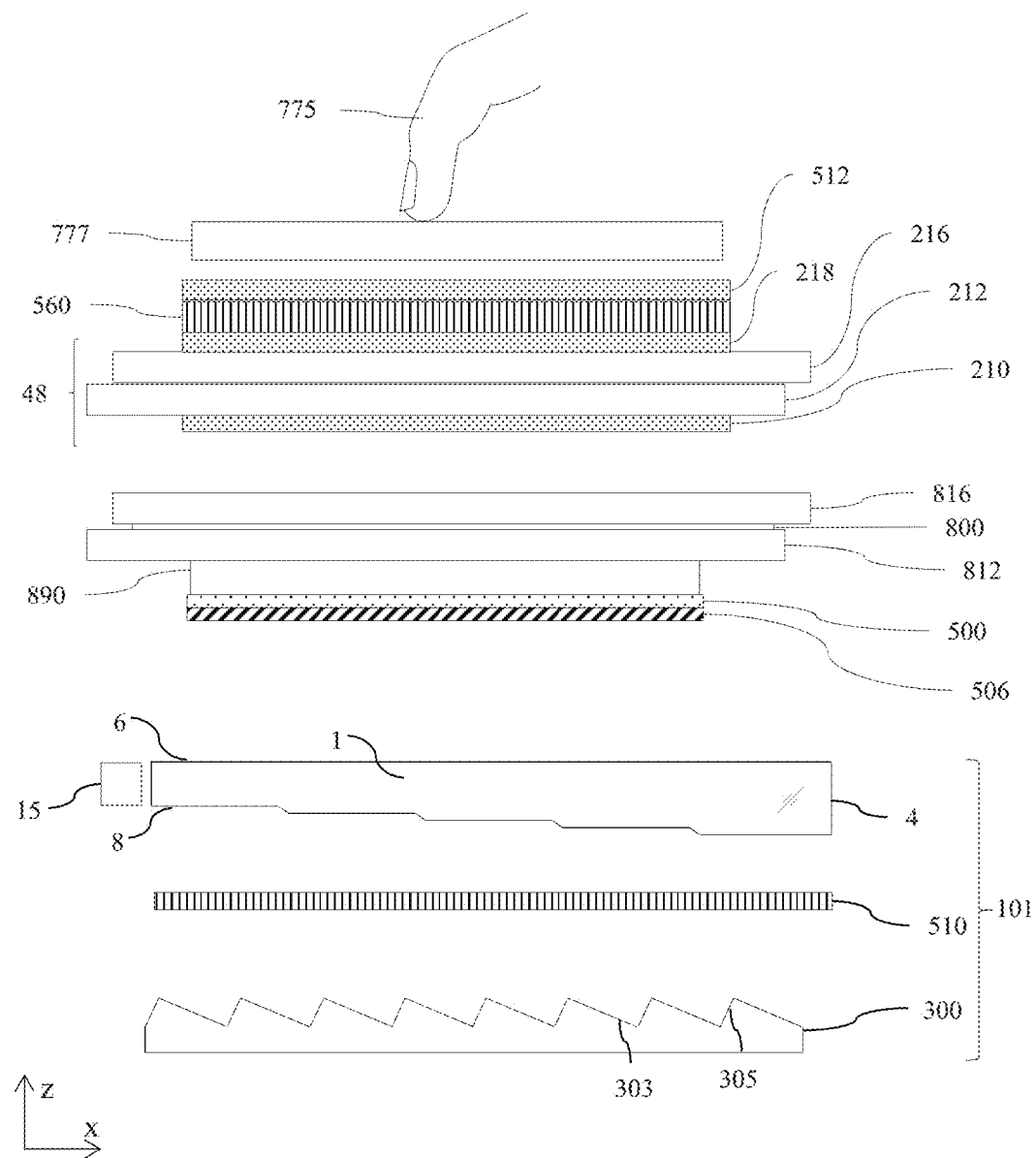

FIG. 46B is a schematic diagram illustrating in side view a directional display comprising a directional waveguide 1 and a homogeneously aligned switchable liquid crystal O-plate arranged between a spatial light modulator and an output polariser and a C-plate 560 arranged between the spatial light modulator output polariser 218 and a further additional polariser 512.

The C-plate 560 operation and switchable liquid crystal O-plate 800 operation provide multiplicative functions as described elsewhere, however the functions are divided between the rear and front of the display. The C-plate 560 and polariser 512 may be arranged as layers of a front mounted touch screen apparatus 777 for finger 775 interaction, advantageously reducing cost and complexity.

Figure 47A:
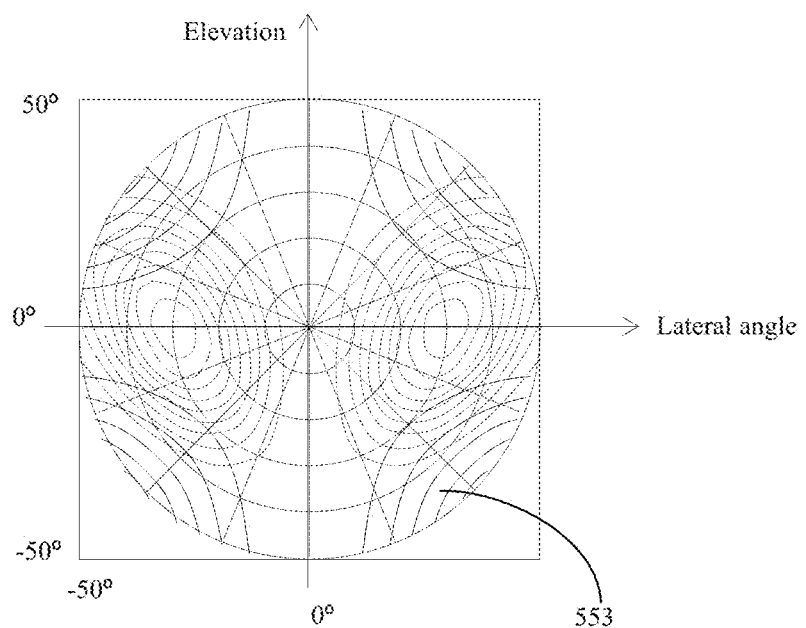
Figure 47B:
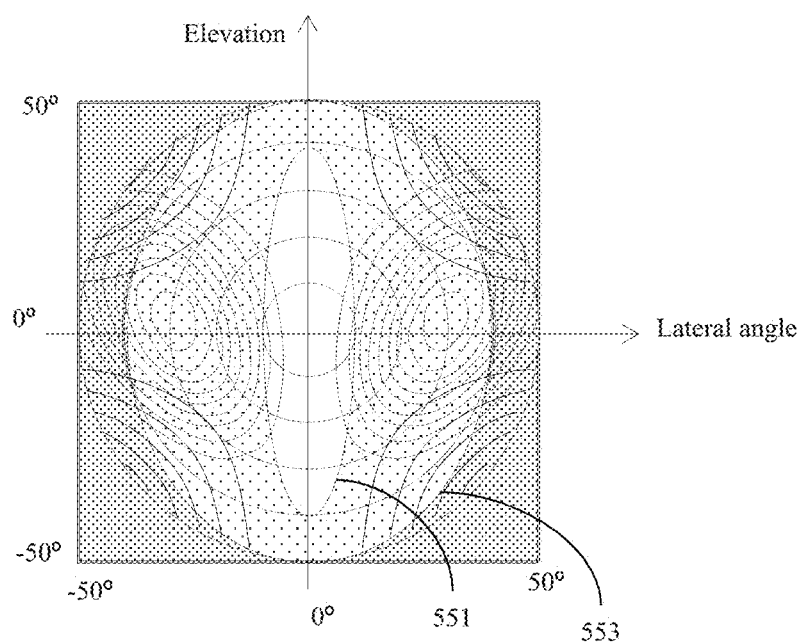
Figure 47B:
Figure 47B:
Figure 47B:
Figure 47C:
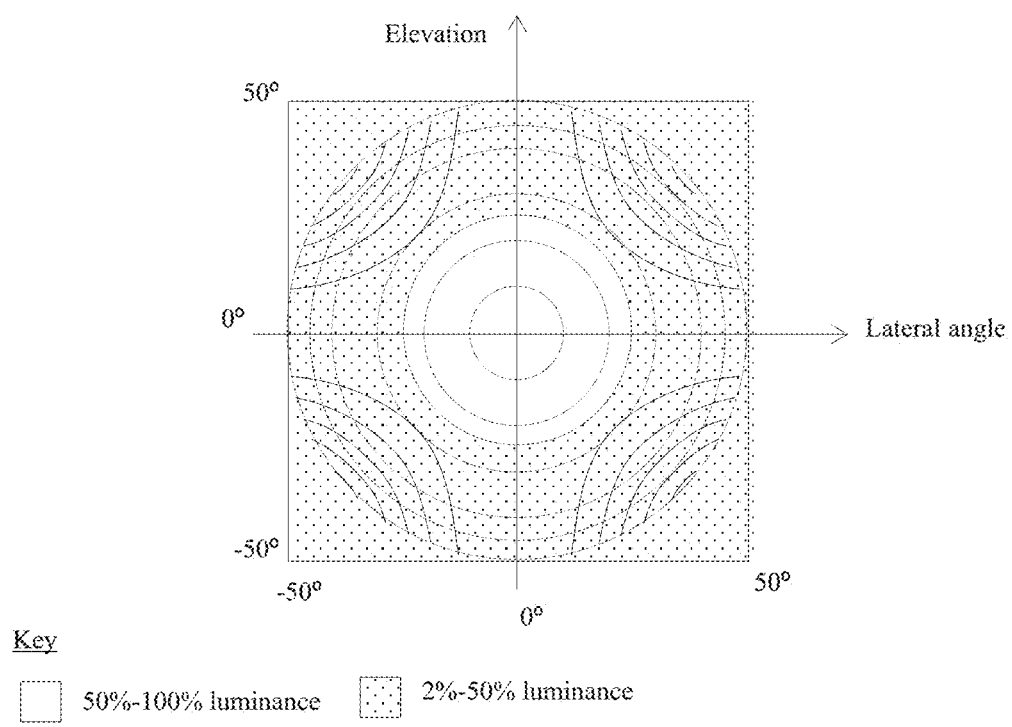

FIG. 47A is a schematic luminance field-of-view graph illustrating variation in transmitted luminance of the homogeneously aligned switchable liquid crystal O-plate and C-plate of FIGS. 45-46B for an applied voltage;

FIG. 47B is a schematic luminance field-of-view graph illustrating variation in transmitted luminance of the optical stack of FIGS. 45-46B in a privacy mode of operation, device luminance being the multiplication of directional backlight 101 luminance field-of-view distribution and retarder luminance field-of-view distribution; and FIG. 47C is a schematic luminance field-of-view graph illustrating variation in transmitted luminance of the optical stack of FIGS. 45-46B in a wide angle mode of operation, device luminance being the multiplication of directional backlight 101 luminance field-of-view distribution and retarder luminance field-of-view distribution.

Thus a display device may comprise a backlight 101 arranged to output light; a transmissive spatial light modulator 48 arranged to receive output light from the backlight 101; an input polariser 210 arranged at the input side of the spatial light modulator 48 between the backlight 101 and the spatial light modulator 48; and an output polariser 218 arranged at the output side of the spatial light modulator 48. Additional polarisers 500, 512 are arranged at the input side of the input polariser 210 between the input polariser 210 and the backlight 101 and on the output side of the output polariser 218 respectively. At least one retarder 800 is arranged between the additional polariser 500 and the input polariser 210 in the case that an additional polariser 500 is arranged on the input side of the input polariser 210. At least one retarder 560 is arranged between the additional polariser 512 and the output polariser 218 in the case that the additional polariser 512 is arranged on the output side of the input polariser 210.

Reduction of luminance in quadrants as illustrated elsewhere herein may be provided, in addition to switchable control of luminance at lower elevations as illustrated in FIG. 42B, the polar profiles being multiplicative. In comparison to the arrangements of FIGS. 43 and 44A, the passive C-plate 560 may advantageously have reduced thickness, complexity and cost.

The luminance field-of-view profiles of FIG. 42B for example provide maximum attenuation polar regions around coordinates 875 that are relatively small polar regions. It would be desirable to increase the area of the polar regions for which off-axis luminance is reduced when a switchable liquid crystal retarder is activated. Further it would be desirable to have substantially no reduction of luminance profile or increase in power consumption in wide angle mode of operation.

Embodiments will now be described wherein the switchable liquid crystal retarder comprises at least one homeotropic alignment layer. At least one correcting passive retarder is arranged between the at least one additional polariser 500 and the input polariser 210 in the case that the additional polariser 500 is arranged on the input side of the input polariser 210 or between the additional polariser 512 and the output polariser 218 in the case that the additional polariser is arranged on the output side of the input polariser 210. The correcting passive retarder comprises a negative C-plate or crossed A-plates.

FIG. 48A is a schematic diagram illustrating in perspective side view orientation in a wide angle mode of operation, a homeotropically aligned switchable liquid crystal O-plate 892 (and thus substantially providing a positive C-plate); and a negative C-plate correcting passive retarder 890 arranged between the input polariser 210 of a spatial light modulator and an additional polariser 500. Thus the display may be provided with at least one retarder that comprises at least one correcting passive retarder 890 and at least one switchable liquid crystal retarder 892.

FIG. 48B is a schematic luminance field-of-view graph illustrating variation in transmitted luminance of the optical stack of FIG. 48A in a wide angle mode of operation. The negative C-plate material 893 is illustrated as discotic liquid crystal molecules (that may be in a cured film); as described elsewhere the negative C-plate may alternatively comprise stretched films for example.

In operation for off-axis incident light, the increase in birefringence for light rays that passes through the switchable positive O-plate is compensated by the reduction in birefringence for the rays as they pass through the negative C-plate. Thus for all viewing angles there is substantially no net birefringence and the combination achieves a wide viewing mode.

Advantageously zero volt drive and thus zero power is achieved for wide angle mode and substantially no change to wide angle luminance profile is achieved.

FIG. 48C is a schematic diagram illustrating the embodiment of FIG. 48A when a voltage is applied by driver 884 to the switchable liquid crystal O-plate 892 in a privacy mode of operation by means of applying a voltage across the liquid crystal material 891 and FIG. 48D is a schematic luminance field-of-view graph illustrating variation in transmitted luminance of the optical stack of FIG. 48C in a privacy mode of operation.

By way of comparison with the arrangements of FIG. 42B for example, the area of the polar region that has attenuation below 20% for example is substantially increased. Advantageously the polar coordinates from which a snooper can perceive data on a display may be substantially reduced.

FIG. 48E is a schematic luminance field-of-view graph illustrating variation in transmitted luminance of a directional backlight in the polar region 569 as illustrated in FIG. 48D. The image has a 3% privacy threshold setting, so some regions may be substantially above that level.

FIG. 48F is a schematic luminance field-of-view graph illustrating variation in transmitted luminance of a directional backlight in a polar region of FIG. 48F further modulated by the optical stack of FIG. 40A. Thus while there is substantial reduction in privacy level around the key snooper viewing angles of 45 degrees lateral angle and 20 degrees elevation, there are other regions where the base image luminance is not as reduced, and so a snooper can more easily perceive the image.

FIG. 48G is a schematic luminance field-of-view graph illustrating variation in transmitted luminance of a directional backlight in a polar region of FIG. 48F further modulated by the optical stack of FIG. 48C.

In the present disclosure, the liquid crystal retarder may have an optical thickness between 500 nm and 1000 nm, preferably between 700 nm and 900 nm and most preferably between 775 nm and 825 nm. Further the at least one correcting passive retarder may have an optical thickness between 400 nm and 800 nm, preferably between 550 nm and 750 nm and more preferably between 625 nm and 675 nm.

TABLE 2 describes an illustrative embodiment for the arrangement of FIGS. 48A and 48C.

TABLE 2

| FIG. | Mode | Correcting passive retarder(s) | | Active LC retarder | | | | |
|---|---|---|---|---|---|---|---|---|
| | | Type | $\Delta n \cdot d$ / nm | Alignment layers | Pretilt/ deg | $\Delta n \cdot d$ / nm | $\Delta\varepsilon$ | Voltage/ V |
| FIG. 48A | Wide | Negative C | −750 | Homeotropic | 88 | 918 | −4.3 | 0 |
| FIG. 48C | Privacy | | | Homeotropic | 88 | | | 2.3 |

In another illustrative example, the active LC retarder 892 may have an optical thickness of 800 nm and the correcting passive retarder 890 may be a C-plate with an optical thickness of −650 nm.

The low luminance vertical bands 567 seen in the exemplary field-of-view plot of FIG. 48D are translated to higher lateral angles (that is, pushed apart) with decreasing active LC retarder cell optical thickness and decreasing correcting passive retarder optical thickness. In comparison to the arrangement of TABLE 2, maximum attenuation is achieved at a larger horizontal viewing angle. Such an arrangement will achieve a wider horizontal viewing angle so that change in luminance with viewing angle and angular color variation is advantageously reduced.

Further, optimisation may be provided for best privacy performance at 45 degrees lateral angle and 22.5 degrees elevation for example. Such a display provides increased privacy performance for typical snooper angular locations.

In comparison with FIG. 48F and the illustrative embodiment of FIG. 40A, the region over which a snooper can perceive an image is advantageously substantially reduced. Further voltage is reduced and power consumption lowered.

It may be desirable to provide high privacy levels in displays with conventional wide angle backlights.

FIG. 48H is a schematic diagram illustrating in perspective side view orientation of multiple parallel homeotropically aligned switchable liquid crystal O-plates 892A, 892B and correcting passive retarders 890A, 890B arranged between a backlight 101 and a spatial light modulator 48. Backlight 101 may for example be a conventional (non-directional) backlight, or may be a directional backlight that is not switchable between at least two different lateral luminance profiles. The multiplicative effect on luminance of profiles as illustrated in FIG. 48D from each stack 890A, 892A and stack 890B, 892B advantageously 892A, 892B achieve substantial reduction in privacy level over a wide field of view. Further cost and complexity of the backlight may be reduced and extended wide angle performance achieved.

Thus the display device may further comprise at least one further additional polariser 500B and at least one further correcting passive retarder 890B and at least one further switchable liquid crystal retarder layer 892B arranged between the at least one further additional polariser 500B and the input polariser 210 in the case that the further additional polariser 500B is arranged on the input side of the input polariser or between the further additional polariser 500B and the output polariser 218 in the case that the further additional polariser 500B is arranged on the output side of the input polariser 210.

Electrodes 850A, 856A of the first switchable liquid crystal retarder layer 892A may further have respective alignment layers (not shown) provided between the respective electrode and the liquid crystal retarder layer 892A; and electrodes 850B, 856B of the first switchable liquid crystal retarder layer 892B may further have respective alignment layers (not shown) provided between the respective electrode and the liquid crystal retarder layer 892B.

The alignment direction 822A of the upper alignment layer of the first switchable liquid crystal layer 892A may be parallel or anti-parallel to the alignment direction 822B of the upper alignment layer of the further switchable liquid crystal layer 892B and the alignment direction 820A of the lower alignment layer of the first switchable liquid crystal layer 892A may be parallel or anti-parallel to the alignment direction 820B of the lower alignment layer of the further switchable liquid crystal layer 892B.

Further the alignment direction of the at least first correcting passive retarder 890A may be parallel or anti-parallel to the alignment direction of the at least one further correcting passive retarder 890B. Alignment directions may be determined by rubbing alignment layers, photoalignment or other known alignment methods. In films alignment direction may be determined by stretch directions or molecular pretilts.

It may be desirable to provide privacy in displays in both lateral and elevation directions.

FIG. 48I is a schematic diagram illustrating in perspective side view orientation of multiple orthogonal homeotropically aligned switchable liquid crystal O-plates 892A, 892B and correcting passive retarders 890A, 890B arranged between a directional backlight 101 and a spatial light modulator 48. Alignment directions of respective layers on each stack may be orthogonal to provide rotated luminance profiles.

The alignment direction 822A of the upper alignment layer of the first switchable liquid crystal layer 892A may be orthogonal to the alignment direction 822B of the upper alignment layer of the further switchable liquid crystal layer 892B and the alignment direction 820A of the lower alignment layer of the first switchable liquid crystal layer 892A may be orthogonal to the alignment direction 820B of the lower alignment layer of the further switchable liquid crystal layer 892B.

Further the alignment direction of the at least first correcting passive retarder 890A may be orthogonal to the alignment direction of the at least one further correcting passive retarder 890B.

FIG. 48J is a schematic luminance field-of-view graph illustrating variation in transmitted luminance of the optical stack of FIG. 48I in a privacy mode of operation. Profile contours 577a, 577b are provided orthogonally and together multiply to provide high on-axis luminance with reduced luminance for both elevation and lateral angle off-axis viewing locations for a snooper. Advantageously image visibility for snoopers viewing from over the head of the primary viewer may be reduced.

It may be desirable to further reduce the visibility of a privacy image to a snooper 47.

FIG. 49A is a schematic diagram illustrating in perspective side view orientation of a homeotropically aligned patterned switchable liquid crystal O-plate 892 arranged between a directional backlight 101 (not shown) and a spatial light modulator 48 (not shown) in a privacy mode of operation arranged to comprise switchable camouflage regions. At least one of the electrodes 850, 856 may be patterned, in this example electrode 856 is patterned with regions 856a, 856b, 856c and driven by respective voltage drivers 884a, 884b, 884c with voltages Va, Vb, Vc. Gaps 885 may be provided between the electrode regions 856a, 856b, 856c. The tilt of the molecules 891a, 891b, 891c may thus be adjusted independently to reveal a camouflage pattern with different luminance levels for off-axis viewing.

Thus at least one of the at least one retarders arranged between the at least one additional polariser 500 and the input polariser 210 in the case that the additional polariser 500 is arranged on the input side of the input polariser or between the additional polariser 500 and the output polariser 218 in the case that the additional polariser 500 is arranged on the output side of the input polariser 210 is controlled by means of addressing electrodes 856a, 856b, 856c and uniform electrode 850. The addressing electrodes may be patterned to provide at least two pattern regions comprising electrode 856a and gap 885.

FIG. 49B is a schematic diagram illustrating in perspective front view illumination of a primary viewer and a snooper by a camouflaged luminance controlled privacy display. Display 100 may have dark image data 1601 and white background data 1603 that is visible to the primary viewer 45 in viewing window 26p. By way of comparison snooper 47 in viewing location 1600 may the camouflaged image as illustrated in FIG. 49C which is a schematic diagram illustrating in perspective side view illumination of a snooper by a camouflaged luminance controlled privacy display. Thus in white background regions 1603, a camouflage structure may be provided that has mixed luminance of the white region 1603. The pattern regions of the electrodes 856a, 856b, 856c are thus camouflage patterns. At least one of the pattern regions is individually addressable and is arranged to operate in a privacy mode of operation.

The pattern regions may be arranged to provide camouflage for multiple spatial frequencies by means of control of which patterns are provided during privacy mode of operation. In an illustrative example, a presentation may be provided with 20 mm high text. A camouflage pattern with similar pattern size may be provided with a first control of an electrode pattern. In a second example a photo may be provided with large area content that is most visible to a snooper 47. The spatial frequency of the camouflage pattern may be reduced to hide the larger area structures, by combining first and second electrode regions to provide the voltage and achieve a resultant lower spatial frequency pattern.

Advantageously a controllable camouflage structure may be provided by means of adjustment of the voltages Va, Vb, Vc across the layer 892. Substantially no visibility of the camouflage structure may be seen for head-on operation. Further the camouflage image may be removed by providing Va, Vb and Vc to be the same.

It may be desirable to reduce the cost of the negative C-plate correcting passive retarder 890 of FIGS. 48A and 48C.

FIG. 50A is a schematic diagram illustrating in perspective side view orientation of a homeotropically aligned switchable liquid crystal O-plate arranged between a directional backlight and a spatial light modulator and crossed A-plates 502, 504 arranged between the spatial light modulator input polariser 210 and an additional polariser 500 in a wide angle mode of operation; and FIG. 50B is a schematic luminance field-of-view graph illustrating variation in transmitted luminance of the optical stack of FIG. 50A in a wide angle mode of operation. FIG. 50C is a schematic diagram illustrating in perspective side view orientation of a homeotropically aligned switchable liquid crystal O-plate correcting passive retarder 890 arranged between a directional backlight and a spatial light modulator and crossed A-plates arranged between the spatial light modulator and an additional polariser in a privacy mode of operation; and FIG. 50D is a schematic luminance field-of-view graph illustrating variation in transmitted luminance of the optical stack of FIG. 50C in a privacy mode of operation. An illustrative embodiment is described in TABLE 3.

TABLE 3

| | | Correcting passive retarder(s) | | Active LC retarder | | | | |
| --- | --- | --- | --- | --- | --- | --- | --- | --- |
| FIG. | Mode | Type | $\Delta n \cdot d$/ nm | Alignment layers | Pretilt/ deg | $\Delta n \cdot d$/ nm | $\Delta\varepsilon$ | Voltage/ V |
| FIG. 50A | Wide | Crossed A | +700 @ 45° | Homeotropic | 88 | 918 | −4.3 | 0 |
| FIG. 50C | Privacy | | +700 @ −45° | Homeotropic | 88 | | | 2.3 |

In comparison to the arrangement of FIGS. 49A and 49C, the crossed A-plates may have improved privacy performance for look-down operation while maintaining a low drive voltage for low drive system cost and reduced power consumption in privacy mode. Further, the cost of the A-plates may be reduced in comparison to the negative C-plate of FIGS. 48A and 48C.

It may be desirable to further increase the area of low luminance for snoopers in privacy mode of operation.

FIG. 51A is a schematic diagram illustrating in perspective side view orientation of a hybrid aligned switchable liquid crystal O-plate 897 arranged between a directional backlight and a spatial light modulator and negative C-plates arranged between the spatial light modulator input polariser 210 and an additional polariser 500 in a wide angle mode of operation. A high voltage state $V_H$ is provided to drive the liquid crystal layer 897 to an O-plate retarder. FIG. 51B is a schematic luminance field-of-view graph illustrating variation in transmitted luminance of the optical stack of FIG. 51A in a wide angle mode of operation.

FIG. 51C is a schematic diagram illustrating in perspective side view orientation of a hybrid aligned switchable liquid crystal O-plate 897 arranged between a directional backlight and a spatial light modulator and a negative C-plate arranged between the spatial light modulator and an additional polariser in a privacy mode of operation. A low voltage state $V_L$ such that the retardance of the liquid crystal layer 897 cooperates with the retardance of the fixed negative C-plate correcting passive retarder 890 to achieve the luminance field-of-view profile of FIG. 51D. An illustrative embodiment is described in TABLE 4. Negative C-plate correcting passive retarder 890 may be alternatively provided by crossed A-plates in a similar manner to FIGS. 50A and 50C.

additional polariser 500 and a spatial light modulator input polariser and a negative C-plate correcting passive retarder 890 arranged between the spatial light modulator and an additional polariser in a wide angle mode of operation. FIG. 52B is a schematic luminance field-of-view graph illustrating variation in transmitted luminance of the optical stack of FIG. 52A in a wide angle mode of operation for a high voltage $V_H$ input from driver 884. FIG. 52C is a schematic diagram illustrating in perspective side view orientation of a homogeneously aligned switchable liquid crystal O-plate 800 arranged between a directional backlight 101 and a spatial light modulator input polariser and a negative C-plate arranged between the spatial light modulator and an additional polariser 500 in a privacy mode of operation, provided by a low voltage $V_L$. FIG. 52D is a schematic luminance field-of-view graph illustrating variation in transmitted luminance of the optical stack of FIG. 52C in a privacy mode of operation.

FIG. 53A is a schematic diagram illustrating in perspective side view orientation of a homogeneously aligned switchable liquid crystal O-plate arranged between additional polariser 500 and a spatial light modulator input polariser 210 and crossed A-plates 502, 504 in a wide angle mode of operation for a high voltage $V_H$ input from driver 884; and FIG. 53B is a schematic luminance field-of-view graph illustrating variation in transmitted luminance of the optical stack of FIG. 53A in a wide angle mode of operation. FIG. 53C is a schematic diagram illustrating in perspective side view orientation of a homogeneously aligned switch-

TABLE 4

| | | Correcting passive retarder(s) | | Active LC retarder | | | | |
|---|---|---|---|---|---|---|---|---|
| FIG. | Mode | Type | $\Delta n \cdot d/$ nm | Alignment layers | Pretilt/ deg | $\Delta n \cdot d/$ nm | $\Delta\varepsilon$ | Voltage/ V |
| FIG. 51A | Wide | Negative C | −750 | Homeotropic | 90 | 1285 | +4.3 | 15.0 |
| FIG. 51C | Privacy | | | Homogeneous | 2 | | | 2.7 |

Advantageously an increased region of viewing reduced privacy is achieved.

By way of comparison, arrangements which do not comprise at least one homeotropic alignment layer will now be described by means of FIGS. 52A-53D and illustrative embodiments of TABLE 5.

FIG. 52A is a schematic diagram illustrating in perspective side view orientation of a homogeneously aligned switchable liquid crystal O-plate 800 arranged between able liquid crystal O-plate arranged between a directional backlight and a spatial light modulator and a negative C-plate arranged between the spatial light modulator and an additional polariser in a privacy mode of operation, provided by a low voltage $V_L$; and FIG. 53D is a schematic luminance field-of-view graph illustrating variation in transmitted luminance of the optical stack of FIG. 53C in a privacy mode of operation.

TABLE 5

| | | Correcting passive retarder(s) | | Active LC retarder | | | | |
|---|---|---|---|---|---|---|---|---|
| FIG. | Mode | Type | $\Delta n \cdot d/$ nm | Alignment layers | Pretilt/ deg | $\Delta n \cdot d/$ nm | $\Delta\varepsilon$ | Voltage/ V |
| FIG. 52A | Wide | Negative C | −750 | Homogeneous | 2 | 918 | +4.3 | 15.0 |
| FIG. 52C | Privacy | | | Homogeneous | 2 | | | 3.8 |
| FIG. 53A | Wide | Crossed A | +700 @ 45° | Homogeneous | 2 | 918 | +4.3 | 25.0 |
| FIG. 53C | Privacy | | +700 @ −45° | Homogeneous | 2 | | | 3.8 |

It may be desirable to provide a voltage in a wide mode of operation and no voltage in privacy mode of operation, for example for a display that is used mostly in privacy mode and for which power saving of privacy mode operation is highly valued by the user.

FIG. 54 is a schematic diagram illustrating in side view orientation of a homogeneously aligned switchable liquid crystal O-plate 800 and a fixed O-plate 807 that may be arranged with a directional backlight 101 and a spatial light modulator 48 wherein the interface between the O-plates is substantially planar. In comparison to the embodiments described above, the retarder material of the fixed O-plate 807 may have a negative dielectric anisotropy, that is the refractive index of the fast axis is arranged to be tilted. Such materials may be referred to as discotic materials as opposed to the rod like materials of positive dielectric anisotropy materials such as illustrated by material 802. The molecules of one of the O-plates 807, 800 may be provided as a fixed retarder, such as a cured reactive mesogen liquid crystal layer. In the present embodiment, the retarder 807 has a fixed retardance while the retarder 800 is switchable.

In operation in a driven state for region 855, the tilted molecules of O-plate 807 are arranged to provide equal and opposite retardance to the tilted molecules of O-plate 800. Thus in the driven state, the net retardance is zero. By way of comparison in the undriven state for region 857, the molecules 802 in retarder 800 relax and no longer compensate the O-plate of the retarder 807, so that an angular profile suitable for Privacy mode operation as described elsewhere herein is provided.

Advantageously the undriven state has lower power consumption, thus the overall power consumption of the Privacy mode may be further reduced in comparison to the arrangement of FIG. 39B for example.

It may be desirable to provide increased diffusion in the wide angle mode of operation in comparison to the privacy mode of operation.

FIG. 55 is a schematic diagram illustrating in perspective side view orientation of a homogeneously aligned switchable liquid crystal O-plate 800 and a fixed O-plate 807 that may be arranged with a directional backlight and a spatial light modulator with no voltage applied wherein the interface 845 between the O-plates is roughened.

In operation in the driven state, the liquid crystal molecules of retarders 800, 807 are matched so that for a given polarisation state, the interface has substantially the same refractive index on each side and no refractive index is step. Such an arrangement produces no optical deflection at the roughened surface 845, and thus input light rays 861 are substantially undeflected.

By way of comparison in the undriven state, an index step is provided at the roughened surface 845 so that light rays 863 are provided with a diffused angular profile.

Advantageously a narrow angle diffusion is provided in privacy mode and a wide angle diffusion is provided in wide angle mode. Further the angular luminance control as provided for FIG. 54 is also provided, achieving reduced image visibility for off-axis viewing positions as described elsewhere herein.

It would be desirable to minimise damage to the display apparatus during assembly and handling.

FIG. 56 is a schematic diagram illustrating a side view of a directional display apparatus optical stack 1760 comprising a directional waveguide 1, wherein a switchable liquid crystal retarder 892, 816, 812 is arranged between the waveguide 1 and the spatial light modulator 48 and surfaces at interfaces 1776, 1770, 1772 and 1774 are arranged to provide reduced damage by an external compressive force 718, as described in U.S. Provisional Patent Appl. No. 62/565,973, filed Sep. 29, 2017, entitled "Optical stack for imaging directional backlights", which is herein incorporated by reference in its entirety.

Optical component 1726 thus comprises interfaces 1776, 1770, 1772, 1774 with surface properties arranged to provide (i) high coefficient of friction under an applied compressive load 1718 that may be by means of wetting, or optical contact, of surfaces 6, 1753 (ii) release from the surface 6 of the waveguide 1 when the compressive load is removed (iii) similar hardness and friability characteristics to the material of the waveguide 1 to minimise damage for any rubbing that does occur. Layer 1724 may further comprise a diffusing function, that may be an asymmetric diffuser with less diffusion in the lateral direction (y-axis) compared to the diffusion in the direction orthogonal to the lateral direction (x-axis).

Advantageously a privacy display that can be viewed with low image visibility from a wide range of viewing angles may be provided. The display has low sensitivity to damage from external applied compressive force 1718 and has extended lifetime and improved uniformity.

It may be desirable to provide further reduction of image visibility to off-axis snoopers by reducing image contrast as well as image luminance as described elsewhere herein. Reduction of off-axis contrast in directional displays incorporating directional backlights is described in U.S. Patent Publ. No. 2015-0378085, herein incorporated by reference in its entirety.

FIG. 57 is a schematic diagram illustrating a side view of a directional display control system comprising control of spatial light modulator, retarder layer and light source array. Control system may comprise directional display controller 401 that is arrange to provide control signals to image controller 403 and light source array controller 402. Further retarder controller 405 may be arranged to provide control signals to retarder driver 884. The spatial light modulator 48 may be arranged to have a high frame rate, for example 120 Hz or greater compared to 60 Hz that may be typically used for other embodiments described elsewhere herein. Display controller 410 may be arranged to provide at least first and second phases of signals to image controller 403, light source array controller 402 and optionally to retarder controller 405. The operation of the display to provide reduced contrast to off-axis snoopers will now be described.

FIGS. 58A-58E are schematic diagrams illustrating the operation of a directional display in privacy mode wherein a primary image is provided on the spatial light modulator in at least a first phase of operation.

Figure 58A:
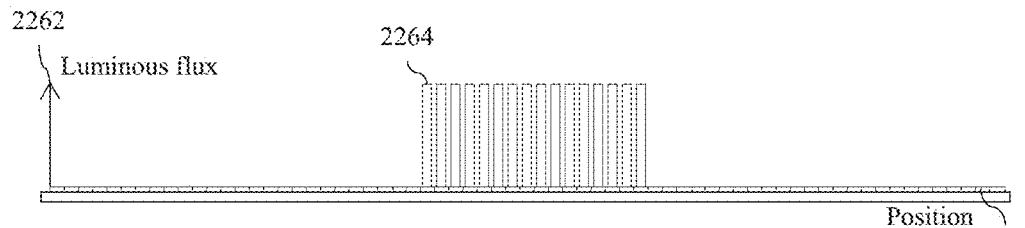

FIG. 58A shows the relative luminous flux 2262 of the light sources 15a-n in array 15 of light sources against position 2260. Such an illumination structure will provide a primary illumination structure 2272 in the window plane of the display. The window plane is the plane of the image of the light sources of the array 15, for example at the location of window 26n and optical axis 197 in FIG. 12B.

Accordingly this is an example in which there are plural primary light sources. Thus individual light source flux 2264 may be uniform in a region near the center of the array, and zero in other regions. Alternatively the flux 2264 may vary across the illuminated elements to provide a graded luminance with viewing angle within a primary viewing cone.

Figure 58B:
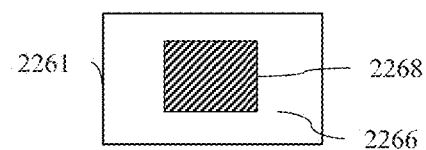

FIG. 58B shows an example displayed primary image 2261 on the spatial light modulator 48 that comprises a low transmittance region 2268, for example 0% transmittance and high transmittance region 2266, for example 100%.

Figure 58C:
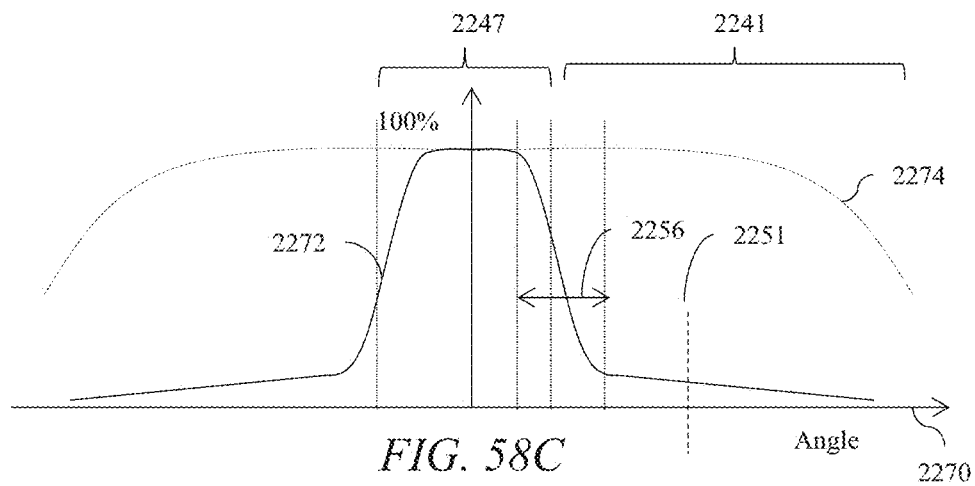

FIG. 58C shows a graph that illustrates the variation of relative luminance and contrast with viewing angle 2270 of the display 100 in the window plane. Profile 2272 may be provided by the directional display comprising for example the active retarders layers 892 and additional polarisers as illustrated in FIG. 48D for example.

Thus luminance distribution 2272 comprises a central viewing window 2247 and stray light region 2241 wherein the luminance is non-zero, for example 1% at the angular position 2251 in the following illustrative example. In operation, the amount of stray light may vary within the region 2241, as shown.

FIG. 58C further illustrates a distribution 2274 of contrast of the perceived image seen on the spatial light modulator 48 with viewing angle, that may be substantially uniform other than for high viewing angles. The polar viewing angle properties of the profile 2274 are determined by the optical properties of the liquid crystal layer 214 and polarisers 210, 218 together with an retarders between polarisers 210, 218, and are thus substantially independent of the optical properties of the backlight apparatus.

Figure 58D:
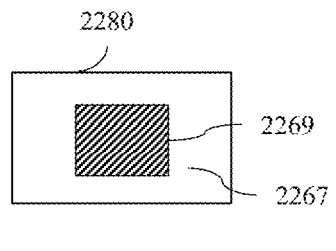

FIG. 58D illustrates the perceived primary image 2280 for a primary observer in the primary viewing window 2247, such that regions 2267, 2269 have relative luminances of 100% and 0% that are substantially equivalent to relative transmittances of regions 2266, 2268 respectively.

Figure 58E:
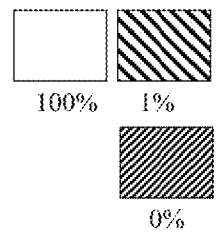
Figure 58E:
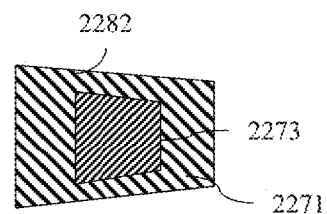

FIG. 58E shows, using a representation of perspective, the perceived secondary image 2282 for angular position 2251 comprising regions 2271, 2273. Region 2273 may have substantially 0% luminance, whereas region 2271 may have 1% luminance in this illustrative example, being the transmittance of region 2266 modulated by the stray light luminance at angular position 2251.

Thus the arrangement of FIGS. 58A-58E may provide a privacy mode operation in which the luminance for a secondary observer is 1% of the luminance for the primary observer. Such an image luminance may provide obscuration of the primary image to the secondary observer by means of luminance as described elsewhere herein.

The contrast of the primary image to the secondary observer may be substantially the same and thus features may still be visible.

It may be desirable to further reduce the visibility images, for example in dark environments where small amounts of light may still provide image readability to snoopers. In the present embodiments, the arrangement of FIG. 58A-58E may be provided in a first phase of operation of a temporally multiplexed display. A second phase of operation is provided to achieve further image obscuration, for example using a frame update rate of greater than 60 Hz, for example 120 Hz.

FIGS. 59A-59E are schematic diagrams illustrating the operation in a second phase of a directional display in privacy mode wherein a primary image is provided on the spatial light modulator in a first phase and a secondary image is provided on the spatial light modulator in a second phase.

Figure 59A:
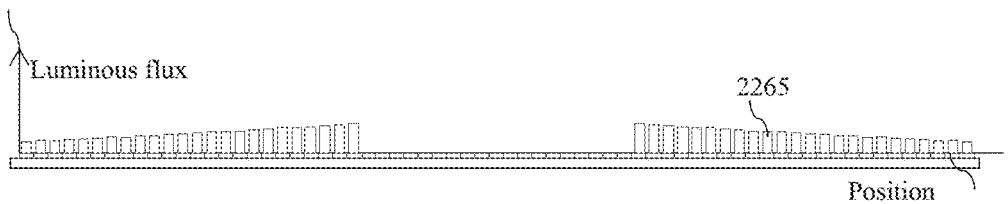

This is an example in which there are plural secondary light sources. FIG. 59A shows that the light sources of array 15 are operated so that the secondary light sources output light with differing luminous flux profile 2265. As a result, there is achieved secondary illumination structure such that light source flux 2265 is arranged to provide substantially the same luminance as the stray light from the primary illumination in the stray light region 2241.

Figure 59B:
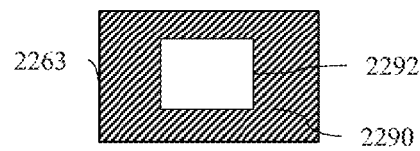

FIG. 59B shows secondary image 2263 with 0% transmittance in the region 2290 and 100% transmittance in the region 2292. Thus the displayed secondary image 2263 may for example be inverted compared to the displayed primary image 2261.

Figure 59C:
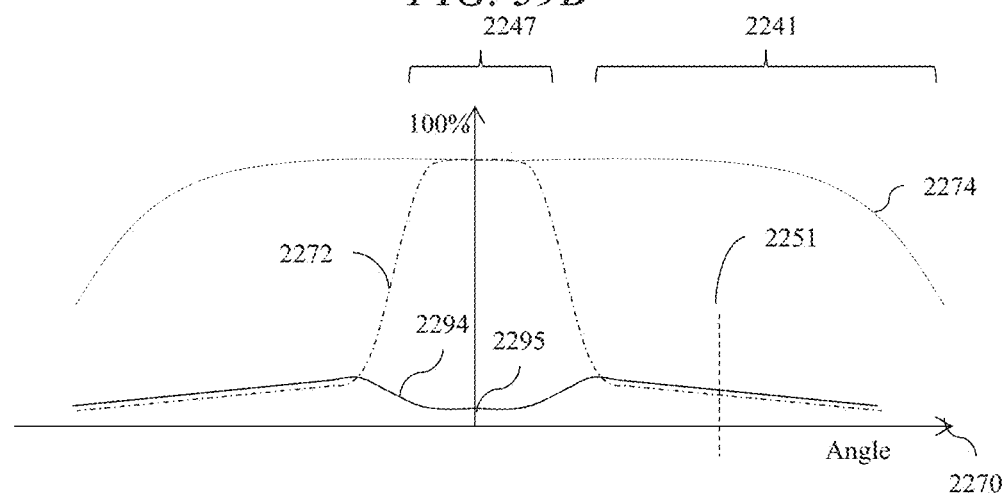

As illustrated in FIG. 59C, the luminance structure 2294 may be substantially matched to structure 2272 in the stray light region 2241, and thus in the illustrative embodiment may achieve a luminance of 1% at angular position 2251. The angular contrast distribution 2274 in the secondary phase is the same as for the primary phase.

Figure 59D:
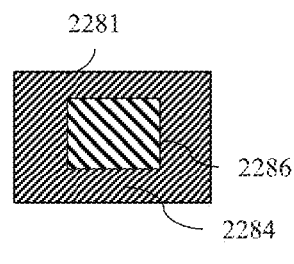

FIG. 59D illustrates the perceived secondary image 2281 to the primary observer 300 comprising region 2284 with luminance 0% and region 2286 with luminance 1% that comprises stray light 2295 from the secondary light sources.

Figure 59E:
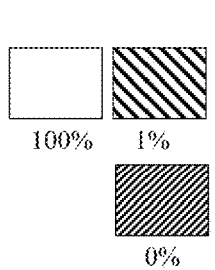

FIG. 59E illustrates a representation of perspective of the perceived secondary image 2283 comprising region 2288 with 0% luminance and region 2290 with 1% luminance, determined by the SLM 48 transmittance for the region 2292 and luminance at position 2251.

It will be observed that the perceived image 2283 in the second phase is substantially the inverse of the perceived image 2282 in the first phase for off-axis viewing positions. The images combine to achieve a perceived secondary image with very low contrast. Advantageously a high degree of obscuration of the primary image to a secondary observer in the secondary viewing windows 2241 may be provided due to contrast reduction.

In operation, matching of perceived primary and secondary images 2282, 2283 may be achieved at a small range of viewing locations, for example location 2251. At other regions of viewing, the matching of the luminance in the two phases for off-axis viewing regions 2241 may be less well matched and residual image contrast may be perceived. In the present disclosure, the luminance for off-axis viewing is reduced.

In comparison to a directional display without the switchable liquid crystal retarder of the present disclosure, the difference in luminance at these non-matched angles for first and second phases is smaller. Residual image luminance differences in first and second phases are reduced, and advantageously image contrast is further reduced, advantageously reducing image visibility to a snooper.

In other words the control system 401, 403, 402 may be capable of controlling the spatial light modulator 48 and capable of selectively operating of light sources 15a-n to direct light into corresponding optical windows 26a-n, wherein stray light in the directional backlight is directed in output directions 2251 outside the optical windows 26 corresponding to selectively operated light sources 2264.

The control system may be further arranged to control the spatial light modulator 48 and the array of light sources 15a-n in synchronization with each other so that: (a) the spatial light modulator 48 displays a primary image 2261 while at least one primary light source is selectively operated to direct light into at least one primary optical window for viewing by a primary observer (that is not a snooper), and (b) in a temporally multiplexed manner with the display of the primary image 2261, the spatial light modulator 48 displays a secondary image 2263 while at least one light source other than the at least one primary light source is selectively operated to direct light into secondary optical windows outside the at least one primary optical window, the secondary image 2282 as perceived by a secondary observer (that may be a snooper) outside the primary optical window obscuring the primary image 2282 that modulates the stray light directed outside the primary optical window 2247.

It may be desirable to reduce power consumption of the display further.

The control system may be arranged to control the applied voltage across the switchable liquid crystal retarder in a temporally multiplexed manner. Thus retarder controller 405 may be further arranged to control the voltage across the switchable retarder in synchronisation with the switching of the spatial light modulator and the light sources. The stray light profile may be adjusted in cooperation with the luminous flux on the array 15 of light sources. In the first phase of operation as described with reference to FIG. 58A, the switchable retarder may be provided with a narrow output luminance profile in the lateral direction, whereas in the second phase of operation, a wider output luminance profile may be provided.

In operation, reduced light flux may be provided in the second mode of operation if the switchable retarder has a higher off-axis output in the second phase of operation. Advantageously power consumption may be reduced in the second phase of operation, and the light sources may be driven less hard, extending lifetime and increasing efficiency.

Directional backlights comprising other types of waveguide will now be described.

FIG. 60 is a schematic diagram illustrating a side view of a directional display apparatus optical stack comprising a collimating waveguide 1901, a wide angle waveguide 1920, a switchable liquid crystal O-plate 892 and a correcting passive retarder 890 arranged between additional polariser 500 and input polariser 210.

In operation fixed collimating waveguide 1901 is illuminated on side 1902 by light source 1915. The fixed collimating waveguide is provided with a taper that has a cross sectional shape that increases in width for light propagating in the waveguide in a direction away from the light sources at the input end. The tapered waveguide may alternatively or additionally be provided by tapered light redirecting micro structures as will be described in FIG. 33. Light rays 1910 that leak from the upper surface 1906 and are incident on prism array 1926. Prism array 1927 deflects grazing incidence light rays 1910 towards the normal direction, providing a narrow light cone angle in the lateral direction (y-z plane) that may be partially diffused by diffuser 1929. The direction of the ray 1910 is substantially independent of the location of the light source 1915 on the input side 1902 and the fixed collimating waveguide 1901 does not image the source 1915 in comparison to imaging waveguide 1 that provides optical windows.

Thus a directional backlight may comprise a waveguide 1920 further comprises a taper, the waveguide being arranged to deflect input light rays 1910 guided through the waveguide 1920 from the light sources 1915 to exit through the first guide surface 1906. Thus one of the optical components 726 comprises a prism array 1927 arranged to deflect light rays 1910 that exit through the first guide surface 1906 of the waveguide 1901.

To provide a wide angle mode of operation, a second wide angle waveguide 1920 may be provided. Wide angle waveguide 1920 is provided with microstructures (not shown) on the surfaces 1921, 1919 to provide scattered light for light rays 1930 from light sources 1925.

Switchable liquid crystal retarder 892 and correcting passive retarder 890 may advantageously achieve substantially reduced off-axis image visibility to a snooper in privacy mode of operation.

FIG. 61 is a schematic diagram illustrating a side view of a directional display apparatus optical stack comprising a collimating waveguide and switchable diffuser, a switchable liquid crystal O-plate and a correcting passive retarder.

Fixed collimating waveguide 1951 may be provided with microstructures 1953 that couple some light rays 1970 from light source 1955 into the vertical direction by means of reflection at prism array 726. The microstructures operate in a similar manner to the single tapered waveguide of FIG. 60, thus the at least one tapered waveguide comprises an array of tapered microstructures 1953.

The backlight may further incorporate a switchable diffuser layer 1960 comprising polymer dispersed liquid crystal (PDLC) 1955. In a narrow angle mode of operation, the liquid crystal is arranged to transmit light rays 1972 that are transmitted through microstructures 1953. Light rays 1972 are absorbed by absorbing layer 1962 and thus not output through the spatial light modulator 48.

In a wide angle mode of operation, the liquid crystal molecules in the PDLC 1955 are switched to provide a scattering function with the surrounding medium and thus light rays 1974 are scattered to a wide range of viewing positions.

Switchable liquid crystal retarder 892 and correcting passive retarder 890 may advantageously achieve substantially reduced off-axis image visibility to a snooper in privacy mode of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A backlight device comprising: a first array of plural light sources and a second array of plural light sources; a first waveguide comprising: a first input end extending in a first lateral direction along a first side of the first waveguide, and opposed first and second guide surfaces extending across the first waveguide from the first input end in a first longitudinal direction, the opposed first and second guide surfaces operable to guide light input at the first input end along the first waveguide, wherein the first waveguide is arranged to extract input light guided through the first waveguide to exit through the first guide surface in grazing directions with respect to the first guide surface; a second waveguide, comprising: a second input end extending in a second lateral direction along a second side of the second waveguide; and opposed third and fourth guide surfaces extending across the second waveguide from the second input end in a second longitudinal direction, the opposed third and fourth guide surfaces operable to guide light input at the second input end along the second waveguide, wherein the second waveguide is arranged to extract input light guided through the second waveguide to exit through the third guide surface in grazing directions with respect to the third guide surface, wherein the first and second longitudinal directions are in opposite directions, wherein the first array of plural light sources is disposed along the input end of the first waveguide and arranged to input input light into the first waveguide, wherein the second array of plural light sources is disposed along the input end of the second waveguide and arranged to input input light in to the second waveguide; a prismatic input layer arranged to receive the light extracted from the first and second waveguides in the grazing directions with respect to the first and third guide surfaces respectively and to direct the received light towards the normal to the plane of the prismatic layer; an output polariser arranged on an output side of the prismatic layer; an additional polariser arranged on the output side of the output polariser; and at least one retarder arranged between the additional polariser and the output polariser, wherein the light from the first and second waveguides is directed to provide first and second viewing windows, a control system arranged to control the first and second arrays of plural light sources, wherein the control system is arranged to provide switching between, in a first mode of operation, the first array of plural light sources being operated along the input end of the first waveguide, and a first applied voltage across the switchable liquid crystal retarder; and in a second mode of operation, the second array of plural light sources being operated along the input end of the second waveguide, and a second applied voltage across the switchable liquid crystal retarder, wherein the second applied voltage is different to the first applied voltage.

2. A backlight device according to claim 1, wherein the light from the respective first and second waveguides is directed to provide viewing windows having different widths.

3. A backlight device according to claim 1, further comprising a rear scattering reflector arranged behind the first and second waveguides.

4. A backlight device according to claim 1, further comprising an intermediate diffuser layer arranged between the first and second waveguides.

5. A backlight device according to claim 1, wherein at least one of the first and second guide surfaces of the first waveguide or the third and fourth guide surfaces of the second waveguide comprise microstructures that are arranged to extract input light guided through the first or second waveguides to exit through the first or third guide surfaces in grazing directions with respect to the first or third guide surfaces.

6. A backlight device according to claim 1, wherein the prismatic input layer comprises first input facets and second input facets, wherein the light extracted from one of the first and second waveguides is received by the first input facets and the light extracted from the other of the first and second waveguides is received by the second input facets.

7. A backlight device according to claim 1, wherein at least one retarder comprises a switchable liquid crystal retarder, and the display device further comprises a control system that is arranged to control the first and second arrays of plural light sources and is further arranged to control an applied voltage across the switchable liquid crystal retarder.

8. A backlight device according to claim 1, wherein in the second mode of operation, the first array of plural light sources is also operated along the input end of the first waveguide.

9. A backlight device according to claim 1, wherein the additional polariser is arranged on the input side of the input polariser and said at least one retarder is arranged between the additional polariser and the input polariser.

10. A backlight device according to claim 9, wherein the additional polariser is a reflective polariser.

11. A backlight device according to claim 1, wherein the additional polariser has an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser.

12. A backlight device according to claim 1, wherein the additional polariser is arranged on the output side of the output polariser and said at least one retarder is arranged between the additional polariser and the output polariser.

13. A backlight device according to claim 1, wherein the at least one retarder comprises at least one switchable liquid crystal retarder and at least one correcting passive retarder.

14. A backlight device according to claim 13, wherein the at least one correcting passive retarder comprises a pair of retarders which have slow axes in a plane of the retarders that are crossed.

15. A backlight device according to claim 13, wherein the at least one correcting passive retarder comprises a retarder having a slow axis perpendicular to a plane of the retarder.

16. A backlight device according to claim 13, wherein the at least one correcting passive retarder comprises a retarder having a slow axis orientation with a component perpendicular to the plane of the retarder, and at least one component in a plane of the retarder.

17. A backlight device according to claim 13, wherein the at least one switchable liquid crystal retarder has an optical thickness between 500 nm and 1000 nm.

18. A backlight device according to claim 17, wherein the at least one correcting passive retarder has an optical thickness between 400 nm and 800 nm.

19. A backlight device according to claim 1, further comprising at least one further additional polariser and at least one further correcting passive retarder and at least one further switchable liquid crystal retarder layer arranged between the at least one further additional polariser and the input polariser in the case that the further additional polariser is arranged on the input side of the input polariser or between the further additional polariser and the output polariser in the case that the further additional polariser is arranged on the output side of the input polariser.

* * * * *